US012804311B2

(12) United States Patent
Chiba et al.

(10) Patent No.: US 12,804,311 B2
(45) Date of Patent: Nov. 17, 2026

(54) ACOUSTIC SIGNAL OUTPUT DEVICE

(71) Applicant: NTT, Inc., Tokyo (JP)

(72) Inventors: Hironobu Chiba, Tokyo (JP); Tatsuya Kako, Tokyo (JP)

(73) Assignee: NTT, Inc., Tokyo (JP)

( * ) Notice: Subject to any disclaimer, the term of this patent is extended or adjusted under 35 U.S.C. 154(b) by 121 days.

(21) Appl. No.: 18/849,530

(22) PCT Filed: Mar. 31, 2022

(86) PCT No.: PCT/JP2022/016739
§ 371 (c)(1),
(2) Date: Sep. 22, 2024

(87) PCT Pub. No.: WO2023/188345
PCT Pub. Date: Oct. 5, 2023

(65) Prior Publication Data

US 2025/0203276 A1 Jun. 19, 2025

(51) Int. Cl.
*H04R 1/28* (2006.01)
*H04R 1/10* (2026.01)
(Continued)

(52) U.S. Cl.
CPC ......... *H04R 1/2857* (2013.01); *H04R 1/1008* (2013.01); *H04R 1/345* (2013.01); *H04R 3/12* (2013.01)

(58) Field of Classification Search
CPC .... H04R 1/2857; H04R 1/1008; H04R 1/345; H04R 3/12
(Continued)

(56) References Cited

U.S. PATENT DOCUMENTS 11,956,591 B2 4/2024 Fu et al.
2010/0080400 A1* 4/2010 Sibbald .................. H04R 3/002 381/71.6
(Continued)

FOREIGN PATENT DOCUMENTS

CN 112738680 A 4/2021
WO 2021/052485 A1 3/2021

OTHER PUBLICATIONS

"What Are Open-Ear Headphones?" Bose Corporation [on-line] Accessed on Sep. 13, 2021, website: https://www.bose.com/en_us/better_with_bose/open-ear-headphones.html.

*Primary Examiner* — Sean H Nguyen

(57) ABSTRACT

An acoustic signal output device includes a driver unit and a housing that houses the driver unit therein. An acoustic signal emitted from the driver unit to one side is defined as a first acoustic signal, and an acoustic signal emitted from the driver unit to the other side is defined as a second acoustic signal. A wall of the housing is provided with a first sound holes for guiding the first acoustic signal to the outside, and a second sound holes for guiding the second acoustic signal to the outside. A waveguide for adjusting at least one of a path length from a position of the driver unit to an emission position of the first acoustic signal to the outside and/or a path length to an emission position of the second acoustic signal to the outside is provided. An attenuation rate of the first acoustic signal at a second point farther from the acoustic signal output device than a predetermined first point with respect to the first point which the first acoustic signal reaches is equal to or smaller than a predetermined value smaller than an attenuation rate due to air propagation. Alternatively, an attenuation amount of the first acoustic signal at the second point with respect to the first point is equal to or larger than a predetermined value larger than an attenuation amount due to air propagation.

9 Claims, 80 Drawing Sheets

(51) Int. Cl.
*H04R 1/34* (2006.01)
*H04R 3/12* (2006.01)

(58) Field of Classification Search
USPC .......................................................... 381/89
See application file for complete search history.

(56) References Cited

U.S. PATENT DOCUMENTS

| | | | |
|---|---|---|---|
| 2021/0067858 | A1 | 3/2021 | Struzik |
| 2021/0289281 | A1 | 9/2021 | Zhang et al. |
| 2023/0370762 | A1 | 11/2023 | Wang |

* cited by examiner

ACOUSTIC SIGNAL OUTPUT DEVICE

CROSS-REFERENCE TO RELATED APPLICATIONS

This application is a U.S. 371 Application of International Patent Application No. PCT/JP2022/016739, filed on 31 Mar. 2022, the disclosure of which is hereby incorporated herein by reference in its entirety.

TECHNICAL FIELD

The present invention relates to an acoustic signal output device, and particularly to an acoustic signal output device that does not seal the ear canal.

BACKGROUND ART

In recent years, the increased strain on the ears caused by wearing earphones and headphones has become a problem. Open-ear (open-type) earphones and headphones that do not block the ear canal are known as devices that reduce the burden on the ears.

CITATION LIST

Non Patent Literature

NPL 1: "WHAT ARE OPEN-EAR HEADPHONES?", [online], Bose Corporation, [Retrieved on Sep. 13, 2021], Internet <https://www.bose.com/en_us/better_with_bose/open-ear-headphones.html>

SUMMARY OF INVENTION

Technical Problem

However, open-ear earphones and headphones have a problem in that sound leakage to the surroundings is large. Such a problem is not limited to open-ear earphones or headphones, and is a problem common to acoustic signal output devices that do not seal the ear canal.

The present invention has been made in view of these points, and an object of the present invention is to provide an acoustic signal output device that does not seal the ear canal and can suppress sound leakage to the surroundings.

Solution to Problem

An acoustic signal output device is provided that includes a driver unit and a housing that houses the driver unit therein. Here, an acoustic signal emitted from the driver unit to one side is defined as a first acoustic signal, and an acoustic signal emitted from the driver unit to the other side is defined as a second acoustic signal. A wall of the housing is provided with one or more first sound holes for guiding the first acoustic signal to the outside, and one or more second sound holes for guiding the second acoustic signal to the outside. A waveguide for adjusting at least one of a path length from a position of the driver unit to an emission position of the first acoustic signal to the outside and/or a path length to an emission position of the second acoustic signal to the outside is provided. The acoustic signal output device is designed so that an attenuation rate of the first acoustic signal at a second point farther from the acoustic signal output device than a predetermined first point with respect to the first point which the first acoustic signal reaches when the first acoustic signal is emitted from the first sound hole and the second acoustic signal is emitted from the second sound hole is equal to or less than a predetermined value smaller than an attenuation rate of an acoustic signal due to air propagation at the second point with respect to the first point, or an attenuation amount of the first acoustic signal at the second point with respect to the first point is equal to or larger than a predetermined value larger than an attenuation amount of an acoustic signal due to air propagation at the second point with respect to the first point.

Advantageous Effects of Invention

This structure can suppress sound leakage to the surroundings.

54A and 54B are front views illustrating a modification of the acoustic signal output device of the fifth embodiment.

Figure 55A:
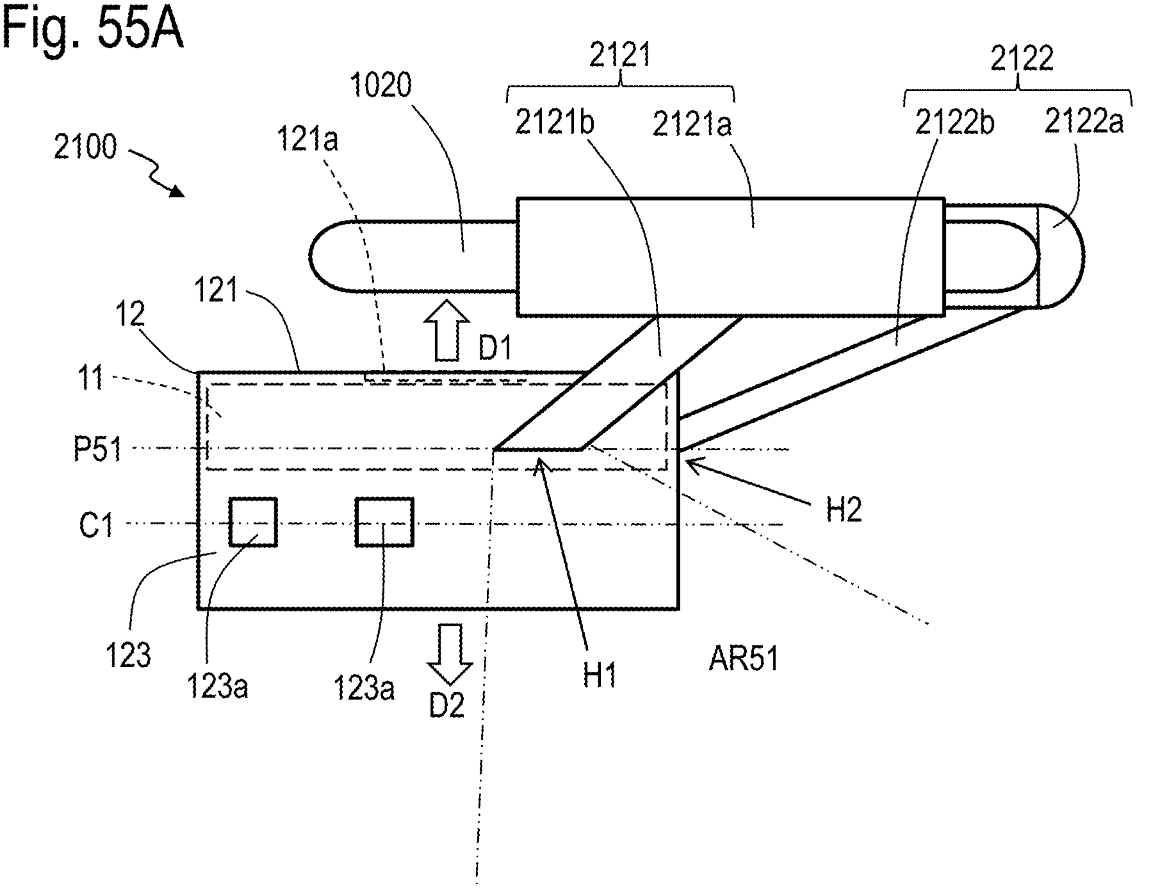
Figure 55B:
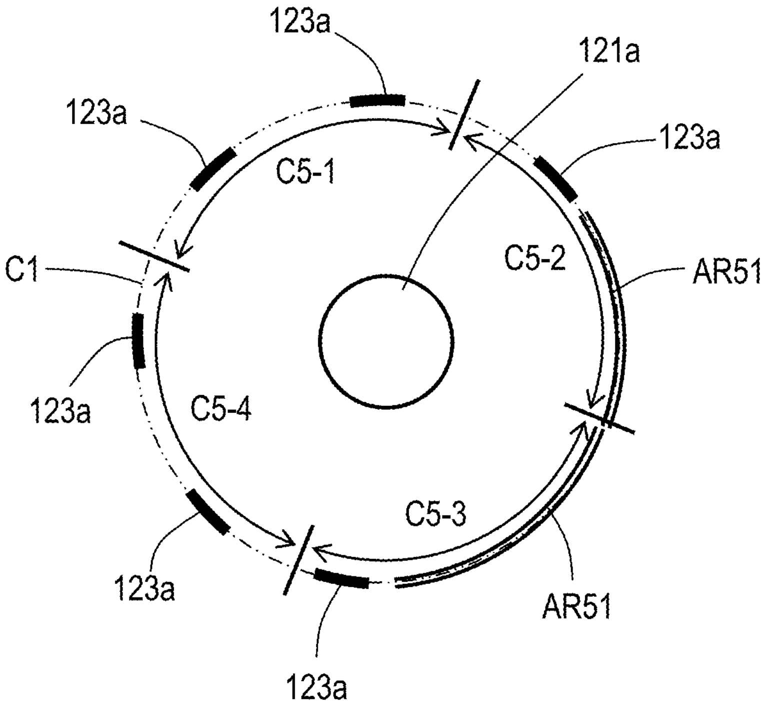

FIG. 55A is a plan view illustrating a modification of the acoustic signal output device of the fifth embodiment. FIG. 55B is a conceptual diagram illustrating a modification of the arrangement of sound holes.

Figure 56A:
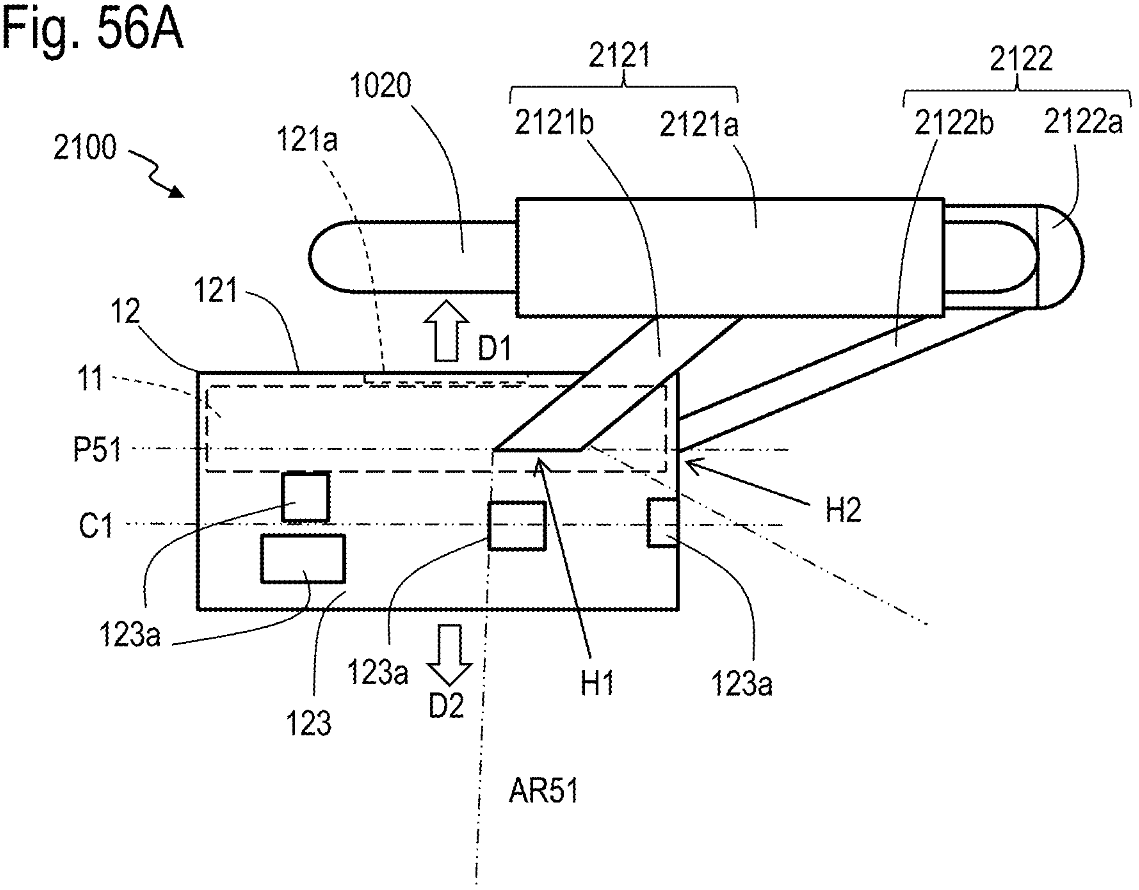
Figure 56B:
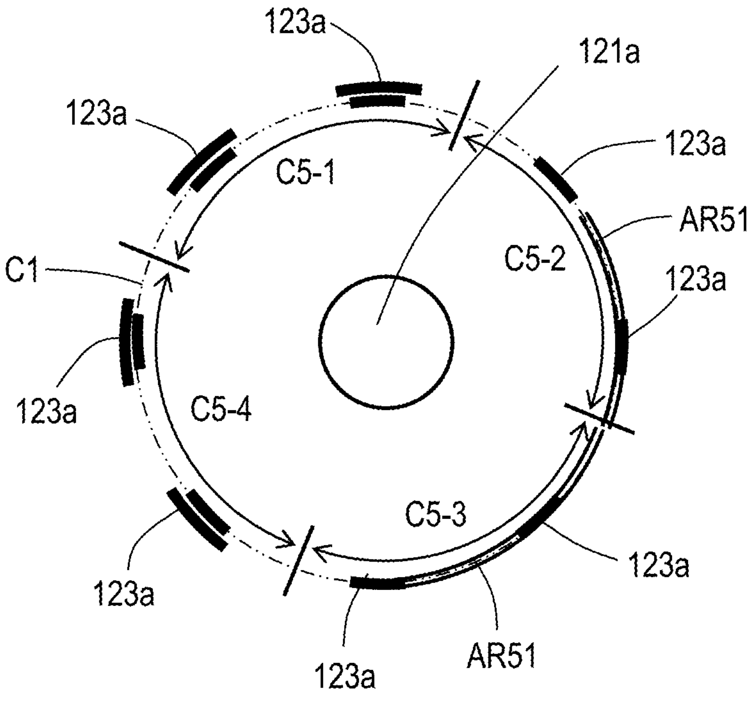

FIG. 56A is a plan view illustrating a modification of the acoustic signal output device of the fifth embodiment. FIG. 56B is a conceptual diagram illustrating a modification of the arrangement of sound holes.

Figure 57:
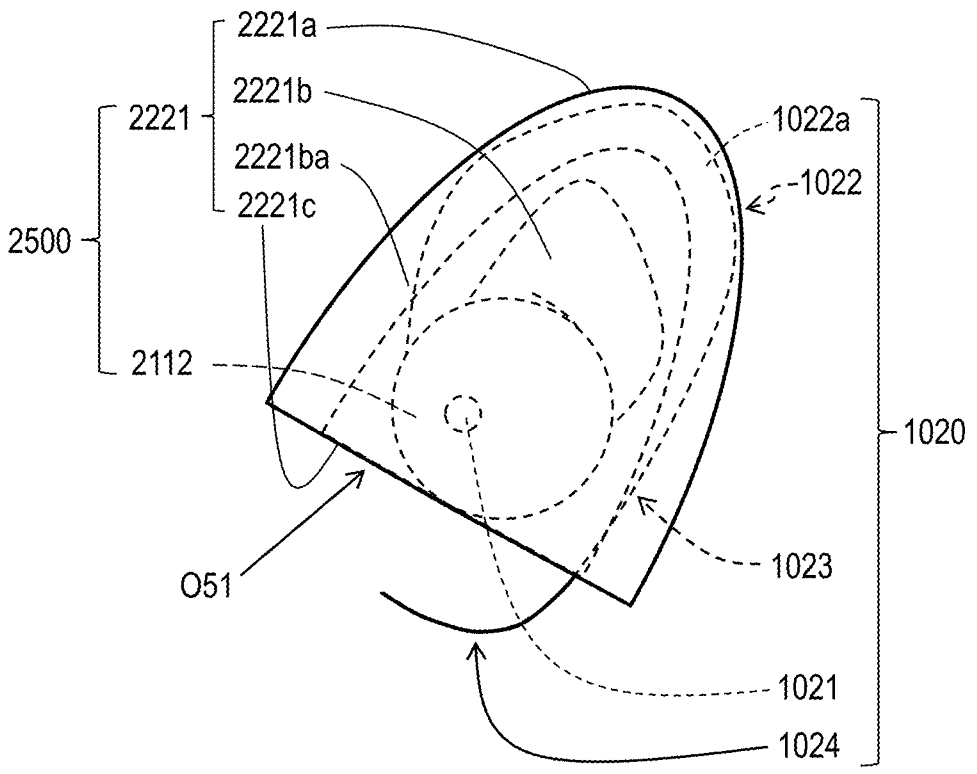

FIG. 57 is a transparent front view illustrating the configuration of the acoustic signal output device of the fifth embodiment.

Figure 58A:
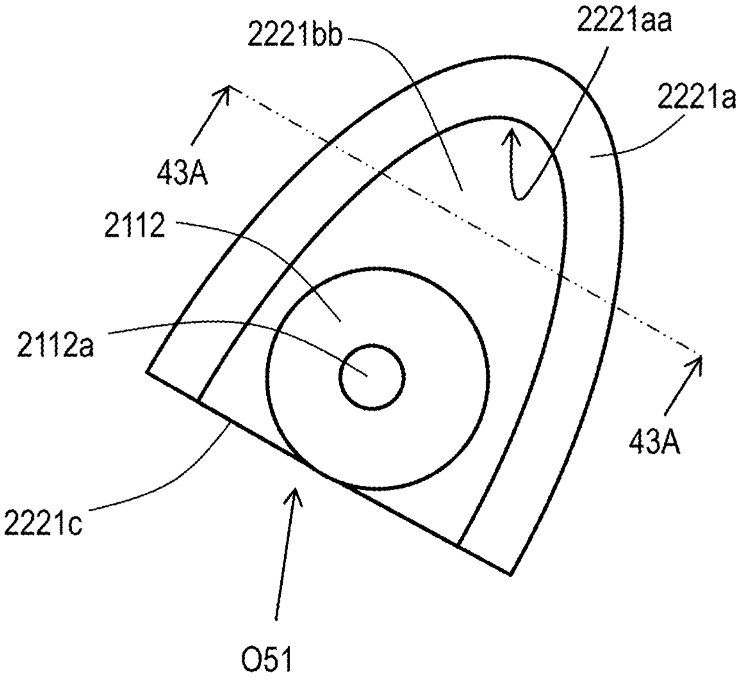
Figure 58B:
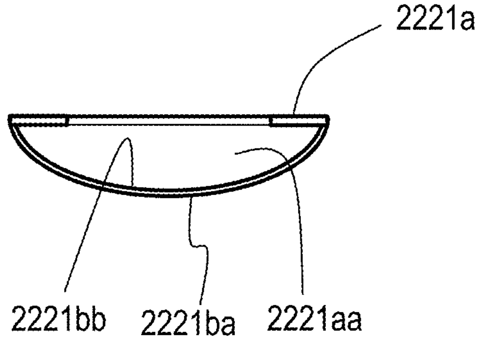

FIG. 58A is a rear view illustrating the configuration of the acoustic signal output device of the fifth embodiment. FIG. 58B is a cross-sectional view taken along the line 43A-43A in FIG. 58A.

Figure 59:
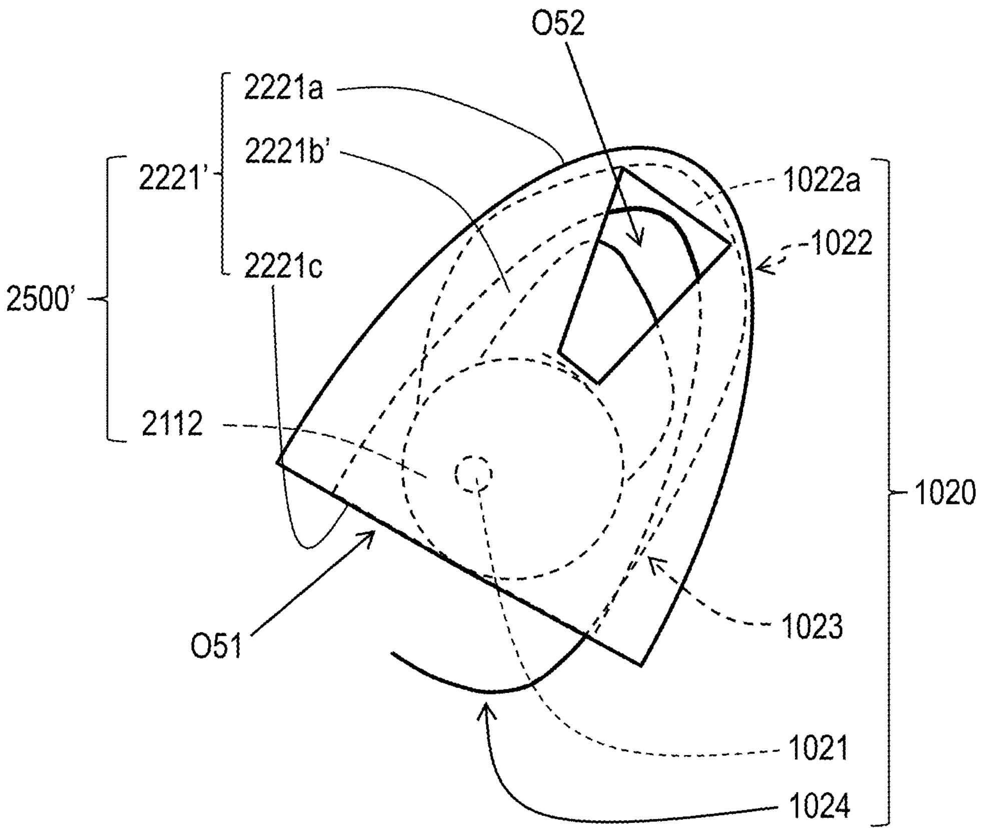

FIG. 59 is a transparent front view illustrating a modification of the acoustic signal output device of the fifth embodiment.

Figure 60:
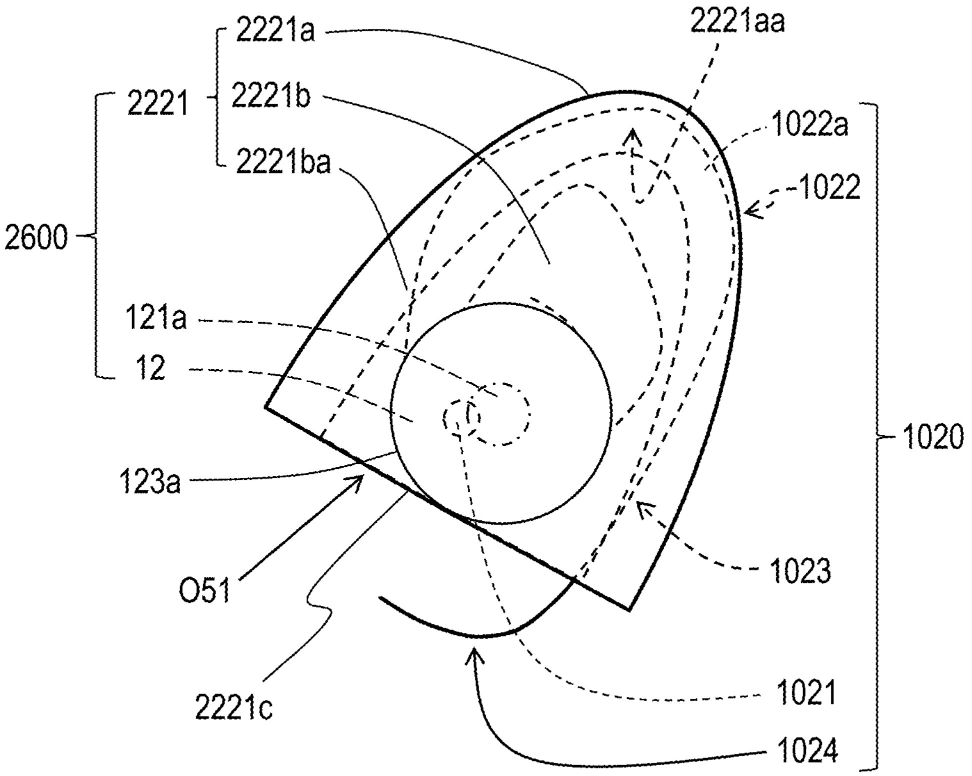

FIG. 60 is a transparent front view illustrating a modification of the acoustic signal output device of the fifth embodiment.

Figure 61A:
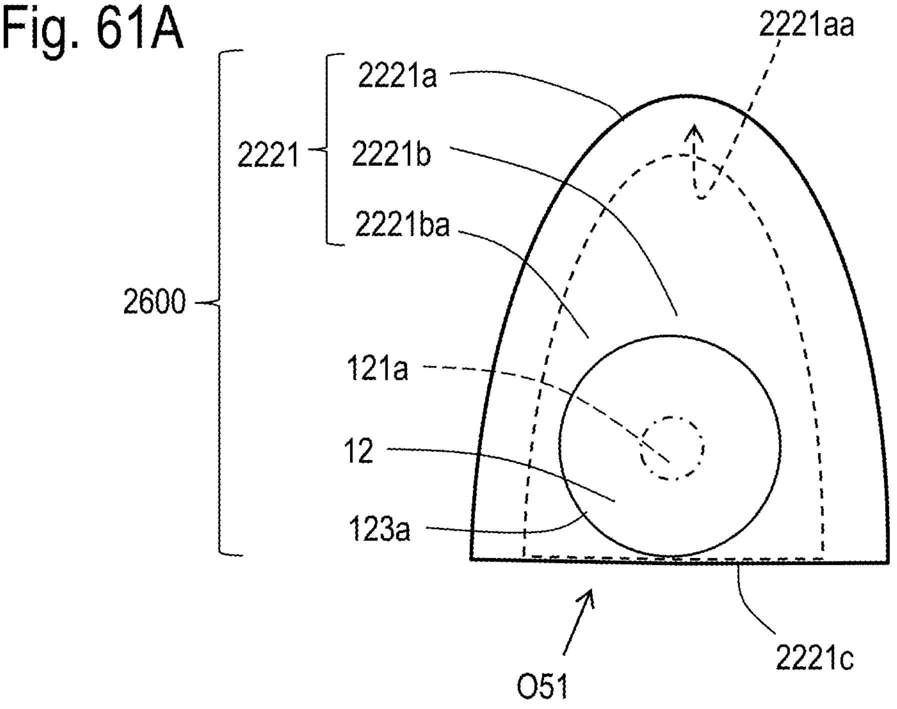
Figure 61B:
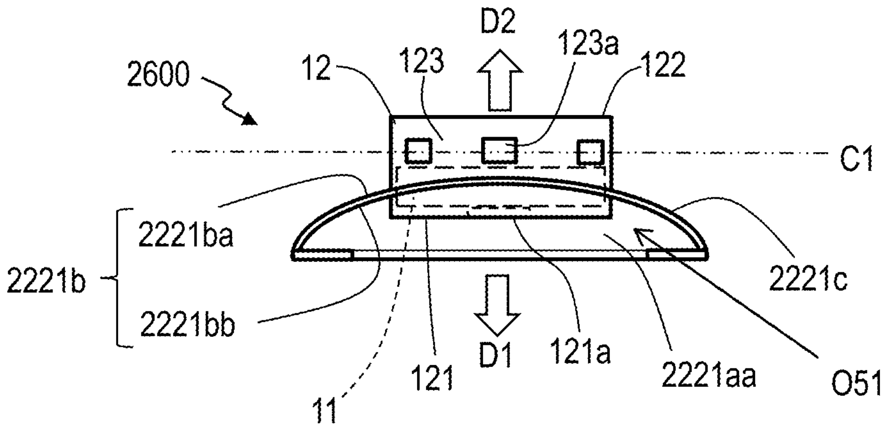
Figure 61C:
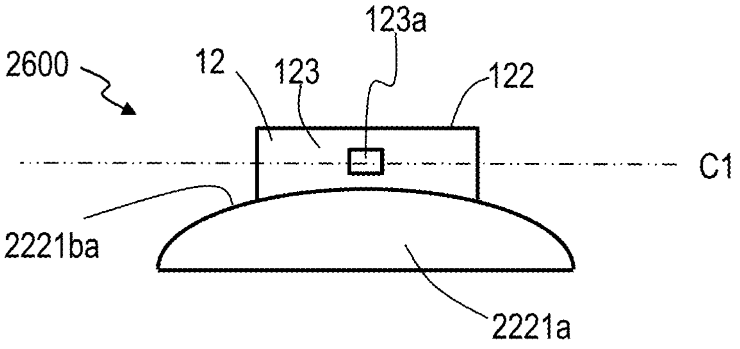

FIG. 61A is a transparent front view illustrating a modification of the acoustic signal output device of the fifth embodiment. FIG. 61B is a transparent bottom view illustrating a modification of the acoustic signal output device of the fifth embodiment. FIG. 61C is a plan view illustrating a modification of the acoustic signal output device of the fifth embodiment.

Figure 62A:
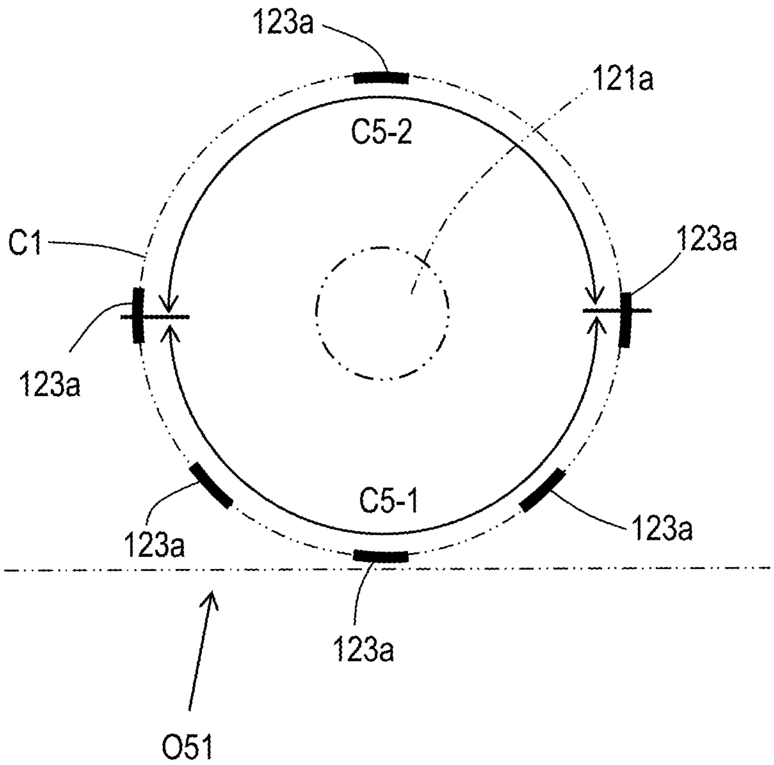
Figure 62B:
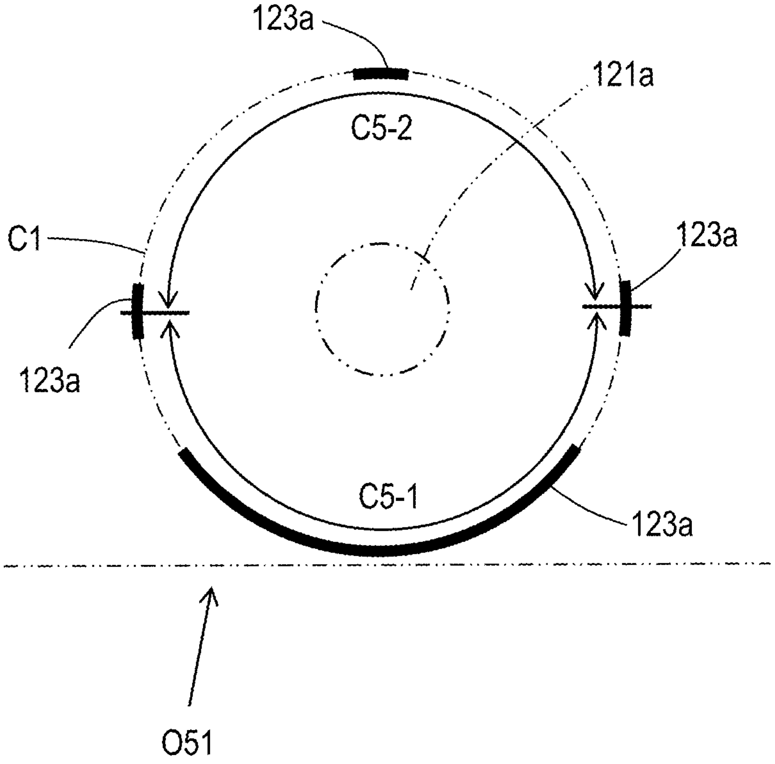

FIGS. 62A and 62B are conceptual diagrams illustrating modifications of the arrangement of sound holes.

Figure 63A:
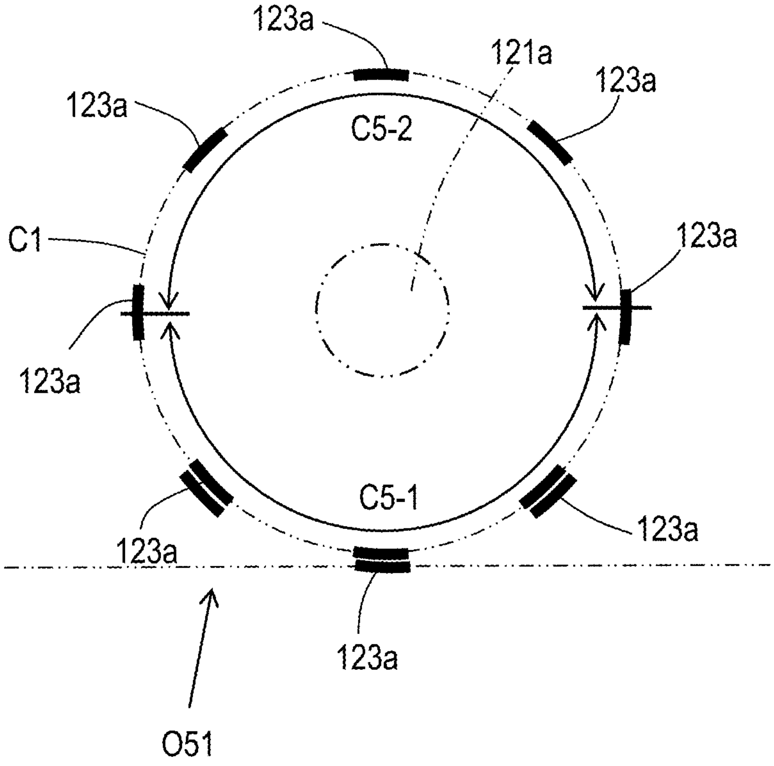
Figure 63B:
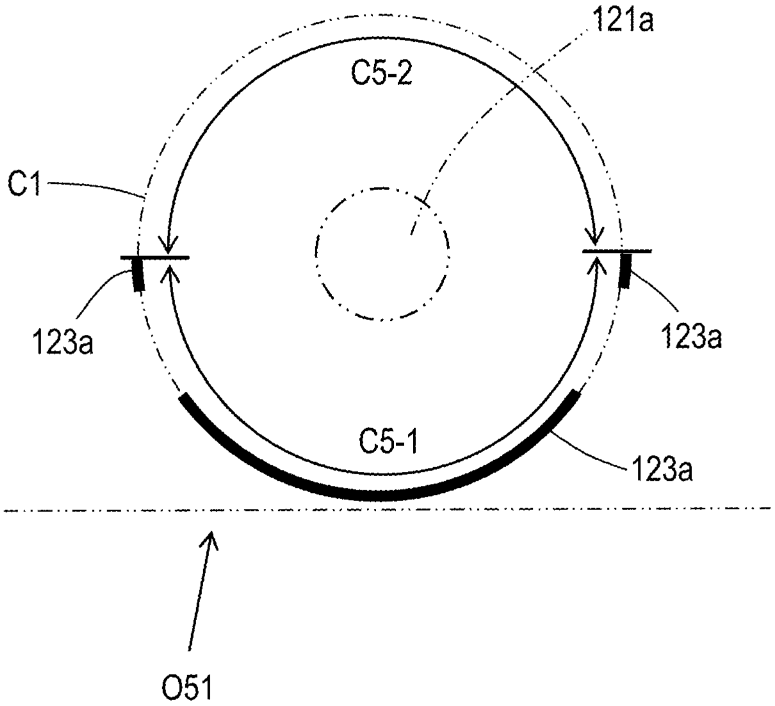

FIGS. 63A and 63B are conceptual diagrams illustrating modifications of the arrangement of sound holes.

Figure 64A:
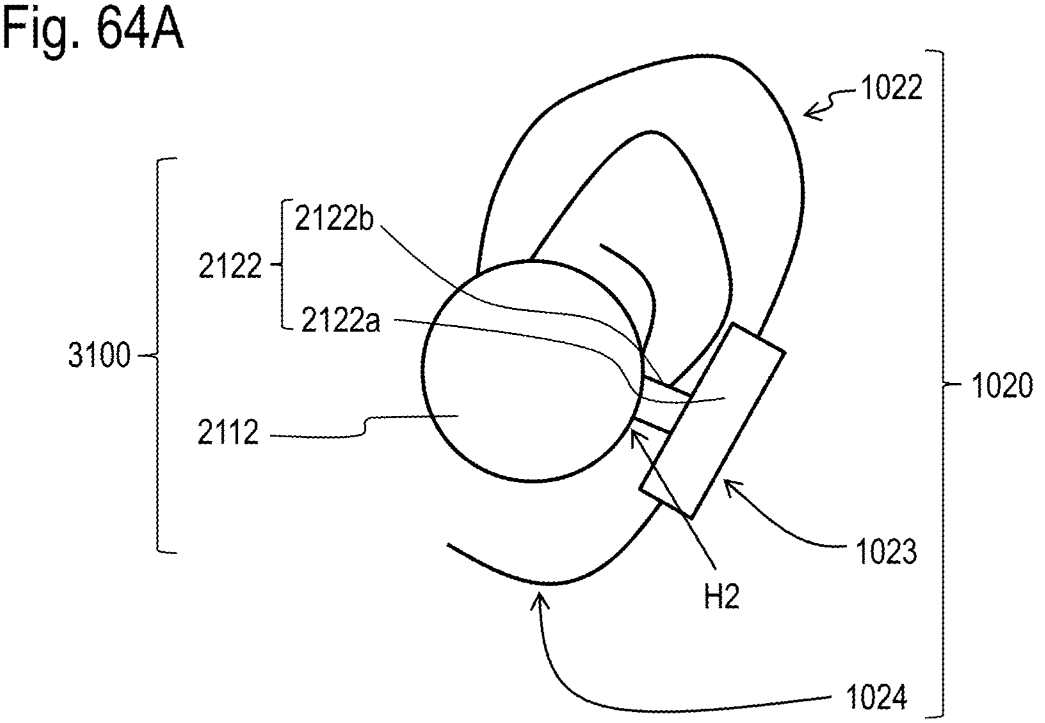
Figure 64B:
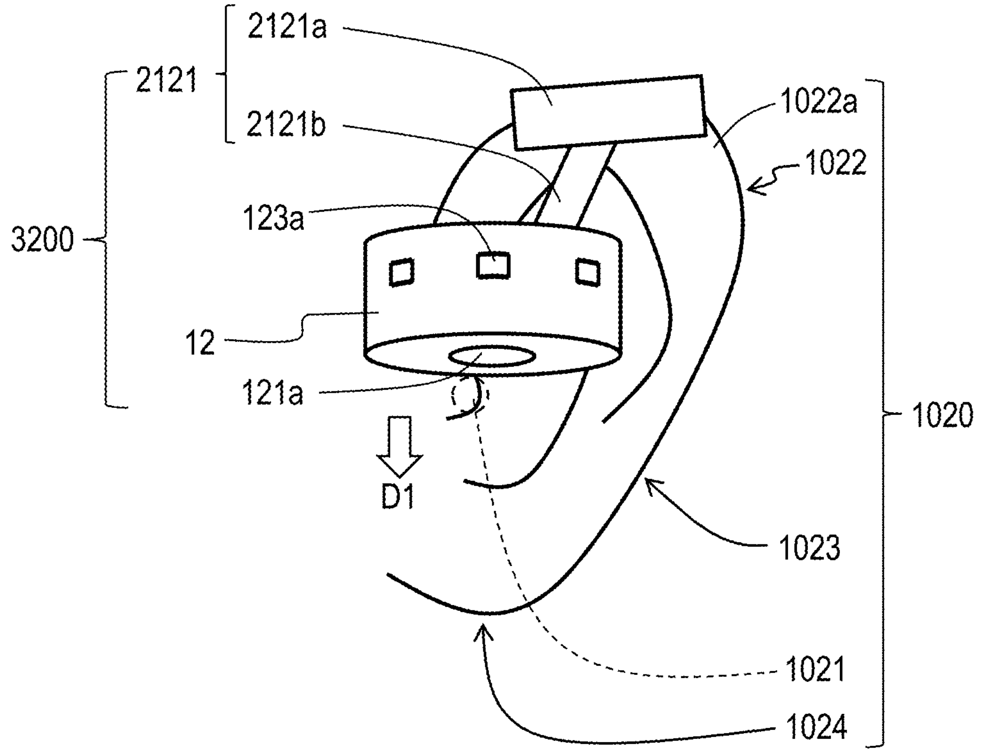

FIG. 64A is a front view illustrating a modification of an acoustic signal output device of a sixth embodiment. FIG. 64B is a perspective view illustrating a modification of the acoustic signal output device of the sixth embodiment.

Figure 65A:
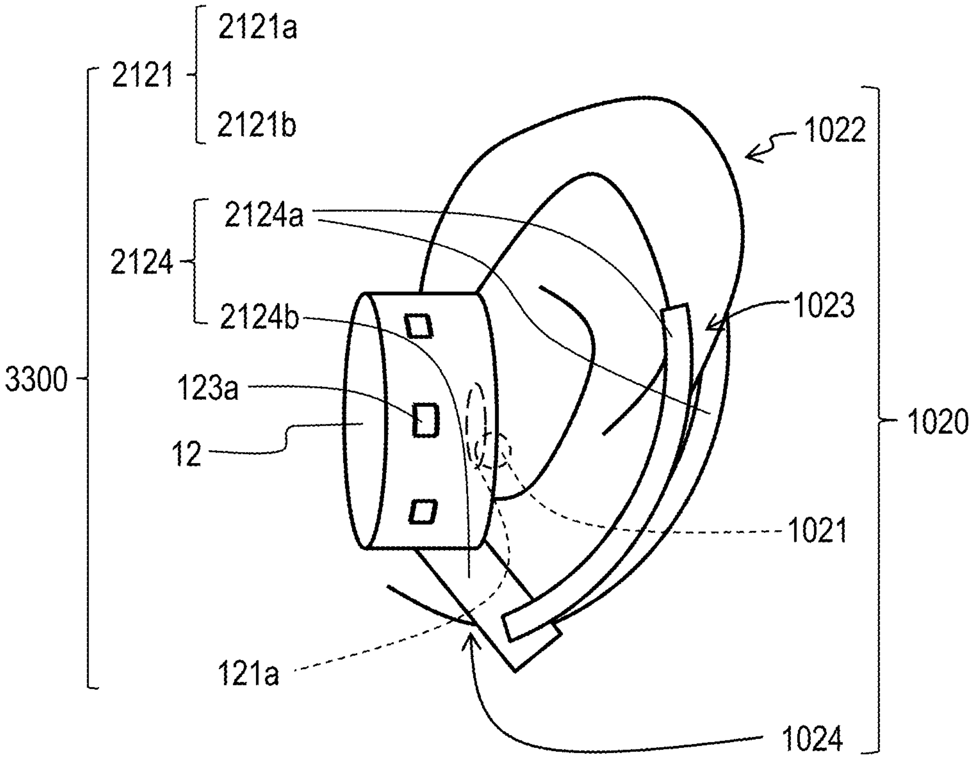

FIG. 65A is a perspective view illustrating a modification of the acoustic signal output device of the sixth embodiment.

Figure 65B:
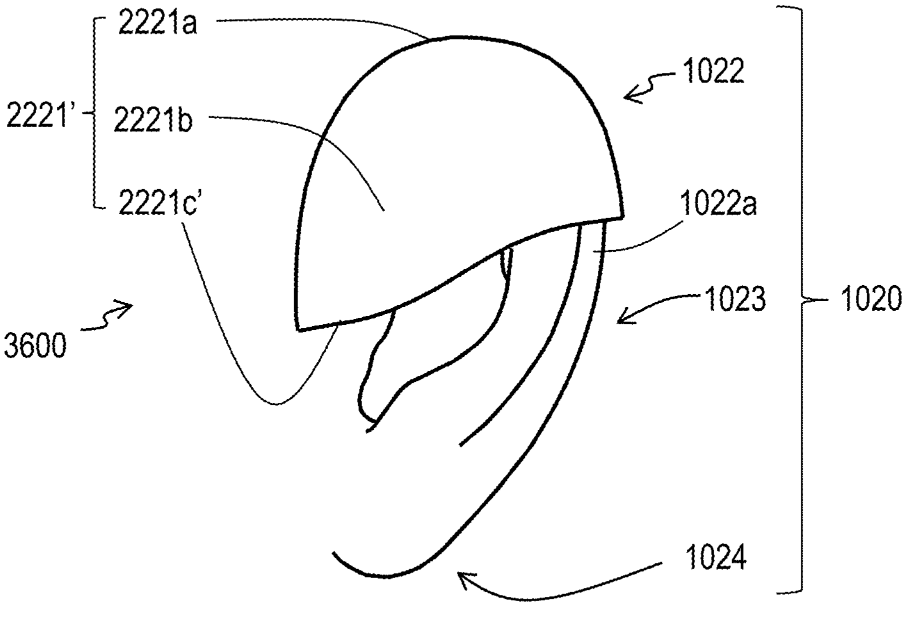

FIG. 65B is a plan view illustrating a modification of the acoustic signal output device of the sixth embodiment.

Figure 66A:
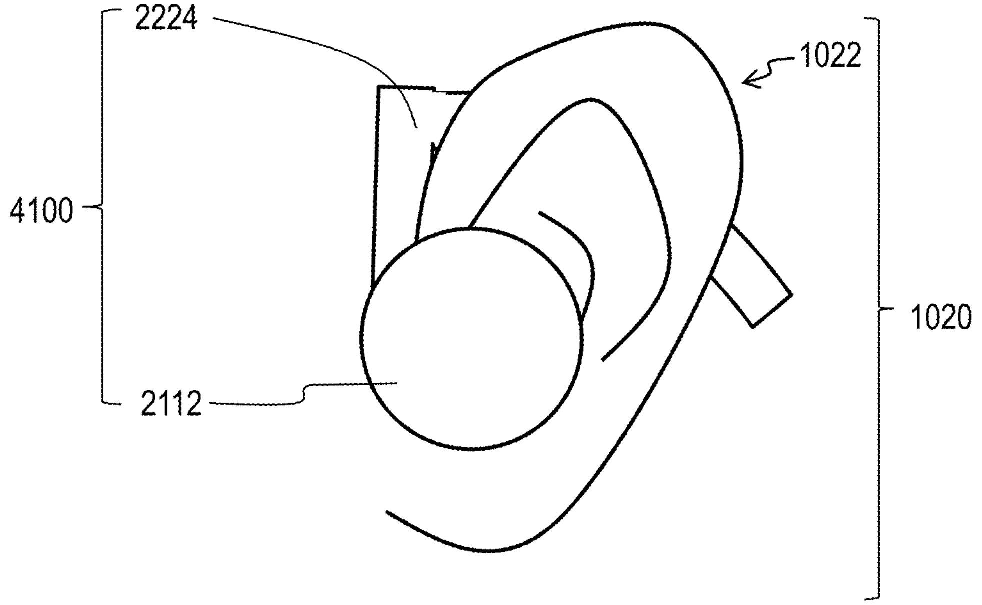

FIG. 66A is a plan view illustrating a modification of the acoustic signal output device of the sixth embodiment. FIG.

66B is a plan view illustrating a modification of the acoustic signal output device of the sixth embodiment.

Figure 67A:
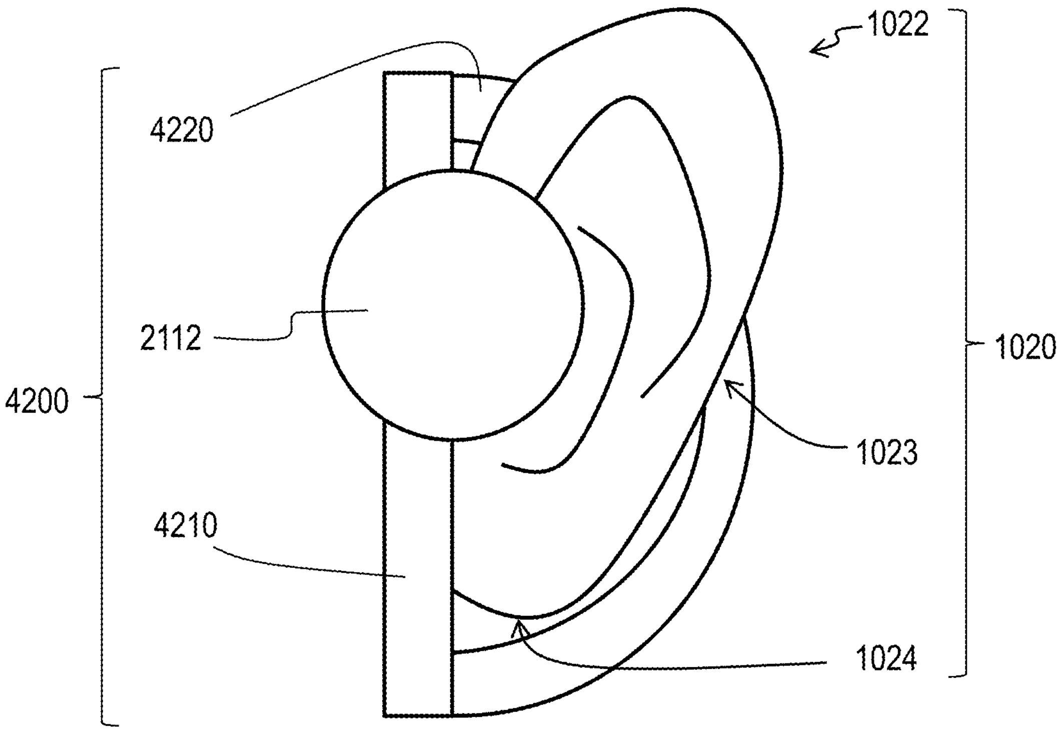
Figure 67B:
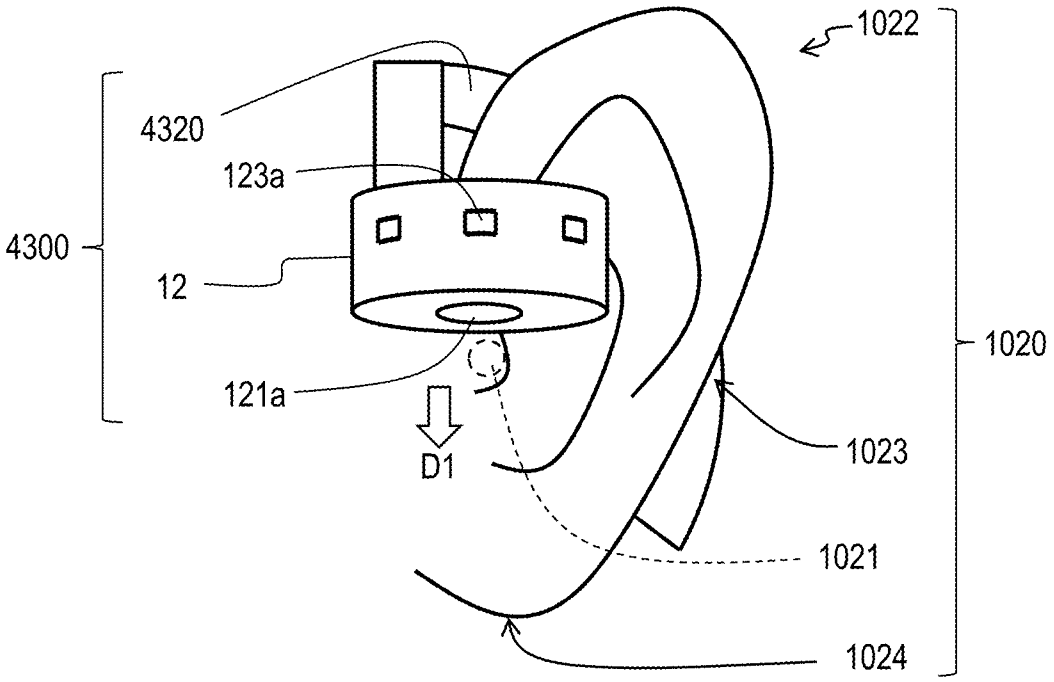

FIG. 67A is a plan view illustrating a modification of the acoustic signal output device of the sixth embodiment. FIG. 67B is a transparent perspective view illustrating a modification of the acoustic signal output device of the sixth embodiment.

Figure 68A:
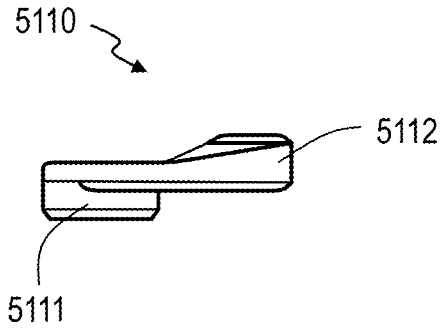
Figure 68B:
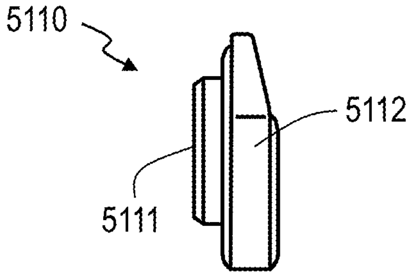
Figure 68C:
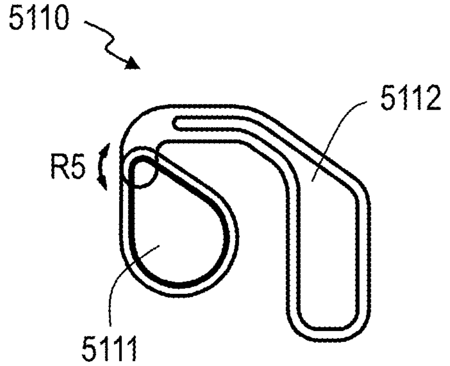
Figure 68D:
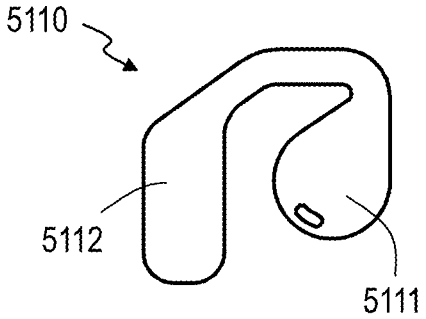
Figure 68E:
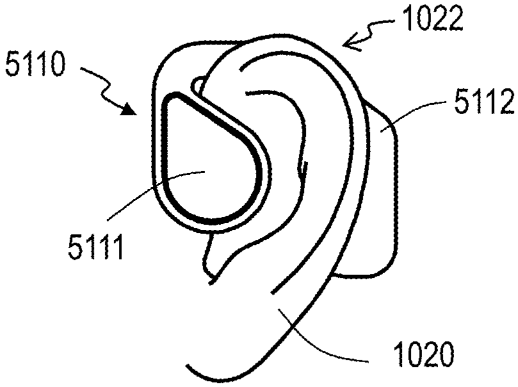

FIG. 68A is a plan view illustrating a modification of the acoustic signal output device of the sixth embodiment. FIG. 68B is a right side view illustrating a modification of the acoustic signal output device of the sixth embodiment. FIG. 68C is a front view illustrating a modification of the acoustic signal output device of the sixth embodiment. FIG. 68D is a rear view illustrating a modification of the acoustic signal output device of the sixth embodiment. FIG. 68E is a front view illustrating the usage state of a modification of the acoustic signal output device of the sixth embodiment.

Figure 69A:
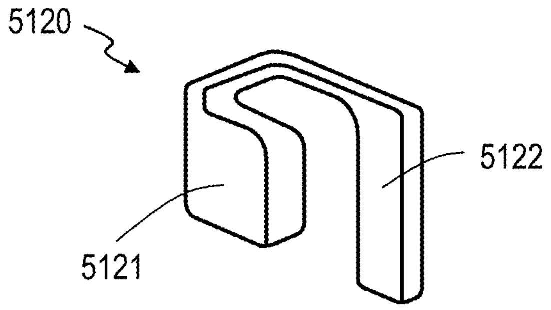

FIG. 69A is a perspective view illustrating a modification of the acoustic signal output device of the sixth embodiment.

Figure 69B:
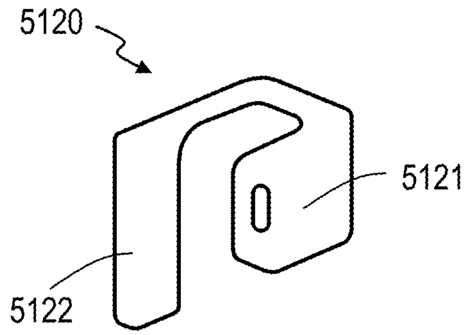

FIG. 69B is a perspective view illustrating a modification of the acoustic signal output device of the sixth embodiment.

Figure 69C:
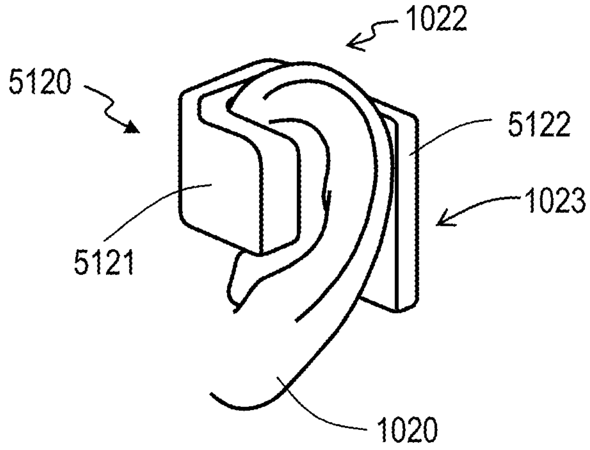

FIG. 69C is a perspective view illustrating the usage state of a modification of the acoustic signal output device of the sixth embodiment.

Figure 70A:
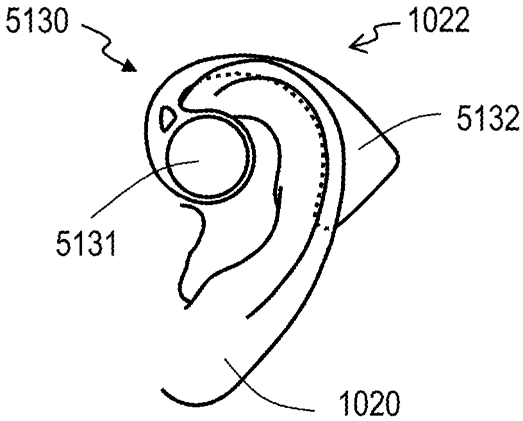
Figure 70B:
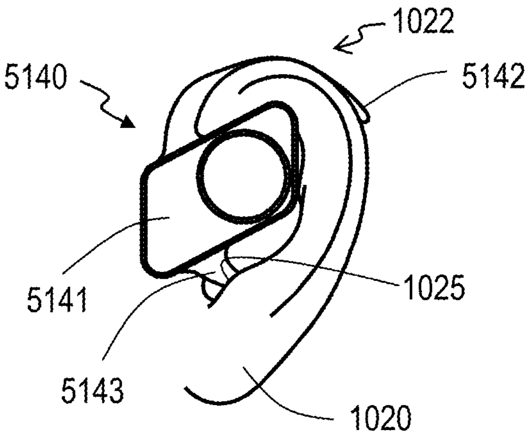

FIGS. 70A and 70B are front views illustrating the usage state of a modification of the acoustic signal output device of the sixth embodiment.

Figure 71A:
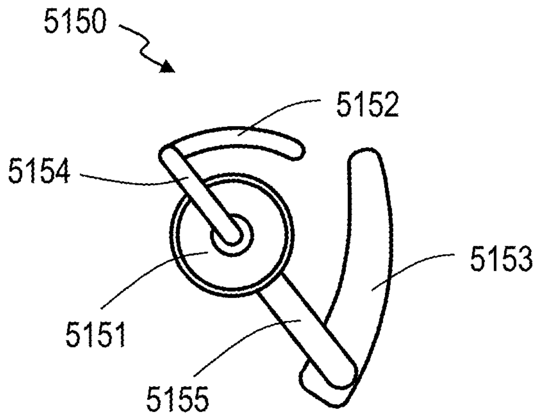
Figure 71B:
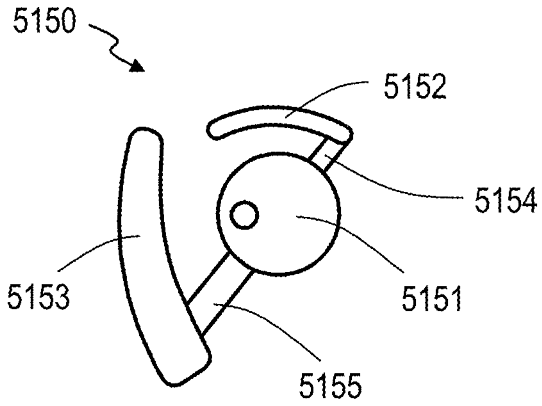
Figure 71C:
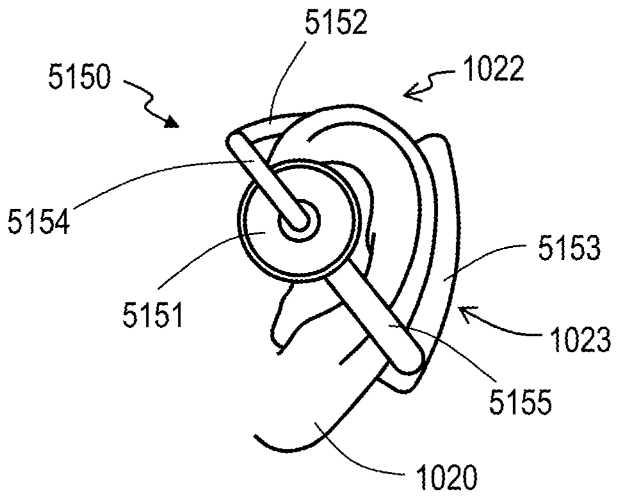

FIG. 71A is a front view illustrating a modification of the acoustic signal output device of the sixth embodiment. FIG. 71B is a rear view illustrating a modification of the acoustic signal output device of the sixth embodiment. FIG. 71C is a front view illustrating the usage state of a modification of the acoustic signal output device of the sixth embodiment.

Figure 72A:
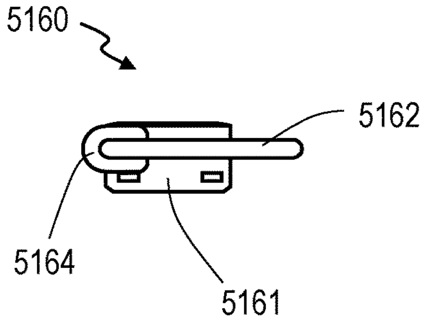
Figure 72B:
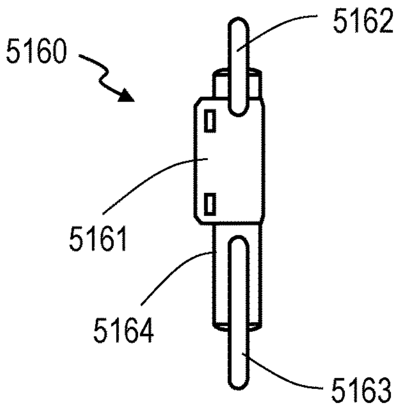
Figure 72C:
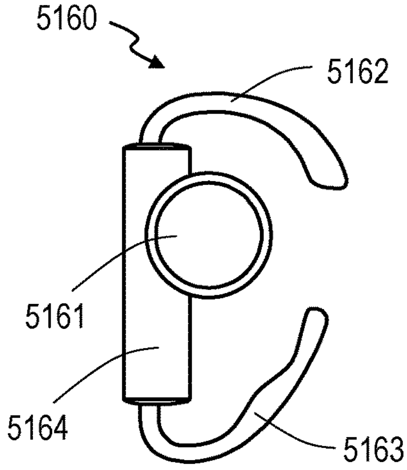
Figure 72D:
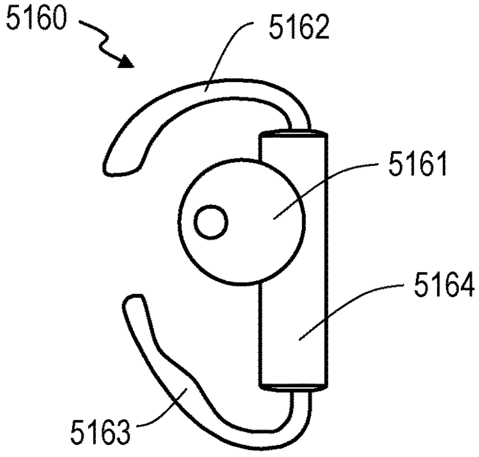
Figure 72E:
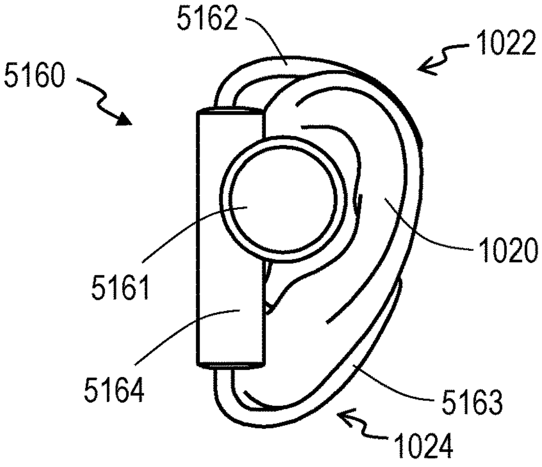

FIG. 72A is a plan view illustrating a modification of the acoustic signal output device of the sixth embodiment. FIG. 72B is a right side view illustrating a modification of the acoustic signal output device of the sixth embodiment. FIG. 72C is a front view illustrating a modification of the acoustic signal output device of the sixth embodiment. FIG. 72D is a rear view illustrating a modification of the acoustic signal output device of the sixth embodiment. FIG. 72E is a front view illustrating the usage state of a modification of the acoustic signal output device of the sixth embodiment.

Figure 73A:
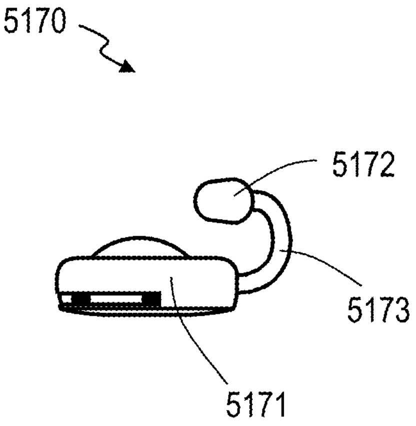
Figure 73B:
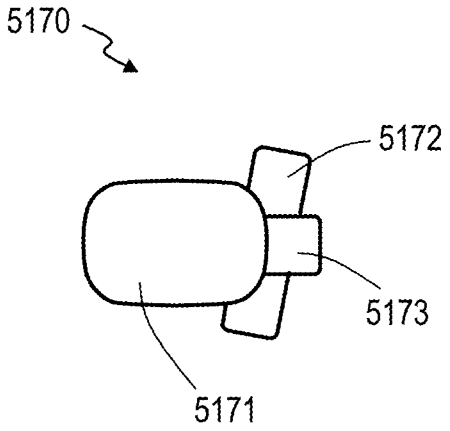
Figure 73C:
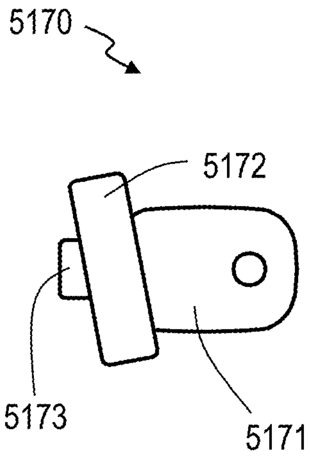
Figure 73D:
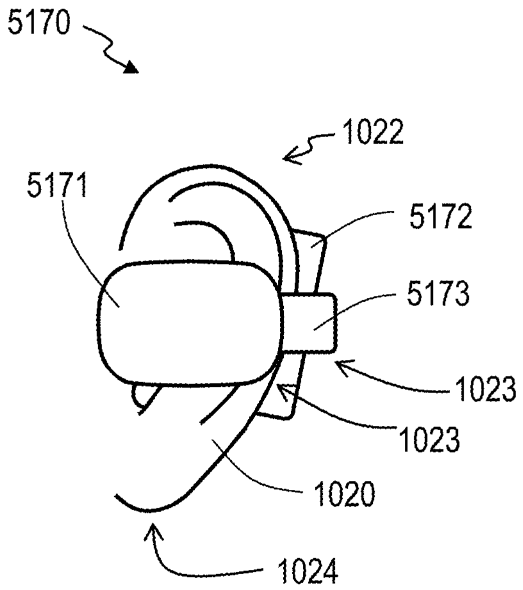

FIG. 73A is a plan view illustrating a modification of the acoustic signal output device of the sixth embodiment. FIG. 73B is a front view illustrating a modification of the acoustic signal output device of the sixth embodiment. FIG. 73C is a rear view illustrating a modification of the acoustic signal output device of the sixth embodiment. FIG. 73D is a front view illustrating the usage state of a modification of the acoustic signal output device of the sixth embodiment.

Figure 74A:
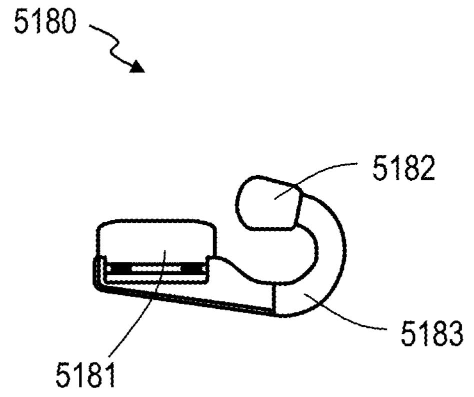
Figure 74B:
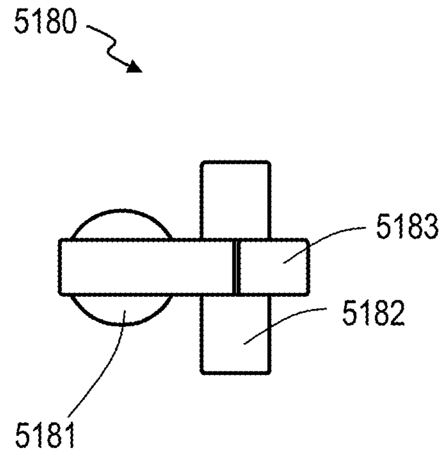
Figure 74C:
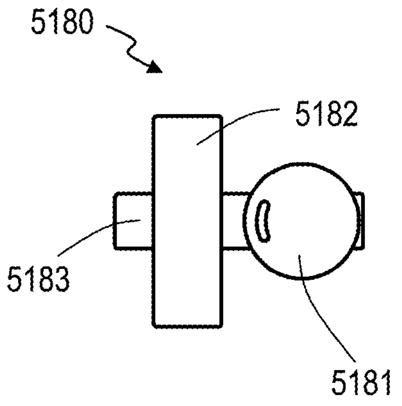
Figure 74D:
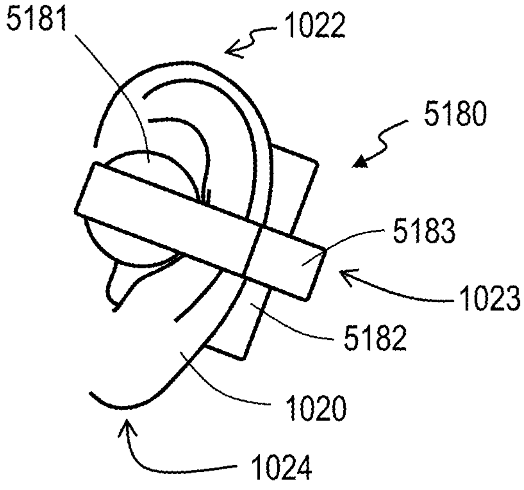

FIG. 74A is a plan view illustrating a modification of the acoustic signal output device of the sixth embodiment. FIG. 74B is a front view illustrating a modification of the acoustic signal output device of the sixth embodiment. FIG. 74C is a rear view illustrating a modification of the acoustic signal output device of the sixth embodiment. FIG. 74D is a front view illustrating the usage state of a modification of the acoustic signal output device of the sixth embodiment.

Figure 75A:
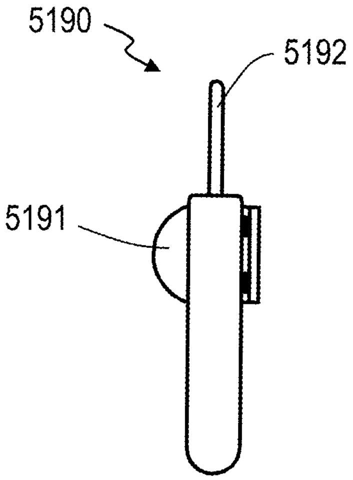

FIG. 75A is a left side view illustrating a modification of the acoustic signal output device of the sixth embodiment.

Figure 75B:
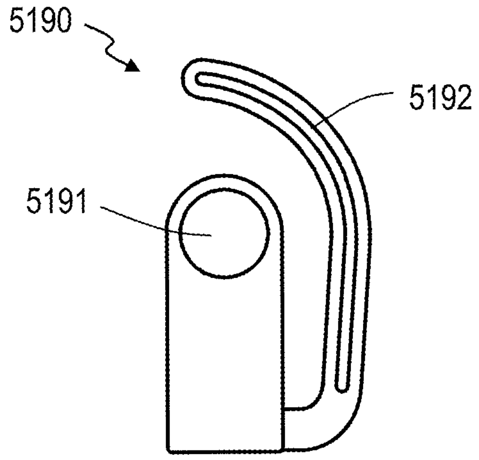
Figure 75C:
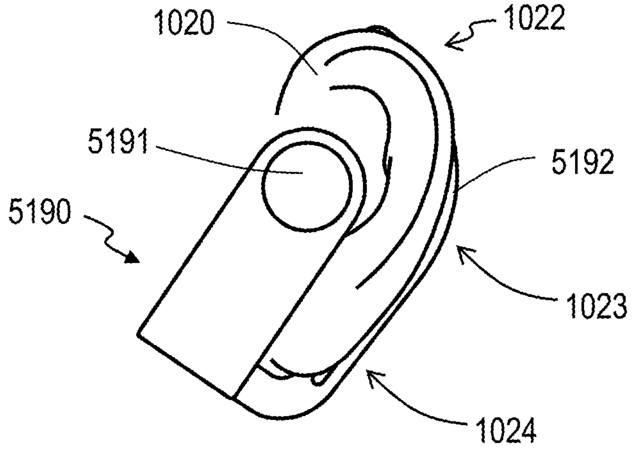

FIG. 75B is a front view illustrating a modification of the acoustic signal output device of the sixth embodiment. FIG. 75C is a front view illustrating the usage state of a modification of the acoustic signal output device of the sixth embodiment.

Figure 76A:
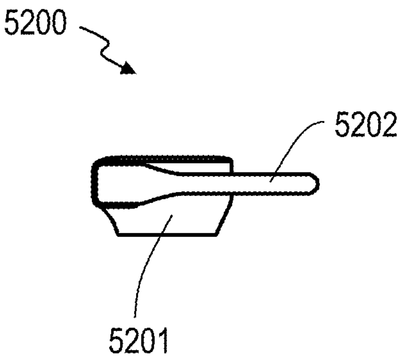
Figure 76B:
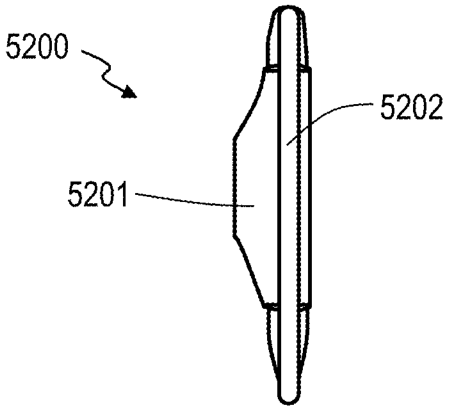
Figure 76C:
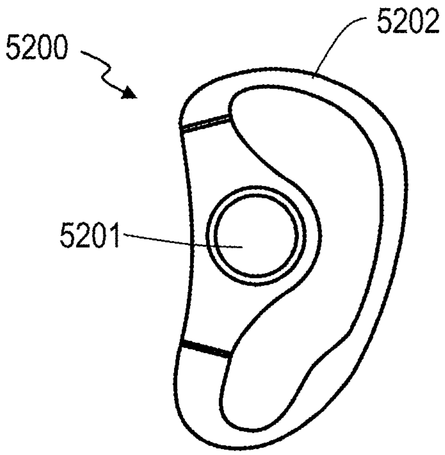
Figure 76D:
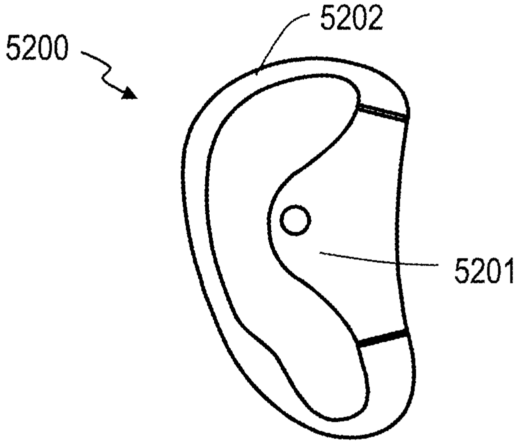
Figure 76E:
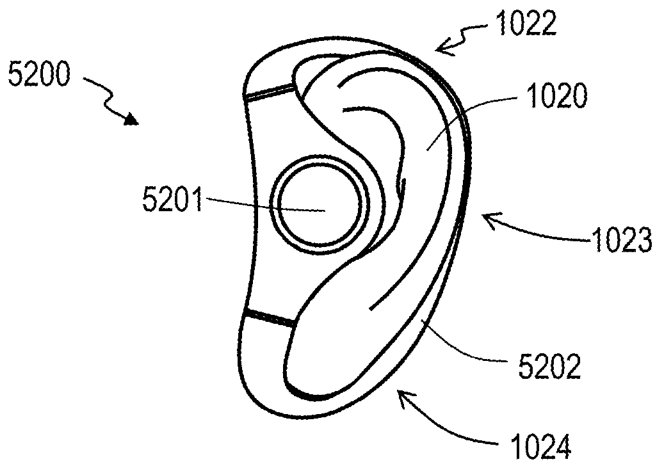

FIG. 76A is a plan view illustrating a modification of the acoustic signal output device of the sixth embodiment. FIG. 76B is a right side view illustrating a modification of the acoustic signal output device of the sixth embodiment. FIG. 76C is a front view illustrating a modification of the acoustic signal output device of the sixth embodiment. FIG. 76D is a rear view illustrating a modification of the acoustic signal output device of the sixth embodiment. FIG. 76E is a front view illustrating the usage state of a modification of the acoustic signal output device of the sixth embodiment.

Figure 77A:
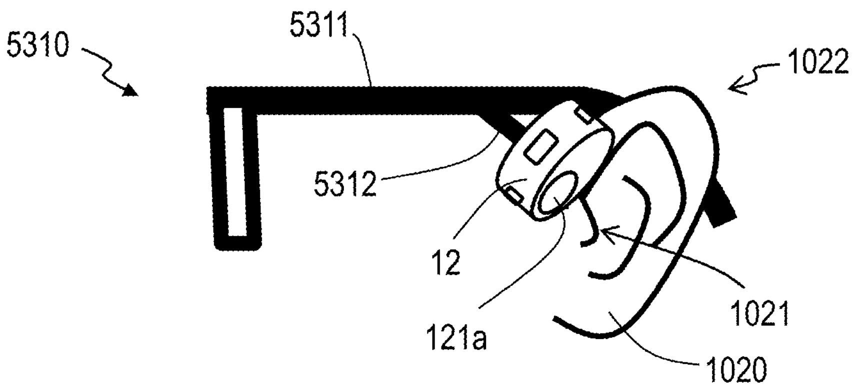
Figure 77B:
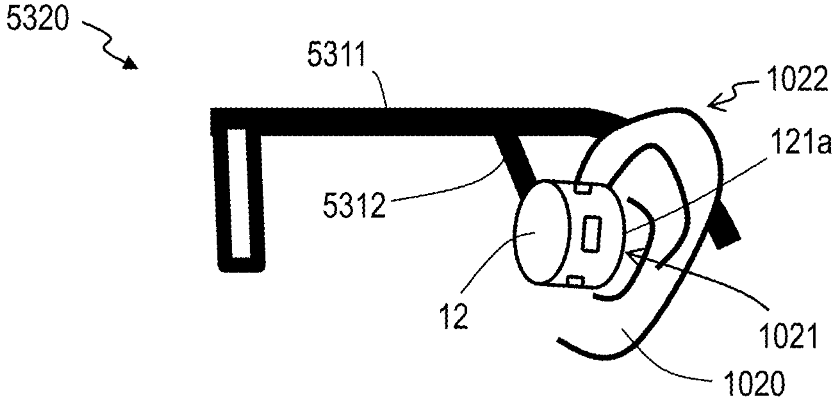

FIGS. 77A and 77B are conceptual diagrams illustrating a modification of the acoustic signal output device of the sixth embodiment.

Figure 78A:
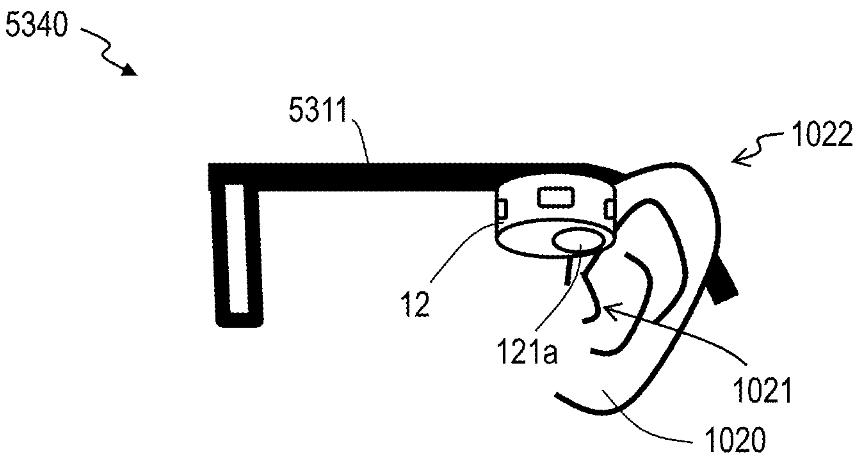
Figure 78B:
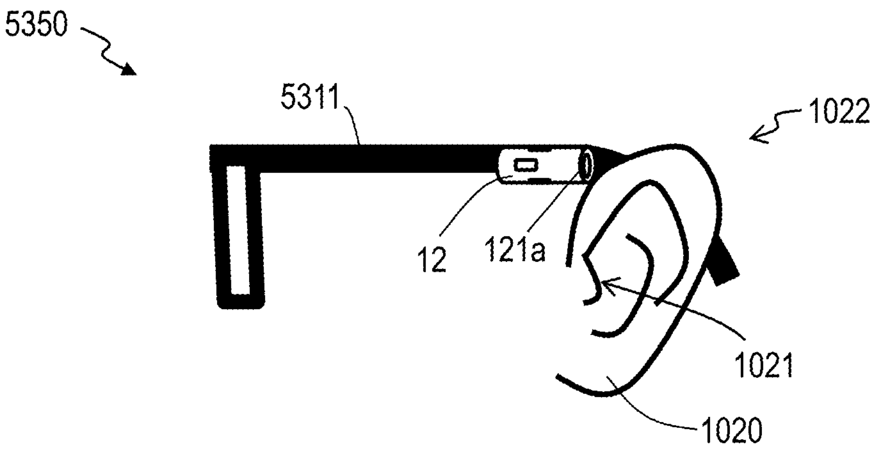

FIGS. 78A and 78B are conceptual diagrams illustrating a modification of the acoustic signal output device of the sixth embodiment.

Figure 79A:
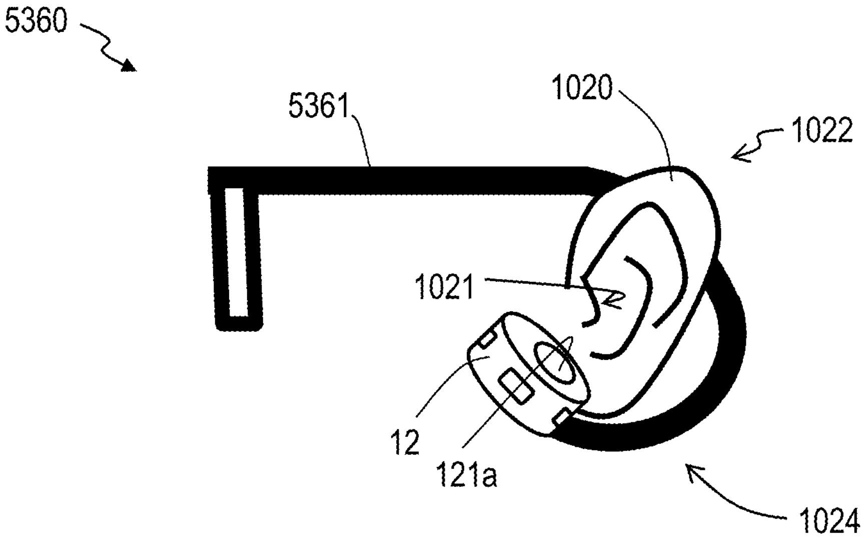
Figure 79B:
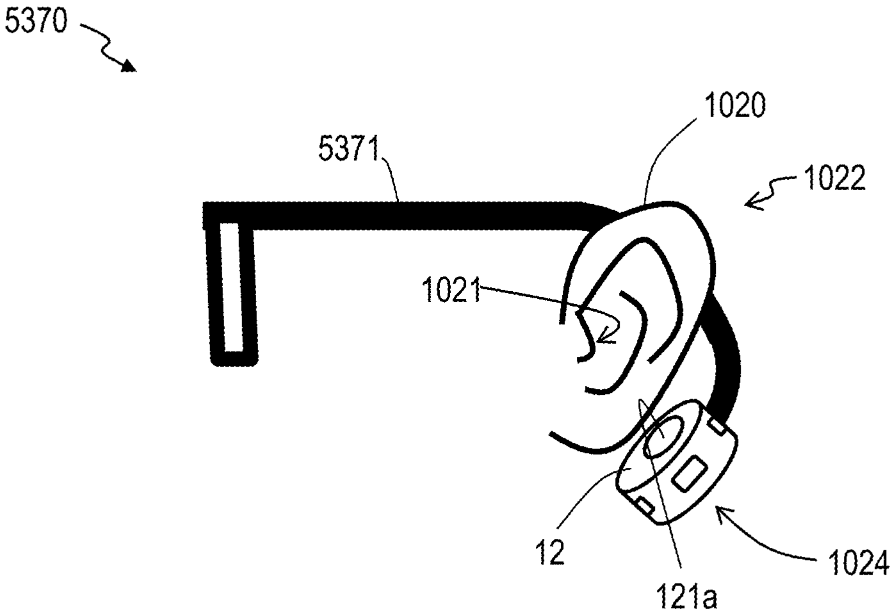

FIGS. 79A and 79B are conceptual diagrams illustrating a modification of the acoustic signal output device of the sixth embodiment.

Figure 80A:
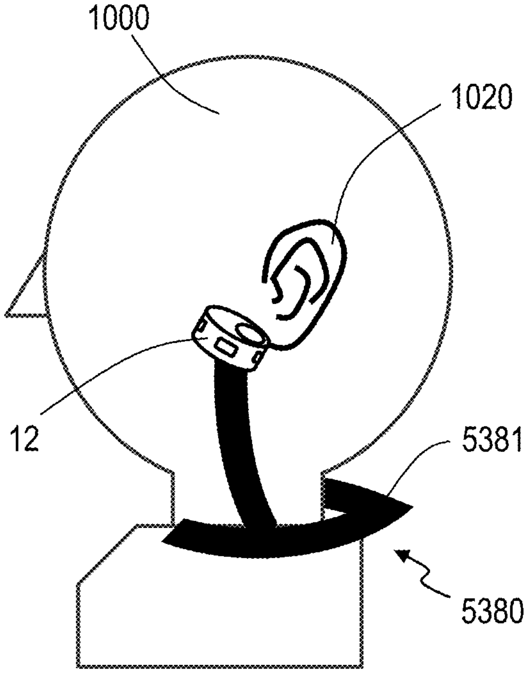
Figure 80B:
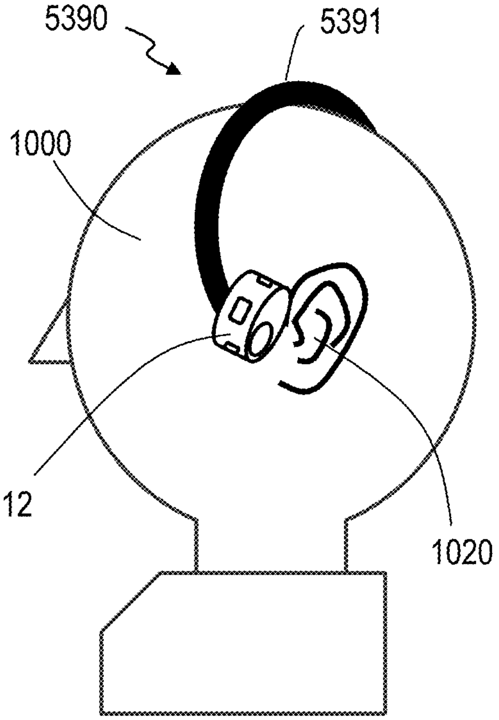
Figure 80C:
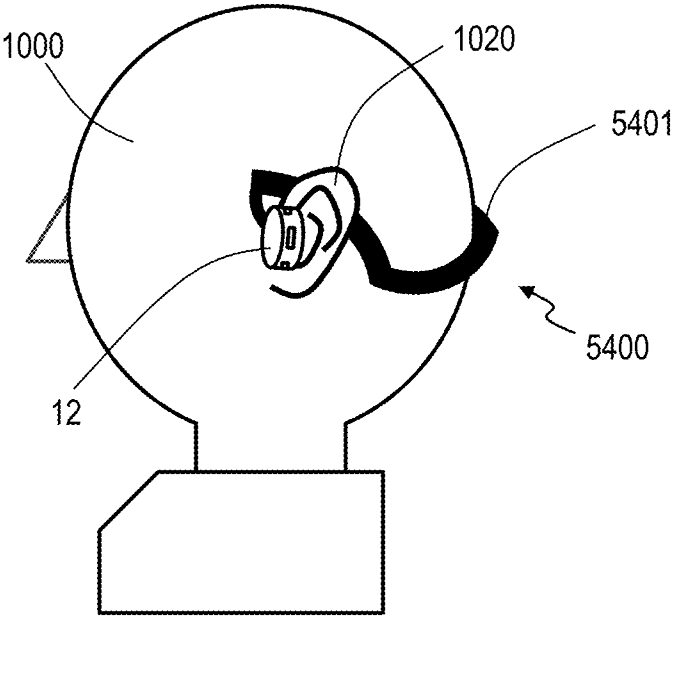

FIGS. 80A to 80C are conceptual diagrams illustrating a modification of the acoustic signal output device of the sixth embodiment.

DESCRIPTION OF EMBODIMENTS

An embodiment of the present invention will be described below with reference to the drawings.

First Embodiment

First, a first embodiment of the present invention will be described.

<Configuration>

An acoustic signal output device 10 of the present embodiment is an acoustic listening device (for example, open-ear (open-type) earphones, headphones, and the like) that is worn without sealing the ear canal of the user. As illustrated in FIG. 1, FIGS. 2A to 2C, and FIGS. 3A to 3C, the acoustic signal output device 10 of the present embodiment includes a driver unit 11 that converts an output signal (an electrical signal representing an acoustic signal) output from a playback device into an acoustic signal and outputs the acoustic signal and a housing 12 that houses the driver unit 11 therein.

<Driver Unit 11>

The driver unit (speaker driver unit) 11 is a device (device with a speaker function) that emits an acoustic signal AC1 (first acoustic signal) based on the input output signal to one side (D1-direction side), and emits an acoustic signal AC2 (second acoustic signal) which is a negative phase signal (phase-inverted signal) of the acoustic signal AC1 or an approximate signal of the negative phase signal to the other side (D2-direction side). That is, the acoustic signal emitted from the driver unit 11 to one side (D1-direction side) is called the acoustic signal AC1 (first acoustic signal), and the acoustic signal emitted from the driver unit 11 to the other side (D2-direction side) is called the acoustic signal AC2 (second acoustic signal). For example, the driver unit 11 includes a diaphragm 113 that emits the acoustic signal AC1 from one surface 113*a* to the D1-direction side by vibration, and emits the acoustic signal AC2 from the other surface 113*b* to the D2-direction side by this vibration (FIG. 2B). When the diaphragm 113 vibrates based on the input output signal, the driver unit 11 of this example emits the acoustic signal AC1 from one surface 111 to the D1-direction side, and emits the acoustic signal AC2 which is the negative phase signal of the acoustic signal AC1 or the approximate signal of the negative phase signal from the other surface 112 to the D2-direction side. That is, the acoustic signal AC2 is emitted secondarily along with the emission of the acoustic signal AC1. Note that the D2 direction (the other side) is, for example, the opposite direction of the D1 direction (one side), but the D2 direction does not have to be strictly the opposite direction of the D1 direction, and it is sufficient that the D2 direction is different from the D1 direction. The relationship between one side (D1 direction) and the other side (D2 direction) depends on the type and shape of the driver unit 11. Furthermore, depending on the type and shape of the driver unit 11, the acoustic signal AC2 may be strictly the negative phase signal of the acoustic signal AC1, or the acoustic signal AC2 may be an approximate signal of the negative phase signal of the acoustic signal AC1. For example, the approximate signal of the negative phase signal of the acoustic signal AC1 may be a signal (1) obtained by shifting the phase of the negative phase signal of the acoustic signal AC1, a signal (2) obtained by changing (amplifying or attenuating) the amplitude of the negative phase signal of the acoustic signal AC1, or a signal (3) obtained by shifting the phase of the negative phase signal of the acoustic signal AC1 and further changing the amplitude. The phase difference between the negative phase signal of the acoustic signal AC1 and its approximate signal is preferably $\delta_1$% or less of one period of the negative phase signal of the acoustic signal AC1. Examples of $\delta_1$% are 1%, 3%, 5%, 10%, 20%, and the like. Further, it is preferable that the difference between the amplitude of the negative phase signal of the acoustic signal AC1 and the amplitude of its approximate signal be $\delta_2$% or less of the amplitude of the negative phase signal of the acoustic signal AC1. Examples of $\delta_2$% are 1%, 3%, 5%, 10%, 20%, and the like. Examples of the type of the driver unit 11 include a dynamic type, a balanced armature type, a hybrid type of a dynamic type and a balanced armature type, and a condenser type. Furthermore, there are no limitations to the shapes of the driver unit 11 and the diaphragm 113. In the present embodiment, to simplify the explanation, an example is shown in which the outer shape of the driver unit 11 is a substantially cylindrical shape with both end surfaces, and the diaphragm 113 is a substantially disc shape, but the present invention is not limited thereto. For example, the outer shape of the driver unit 11 may be a rectangular parallelepiped, and the diaphragm 113 may be a dome shape. Further, examples of the acoustic signal are sounds such as music, vocal sound, sound effects, and environmental sounds.

<Housing 12>

The housing 12 is a hollow member having a wall on the outside, and houses the driver unit 11 therein. For example, the driver unit 11 is fixed to an end inside the housing 12 on the D1-direction side. However, the present invention is not limited thereto. Although there is no limitation on the shape of the housing 12, for example, it is preferable that the shape of the housing 12 be rotationally symmetric (bilaterally symmetric) or substantially rotationally symmetric about the axis A1 extending along the D1 direction. This makes it easy to provide sound holes 123*a* (details will be described later) so that variations in sound energy emitted from the housing 12 from direction to direction are reduced. As a result, it becomes easy to reduce sound leakage uniformly in each direction. For example, the housing 12 has a first end surface that is a wall 121 disposed on one side (D1-direction side) of the driver unit 11, a second end surface that is a wall 122 disposed on the other side (D2-direction side) of the driver unit 11, and a side surface that is a wall 123 that surrounds the space sandwiched between the first end surface and the second end surface around the axis A1 passing through the first end surface and the second end surface (FIGS. 2B and 3B). In the present embodiment, to simplify the explanation, an example will be shown in which the housing 12 has a substantially cylindrical shape with both end surfaces. For example, the distance between the wall 121 and the wall 122 is 10 mm, and the walls 121 and 122 are circular with a radius of 10 mm. However, these are examples and the present invention is not limited thereto. For example, the housing 12 may have a substantially dome shape with a wall at the end, a hollow substantially cubic shape, or any other three-dimensional shape. Furthermore, there is no limitation on the material that constitutes the housing 12. The housing 12 may be made of a rigid body such as synthetic resin or metal, or may be made of an elastic body such as rubber.

<Sound Holes 121*a* and 123*a*>

The wall of the housing 12 is provided with a sound hole 121*a* (first sound hole) for guiding the acoustic signal AC1 (first acoustic signal) emitted from the driver unit 11 to the outside, and a sound hole 123*a* (second sound hole) for guiding the acoustic signal AC2 (second acoustic signal) emitted from the driver unit 11 to the outside. The sound hole 121*a* and the sound hole 123*a* are, for example, through-holes penetrating the wall of the housing 12, but the present invention is not limited thereto. The sound holes 121*a* and 123*a* may not be through-holes, as long as the acoustic signals AC1 and AC2 can be respectively guided to the outside.

The acoustic signal AC1 emitted from the sound hole 121*a* reaches the user's ear canal and is heard by the user. On the other hand, the acoustic signal AC2, which is a negative phase signal of the acoustic signal AC1 or an approximate signal of the negative phase signal, is emitted from the sound hole 123*a*. A portion of this acoustic signal AC2 cancels out a portion (sound leakage component) of the acoustic signal AC1 emitted from the sound hole 121*a*. That is, when the acoustic signal AC1 (first acoustic signal) is emitted from the sound hole 121*a* (first sound hole), and the acoustic signal AC2 (second acoustic signal) is emitted from the sound hole 123*a* (second sound hole), an attenuation rate $\eta_{11}$ of the acoustic signal AC1 (first acoustic signal) at the position P2 (second point) with respect to the position P1 (first point) can be made equal to or less than a predetermined value $\eta_{th}$, or an attenuation amount $\eta_{12}$ of the acoustic signal AC1 (first acoustic signal) at the position P2 (second point) with respect to the position P1 (first point) can be made equal to or larger than a predetermined value $\omega_{th}$. Here, the position P1 (first point) is a predetermined point where the acoustic signal AC1 (first acoustic signal) emitted from the sound hole 121*a* (first sound hole) reaches. On the other hand, the position P2 (second point) is a predetermined point that is farther from the acoustic signal output device 10 than the position P1 (first point). The predetermined value $\eta_{th}$ is a value smaller (lower value) than the attenuation rate $\eta_{21}$ of an arbitrary or specific acoustic signal (sound) due to air propagation at the position P2 (second point) with respect to the position P1 (first point). In addition, the predetermined value $\omega_{th}$ is a value larger than the attenuation amount $\eta_{22}$ of an arbitrary or specific acoustic signal (sound) due to air propagation at the position P2 (second point) with respect to the position P1 (first point). That is, the acoustic signal output device 10 of the present embodiment is designed so that the attenuation rate $\eta_{11}$ is equal to or less than the predetermined value $\eta_{th}$ smaller than the attenuation rate $\eta_{21}$, or the attenuation amount $\eta_{12}$ is equal to or larger than the predetermined value $\omega_{th}$ larger than the attenuation amount $\eta_{22}$. Note that the acoustic signal AC1 propagates through the air from the position P1 to the position P2, and attenuates due to this air propagation and the acoustic signal AC2. The attenuation rate $\eta_{11}$ is the ratio ($AMP_2$(AC1)/$AMP_1$(AC1)) of the magnitude $AMP_2$ (AC1) of the acoustic signal AC1 at the position P2, which attenuates due to air propagation and the acoustic signal AC2, to the magnitude $AMP_1$(AC1) of the acoustic signal AC1 at the position P1. Further, the attenuation amount $\eta_{12}$ is the difference (|$AMP_1$(AC1)−$AMP_2$(AC1)|) between the magnitude $AMP_1$ (AC1) and the magnitude $AMP_2$ (AC1). On the other hand, when the acoustic signal AC2 is not assumed, an arbitrary or specific acoustic signal $AC_{ar}$ that propagates through the air from the position P1 to the position P2 attenuates due to the air propagation, not due to the acoustic signal AC2. The attenuation rate $\eta_{21}$ is the ratio ($AMP_2$ ($AC_{ar}$)/$AMP_1$ ($AC_{ar}$)) of the magnitude $AMP_2$ ($AC_{ar}$) of the acoustic signal $AC_{ar}$ at the position P2, which attenuates due to air propagation (attenuated not due to the acoustic signal AC2) with respect to the magnitude $AMP_1$ ($AC_{ar}$) of the acoustic signal $AC_{ar}$ at the position P1. Further, the attenuation amount $\eta_{22}$ is the difference (| $AMP_1$ ($AC_{ar}$)−$AMP_2$ ($AC_{ar}$)|) between the magnitude $AMP_1$ ($AC_{ar}$) and the magnitude $AMP_2$ ($AC_{ar}$). Note that examples of the magnitude of an acoustic signal include the sound pressure of an acoustic signal or the energy of an acoustic signal. Furthermore, the "sound leakage component" refers to, for example, a component that is likely to reach a region (for example, a person other than the user wearing the acoustic signal output device 10) other than the user wearing the acoustic signal output device 10, of the acoustic signal AC1 emitted from the sound hole 121*a*. For example, "sound leakage component" refers to a component of the acoustic signal AC1 that propagates in a direction other than the D1 direction. For example, the direct wave of the acoustic signal AC1 is mainly emitted from the sound hole 121*a*, and the direct wave of the second acoustic signal is mainly emitted from the second sound hole. A part (sound leakage component) of the direct wave of the acoustic signal AC1 emitted from the sound hole 121*a* is canceled out by interfering with at least a portion of the direct wave of the acoustic signal AC2 emitted from the sound hole 123*a*. However, the present invention is not limited thereto, and this cancellation can also occur with other than direct waves. That is, the sound leakage component, which is at least one of the direct wave and the reflected wave of the acoustic signal AC1 emitted from the sound hole 121*a*, may be canceled out by at least one of the direct wave and the reflected wave of the acoustic signal AC2 emitted from the sound hole 123*a*. In this way, the sound leakage can be suppressed.

The arrangement of the sound holes 121*a* and 123*a* will be described.

The sound hole 121*a* (first sound hole) of the present embodiment is provided in a region AR1 (first region) of the wall 121 disposed on one side (the D1-direction side which is the side from which the acoustic signal AC1 is emitted) of the driver unit 11 (FIG. 1, FIG. 2A, FIG. 2B, FIG. 3B). That is, the sound hole 121*a* is open in the D1 direction (first direction) along the axis A1. Further, the sound hole 123*a* (second sound hole) of the present embodiment is provided in a region AR3 of the wall 123 that is in contact with the region AR between the region AR1 (first region) of the wall 121 of the housing 12 and a region AR2 (second region) of the wall 122 disposed on the D2-direction side (the other side which is the side from which the acoustic signal AC2 is emitted) of the driver unit 11. That is, if the center of the housing 12 is used as a reference and the direction between the D1 direction (first direction) and the direction opposite to the D1 direction is a D12 direction (second direction) (FIG. 3B), the sound hole 121*a* (first sound hole) is provided on the D1-direction side (first direction side) of the housing 12, and the sound hole 123*a* (second sound hole) is provided on the D12-direction side (second direction side) of the housing 12. For example, when the housing 12 has a first end surface that is the wall 121 disposed on one side (D1-direction side) of the driver unit 11, a second end surface that is the wall 122 disposed on the other side (D2-direction side) of the driver unit 11, and a side surface that is the wall 123 surrounding the space sandwiched between the first end surface and the second end surface about the axis A1 along the emission direction (D1 direction) of the acoustic signal AC1 passing through the first end surface and the second end surface (FIGS. 2B and 3B), the sound hole 121*a* (first sound hole) is provided in the first end surface and the sound hole 123*a* (second sound hole) is provided in the side surface. Further, in the present embodiment, no sound hole is provided on the wall 122 side of the housing 12. This is because, if a sound hole is provided on the wall 122 side of the housing 12, the sound pressure level of the acoustic signal AC2 emitted from the housing 12 will exceed the level required to cancel out the sound leakage component of the acoustic signal AC1, and the excess amount will be perceived as sound leakage.

Figure 1:
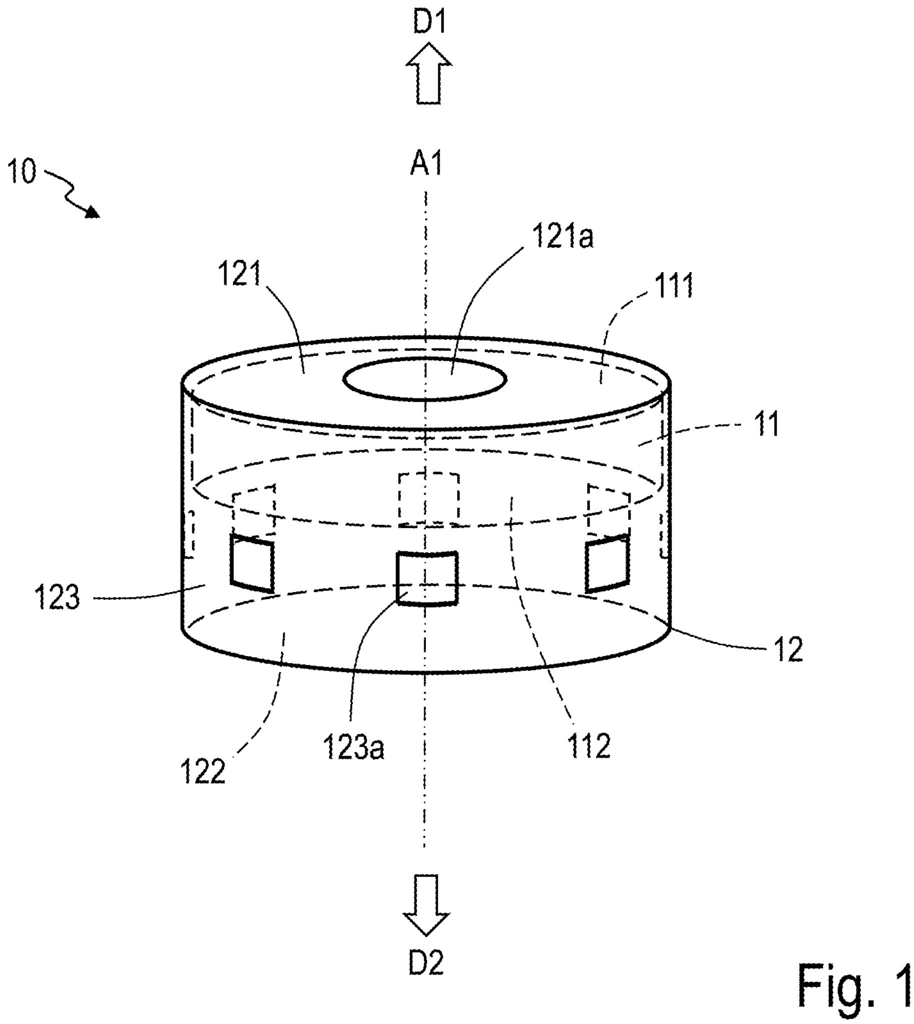
FIG. 1 is a transparent perspective view illustrating the configuration of an acoustic signal output device of a first embodiment.
Figure 2A:
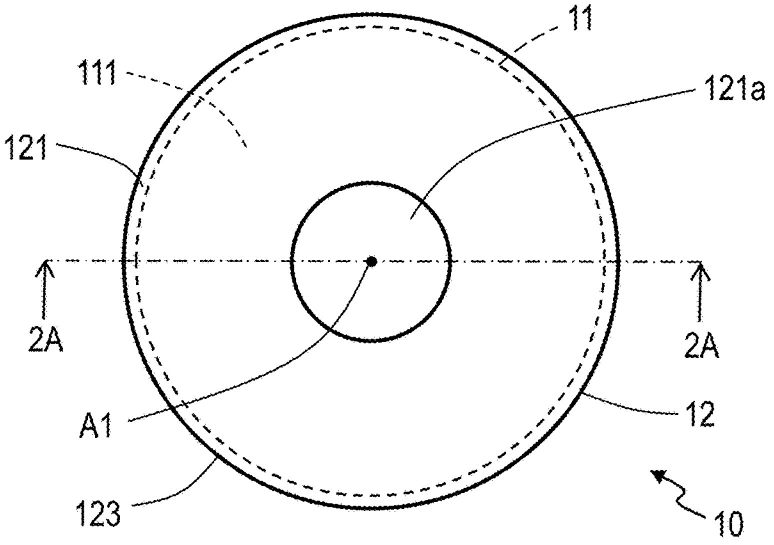
FIG. 2A is a transparent plan view illustrating the configuration of the acoustic signal output device of the first embodiment.
Figure 2B:
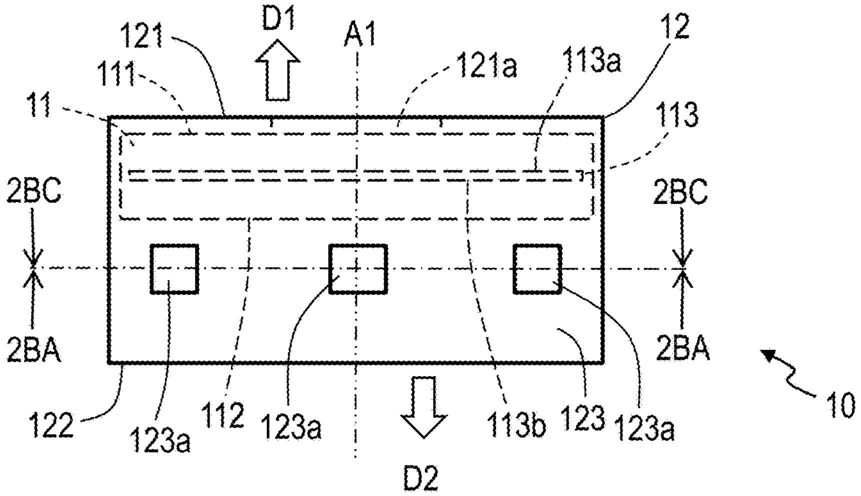
FIG. 2B is a transparent front view illustrating the configuration of the acoustic signal output device of the first embodiment.
Figure 2C:
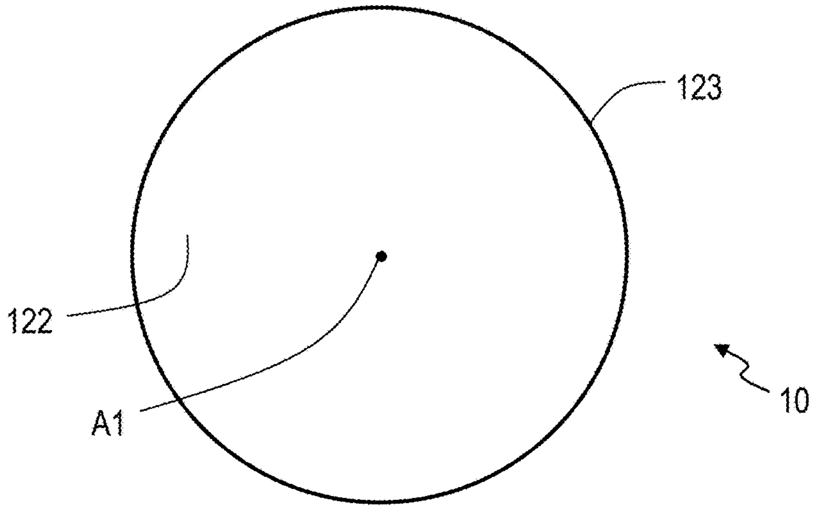
FIG. 2C is a bottom view illustrating the configuration of the acoustic signal output device of the first embodiment.

As illustrated in FIG. 2A and the like, the sound hole 121*a* of the present embodiment is disposed on or near the axis A1 along the emission direction (D1 direction) of the acoustic signal AC1. The axis A1 of the present embodiment passes through the center of or near the center of the region AR1 (first region) of the wall 121 disposed on one side (D1-direction side) of the driver unit 11 of the housing 12. For example, the axis A1 is an axis that passes through the central region of the housing 12 and extends in the D1 direction. That is, the sound hole 121*a* of the present embodiment is provided at the center position of the region AR1 of the wall 121 of the housing 12. In the present embodiment, to simplify the explanation, an example is shown in which the shape of the edge of the open end of the sound hole 121*a* is circular (the open end is circular). The radius of such a sound hole 121*a* is, for example, 3.5 mm. However, the present invention is not limited thereto. For example, the shape of the edge of the open end of the sound hole 121*a* may be other shapes such as an ellipse, a quadrangle, or a triangle. Further, the open end of the sound hole 121*a* may have a mesh shape. In other words, the open end of the sound hole 121*a* may be composed of a plurality of holes. Further, in the present embodiment, to simplify the explanation, an example will be shown in which one sound hole 121*a* is provided in the region AR1 (first region) of the wall 121 of the housing 12. However, the present invention is not limited thereto. For example, two or more sound holes 121*a* may be provided in the region AR1 (first region) of the wall 121 of the housing 12.

The sound hole 123*a* (second sound hole) of the present embodiment is preferably disposed in consideration of the following viewpoints, for example.

(1) Positional Viewpoint:

The sound hole 123*a* is disposed so that the propagation path of the sound leakage component of the acoustic signal AC1 to be canceled out overlaps the propagation path of the acoustic signal AC2 emitted from the sound hole 123*a*.

(2) Areal Viewpoint:

The propagation region of the acoustic signal AC2 emitted from the sound hole 123*a* and the frequency characteristics of the housing 12 differ depending on the opening area of the sound hole 123*a*. Further, the frequency characteristics of the housing 12 affect the frequency characteristics of the acoustic signal AC2 emitted from the sound hole 123*a*, that is, the amplitude at each frequency. Considering the propagation region and frequency characteristics of the acoustic signal AC2 emitted from the sound hole 123*a*, the opening area of the sound hole 123*a* is determined so that the sound leakage component is canceled out by the acoustic signal AC2 emitted from the sound hole 123*a* in the region where the sound leakage component is to be canceled out.

From the above-described viewpoint, for example, it is preferable that the sound hole 123*a* (second sound hole) be configured as follows.

Figure 3A:
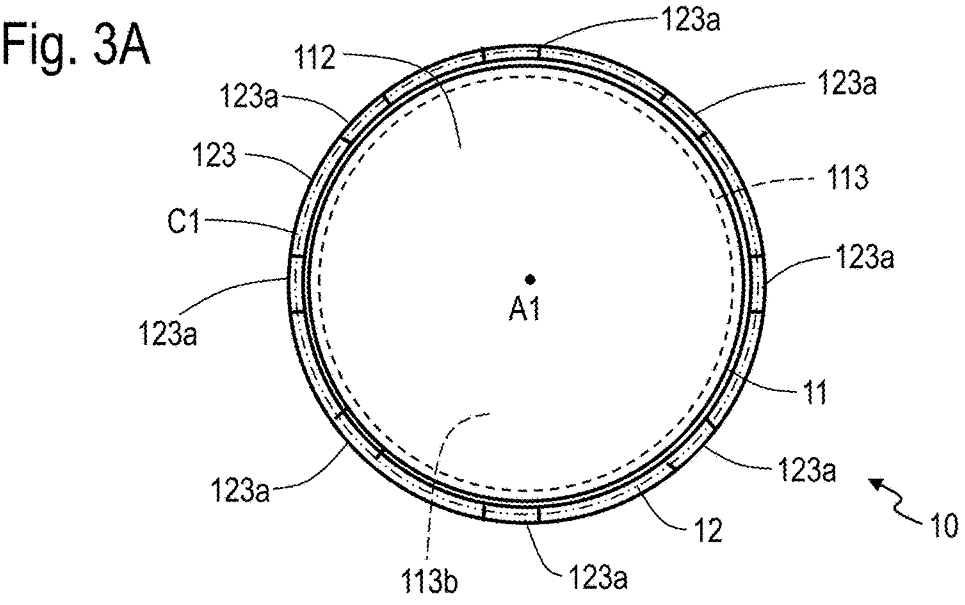
FIG. 3A is a cross-sectional view taken along the line 2BA-2BA in FIG. 2B.
Figure 3B:
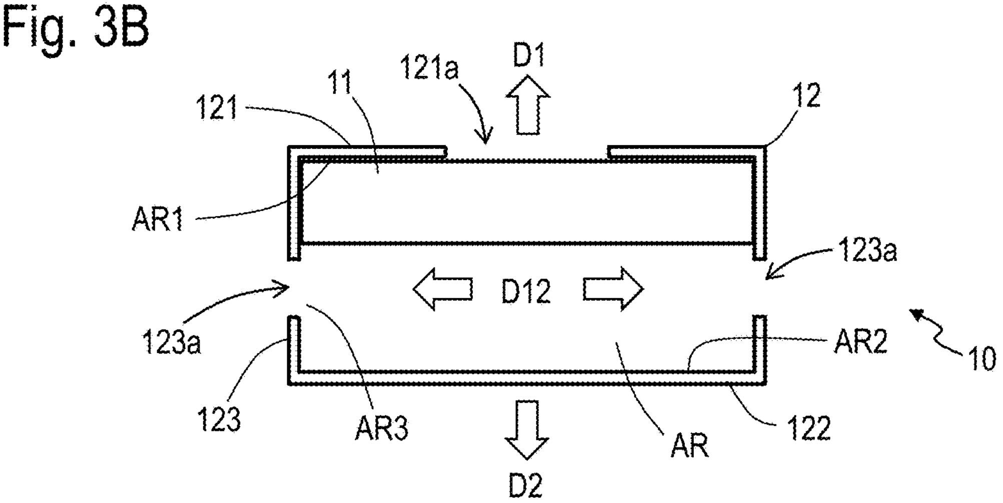
FIG. 3B is a cross-sectional view taken along the line 2A-2A in FIG. 2A.
Figure 3C:
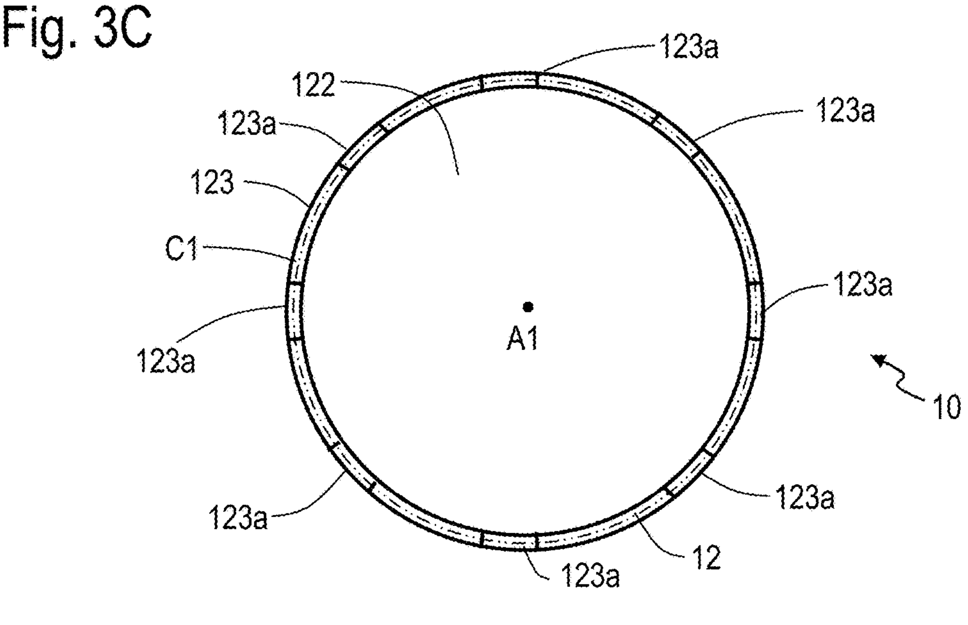
FIG. 3C is a cross-sectional view taken along the line 2BC-2BC in FIG. 2B.

For example, as illustrated in FIGS. 2B, 3A, and 3C, it is preferable that a plurality of sound hole 123*a* (second sound hole) of the present embodiment be provided along the circumference (circle) C1 about the axis A1 along the emission direction of the acoustic signal AC1 (first acoustic signal). When a plurality of sound holes 123*a* is provided along the circumference C1, the acoustic signal AC2 is emitted radially (radially around the axis A1) from the sound holes 123*a* to the outside. Here, the sound leakage component of the acoustic signal AC1 is also emitted radially (radially around the axis A1) from the sound hole 121*a* to the outside. Therefore, by providing the plurality of sound holes 123*a* along the circumference C1, the sound leakage component of the acoustic signal AC1 can be appropriately canceled out by the acoustic signal AC2. In the present embodiment, to simplify the explanation, an example is shown in which a plurality of sound holes 123*a* are provided on the circumference C1. However, it is sufficient that the plurality of sound holes 123*a* are provided along the circumference C1, and it is not necessary that all the sound holes 123*a* are arranged strictly on the circumference C1.

Figure 4:
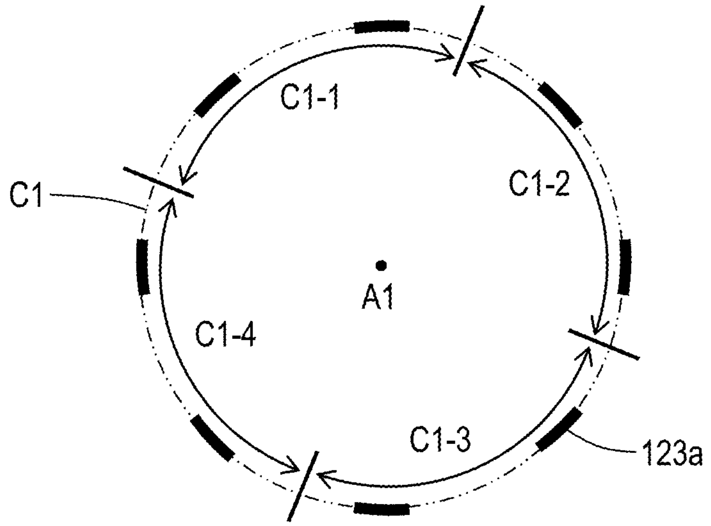
FIG. 4 is a conceptual diagram illustrating the arrangement of sound holes.

Preferably, when the circumference C1 is equally divided into a plurality of unit arc regions, a total opening area of the sound holes 123*a* (second sound holes) provided along a first arc region, which is any of the unit arc regions is the same as or approximately the same as a total opening area of the sound holes 123*a* (second sound holes) provided along a second arc region, which is any of the unit arc regions excluding the first arc region. For example, as illustrated in FIG. 4, when the circumference C1 is equally divided into four unit arc regions C1-1, . . . , C1-4, a total opening area of the sound holes 123*a* (second sound holes) provided along the first arc region (for example, the unit arc region C1-1) which is any of the unit arc regions C1-1, . . . , C1-4 is the same as or approximately the same as a total opening area of the sound holes 123*a* (second sound holes) provided along the second arc region (for example, the unit arc region C1-2) which is any of the unit arc regions excluding the first arc region. For the sake of simplicity, here is an example in which the circumference C1 is equally divided into four unit arc regions C1-1, . . . , C1-4, but the present invention is not limited thereto. Further, "α1 and α2 are substantially the same" means that the difference between a1 and a2 is equal to or less than β% of α1. Examples of β% are 3%, 5%, 10%, and the like. As a result, the sound pressure distribution of the acoustic signal AC2 emitted from the sound holes 123*a* provided along the first arc region and the sound pressure distribution of the acoustic signal AC2 emitted from the sound holes 123*a* provided along the second arc region become point-symmetric or approximately point-symmetric with respect to the axis A1. Preferably, the total opening areas for each unit arc region of the sound holes 123*a* (second sound holes) provided along each unit arc region are the same or approximately the same. As a result, the sound pressure distribution of the acoustic signal AC2 emitted from the sound holes 123*a* becomes point-symmetric or approximately point-symmetric with respect to the axis A1. In this way, the sound leakage component of the acoustic signal AC1 can be more appropriately canceled out by the acoustic signal AC2.

More preferably, the plurality of sound holes 123*a* are provided along the circumference C1 with the same shape, the same size, and the same interval. For example, a plurality of sound holes 123*a* each having a width of 4 mm and a height of 3.5 mm are provided along the circumference C1 with the same shape, the same size, and the same interval. When the plurality of sound holes 123*a* are provided along the circumference C1 with the same shape, the same size, and the same interval, the sound leakage component of the acoustic signal AC1 can be more appropriately canceled out by the acoustic signal AC2. However, the present invention is not limited thereto.

Preferably, the sound hole 123*a* (second sound hole) is provided in a wall in contact with the region AR located on the other side (D2-direction side) of the driver unit 11 (FIG. 3B). In this way, the direct wave of the acoustic signal AC2 emitted from the other side of the driver unit 11 is efficiently guided to the outside from the sound hole 123*a*. As a result, the sound leakage component of the acoustic signal AC1 can be more appropriately canceled out by the acoustic signal AC2.

In the present embodiment, to simplify the explanation, a case is illustrated in which the shape of the edge of the open end of the sound hole 123*a* is a quadrangle (the open end is rectangular), but the present invention is not limited thereto. For example, the shape of the edge of the open end of the sound hole 123*a* may be a circle, an ellipse, a triangle, or other shapes. Further, the open end of the sound hole 123*a* may have a mesh shape. In other words, the open end of the sound hole 123*a* may be composed of a plurality of holes. Further, there is no limitation on the number of sound holes 123*a*, and a single sound hole 123*a* may be provided in the region AR3 of the wall 123 of the housing 12, or a plurality of sound holes 123*a* may be provided.

The ratio $S_2/S_1$ of the total opening area $S_2$ of the sound holes 123*a* (second sound holes) to the total opening area $S_1$ of the sound holes 121*a* (first sound holes) preferably satisfies $2/3 \leq S_2/S_1 \leq 4$ (details will be described later). In this way, the sound leakage component of the acoustic signal AC1 can be appropriately canceled out by the acoustic signal AC2.

The sound leakage suppression performance may also depend on the ratio between the area of the wall 123 where the sound hole 123*a* is provided and the opening area of the sound hole 123*a*. For example, a case will be considered in which the housing 12 has a first end surface that is a wall 121 disposed on one side (D1-direction side) of the driver unit 11, a second end surface that is a wall 122 disposed on the other side (D2-direction side) of the driver unit 11, and a side surface that is a wall 123 that surrounds the space sandwiched between the first end surface and the second end surface around the axis A1 passing through the first end surface and the second end surface along the emission direction (D1 direction) of the acoustic signal AC1, the sound hole 121*a* (first sound hole) is provided on the first end surface, and the sound hole 123*a* (second sound hole) is provided on the side surface (FIGS. 2B and 3B). In such a case, the ratio $S_2/S_3$ of the total opening area $S_2$ of the sound holes 123*a* to the total area $S_3$ of the side surfaces is preferably $1/20 \leq S_2/S_3 \leq 1/5$ (details will be described later). In this way, the sound leakage component of the acoustic signal AC1 can be appropriately canceled out by the acoustic signal AC2. However, the present invention is not limited thereto.

<Usage State>

Figure 5A:
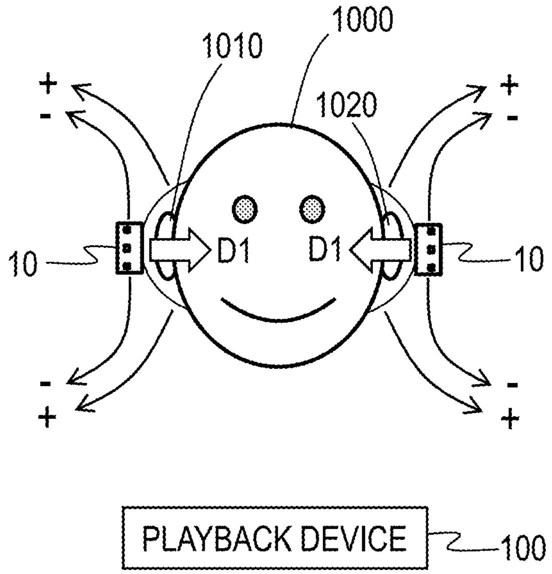
FIG. 5A is a diagram illustrating the usage state of the acoustic signal output device of the first embodiment.

Using FIG. 5A, a usage state of the acoustic signal output device 10 will be described. In the example of FIG. 5A, one acoustic signal output device 10 is worn on each of the right ear 1010 and the left ear 1020 of the user 1000. Any wearing mechanism can be used to wear the acoustic signal output device 10 on the ear. The D1-direction side of each acoustic signal output device 10 is directed toward the user 1000 side. The output signal output from the playback device 100 is input to the driver unit 11 of each acoustic signal output device 10, and the driver unit 11 emits the acoustic signal AC1 to the D1-direction side and the acoustic signal AC2 to the other side. The acoustic signal AC1 is emitted from the sound hole 121*a*, and the emitted acoustic signal AC1 enters the right ear 1010 and the left ear 1020, and is heard by the user 1000. On the other hand, the acoustic signal AC2, which is a negative phase signal of the acoustic signal AC1 or an approximate signal of the negative phase signal, is emitted from the sound hole 123*a*. A portion of this acoustic signal AC2 cancels out a portion (sound leakage component) of the acoustic signal AC1 emitted from the sound hole 121*a*.

<Experimental Results>

Figure 5B:
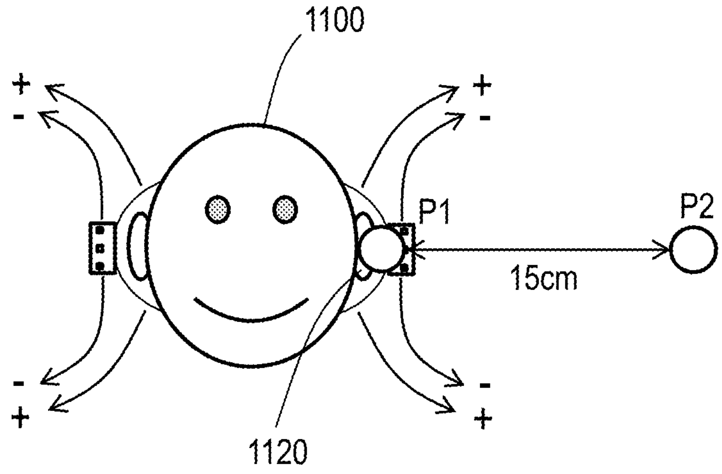
FIG. 5B is a diagram illustrating conditions for observing the acoustic signal emitted from the acoustic signal output device of the first embodiment.

Experimental results showing the sound leakage suppression effect of the acoustic signal output device 10 of the present embodiment will be described. In this experiment, as illustrated in FIG. 5B, the acoustic signal output device 10 was worn on both ears of a dummy head 1100 imitating a human head, and acoustic signals were observed at positions P1 and P2. In this example, the position P1 is a position near the left ear 1120 of the dummy head 1100 (near the acoustic signal output device 10), and the position P2 is a position 15 cm outward from the position P1.

Figure 6:
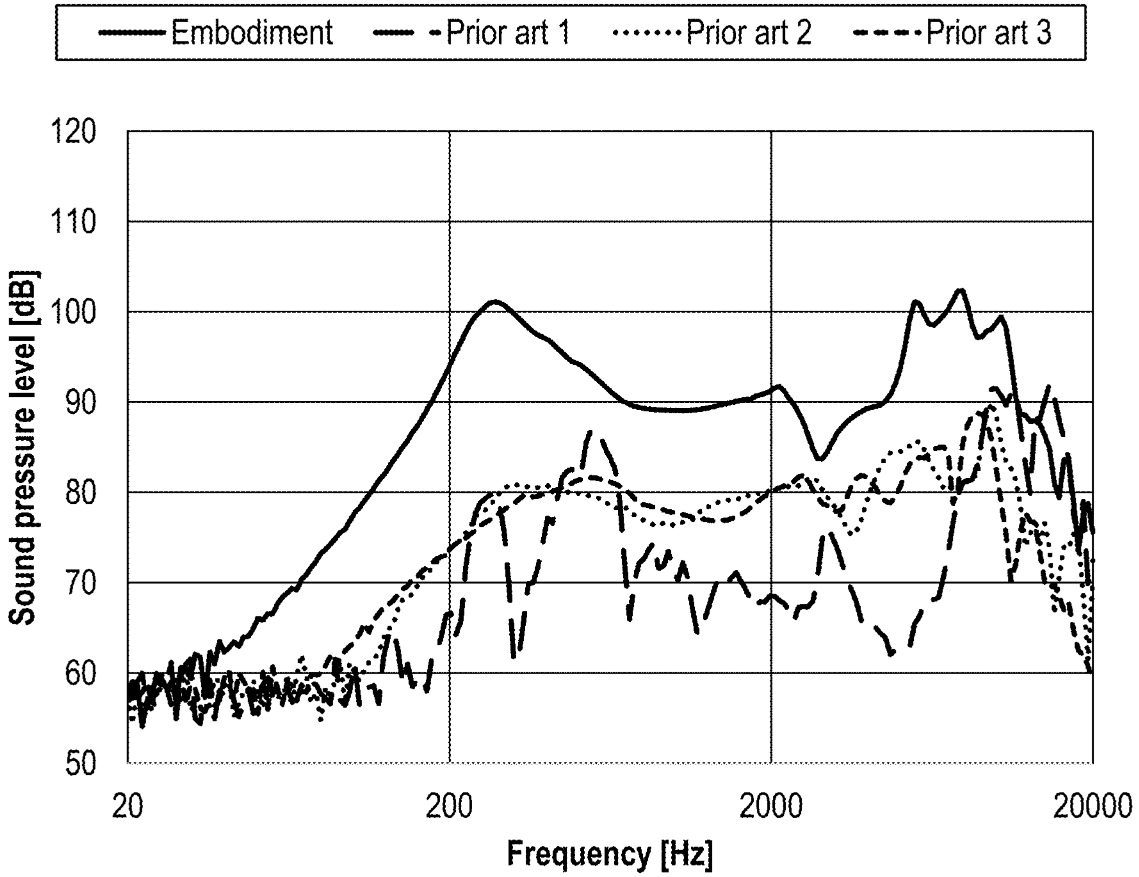
FIG. 6 is a graph illustrating the frequency characteristics of the acoustic signal observed at the position P1 in FIG. 5B.
Figure 7:
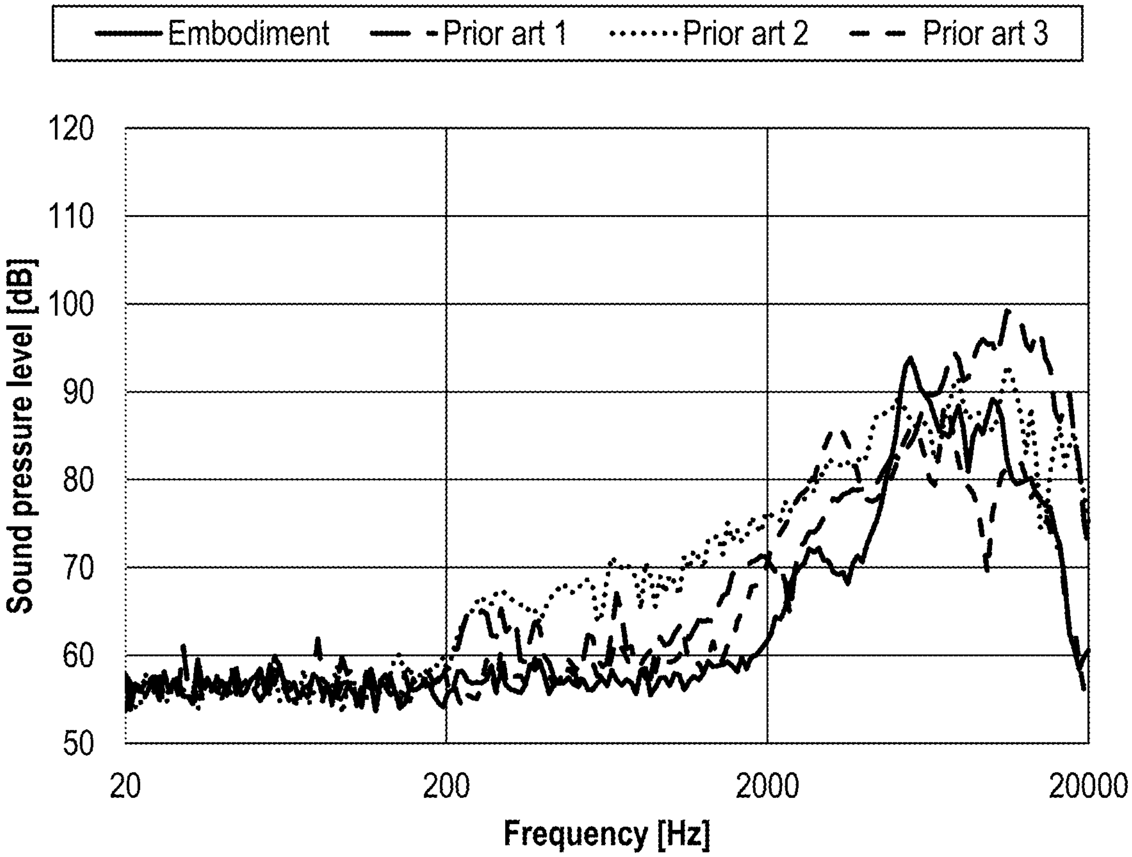
FIG. 7 is a graph illustrating the frequency characteristics of the acoustic signal observed at the position P2 in FIG. 5B.
Figure 8:
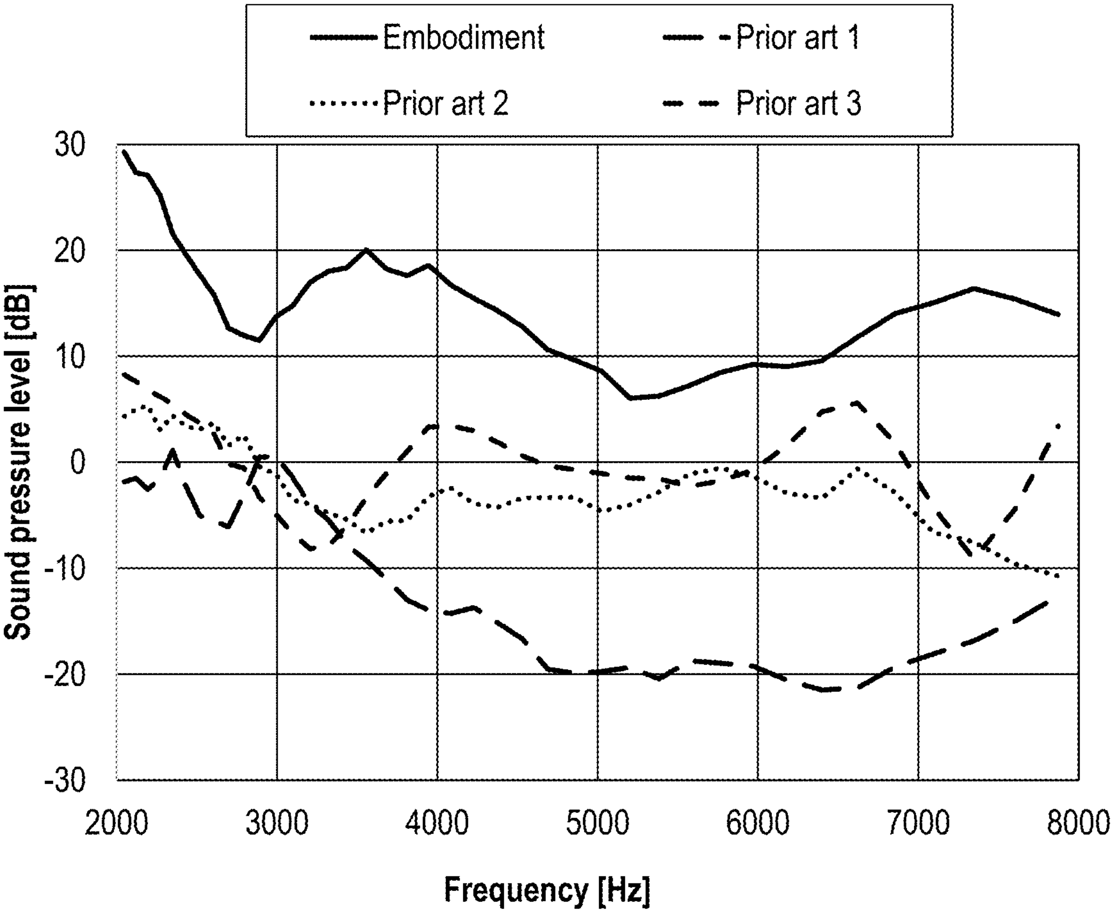
FIG. 8 is a graph illustrating the difference between the acoustic signal observed at the position P1 and the acoustic signal observed at the position P2.

FIG. 6 illustrates the frequency characteristics of the acoustic signal observed at the position P1 in FIG. 5B, FIG. 7 illustrates the frequency characteristics of the acoustic signal observed at the position P2 in FIG. 5B, and FIG. 8 illustrates the difference (difference in sound pressure level at each frequency) between the frequency characteristics of the acoustic signal observed at the position P1 and the frequency characteristic of the acoustic signal observed at the position P2. The horizontal axis represents the frequency ([Hz]), and the vertical axis represents the sound pressure level (SPL) ([dB]). The solid line graph illustrates the frequency characteristics when using the acoustic signal output device 10 of the present embodiment, and the broken line graph illustrates the frequency characteristics when using the conventional acoustic signal output device (open-ear earphone). As illustrated in FIG. 8, it can be seen that, when the acoustic signal output device 10 of the present embodiment is used, compared to the case where a conventional acoustic signal output device is used, the difference between the sound pressure levels of the acoustic signal observed at the position P1 and the acoustic signal observed at the position P2 is large. This indicates that the acoustic signal output device 10 of the present embodiment can suppress sound leakage at the position P2 compared to the conventional acoustic signal output device.

Figure 9A:
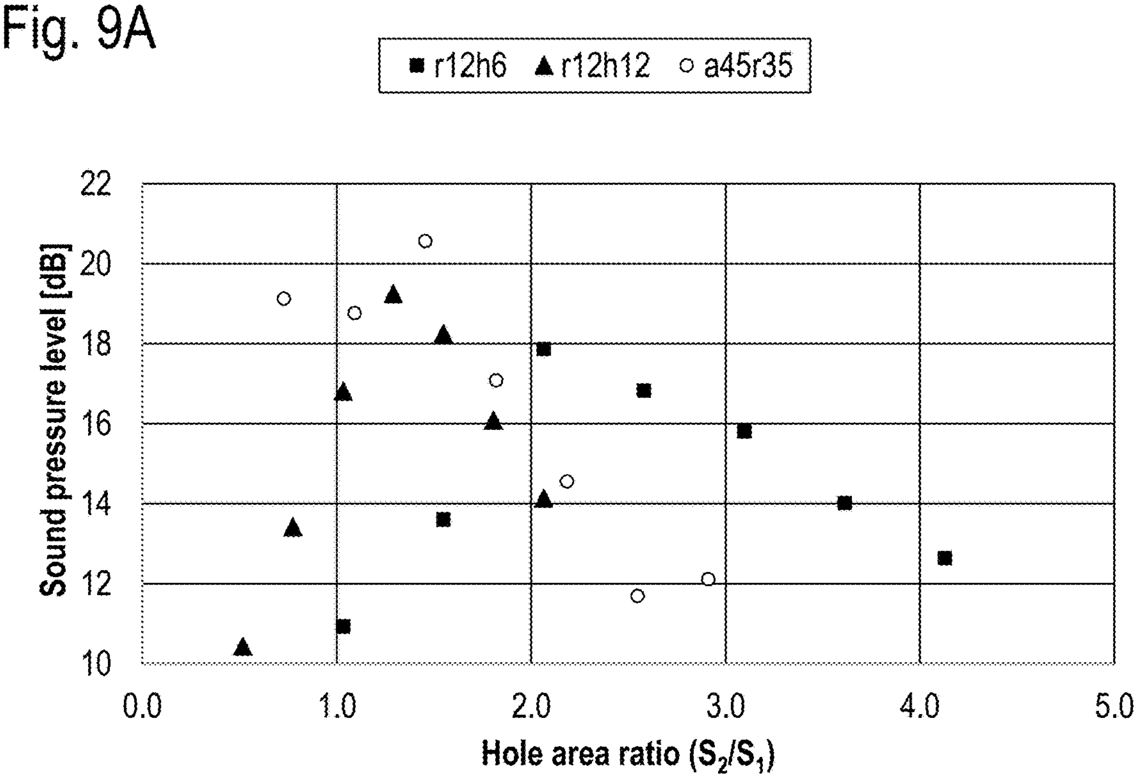
FIGS. 9A and 9B are graphs illustrating the relationship between the sound hole region ratio and sound leakage.

FIG. 9A illustrates the relationship between the ratio $S_2/S_1$ of the total opening area $S_2$ of the sound holes 123*a* (second sound holes) to the total opening area $S_1$ of the sound holes 121*a* (first sound holes) and the difference between the frequency characteristics of the acoustic signal observed at the position P1 and the frequency characteristics of the acoustic signal observed at the position P2. The horizontal axis indicates the ratio $S_2/S_1$, and the vertical axis indicates the sound pressure level (SPL) ([dB]) representing the difference. r12*h*6 illustrates the result when the number of sound holes 121*a* is 6 and the number of sound holes 123*a* is 4, r12*h*12 illustrates the result when the number of sounds 21*a* is 12 and the number of sound holes 123*a* is 4, and r45*h*35 illustrates the result when the number of sound holes 121*a* is 1 and the number of sound holes 123*a* is 4. As illustrated in FIG. 9A, it can be seen that, when the ratio $S_2/S_1$ of the total opening area $S_2$ of the sound holes 123*a* to the total opening area $S_1$ of the sound holes 121*a* is in the range of $2/3 \leq S_2/S_1 \leq 4$, the difference between the sound pressure levels of the acoustic signal observed at the position P1 and the acoustic signal observed at the position P2 is particularly large. This indicates that the sound leakage suppression effect is large in this range.

Figure 9B:
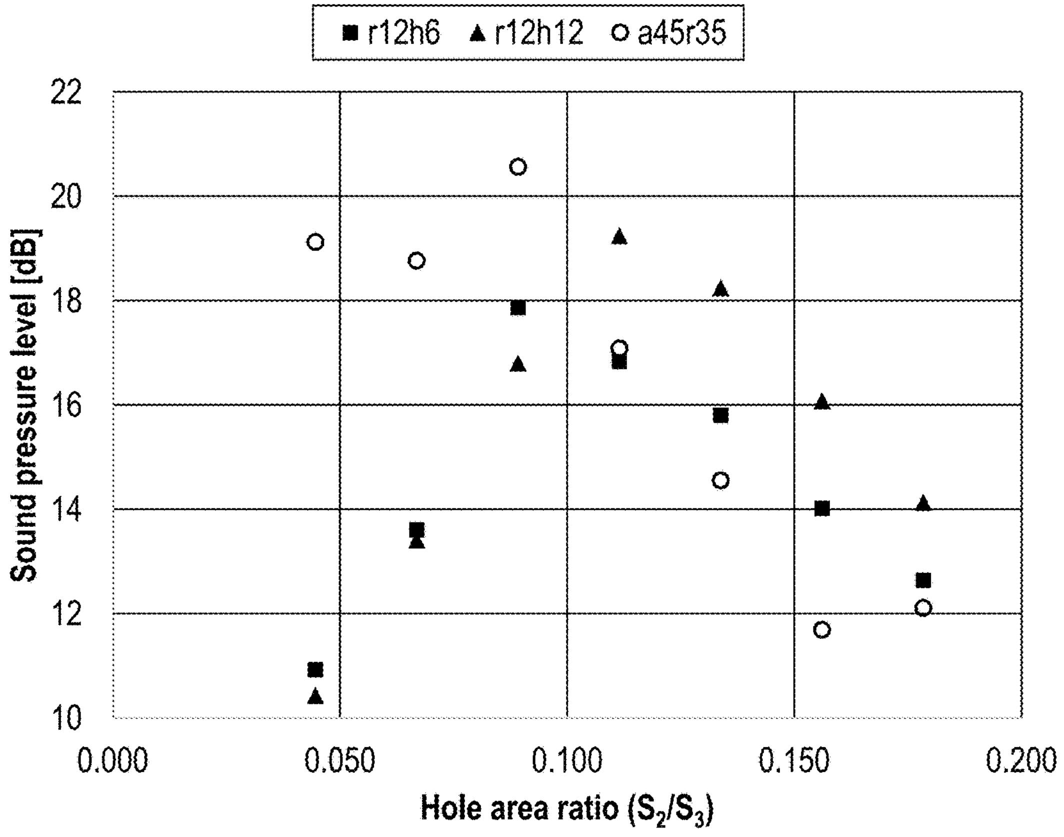
Figure 10A:
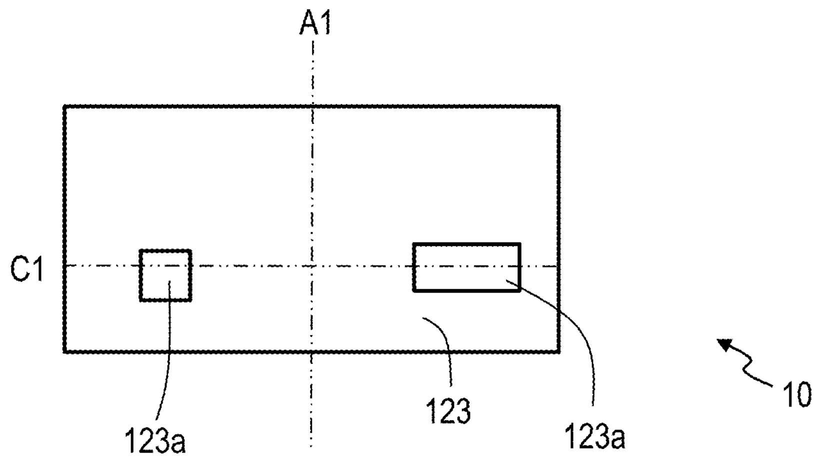
FIG. 10A is a front view illustrating the arrangement of sound holes.
Figure 10B:
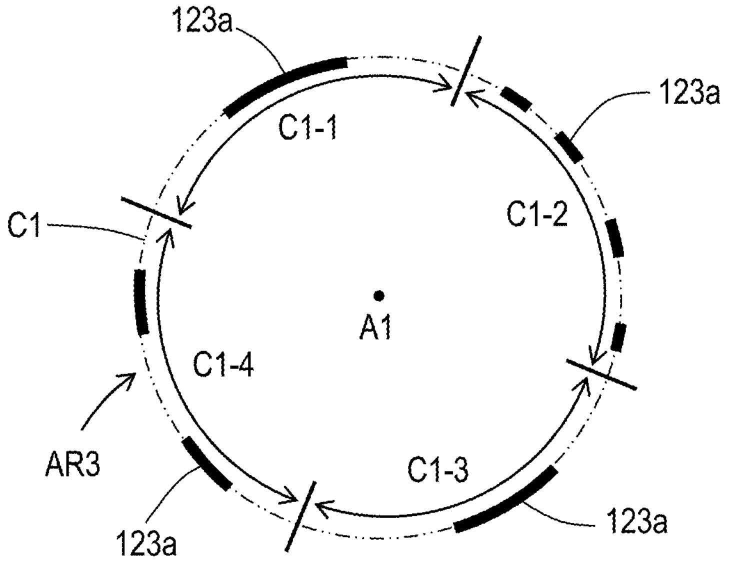
FIG. 10B is a conceptual diagram illustrating the arrangement of sound holes.
Figure 11A:
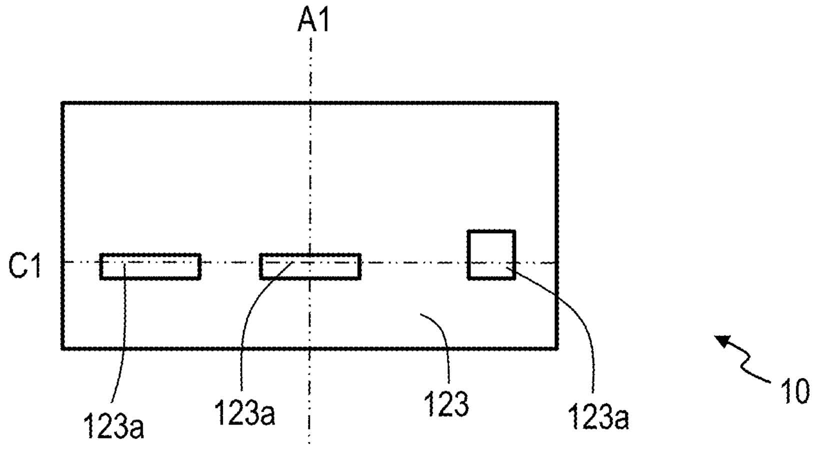
FIG. 11A is a front view illustrating the arrangement of sound holes.
Figure 11B:
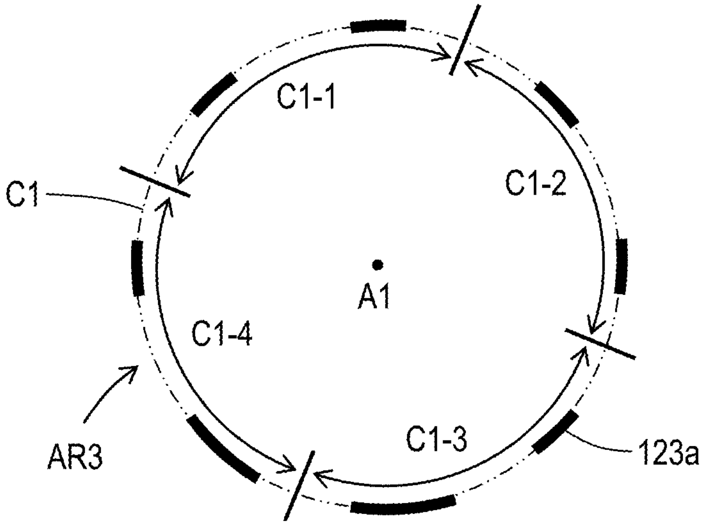
FIG. 11B is a conceptual diagram illustrating the arrangement of sound holes.

FIG. 9B illustrates the relationship between the ratio $S_2/S_3$ of the total opening area $S_2$ of sound holes 123*a* (second sound holes) to the total area $S_3$ of the side surface and the difference between the frequency characteristics of the acoustic signal observed at the position P1 and the frequency characteristics of the acoustic signal observed at the position P2. The horizontal axis indicates the ratio $S_2/S_3$, and the vertical axis indicates the sound pressure level (SPL) ([dB]) representing the difference. The meanings of r12*h*6, r12*h*12, and r45*h*35 are the same as in FIG. 9A. As illustrated in FIG. 9B, it can be seen that, when the ratio $S_2/S_3$ of the total opening area $S_2$ of the sound holes 123*a* (second sound holes) to the total area $S_3$ of the side surface is in the range of $1/20 \leq S_2/S_3 \leq 1/5$, the difference between the sound pressure levels of the acoustic signal observed at the position P1 and the acoustic signal observed at the position P2 is particularly large. This indicates that the sound leakage suppression effect is large in this range.

Modification 1 of First Embodiment

Figure 12A:
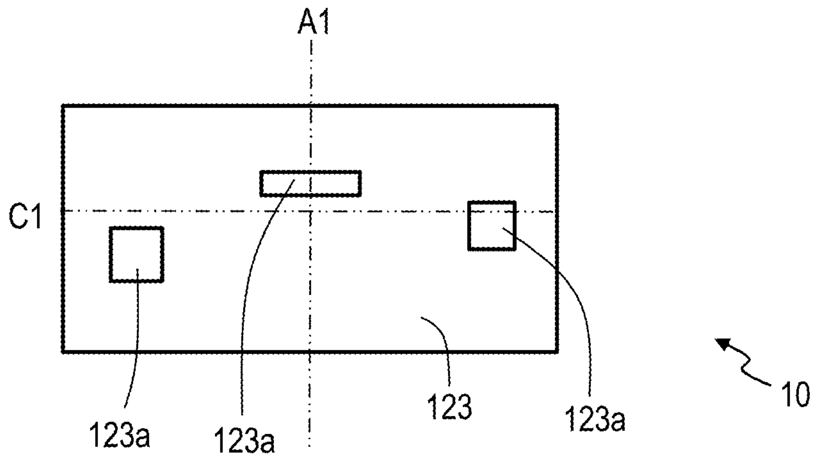
FIGS. 12A to 12C are front views illustrating modifications of the arrangement of sound holes.
Figure 12B:
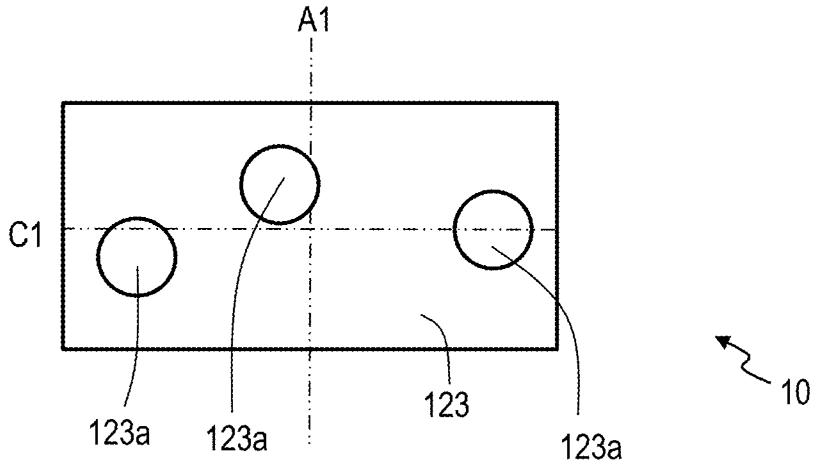
Figure 12C:
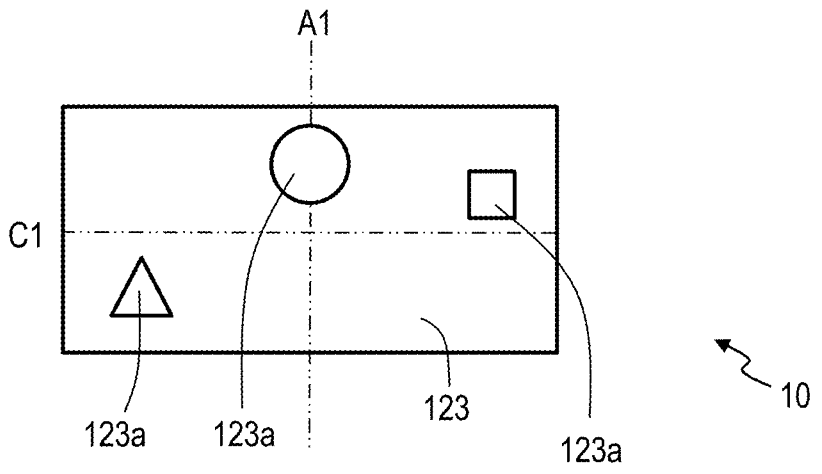

In the first embodiment, an example has been shown in which a plurality of sound holes 123*a* (second sound holes) having the same shape, the same size, and the same interval are provided along the circumference C1. However, the present invention is not limited thereto. A plurality of sound holes 123*a* having different shapes and/or sizes and/or intervals may be provided along the circumference C1. For example, as illustrated in FIGS. 10A, 10B, 11A, 11B, and 12A, a plurality of sound holes 123*a* having different shapes and intervals may be provided in the wall 123 along the circumference C1. As illustrated in FIG. 12B, a plurality of sound holes 123*a* with different intervals may be provided in the wall 123 along the circumference C1. As illustrated in FIG. 12C, a plurality of sound holes 123*a* with different shapes and sizes may be provided in the wall 123 along the circumference C1.

In addition, even in such a case, when the circumference C1 is equally divided into a plurality of unit arc regions, the total opening area of the sound holes 123*a* (second sound holes) provided along the first arc region which is any of the unit arc regions is preferably the same as or approximately the same as the total opening area of the sound holes 123*a* provided along the second arc region which is any of the unit arc regions excluding the first arc region. More preferably, the total opening areas for each unit arc region of the sound holes 123*a* provided along each unit arc region are the same or approximately the same. For example, as illustrated in FIGS. 10A, 10B, 11A, and 11B, it is preferable that the numbers and the sizes of the sound holes 123*a* provided in the unit arc regions C1-1, C1-2, C1-3, and C1-4 be different from each other, but the total opening area of the sound holes 123*a* provided in the unit arc region C1-1, the total opening area of the sound holes 123*a* provided in the unit arc region C1-2, the total opening area of the sound holes 123*a* provided in the unit arc region C1-3, and the total opening area of the sound holes 123*a* provided in the unit arc region C1-4 are the same or approximately the same.

It is sufficient that the plurality of sound holes 123*a* are provided along the circumference C1, and it is not necessary that all the sound holes 123*a* are strictly arranged on the circumference C1. For example, as illustrated in FIGS. 12A, 12B, and 12C, all the sound holes 123*a* do not have to be arranged on the circumference C1, and it is sufficient that the plurality of sound holes 123*a* are arranged along the circumference C1. Note that the position of the circumference C1 is not limited to that illustrated in the first embodiment, and may be any circumference around the axis A1.

Furthermore, all the sound holes 123*a* may not be arranged along the circumference C1 as long as a sufficient sound leakage suppression effect can be obtained. That is, some of the sound holes 123*a* may be arranged at positions away from the circumference C1. Further, the number of sound holes 123*a* is not limited, and one sound hole 123*a* may be provided as long as a sufficient sound leakage suppression effect can be obtained.

Modification 2 of First Embodiment

Figure 13A:
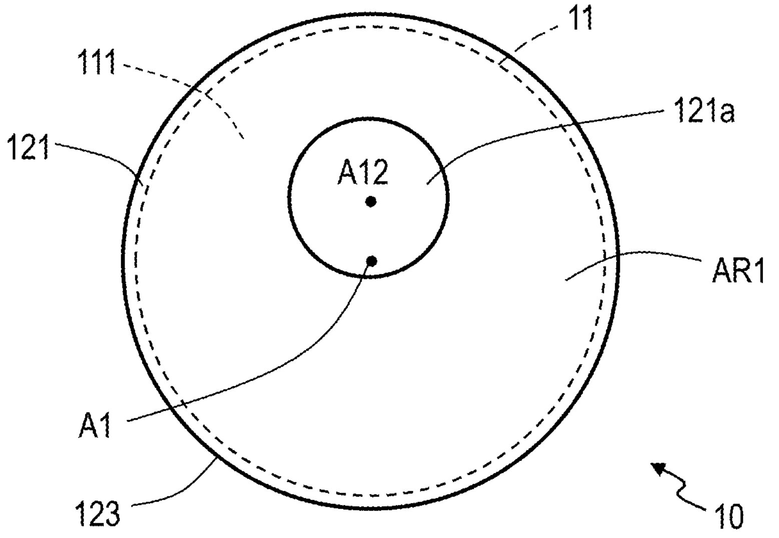
FIGS. 13A and 13B are transparent plan views illustrating modifications of the arrangement of sound holes.
Figure 13B:
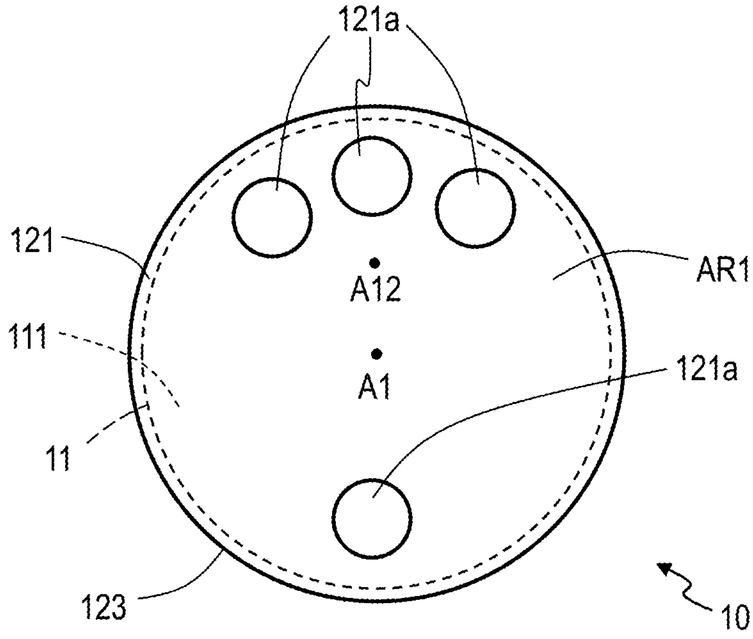

In the first embodiment, a configuration has been illustrated in which one sound hole 121*a* is provided at the center position (hereinafter simply referred to as "center position") of the region AR1 (the region of the wall disposed on one side of the driver unit) of the wall 121 of the housing 12. However, a plurality of sound holes 121*a* may be provided in the region AR1 of the wall 121 of the housing 12, or the sound hole 121*a* may be biased toward an eccentric position offset from the center (center position) of the region AR1 of the wall 121 of the housing 12 at an eccentric position. For example, as illustrated in FIG. 13A, one sound hole 121*a* may be provided at an eccentric position on the region AR1 (a position on the axis A12 parallel to the axis A1, which is shifted from the axis A1) (hereinafter simply referred to as an "eccentric position"). In other words, the position of one sound hole 121*a* provided in the region AR1 may be biased toward an eccentric position. Alternatively, as illustrated in FIG. 13B, a plurality of sound holes 121*a* may be provided in the region AR1, and the plurality of sound holes 121*a* may be biased toward an eccentric position on the axis A12 parallel to the axis A1, which is shifted from the axis A1. In other words, the positions of the plurality of sound holes 121*a* provided in the region AR1 may be biased toward an eccentric position. That is, a single sound hole 121*a* may be provided, or a plurality of sound holes 121*a* may be provided, the sound hole 121*a* may be biased toward the center position of the region AR1 of the wall 121 of the housing 12, or may be biased toward an eccentric position. Note that the distance between the axis A1 and the axis A12 is not limited, and may be set according to the required sound leakage suppression performance. An example of the distance between the axis A1 and the axis A12 is 4 mm, but the present invention is not limited thereto.

The resonance frequency of the housing 12 can be controlled by the arrangement of the sound holes 121*a* provided in the region AR1 (for example, the number, size, interval, arrangement, and the like of the sound holes 121*a*). The resonance frequency of the housing 12 affects the frequency characteristics of the acoustic signals emitted from the sound holes 121*a* and 123*a*. Therefore, the frequency characteristics of the acoustic signals emitted from the sound holes 121*a* and 123*a* can be controlled by the arrangement of the sound holes 121*a* provided in the region AR1. For example, as the frequencies of the acoustic signals AC1 and AC2 increases, their wavelength becomes shorter, and it becomes difficult to match the phases so that the sound leakage component of the acoustic signal AC1 emitted to the outside is canceled out by the acoustic signal AC2. As a result, the higher the frequencies of the acoustic signals AC1 and AC2, the more difficult it becomes to suppress the sound leakage of the acoustic signal AC1. At the resonance frequency of the housing 12, since the sound pressure level of the acoustic signals AC1 and AC2 increases, if the resonance frequency of the housing 12 belongs to a high frequency band where it is difficult to suppress sound leakage, sound leakage will be perceived to be large. In order to solve this problem, the arrangement of the sound holes 121*a* may be set as in Examples 2-1 and 2-2 below, and the resonance frequency of the housing 12 may be controlled.

Example 2-1

The arrangement of the sound holes 121*a* may be set so that the human auditory sensitivity to the resonance frequency of the housing 12 is low in a high frequency band where it is difficult to suppress sound leakage. For example, Sa is defined as the human auditory sensitivity (easiness of hearing) to an acoustic signal having a resonance frequency equal to or higher than a predetermined frequency $f_{th}$ of the housing 12 in which the position of the sound hole 121*a* is biased toward a certain eccentric position. Further, Sc is defined as the human auditory sensitivity to an acoustic signal having a resonance frequency equal to or higher than a predetermined frequency $f_{th}$ of the housing 12 in which the sound hole 121*a* is provided at the center position. It is assumed that the auditory sensitivity Sa in this case is lower than the auditory sensitivity Sc. That is, the human auditory sensitivity Sa to an acoustic signal having a resonance frequency equal to or higher than a predetermined frequency $f_{th}$ of the housing 12 in which the position of the sound hole 121*a* (first sound hole) is biased toward a certain eccentric position (a position shifted from the center of the region of the wall disposed on one side of the driver unit) is lower than the human auditory sensitivity Se to an acoustic signal having a resonance frequency equal to or higher than the predetermined frequency $f_{th}$ of the housing 12 in which it is assumed that the sound hole 121*a* is provided at the center position (the center of the region of the wall disposed on one side of the driver unit). The position of the sound hole 121*a* may be biased toward such an eccentric position. Note that auditory sensitivity may be any index that represents the easiness of hearing sounds. The higher the auditory sensitivity, the easier it is to hear. An example of the auditory sensitivity is the reciprocal of the sound pressure level required for a human to perceive a sound of a reference loudness. For example, the reciprocal of the sound pressure level at each frequency in the equal loudness curve is the auditory sensitivity. The predetermined frequency $f_{th}$ means the lower limit of a frequency band that includes a frequency at which it is difficult to cancel out the sound leakage component of the acoustic signal AC1 with the acoustic signal AC2. Examples of the predetermined frequency $f_{th}$ are 3000 Hz, 4000 Hz, 5000 Hz, 6000 Hz, and the like.

Example 2-2

Depending on the arrangement of the sound holes 121*a*, the resonance peak of the magnitude of the acoustic signal AC1 and/or the acoustic signal AC2 emitted from the housing 12 may be accentuated. For example, $Q_d$ is defined as the sharpness (sharpness) of the peak above the predetermined frequency $f_{th}$ of the magnitude of the acoustic signal AC1 emitted from the sound hole 121$a$ and/or the acoustic signal AC2 emitted from the sound hole 123$a$ of the housing 12 in which the position of the sound hole 121$a$ is biased toward a certain eccentric position. Further, $Q_c$ is defined as the sharpness of the peak above the predetermined frequency $f_{th}$ of the magnitude of the acoustic signal AC1 emitted from the sound hole 121$a$ and/or the acoustic signal AC2 emitted from the sound hole 123$a$ of the housing 12 in which the sound hole 121$a$ is provided at the center position. In this case, the peak sharpness $Q_d$ is assumed to be duller than the peak sharpness $Q_c$. That is, the sharpness $Q_d$ of the peak above the predetermined frequency $f_{th}$ of the magnitude of the acoustic signal AC1 (first acoustic signal) emitted from the sound hole 121$a$ (first sound hole) and/or the acoustic signal AC2 (second acoustic signal) emitted from the sound hole 123$a$ (second sound hole) of the housing 12 in which the position of the sound hole 121$a$ (first sound hole) is biased toward a certain eccentric position is duller than the sharpness $Q_c$ of the peak above the predetermined frequency $f_{th}$ of the magnitude of the acoustic signal AC1 (first acoustic signal) emitted from the sound hole 121$a$ (first sound hole) and/or the acoustic signal AC2 (second acoustic signal) emitted from the sound hole 123$a$ (second sound hole) of the housing 12 in which it is assumed that the sound hole 121$a$ is provided at the center position. In other words, the peak above the predetermined frequency $f_{th}$ of the magnitude of the acoustic signal AC1 and/or the acoustic signal AC2 emitted from the housing 12 in which the sound hole 121$a$ is biased toward a certain eccentric position is flattened more than the peak above the predetermined frequency $f_{th}$ of the magnitude of the acoustic signal AC1 and/or the acoustic signal AC2 emitted from the housing 12 in which it is assumed that the sound hole 121$a$ is provided at the center position. The position of the sound hole 121$a$ may be biased toward such an eccentric position.

Figure 14A:
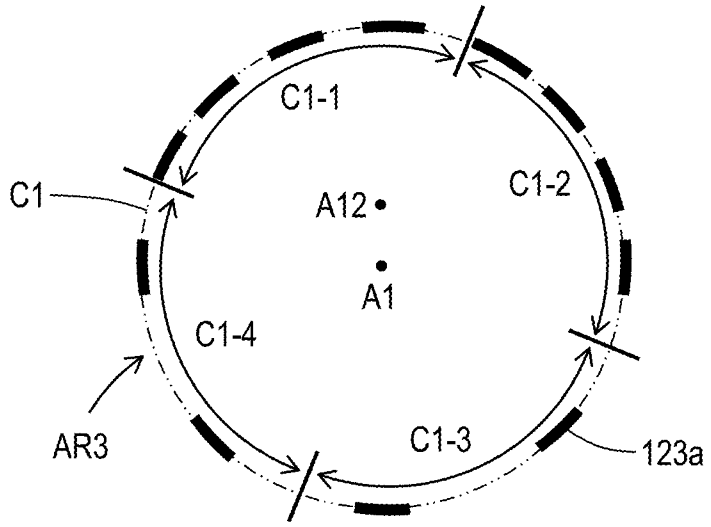
FIGS. 14A and 14B are conceptual diagrams illustrating modifications of the arrangement of sound holes.
Figure 14B:
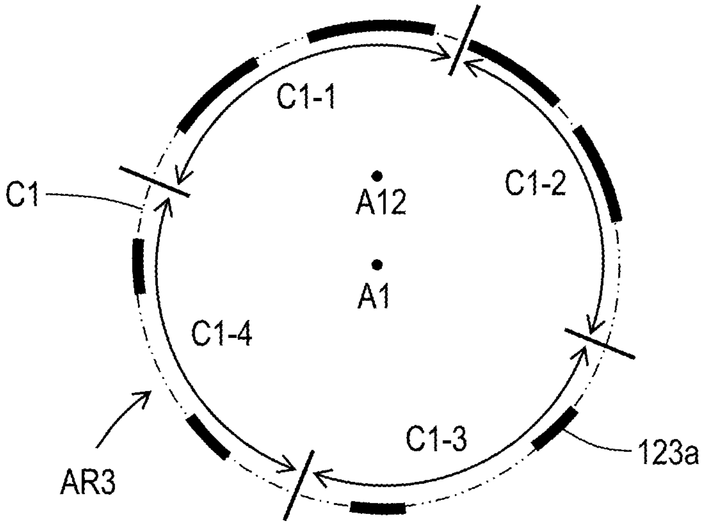

When the position of one or more sound holes 121$a$ is biased toward an eccentric position, the distribution and the opening area of the sound holes 123$a$ may be biased accordingly. For example, as illustrated in FIG. 13A or 13B, the position of one or more sound holes 121$a$ provided in the region AR1 may be biased toward an eccentric position on the axis A12 shifted from the axis A1, and as illustrated in FIGS. 14A and 14B, the opening area of the sound hole 123$a$ provided in the region AR3 may also be biased toward the eccentric position on the axis A12. In the example of FIG. 14A, the number of sound holes 123$a$ provided along the unit arc region C1-3 distant from the eccentric position on the axis A12 is smaller than the number of sound holes 123$a$ provided along the unit arc region C1-1 closer to the eccentric position than the unit arc region C1-3. In the example of FIG. 14B, each opening area of the sound holes 123$a$ provided along the unit arc region C1-3 distant from the eccentric position on the axis A12 in the example of FIG. 14A is smaller than each opening area of the sound holes 123$a$ provided along the unit arc region C1-1 closer to the eccentric position than the unit arc region C1-3. That is, when the circumference C1 is equally divided into a plurality of unit arc regions, the total opening area of the sound holes 123$a$ (second sound holes) provided along the first arc region (for example, C1-3) which is any of the unit arc regions is smaller than the total opening area of the sound holes 123$a$ provided along the second arc region (for example, C1-1) which is any of the unit arc regions closer to the eccentric position than the first arc region. When the position of the sound hole 121$a$ is biased toward the eccentric position, the distribution of the acoustic signal AC1 emitted to the outside from the sound holes 121$a$ is also biased toward the eccentric position. Here, by biasing the distribution and the opening area of the sound hole 123$a$ toward the eccentric position, the distribution of the acoustic signal AC2 emitted to the outside from the sound holes 123$a$ can also be biased toward the eccentric position. In this way, the sound leakage component of the acoustic signal AC1 can be sufficiently canceled out by the emitted acoustic signal AC2.

In order to control the resonance frequency of the housing 12 for other purposes, the sound hole 121$a$ may be biased toward an eccentric position offset from the center (center position) of the region AR1 of the wall 121 of the housing 12.

Furthermore, the size of the openings of the sound holes 121$a$ and 123$a$, the thickness of the wall of the housing 12, and the internal volume of the housing 12 affect the resonance frequency of the housing 12. Therefore, by controlling at least a portion of them, the resonance frequency of the housing 12 can be increased or decreased. That is, the larger the size of the openings of the sound holes 121$a$ and 123$a$, the thinner the wall of the housing 12, and the smaller the internal volume of the housing 12, the higher the resonance frequency of the housing 12. Conversely, the smaller the size of the openings of the sound holes 121$a$ and 123$a$, the thicker the wall of the housing 12, and the larger the internal volume of the housing 12, the lower the resonance frequency of the housing 12.

Modification 3 of First Embodiment

As described above, in the first embodiment and its modifications 1 and 2, the acoustic signal AC2, which is a negative phase signal of the acoustic signal AC1 or an approximate signal of the negative phase signal, is emitted from the sound hole 123$a$, and a portion (sound leakage component) of the acoustic signal AC1 emitted from the sound hole 121$a$ is canceled out by a portion of the emitted acoustic signal AC2. For this purpose, it is preferable that, when the direct wave of the acoustic signal AC1 is mainly emitted from the sound hole 121$a$, the direct wave of the acoustic signal AC2 is mainly emitted from the sound hole 123$a$. This is because, since the propagation path of reflected waves is different from that of direct waves, if reflected waves are included in the acoustic signal AC2 emitted from the sound hole 123$a$, there is a possibility that the acoustic signal AC2 emitted from the sound hole 123$a$ has a phase different from that of the negative phase signal of the acoustic signal AC1 emitted from the sound hole 121$a$ or the approximate signal of the negative phase signal, and the efficiency of canceling out the sound leakage component may decrease. That is, a configuration is preferable in which the housing 12 has an internal structure that suppresses the echos of the acoustic signal AC2 (second acoustic signal) inside the housing 12, and the direct wave of the acoustic signal AC2 is mainly emitted from the sound hole 123$a$ (second sound hole). An example of such a configuration will be shown below.

Example 3-1

An echo suppressing material (for example, sponge, paper, and the like) for suppressing echoes may be installed in the internal region (for example, the regions AR2 and AR3) of the wall of the housing 12. The wall of the housing 12 itself may be made of an echo suppressing material, or a sheet-like echo suppressing material may be fixed to the wall of the housing 12. Alternatively, the internal region (for example, the regions AR2 and AR3) of the wall of the housing 12 may have an uneven shape to suppress echoes. Alternatively, a sheet with an uneven surface shape having an echo suppression effect may be fixed to the internal region of the wall of the housing 12.

Example 3-2

Figure 15A:
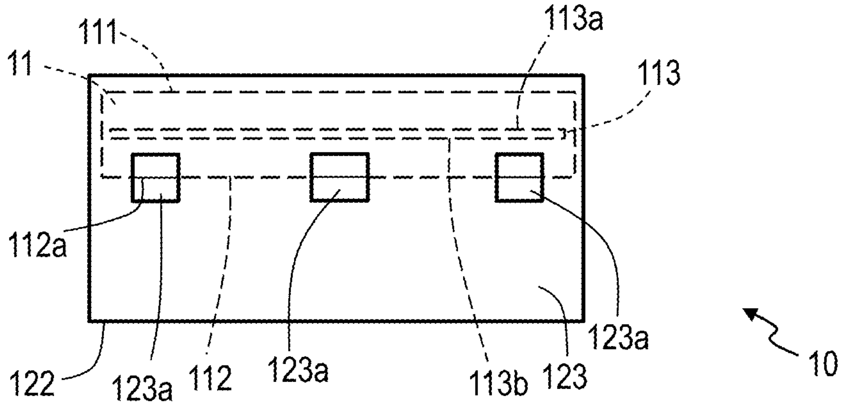
FIG. 15A is a transparent front view illustrating a modification of the arrangement of sound holes.
Figure 15B:
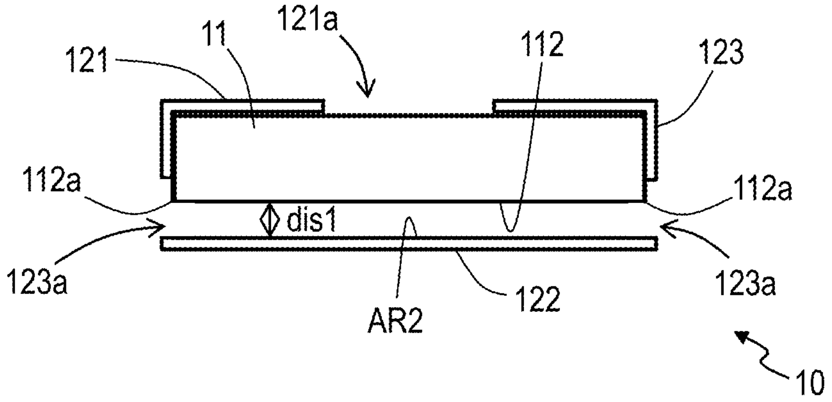
FIG. 15B is a cross-sectional view illustrating a modification of the arrangement of sound holes and a modification of the distance between a driver unit and a housing.

As illustrated in FIGS. 15A and 15B, the open end of the sound hole 123*a* (second sound hole) may be directed toward the edge portion 112*a* of the other side 112 (D2-direction side) of the driver unit 11 so that the direct wave of the acoustic signal AC2 (second acoustic signal) emitted from the other side 112 of the driver unit 11 is mainly emitted from the sound hole 123*a*.

Example 3-3

As illustrated in FIG. 15B, the wall 122 (the region AR2) disposed on the other side of the driver unit 11 may not be in contact with the driver unit 11 (does not contact while the driver unit 11 is being driven), and the distance dis1 between the driver unit 11 and the wall 122 disposed on the other side 112 of the driver unit 11 may be 5 mm or less, so that the direct wave of the acoustic signal AC2 (second acoustic signal) is mainly emitted from the sound hole 123*a* (second sound hole). Note that the region AR2 being not in contact with the driver unit 11 while the driver unit 11 is being driven means, for example, that the distance dis1 is larger than the amplitude on the other side 112 of the driver unit 11 that is being driven.

Modification 4 of First Embodiment

As described above, the higher the frequencies of the acoustic signals AC1 and AC2, the shorter the wavelengths thereof, making it difficult to cancel out the sound leakage component of the acoustic signal AC1 with the acoustic signal AC2. In some cases, it may be difficult to match the phases of the acoustic signals AC1 and AC2 at high frequencies, and conversely, it may be possible that the sound leakage component of the acoustic signal AC1 is amplified by the acoustic signal AC2. Therefore, it may be better to suppress the high-frequency acoustic signal AC2 from being emitted from the sound hole 123*a*. Therefore, the housing 12 may be provided with an acoustic absorbent that absorbs high-frequency acoustic signals. This acoustic absorbent has a characteristic that the sound absorption coefficient for an acoustic signal of frequency $f_1$ is larger than the sound absorption coefficient for an acoustic signal of frequency $f_2$. Here, the frequency $f_1$ is higher than the frequency $f_2$ ($f_1>f_2$). In other words, this acoustic absorbent suppresses higher frequency components of the acoustic signal more than lower frequency components. The frequency $f_1$ is equal to or less than a predetermined frequency $f2_{th}$, and the frequency $f_2$ is larger than a predetermined frequency $f2_{th}$. Examples of the predetermined frequency $f2_{th}$ are 3000 Hz, 4000 Hz, 5000 Hz, 6000 Hz, and the like. In addition, the sound absorption coefficient $\alpha$ of an acoustic absorbent can be expressed as $\alpha=(E_{in}-E_{out})/E_{in}$ where $E_{in}$ is the energy of an acoustic signal input to the acoustic absorbent, and $E_{out}$ is the energy of an acoustic signal reflected by the acoustic absorbent or the energy of an acoustic signal that passed through the acoustic absorbent. Examples of such acoustic absorbents include paper such as Japanese paper and hanshi paper, nonwoven fabric, silk, and cotton.

Example 4-1

Figure 16A:
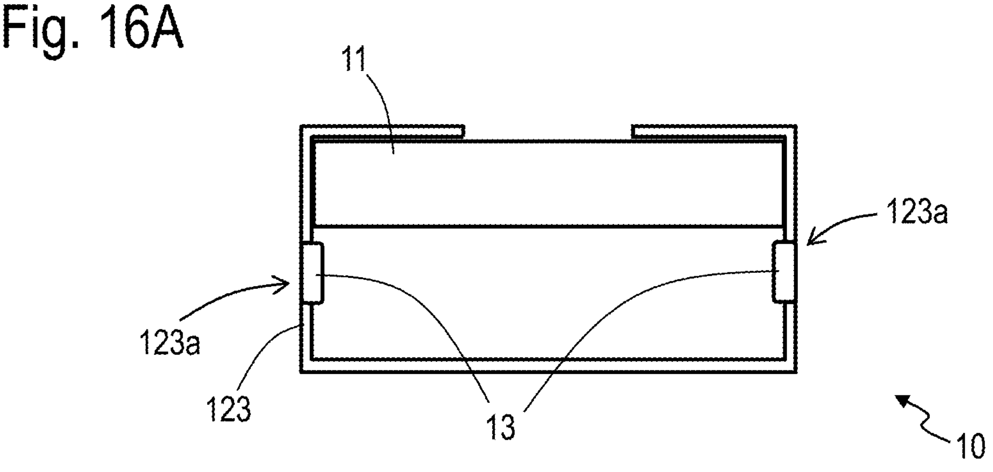
FIGS. 16A to 16C are cross-sectional views illustrating a modification of the acoustic signal output device of the first embodiment.

An acoustic absorbent 13 may be provided in at least one of the sound holes 123*a* (second sound holes). For example, as illustrated in FIG. 16A, at least one of the sound holes 123*a* may be filled with the acoustic absorbent 13. At least one of the inside and outside of the sound holes 123*a* may be covered with the acoustic absorbent 13.

Example 4-2

Figure 16B:
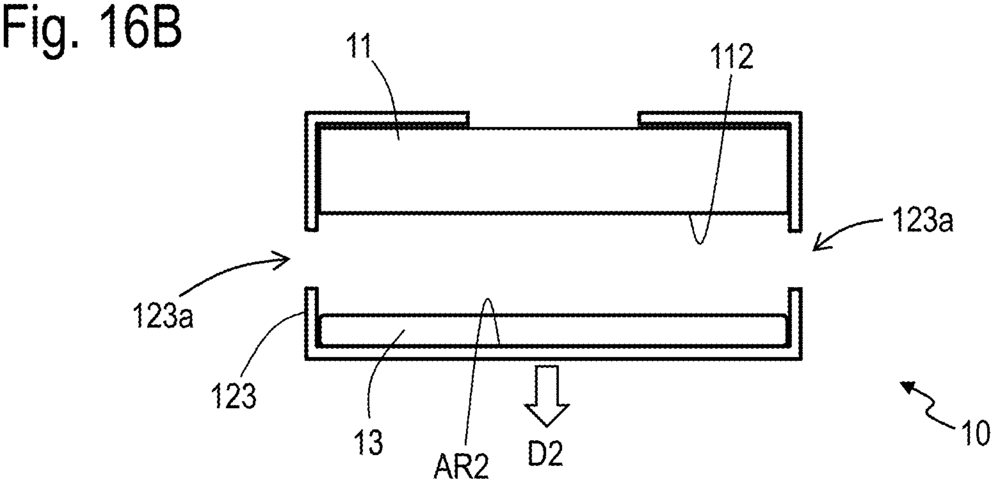

The acoustic absorbent 13 may be provided in a region on the other side 112 (D2-direction side) of the driver unit 11 inside the housing 12. For example, as illustrated in FIG. 16B, the acoustic absorbent 13 may be fixed to the region AR2 of the wall 122 located on the other side 112 (D2-direction side) of the driver unit 11. The acoustic absorbent 13 may be fixed inside the wall 123.

Example 4-3

Figure 16C:
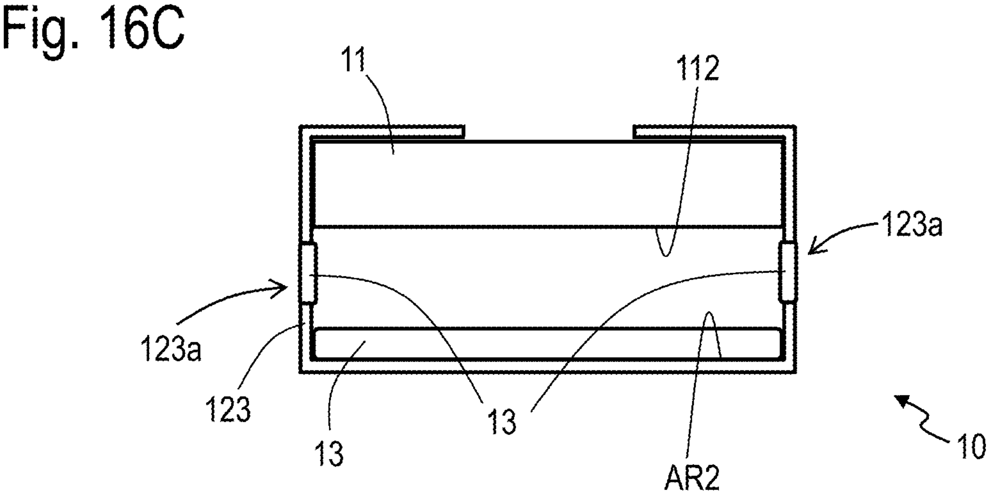

The acoustic absorbent 13 is provided in at least one of the sound holes 123*a* (second sound hole), and the acoustic absorbent 13 is provided in the region on the other side 112 (D2-direction side) of the driver unit 11 inside the housing 12. For example, as illustrated in FIG. 16C, at least one of the sound holes 123*a* may be filled with the acoustic absorbent 13, and the acoustic absorbent 13 may be further fixed to the region AR2 of the wall 122.

<Experimental Results>

Experimental results showing the sound leakage suppression effect of the acoustic signal output device 10 of this modification will be described. This experiment was conducted for a case where the acoustic signal output device 10 of the first embodiment (no acoustic absorbent) was used and a case where the acoustic signal output device 10 with the sound hole 123*a* covered with an acoustic absorbent as illustrated in this modification (with acoustic absorbent) was used. Japanese paper was used as the acoustic absorbent. In this experiment as well, as illustrated in FIG. 5B, the acoustic signal output device 10 was worn on both ears of the dummy head 1100 imitating a human head, and acoustic signals were observed at positions P1 and P2. The position P1 is a position near the left ear 1120 of the dummy head 1100 (near the acoustic signal output device 10), and the position P2 is a position 15 cm outward from the position P1.

Figure 17:
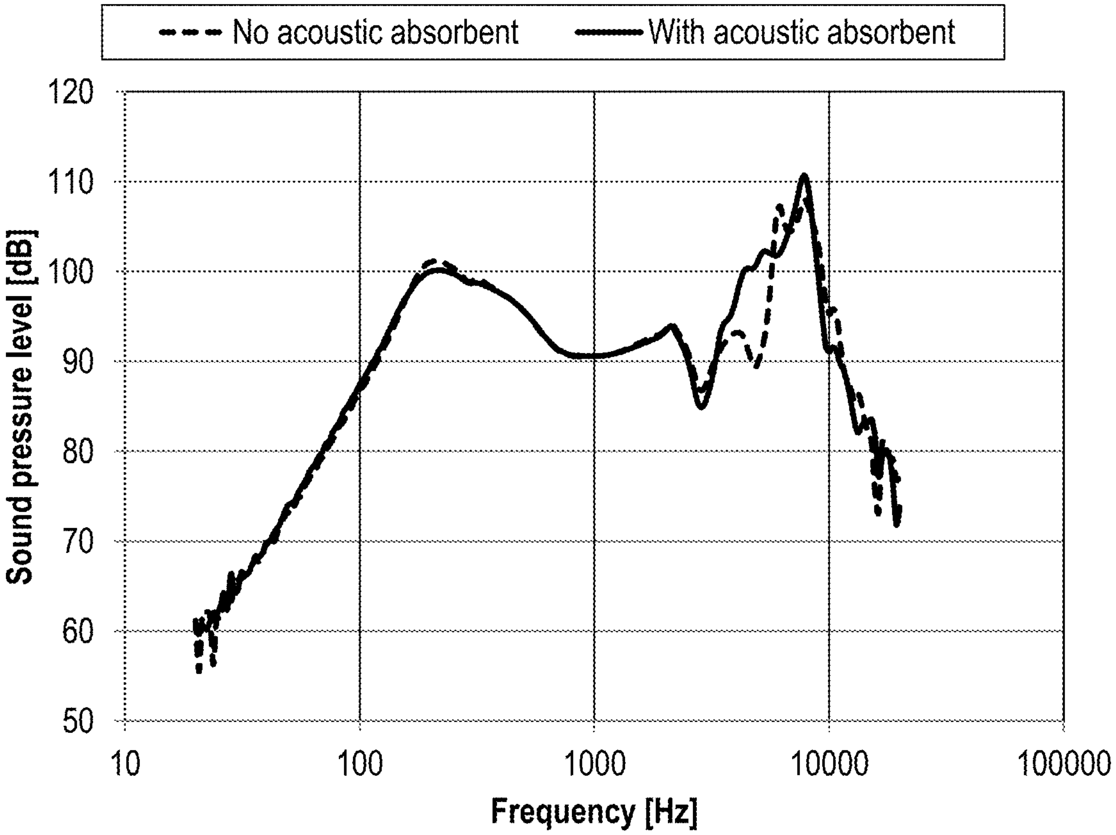
FIG. 17 is a graph comparing the frequency characteristics of the acoustic signals observed at the position P1 in FIG. 5B.
Figure 18:
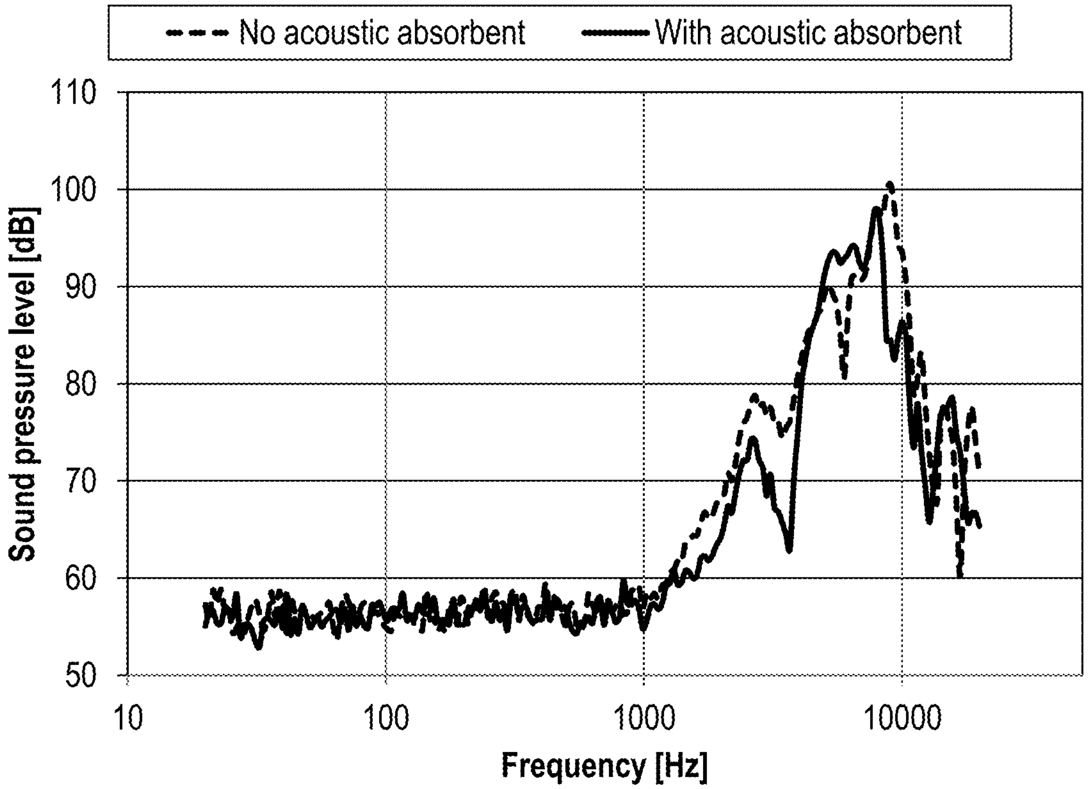
FIG. 18 is a graph illustrating the frequency characteristics of the acoustic signal observed at the position P2 in FIG. 5B.
Figure 19:
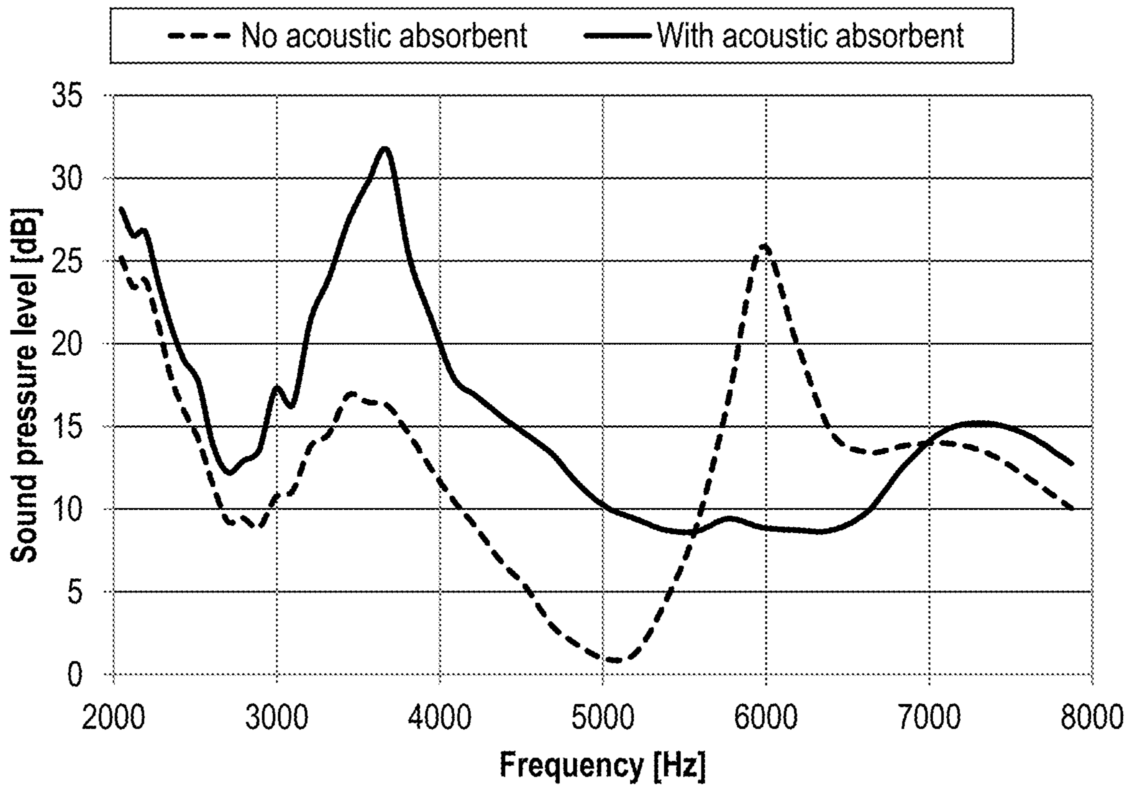
FIG. 19 is a graph illustrating the difference between the acoustic signal observed at the position P1 and the acoustic signal observed at the position P2.

FIG. 17 illustrates the frequency characteristics of the acoustic signal observed at the position P1 in FIG. 5B, FIG. 18 illustrates the frequency characteristics of the acoustic signal observed at the position P2 in FIG. 5B, and FIG. 19 illustrates the difference between the frequency characteristics of the acoustic signal observed at the position P1 and the frequency characteristic of the acoustic signal observed at the position P2. The horizontal axis represents the frequency ([Hz]), and the vertical axis represents the sound pressure level (SPL) ([dB]). The solid line graph illustrates the frequency characteristics when using the acoustic signal output device 10 with the sound hole 123*a* covered with an acoustic absorbent (with acoustic absorbent), and the broken line graph illustrates the frequency characteristics when using the acoustic signal output device 10 of the first embodiment (no acoustic absorbent). As illustrated in FIG. 19, it can be seen that, generally, in the frequency band of 2000 Hz or higher, when the acoustic signal output device 10 with the sound hole 123*a* covered with an acoustic absorbent is used, compared to the case where the acoustic signal output device 10 without the acoustic absorbent is used, the difference between the sound pressure levels of the acoustic signal observed at the position P1 and the acoustic signal observed at the position P2 is large. This indicates that, generally, in the frequency band of 2000 Hz or higher, sound leakage at the position P2 can be suppressed when using the acoustic signal output device 10 with the sound hole 123*a* covered with an acoustic absorbent.

Modification 5 of First Embodiment

Figure 20A:
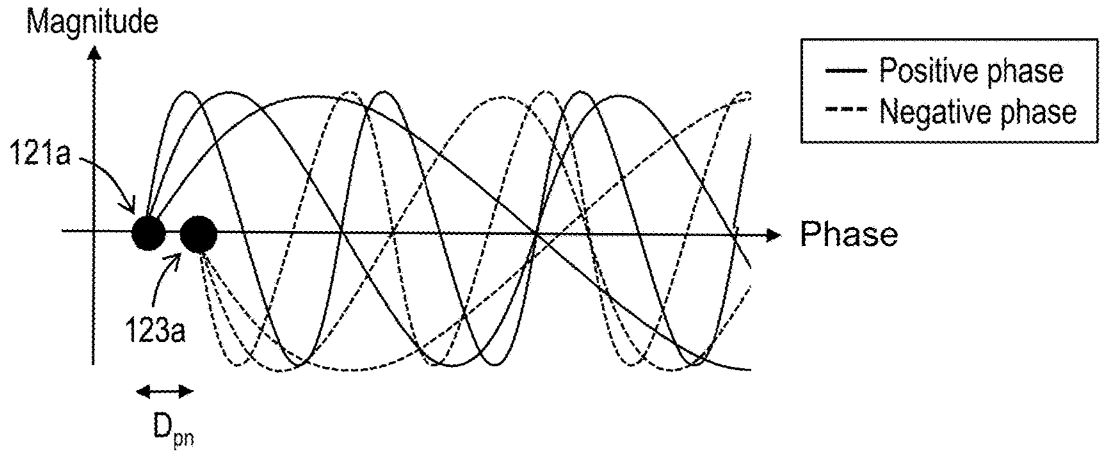
FIG. 20A is a diagram illustrating the relationship between the acoustic signal AC1 (positive phase signal) emitted from a first sound hole to the outside and the acoustic signal AC2 (negative phase signal) emitted from the second sound hole to the outside.
Figure 20B:
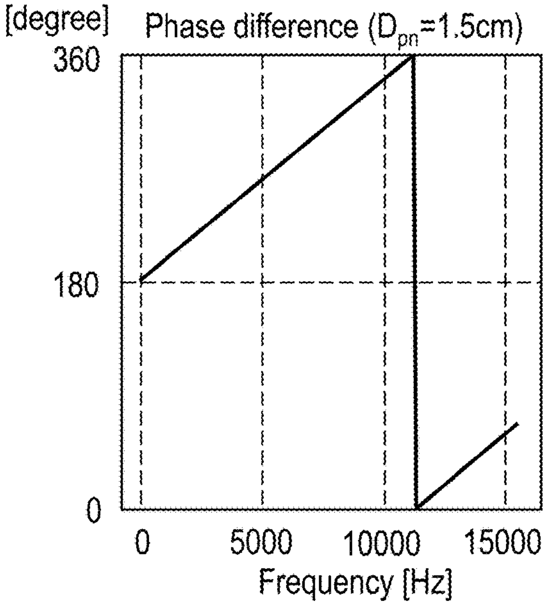
FIG. 20B is a diagram illustrating the relationship between the phase difference between the acoustic signal AC1 (positive phase signal) emitted from the first sound hole to the outside and the acoustic signal AC2 (negative phase signal) emitted from the second sound hole to the outside and the frequencies of the acoustic signals AC1 and AC2 when the distance between the first sound hole and the second sound hole is 1.5 cm.
Figure 20C:
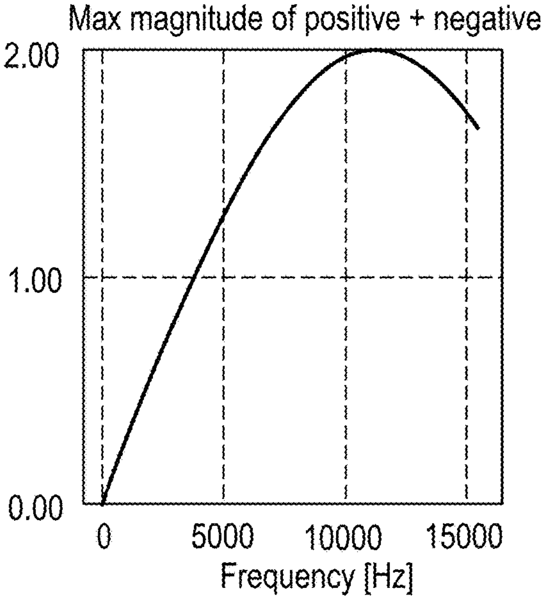
FIG. 20C is a diagram illustrating the relationship between the maximum value of the sum of the magnitudes of the acoustic signal AC1 (positive phase signal) and the acoustic signal AC2 (negative phase signal) observed at a position 15 cm outside the acoustic signal output device and the frequencies of the acoustic signals AC1 and AC2 when the distance between the first sound hole and the second sound hole is 1.5 cm.

FIG. 20A illustrates a state in which the acoustic signal AC1 which is a sine wave is emitted from the sound hole 121*a* (first sound hole), and the acoustic signal AC2 (second acoustic signal) which is a negative phase signal (phase-inverted signal) of the acoustic signal AC1 is emitted from the sound hole 123*a* (second sound hole). Here, the horizontal axis in FIG. 20A represents the phase ([degree]), and the vertical axis represents the magnitude (for example, amplitude and power) of the acoustic signals AC1 and AC2. The sound hole 121*a* and the sound hole 123*a* are separated by a distance $D_{pn}$. An example of $D_{pn}$ is 1.5 cm. As described above, a portion of the acoustic signal AC1 emitted from the sound hole 121*a* is canceled out by a portion of the acoustic signal AC2 emitted from the sound hole 123*a*, thereby suppressing the sound leakage of the acoustic signal AC1. However, the acoustic signals AC1 and AC2 have a phase difference based on the distance $D_{pn}$. FIG. 20B illustrates the relationship between the phase difference and frequency when the distance $D_{pn}$ is 1.5 cm. Here, the horizontal axis in FIG. 20B represents the frequency ([Hz]), and the vertical axis represents the phase difference ([degree]). As illustrated in FIG. 20B, this phase difference becomes further away from 180° as the frequency becomes higher. Due to the influence of this phase difference, the acoustic signal AC1 emitted from the sound hole 121*a* and the acoustic signal AC2 emitted from the sound hole 123*a* do not have completely opposite phases. In particular, among the acoustic signals AC1 and AC2, the components of the wavelength λ that satisfy $D_{pn}=(\lambda/2)+n\lambda$ are in phase with each other, so that sound leakage is contrarily emphasized. Here, n is a positive integer. That is, it is more difficult to suppress the sound leakage of the acoustic signal component having a wavelength closer to A that satisfies $D_{pn}=(\lambda/2)+n\lambda$. FIG. 20C illustrates relationship between the maximum value of the sum of the magnitudes of the acoustic signals AC1 and AC2 observed at a position 15 cm outside the acoustic signal output device and the frequencies of the acoustic signals AC1 and AC2 when the distance $D_{pn}$ is 1.5 cm. The horizontal axis in FIG. 20C represents the frequency ([Hz]), and the vertical axis represents the ratio of the maximum value of the sum of the magnitudes of the acoustic signals AC1 and AC2 to the acoustic signal AC1. In the example of FIG. 20C, it can be seen that, due to the above-mentioned effect, the ratio of the maximum value of the sum of the magnitudes of the acoustic signals AC1 and AC2 to the acoustic signal AC1 exceeds 1 from around the frequency 3000 Hz or more, and the sound leakage cannot be sufficiently suppressed. Although it is possible to change the waveform in FIG. 20C by adjusting the distance $D_{pn}$, there are limitations on the adjustable distance $D_{pn}$ due to mechanical constraints such as the arrangement and shape of the sound holes 121*a* and 123*a*, and it is not always possible to sufficiently suppress the sound leakage at a desired frequency band.

Figure 21A:
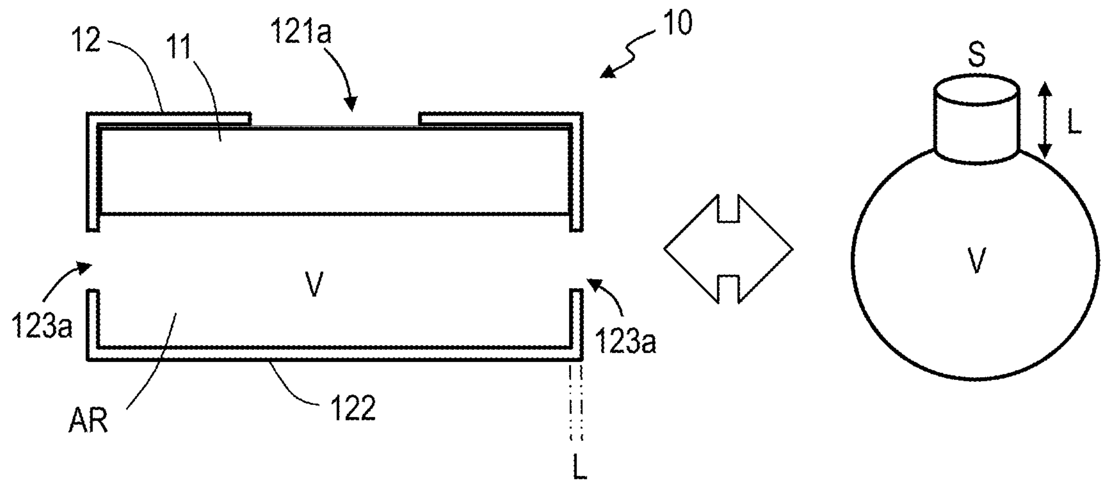
FIG. 21A is a diagram illustrating how the acoustic signal output device is modeled as an enclosure.

Therefore, we attempt to solve the problem by controlling the resonance frequency based on the Helmholtz resonance. As illustrated in FIG. 21A, the acoustic signal output device 10 can be modeled as a Helmholtz resonator (enclosure) in which the length (duct length, for example, the depth of the sound holes 121*a* and 123*a*) of the sound hole 121*a* (first sound hole) and the sound hole 123*a* (second sound hole) in the depth direction is L [mm], the total opening area of the sound holes 121*a* (first sound holes) and the sound holes 123*a* (second sound holes) is S [mm²], and the volume of the internal space (for example, the region AR) of the housing 12 is V [mm³]. The resonance frequency $f_H$ [Hz] based on the Helmholtz resonance of the housing 12 modeled in this way is as follows.

[Math. 1]

$$f_H = \frac{c}{2\pi}\sqrt{\frac{S}{V(L+F(S))}} \tag{1}$$

Figure 21B:
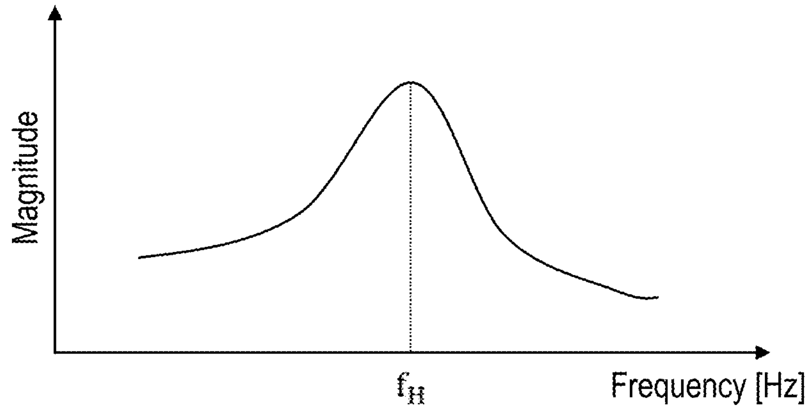
FIG. 21B is a diagram illustrating the relationship between the resonance frequency f [Hz] determined based on the Helmholtz resonance of the enclosure and the magnitude of the acoustic signal AC2 (negative phase signal) inside the enclosure.

Here, c is the sound speed, $S=S_1+\ldots+S_K$, $S_k$ (k=1, . . . , K) is the opening area of sound holes 121*a* and 123*a*, and K is the total number of sound holes 121*a* and 123*a*. F is a function, and F(S) is the function value of S by the function F. The function F depends on the shapes of the sound holes 121*a* and 123*a*. For example, when the sound holes 121*a* and 123*a* are rectangular, $F(S)=S_{1/2}$. FIG. 21B illustrates the relationship between the resonance frequency $f_H$ and the magnitude of the acoustic signal AC2 (negative phase signal) inside the housing 12. Here, the horizontal axis in FIG. 21B represents the frequency ([Hz]), and the vertical axis represents the magnitude of the acoustic signal AC2 emitted from the driver unit 11 to the internal space (region AR) of the housing 12.

Figure 21C:
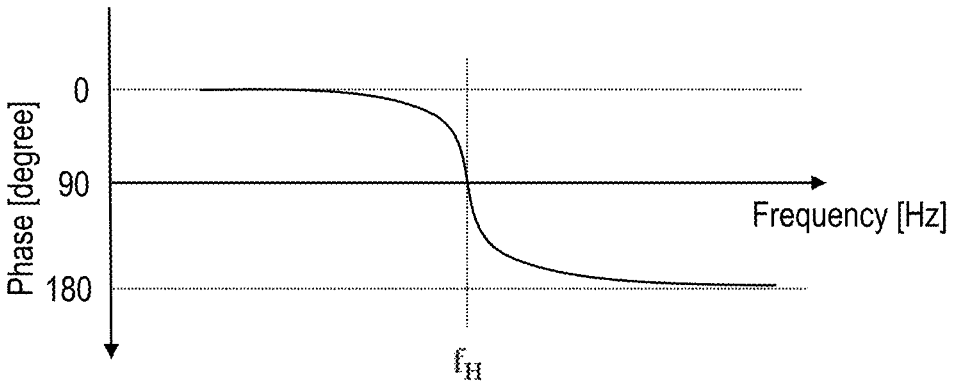
FIG. 21C is a diagram illustrating the relationship between the difference in phase of the acoustic signal AC2 (negative phase signal) emitted from the second sound hole to the outside with respect to the phase of the acoustic signal AC2 (negative phase signal) emitted from the driver unit, and the frequency of the acoustic signal AC2 (negative phase signal).

As illustrated in FIG. 21B, the magnitude of the acoustic signal AC2 emitted from the driver unit 11 to the internal space of the housing 12 reaches a maximum at the resonance frequency $f_H$. Furthermore, the phase of the acoustic signal AC2 emitted from the driver unit 11 to the internal space of the housing 12 changes significantly around the resonance frequency $f_H$. FIG. 21C illustrates the relationship between the phase and frequency of the acoustic signal AC2 emitted from the driver unit 11 to the internal space of the housing 12. Here, the horizontal axis in FIG. 21C represents the frequency ([Hz]), and the vertical axis represents the phase ([degree]) of the acoustic signal AC2 emitted from the sound hole 123*a* to the outside with respect to the phase of the acoustic signal AC2 emitted from the driver unit 11 to the internal space of the housing 12 (with respect to the acoustic signal AC2 at the time when it is emitted from the driver unit 11 to the internal space of the housing 12). As illustrated in FIG. 21C, the phase of the acoustic signal AC2 emitted from the driver unit 11 to the internal space of the housing 12 is delayed by 90° at the resonance frequency $f_H$, and as the frequency increases, the phase approaches the phase delayed by 180°. By controlling the resonance frequency $f_H$ [Hz] based on the Helmholtz resonance of the housing 12, the phase of the acoustic signal AC2 emitted to the outside from the sound hole 123*a* is adjusted, and the sound leakage at a desired frequency is suppressed.

Figure 22A:
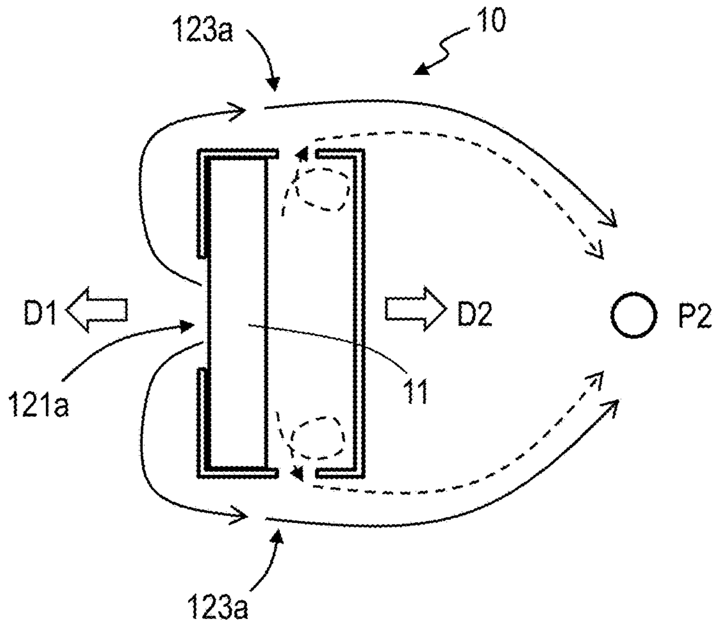
FIG. 22A is a conceptual diagram for explaining the state of acoustic signals AC1 and AC2 observed at the position P2.
Figure 22B:
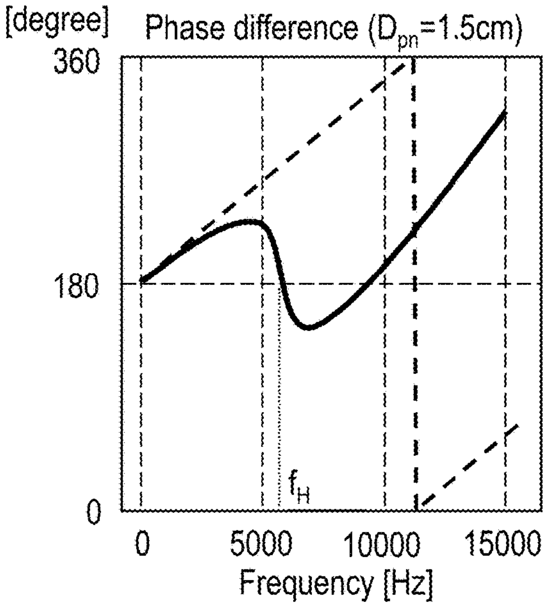
FIG. 22B is a diagram illustrating the relationship between the phase difference between the acoustic signal AC1 (positive phase signal) emitted from the first sound hole to the outside and the acoustic signal AC2 (negative phase signal) emitted from the second sound hole to the outside and the frequencies of the acoustic signals AC1 and AC2 when the distance between the first sound hole and the second sound hole is 1.5 cm and the resonance frequency $f_H$ [Hz] determined based on the Helmholtz resonance of the enclosure is appropriately adjusted.
Figure 22C:
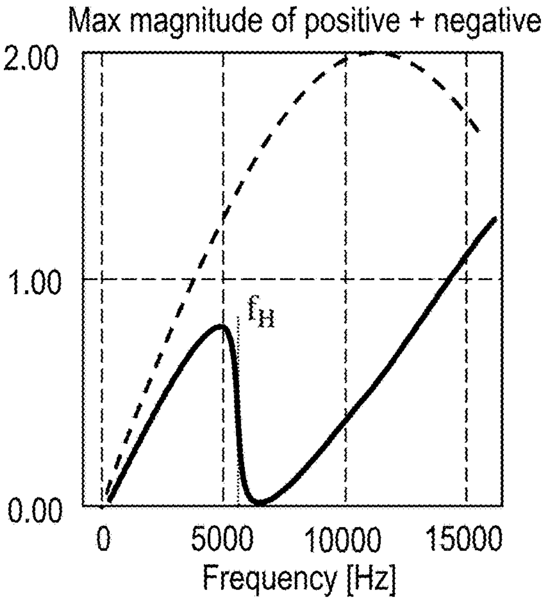
FIG. 22C is a diagram illustrating the relationship between the maximum value of the sum of the magnitudes of the acoustic signal AC1 (positive phase signal) and the acoustic signal AC2 (negative phase signal) observed at a position 15 cm outside the acoustic signal output device and the frequencies of the acoustic signals AC1 and AC2 when the distance between the first sound hole and the second sound hole is 1.5 cm and the resonance frequency $f_H$ [Hz] determined based on the Helmholtz resonance of the enclosure is appropriately adjusted.

That is, as illustrated in FIG. 22A, the acoustic signal AC1 emitted to one side (D1-direction side) of the driver unit 11 is emitted to the outside of the acoustic signal output device 10 from the sound hole 121*a*, and a portion thereof reaches the position P2 on the other side (D2-direction side) of the acoustic signal output device 10. Furthermore, the acoustic signal AC2 emitted to the other side (direction D2) of the driver unit 11 is delayed in phase as described above based on the Helmholtz resonance of the housing 12, and is emitted to the outside of the acoustic signal output device 10 from the sound hole 123*a*, and a portion thereof reaches the position P2. Here, the phase of the acoustic signal AC2 emitted to the internal space of the housing 12 from the driver unit 11 can be adjusted by adjusting the length L in the depth direction of the sound holes 121*a* and 123*a*, the total opening area S of the sound holes 121*a* and 123*a*, and the volume V of the internal space of the housing 12 based on the above-described equation (1) and appropriately adjusting the resonance frequency $f_H$ based on the Helmholtz resonance of the housing 12. As a result, the phase difference between the acoustic signals AC1 and AC2 at the position P2 can be brought close to 180° at a desired frequency, and sound leakage can be sufficiently suppressed. FIG. 22B illustrates the relationship between the phase difference and frequencies of the acoustic signals AC1 and AC2 at the position P2 when the resonance frequency $f_H$ [Hz] based on the Helmholtz resonance of the housing 12 with the distance $D_{pn}$ of 1.5 cm is adjusted. Here, the horizontal axis in FIG. 22B represents the frequency ([Hz]), and the vertical axis represents the phase difference ([degree]). Further, FIG. 22C illustrates the relationship between the maximum value of the sum of the magnitudes of the acoustic signals AC1 and AC2 observed at the position P2 and the frequencies of the acoustic signals AC1 and AC2. The horizontal axis in FIG. 22C represents the frequency ([Hz]), and the vertical axis represents the ratio of the maximum value of the sum of the magnitudes of the acoustic signals AC1 and AC2 to the acoustic signal AC1. As illustrated in FIG. 22C, it can be seen that, by adjusting the length L, the total opening area S, and the volume V so that the resonance frequency $f_H$ is approximately 6000 Hz, as illustrated in FIG. 22B, the maximum value of the sum of the magnitudes of the acoustic signals AC1 and AC2 with respect to the acoustic signal AC1 can be made less than 1 in a broad frequency band, and sound leakage can be sufficiently suppressed. Since sound leakage should be suppressed for frequencies within the audible frequency band, the length L, the total opening area S, and the volume V (the length L in the depth direction of the sound holes 121*a* and 123*a*, the total opening area S of the sound holes 121*a* and 123*a*, and the volume V of the internal space of the housing 12) are designed so that at least the resonance frequency $f_H$ belongs to a predetermined frequency band within the audible frequency band.

Figure 23A:
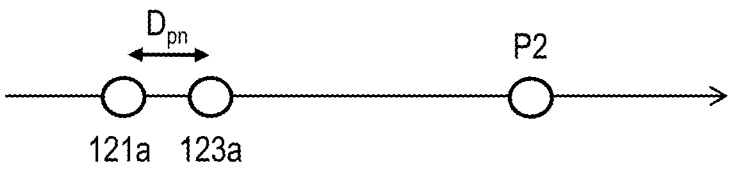
FIG. 23A is a diagram modeling the relationship between the first sound hole, the second sound hole, and position P2. In this example, the first sound hole and the second sound hole are separated from each other by a distance $D_{pn}$.

This will be described more specifically. As illustrated in FIG. 23A, an environment is assumed in which the sound holes 121*a* and 123*a* are separated by a distance $D_{pn}$, and sound leakage at the position P2 is suppressed. y is the magnitude of the observed signal at the position P2, ω is the frequencies of the acoustic signals AC1 and AC2, t is the time, A is a positive constant representing the maximum value of the magnitude of an acoustic signal, $\varphi_{init}$ is a constant representing the initial phase of the acoustic signals AC1 and AC2, and $\varphi_{Dpn}$ is the phase difference between the acoustic signals AC1 and AC2 based on the above-mentioned distance $D_{pn}$. Assuming that there is no factor other than the distance $D_{pn}$ that causes the acoustic signal AC2 to be delayed with respect to the acoustic signal AC1, the following relationship is satisfied.

$$y = A\sin(\omega t - \varphi_{init} + \varphi_{Dpn}) + A\sin(\omega t - \pi - \varphi_{init}) \quad (2)$$

$$\varphi_{Dpn} = -(D_{pn}\omega)/c \quad (3)$$

Because of this phase difference $\varphi_{Dpn}$, the acoustic signal AC2 does not have an opposite phase to the acoustic signal AC1, and depending on the phase difference $\varphi_{Dpn}$, it may not be possible to sufficiently suppress sound leakage at the position P2. Therefore, a phase difference (phase delay) $Q_c$ for canceling out the phase difference $\varphi_{Dpp}$ is introduced into the acoustic signal AC2 emitted to the outside of the acoustic signal output device 10. When such a phase difference $Q_c$ is introduced, the following relationship is satisfied.

$$y = A\sin(\omega t - \varphi_{init} + \varphi_{Dpn}) + A\sin(\omega t - \pi - \varphi_{init} + \varphi_c) \quad (4)$$

Figure 23B:
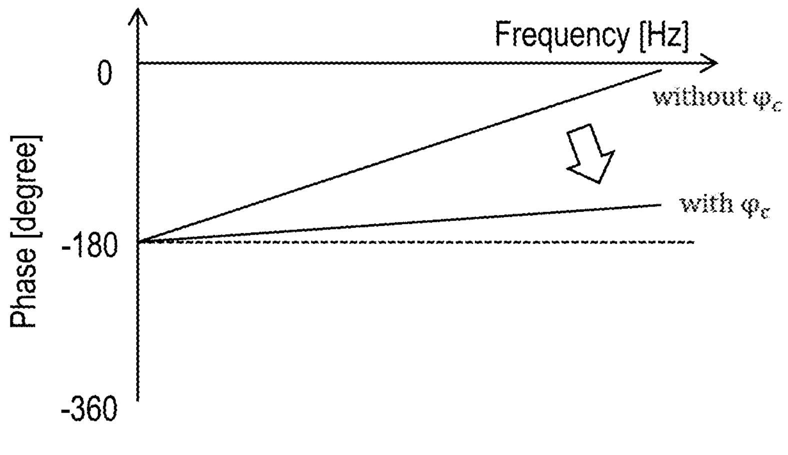
FIG. 23B is a diagram illustrating the relationship between the phase difference and frequencies of the acoustic signals AC1 and AC2 observed at the position P2 when a delay $\varphi_c$ for suppressing the phase difference between the acoustic signals AC1 and AC2 at the position P2 is applied to the acoustic signal AC2 (with $\varphi_c$) and when it is not applied (without $\varphi_c$).

By introducing a phase difference $\varphi_c$ close to the phase difference $\varphi_{Dpn}$, the magnitude of y in Equation (4) can be reduced, and sound leakage at the position P2 can be suppressed. In this modification, the resonance frequency $f_H$ based on the Helmholtz resonance of the housing 12 is adjusted by optimizing the length L, the total opening area S, and the volume V, whereby a phase difference $\varphi_c$ close to the phase difference $\varphi_{Dpn}$ is introduced into the acoustic signal AC2 emitted to the outside of the acoustic signal output device 10. By introducing such a phase difference $\varphi_c$ (with $\varphi_c$), the phase difference between the acoustic signals AC1 and AC2 at the position P2 in the frequency band in which sound leakage is to be suppressed can be brought close to 180° as compared to the case without the phase difference $\varphi_c$ (without $\varphi_c$) (FIG. 23B). As a result, the sound leakage can be sufficiently suppressed in this frequency band.

Figure 24A:
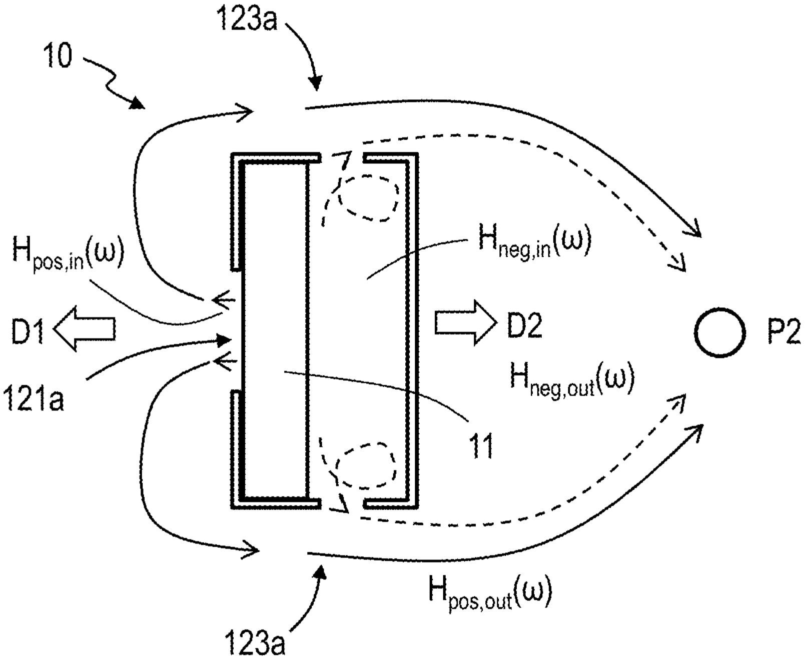
FIG. 24A is a conceptual diagram for explaining the state of acoustic signals AC1 and AC2 observed at the position P2.

This will be described using a transfer function model. As illustrated in FIG. 24A, an environment is assumed in which the sound holes 121*a* and 123*a* are separated by a distance $D_{pn}$, and sound leakage at the position P2 is suppressed. $Y_{lis}(\omega)$ is the frequency domain signal of the observed signal at the position P2, $H_{pos,in}(\omega)$ is the transfer function in the internal region from one side (D1-direction side) of the driver unit 11 to the sound hole 121*a*, $H_{pos,out}(\omega)$ is the transfer function in the external region from the sound hole 121*a* to the position P2, $H_{neg,in}(\omega)$ is the transfer function in the internal region from the other side (D2-direction side) of the driver unit 11 to the sound hole 123*a*, and $H_{neg,out}(\omega)$ is the transfer function in the external region from the sound hole 123*a* to the position P2. In addition, $S_{pos}(\omega)$ is the frequency domain signal of the acoustic signal AC1 emitted from one side (D1-direction side) of the driver unit 11, and $S_{neg}(\omega)$ is the frequency domain signal of the acoustic signal AC2 emitted from the other side (D2-direction side) of the driver unit 11. In this case, the following relationship is satisfied.

$$Y_{lis}(\omega) = H_{pos,out}(\omega)H_{pos,in}(\omega)S_{pos}(\omega) + H_{neg,out}(\omega)H_{neg,in}(\omega)S_{neg}(\omega) \quad (5)$$

Here, $S_{sou}(\omega)$ is the frequency domain signal of the acoustic signal emitted by a sound source inside the driver unit 11, $H_{pos,spk}(\omega)$ is the transfer function on one side (D1-direction side) of the sound source inside the driver unit 11, and $H_{neg,spk}(\omega)$ is the transfer function on the other side (D2-direction side) of the sound source inside the driver unit 11. Then, the following is satisfied.

$$S_{pos}(\omega)=H_{pos,spk}(\omega)S_{sou}(\omega) \tag{6}$$

$$S_{neg}(\omega)=-H_{neg,spk}(\omega)S_{sou}(\omega) \tag{7}$$

From the above-described equations (5), (6), and (7), in order for $|Y_{lis}(\omega)|=0$, the length L, the total opening area S, and the volume V may be designed so that the transfer function $H_{neg,in}(\omega)$ of the region from the other side (D2-direction side) of the driver unit 11 to the sound hole 123*a* satisfies the following.

$$H_{neg,in}(\omega)=H_{pos,out}(\omega)H_{pos,in}(\omega)H_{pos,spk}(\omega)/H_{neg,out}(\omega)H_{neg,spk}(\omega) \tag{8}$$

Here, assuming that $H_{pos,spk}(\omega)=H_{neg,spk}(\omega)$ is satisfied at the frequency $\omega$ at which sound leakage is to be suppressed, and that $H_{pos,in}(\omega)$ can be approximated to 1, Equation (8) can be modified as follows.

$$H_{neg,in}(\omega)=H_{pos,out}(\omega)/H_{neg,out}(\omega) \tag{9}$$

Figure 24B:
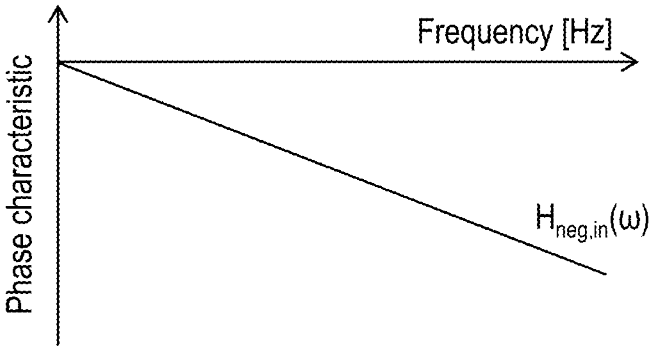
FIG. 24B is a diagram illustrating the relationship between frequency and phase characteristics.

Here, assuming that it is a free sound field and that echos of the housing 12 can be ignored, the phase characteristics of the transfer functions $H_{pos,out}(\omega)$ and $H_{neg,out}(\omega)$ can be regarded as linear. That is, the transfer functions $H_{pos,out}(\omega)$ and $H_{neg,out}(\omega)$ can be considered to depend only on the delay based on distance. In this case, as illustrated in FIG. 24B, the phase characteristic of $H_{neg,in}(\omega)$ in Equation (9) can also be regarded as linear with respect to frequency $\omega$. Therefore, ideally, in the frequency band where sound leakage at the position P2 is to be suppressed, the sound leakage in this frequency band can be sufficiently suppressed by appropriately designing the length L, the total opening area S, and the volume V so that the phase characteristic $H_{neg,in}(\omega)$ satisfies Equation (9) or approach the right side of Equation (9). For example, by designing the length L, the total opening area S, and the volume V so as to satisfy any of the following condition examples 1 to 7, the sound leakage can be sufficiently suppressed in this frequency band.

Condition Example 1

For any frequency $\omega$, $H_{neg,in}(\omega)$ matches or approximates $H_{pos,out}(\omega)/H_{neg,out}(\omega)$ (Equation (9)). However, the frequency $\omega$ belongs to a predetermined frequency band of the audible frequency band. The predetermined frequency band is, for example, a frequency band in which sound leakage at the position P2 is to be suppressed.

Condition Example 2

$$|Y_{lis}(\omega)|<|H_{pos,out}(\omega)H_{pos,in}(\omega)S_{pos}(\omega)| \tag{10a}$$

and $$|Y_{lis}(\omega)|<|H_{neg,out}(\omega)H_{neg,in}(\omega)S_{neg}(\omega)| \tag{10b}$$

Condition Example 3

$$|Y_{lis}(\omega)|<|H_{pos,out}(\omega)H_{pos,in}(\omega)S_{pos}(\omega)| \tag{10a}$$

or $$|Y_{lis}(\omega)|<|H_{neg,out}(\omega)H_{neg,in}(\omega)S_{neg}(\omega)| \tag{10b}$$

Condition Example 4

$$Y_{lis}(\omega)|<|H_{pos,out}(\omega)S_{pos}(\omega)| \tag{11a}$$

and $$|Y_{lis}(\omega)|<|H_{neg,out}(\omega)H_{neg,in}(\omega)S_{neg}(\omega)| \tag{10b}$$

Condition Example 5

$$|Y_{lis}(\omega)|<|H_{pos,out}(\omega)S_{pos}(\omega)| \tag{11a}$$

or $$|Y_{lis}(\omega)|<|H_{neg,out}(\omega)H_{neg,in}(\omega)S_{neg}(\omega)| \tag{10b}$$

Condition Example 6

The following design condition 1 and/or design condition 2 is satisfied.

Design Condition 1:

The sound pressure level of the acoustic signal AC1 (first acoustic signal) at the position P2 (second point) when the acoustic signal AC1 (first acoustic signal) is emitted from the sound hole 121*a* (first sound hole) and the acoustic signal AC2 (second acoustic signal) is emitted from the sound hole 123*a* (second sound hole) is lower than the sound pressure level of the acoustic signal AC1 (first acoustic signal) at the position P2 (second point) when the acoustic signal AC1 (first acoustic signal) is emitted from the sound hole 121*a* (first sound hole) and the acoustic signal AC2 (second acoustic signal) is not emitted from the sound hole 123*a* (second sound hole) (for example, Equations (10a) and (11a)). Design Condition 2:

The sound pressure level of the acoustic signal AC1 (first acoustic signal) at the position P2 (second point) when the acoustic signal AC1 (first acoustic signal) is emitted from the sound hole 121*a* (first sound hole) and the acoustic signal AC2 (second acoustic signal) is emitted from the sound hole 123*a* (second sound hole) is lower than the sound pressure level of the acoustic signal AC1 (first acoustic signal) at the position P2 (second point) when the acoustic signal AC1 (first acoustic signal) is not emitted from the sound hole 121*a* (first sound hole) and the acoustic signal AC2 (second acoustic signal) is emitted from the sound hole 123*a* (second sound hole) (for example, Equation (10b)).

Condition Example 7

The resonance frequency based on the Helmholtz resonance of the housing 12 belongs to a frequency band of 3000 Hz or higher and 8000 Hz or lower.

A configuration of the acoustic signal output device 10 in which at least one of the length L in the depth direction of the sound holes 121*a* and 123*a*, the total opening area S of the sound holes 121*a* and 123*a*, and the volume V of the internal space of the housing 12 is adjusted will be described below. However, these are examples and the present invention is not limited thereto.

Design Example 1

Figure 25A:
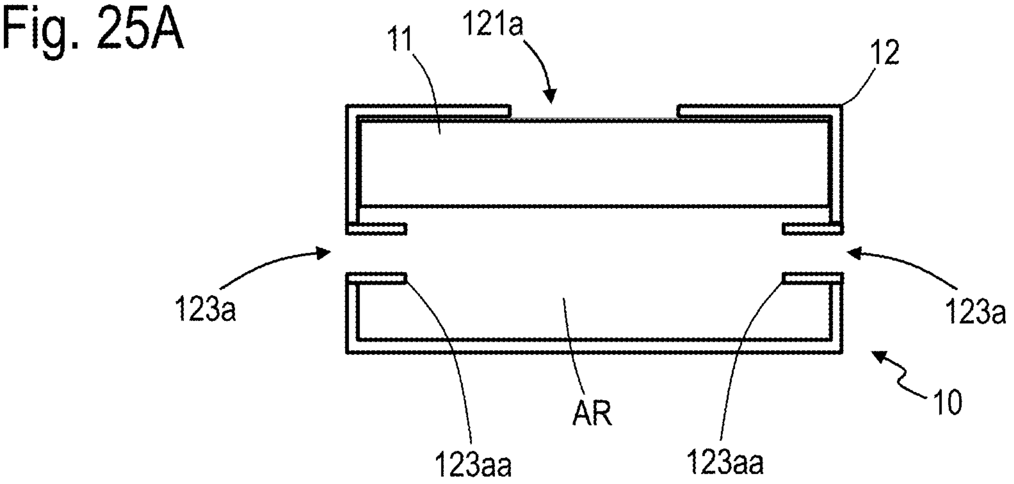
FIGS. 25A to 25C are modifications of the cross-sectional view taken along the line 2A-2A in FIG. 2A for explaining modifications of the acoustic signal output device.

FIG. 25A illustrates a design example in which a cylindrical duct 123*aa* for adjusting the length L is further provided in the sound hole 123*a* provided in the housing 12 of the acoustic signal output device 10. The duct 123*aa* in FIG. 25A extends inward from the sound hole 123*a*, thereby adjusting the length L of the sound hole 123*a* in the depth direction.

Design Example 2

Figure 25B:
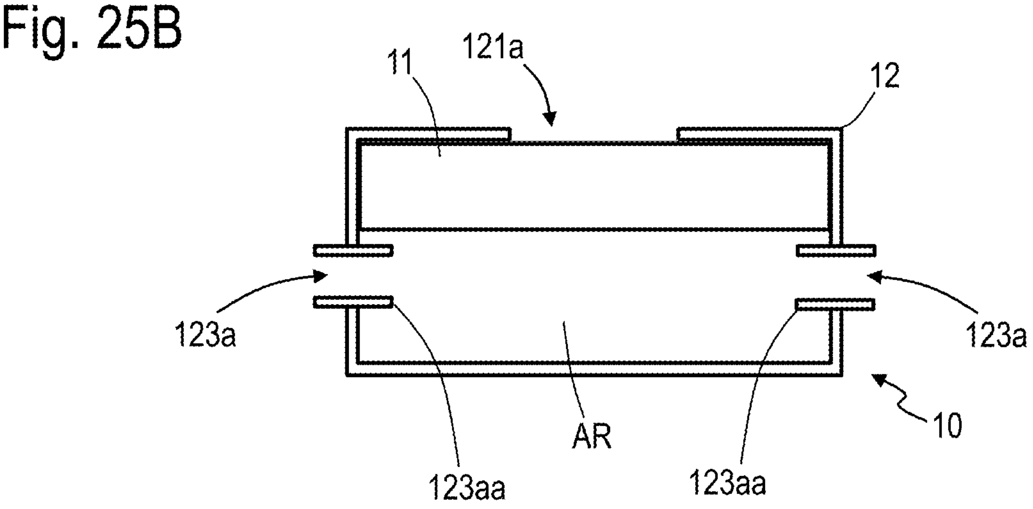

FIG. 25B illustrates another design example in which a cylindrical duct 123*aa* for adjusting the length L is further provided in the sound hole 123*a* provided in the housing 12 of the acoustic signal output device 10. The difference from the example in FIG. 25A is that the duct 123*aa* extends from the sound hole 123*a* toward the inside and outside of the housing 12. Even in this case, the length L in the depth direction of the sound hole 123*a* can be adjusted.

Design Example 3

Figure 25C:
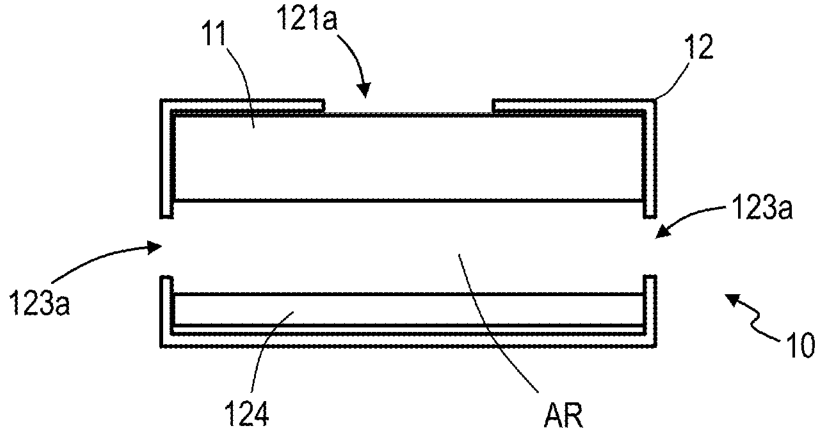

FIG. 25C illustrates a design example in which an additional member 124 is provided in the region AR inside the housing 12 of the acoustic signal output device 10. By adjusting the volume of the additional member 124, the volume V of the internal space (region AR) of the housing 12 can be adjusted.

Design Example 4

Figure 26A:
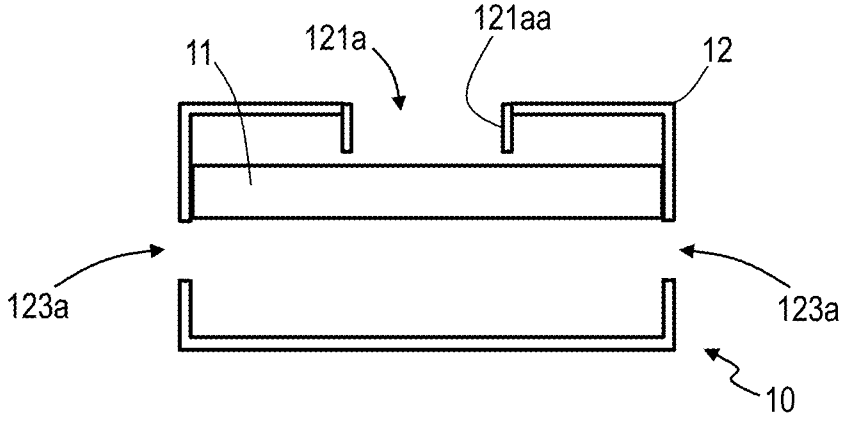
FIGS. 26A to 26C are modifications of the cross-sectional view taken along the line 2A-2A in FIG. 2A for explaining modifications of the acoustic signal output device.

FIG. 26A illustrates a design example in which a cylindrical duct 121*aa* for adjusting the length L is provided in the sound hole 121*a* provided in the housing 12 of the acoustic signal output device 10. The duct 121*aa* in FIG. 26A extends inward from the sound hole 121*a*, thereby adjusting the length L of the sound hole 121*a* in the depth direction.

Design Example 5

Figure 26B:
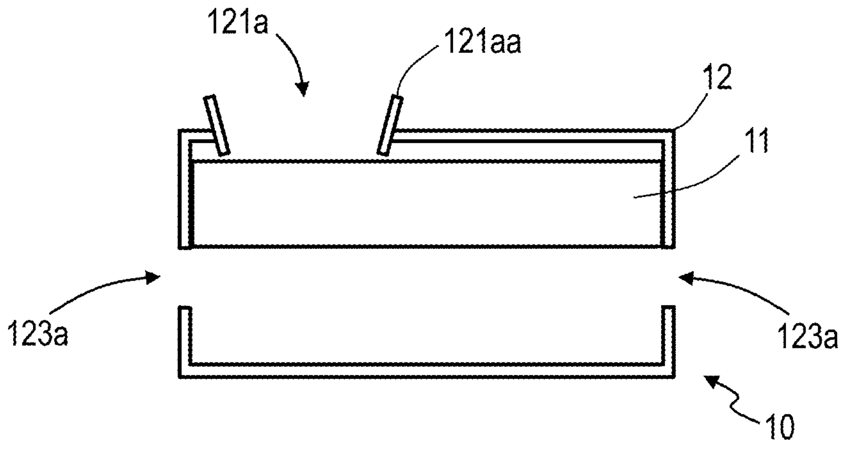

In the design example illustrated in FIG. 26B, a cylindrical duct 121*aa* for adjusting the length L is provided in the sound hole 121*a* provided in the housing 12 of the acoustic signal output device 10. The difference from the example in FIG. 26A is that the sound hole 121*a* is provided at a position offset from the center of the acoustic signal output device 10, the inner diameter of the duct 121*aa* tapers from the inside of the housing 12 toward the outside, and the duct 121*aa* extends from the sound hole 121*a* toward the inside and outside of the housing 12. Even in this case, the length L in the depth direction of the sound hole 121*a* can be adjusted.

Design Example 6

Figure 26C:
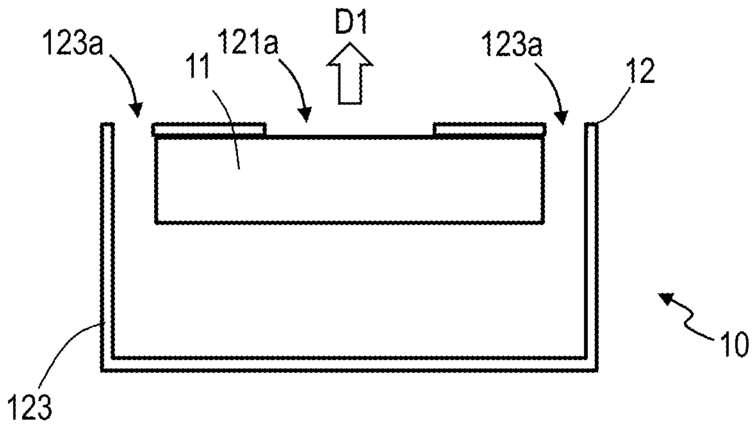

FIG. 26C illustrates a design example in which not only the sound hole 121*a* but also the sound hole 123*a* is provided on the D1-direction side of the driver unit 11 of the acoustic signal output device 10. In this way, the arrangement of the sound holes 123*a* is changed, the distance between the sound holes 121*a* and the sound holes 123*a* is adjusted, and the volume V of the internal space of the housing 12 is also adjusted.

Design Example 7

Figure 27A:
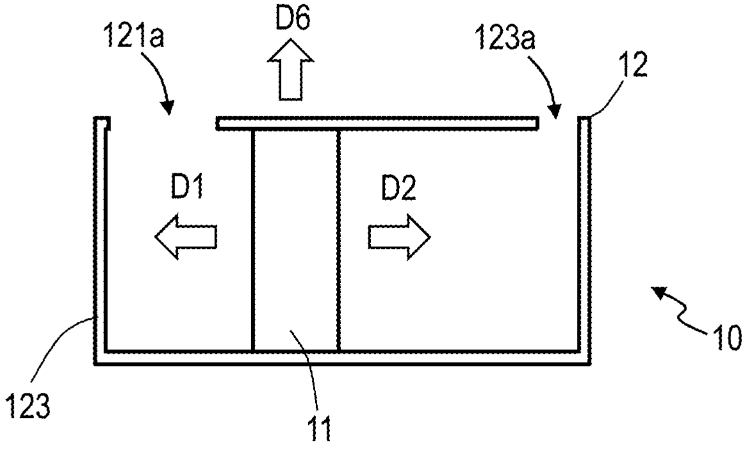
FIGS. 27A to 27C are modifications of the cross-sectional view taken along the line 2A-2A in FIG. 2A for explaining modifications of the acoustic signal output device.

FIG. 27A illustrates a design example in which the sound hole 121*a* is provided not on the D1-direction side of the driver unit 11 (the emission direction side of the acoustic signal AC1), but on the D6-direction side that is perpendicular to the D1 direction, and the sound hole 123*a* is also provided on the same D6-direction side. In this way, the distance between the sound holes 121*a* and 123*a* is adjusted, and the volume V of the internal space of the housing 12 is also adjusted.

Design Example 8

Figure 27B:
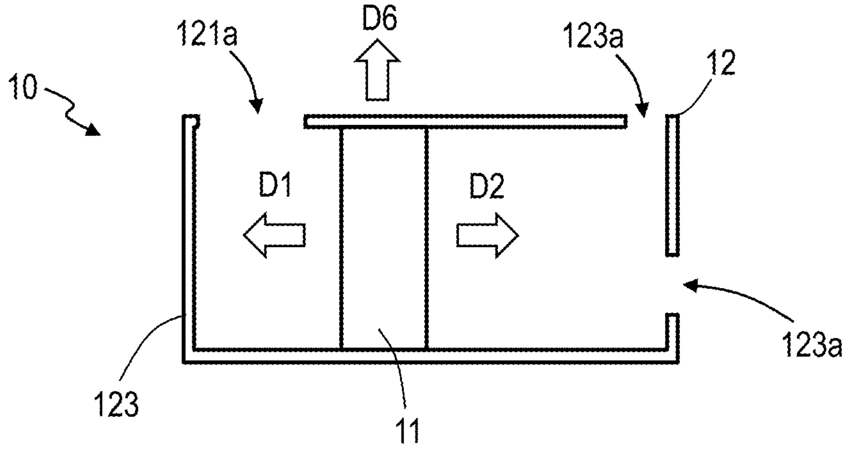

FIG. 27B is a design example in which the sound hole 123*a* is further provided on the D2-direction side in addition to the configuration illustrated in FIG. 27A. In this way, the distance between the sound holes 121*a* and 123*a* can be further adjusted.

Design Example 9

Figure 27C:
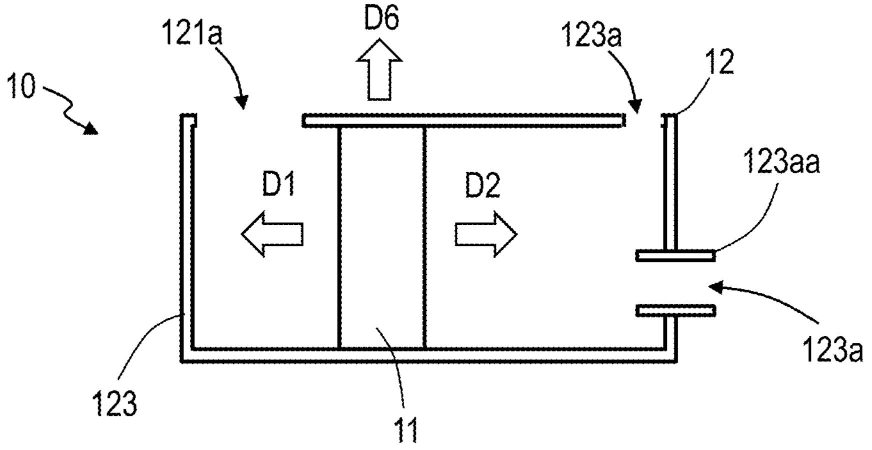

FIG. 27C is a design example in which a cylindrical duct 121*aa* is further provided in the sound hole 123*a* provided on the D2-direction side in addition to the configuration illustrated in FIG. 27B. In this way, the length L in the depth direction of the sound hole 123*a* provided on the D2-direction side can be further adjusted.

Design Example 10

Figure 28A:
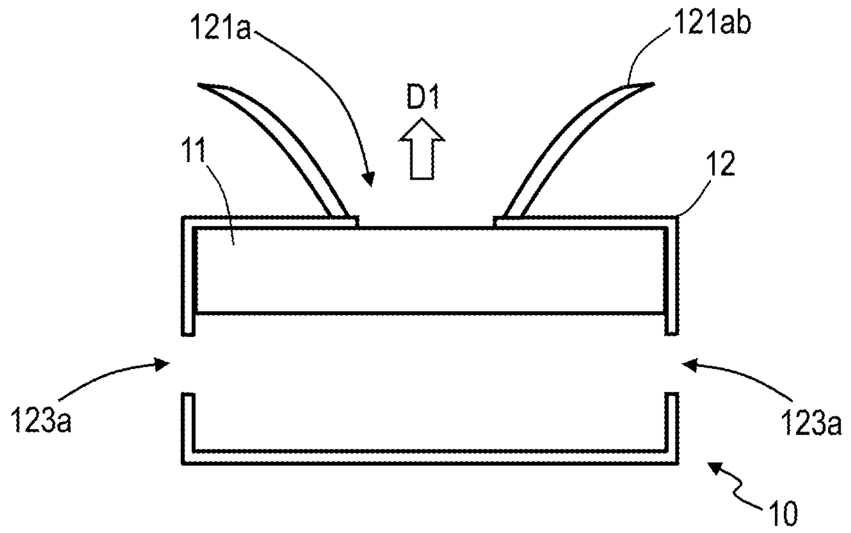
FIGS. 28A and 28B are modifications of the cross-sectional view taken along the line 2A-2A in FIG. 2A for explaining modifications of the acoustic signal output device.
Figure 28B:
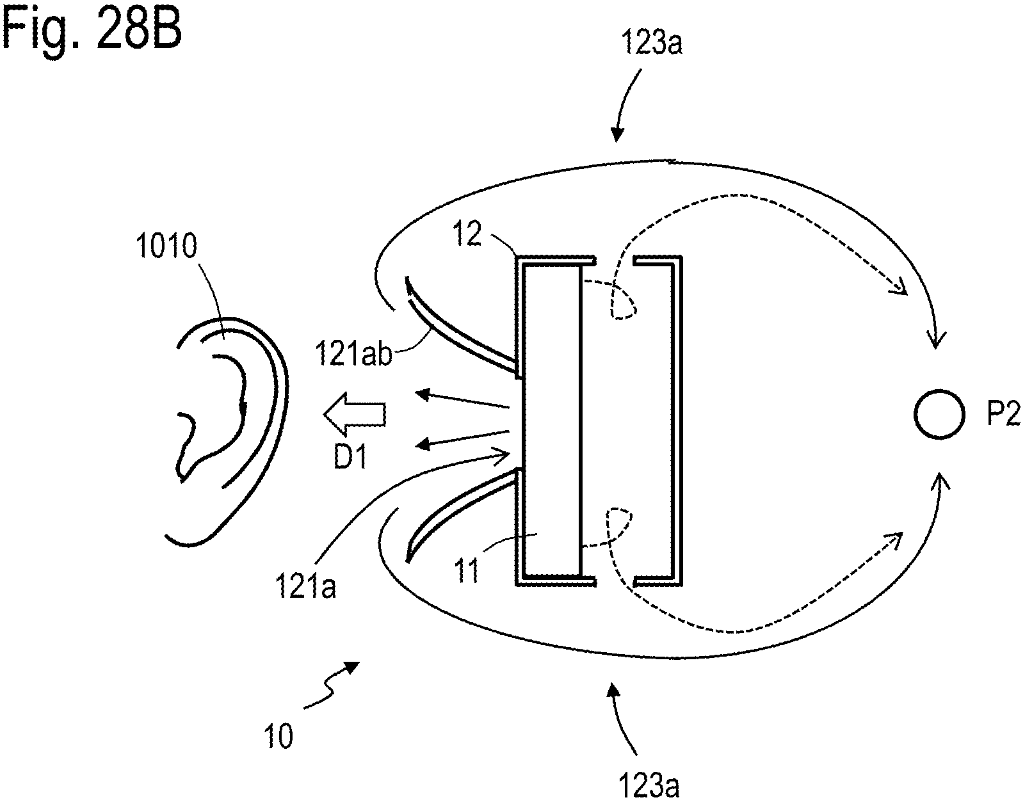

FIG. 28A illustrates a design example in which a cylindrical horn 121*ab* that enhances the directivity of the acoustic signal AC1 emitted from the sound hole 121*a* in the D1 direction is provided in the opening of the sound hole 121*a* of the housing 12. The inner diameter of the horn 121*ab* tapers from the inside of the housing 12 toward the outside. As illustrated in FIG. 28B, for example, the outer side (D1-direction side) of the horn 121*ab* is disposed toward the right ear 1010 of the user 1000. This horn 121*ab* can suppress the acoustic signal AC1 from going around to the position P2, and also adjust the phase difference between the acoustic signal AC1 emitted from the sound hole 121*a* and the acoustic signal AC2 emitted from the sound hole 123*a*. Furthermore, the length L of the sound hole 121*a* in the depth direction is also adjusted by the horn 121*ab*.

Design Example 11

Figure 29A:
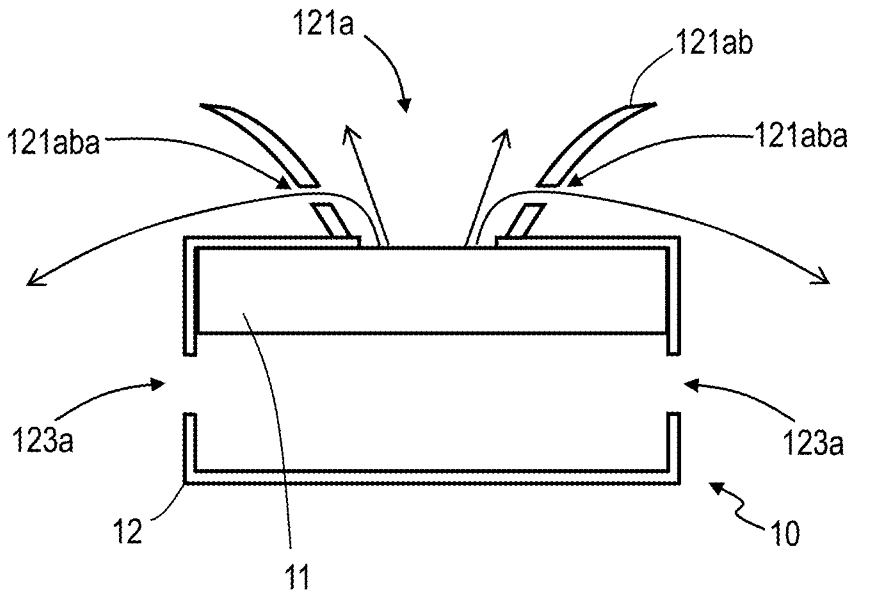
FIGS. 29A and 29B are modifications of the cross-sectional view taken along the line 2A-2A in FIG. 2A for explaining modifications of the acoustic signal output device.

FIG. 29A is a modification of the structure illustrated in FIG. 28A, and is a design example in which a sound hole 121*aba* is provided on the side surface of the horn 121*ab*. The higher the frequency component, the higher the straightness. Therefore, the higher frequency component of the acoustic signal AC1 is less likely to be emitted from the sound hole 121*aba* on the side surface of the horn 121*ab*, and the lower frequency component is also more likely to be emitted from the sound hole 121*aba*. In this way, the phase difference between the acoustic signals AC1 and AC2 at the position P2 can be adjusted according to the frequency.

Design Example 12

Figure 29B:
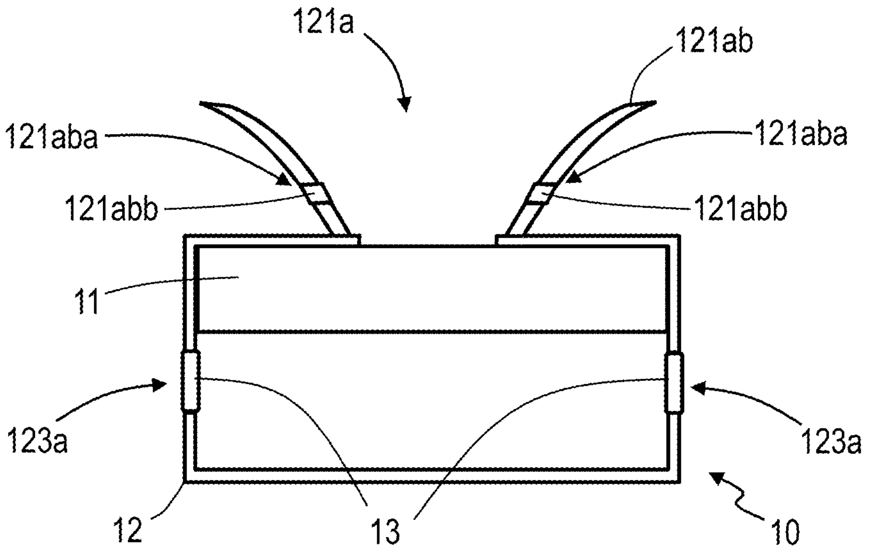

FIG. 29B is a modification of FIG. 29A, and is a design example in which the sound hole 121*aba* provided on the side surface of the horn 121*ab* and the sound hole 123*a* provided in the housing 12 are provided with an acoustic absorbent 13 that absorbs high-frequency acoustic signals. In this way, the ratio of the magnitudes of the acoustic signals AC1 and AC2 at the position P2 can be adjusted according to the frequency.

Design Example 13

Figure 30A:
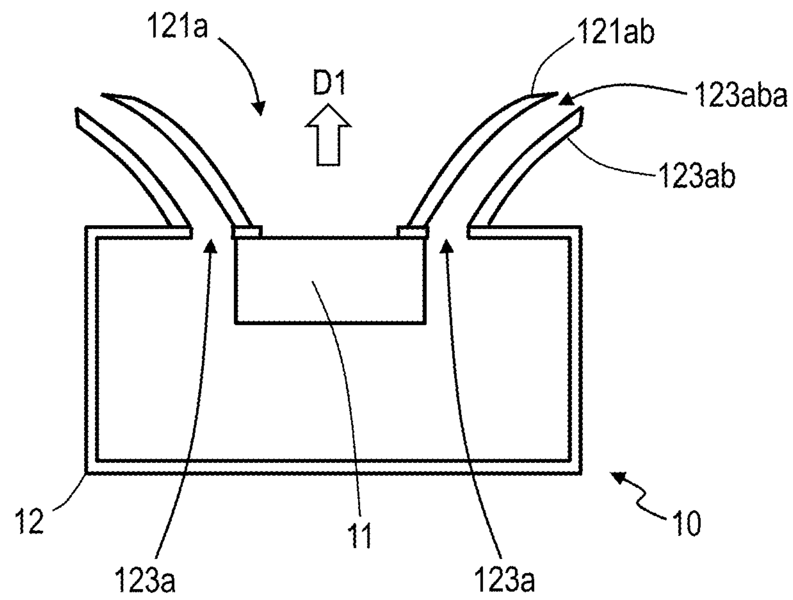
FIGS. 30A and 30B are modifications of the cross-sectional view taken along the line 2A-2A in FIG. 2A for explaining modifications of the acoustic signal output device.

FIG. 30A is also a modification of FIG. 28A, in which not only the sound hole 121*a* but also the sound hole 123*a* is provided on the D1-direction side of the driver unit 11 of the acoustic signal output device 10, a horn 121*ab* is provided outside the sound hole 121*a* of the housing 12, and a cylindrical horn 123*ab* surrounding the outside of the horn 121*ab* is also provided. The inner diameter of the horn 123*ab* tapers from the inside to the outside of the housing 12, and the horn 121*ab* is disposed inside the horn 123*ab*. The opening of the sound hole 123*a* is disposed in the region between the horn 123*ab* and the horn 121*ab* (the region outside the horn 123*ab* and inside the horn 121*ab*). The acoustic signal AC2 emitted to the outside from the sound hole 123*a* is emitted to the outside through a gap 123*aba* between the horn 123*ab* and the horn 121*ab*. Due to these horns 123*ab* and 121*ab*, it is possible to suppress the acoustic signals AC1 and AC2 from going around to the position P2, and also adjust the phase difference between the acoustic signal AC1 emitted from the sound hole 121*a* and the acoustic signal AC2 emitted from the sound hole 123*a*. Furthermore, the length L in the depth direction of the sound holes 121*a* and 123*a* is also adjusted by the horns 121*ab* and 123*ab*.

Design Example 14

Figure 30B:
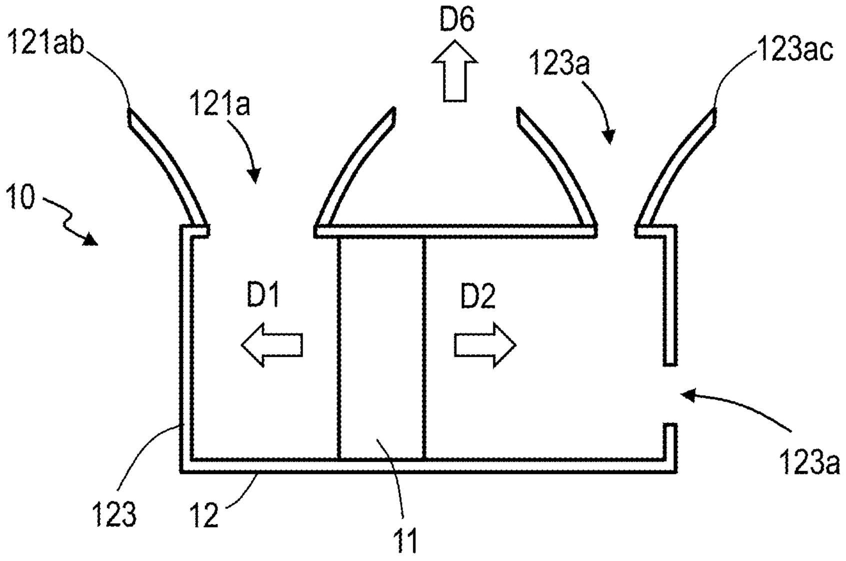

FIG. 30B is a modification of FIG. 27A, in which the sound hole 121*a* is provided not on the D1-direction side of the driver unit 11 (the emission direction side of the acoustic signal AC1) but on the D6-direction side that is perpendicular to the D1 direction, and the sound hole 123*a* is also provided in the same D6-direction side. Furthermore, in the design example illustrated in FIG. 30B, a cylindrical horn 121*ab* that enhances the directivity of the acoustic signal AC1 emitted from the sound hole 121*a* in the D6 direction is provided at the opening of the sound hole 121*a* of the housing 12, and a cylindrical horn 123*ac* that enhances the directivity of the acoustic signal AC2 emitted from the sound hole 123*a* in the D6 direction is provided at the opening of the sound hole 123*a* of the housing 12. Due to these horns 121*ab* and 123*ac*, it is possible to suppress the acoustic signals AC1 and AC2 from going around to the above-mentioned position P2, and adjust the phase difference between the acoustic signal AC1 emitted from the sound hole 121*a* and the acoustic signal AC2 emitted from the sound hole 123*a*. Further, the length L in the depth direction of the sound holes 121*a* and 123*a* is also adjusted by the horns 121*ab* and 123*ac*.

Experimental Results

Experimental results showing the sound leakage suppression effect of the acoustic signal output device 10 of this modification will be described. In this experiment, as illustrated in FIG. 5B, the acoustic signal output device 10 was worn on both ears of the dummy head 1100 imitating a human head, and acoustic signals were observed at positions P1 and P2. In this example, the position P1 is a position near the left ear 1120 of the dummy head 1100 (near the acoustic signal output device 10), and the position P2 is a position 15 cm outward from the position P1.

Figure 31A:
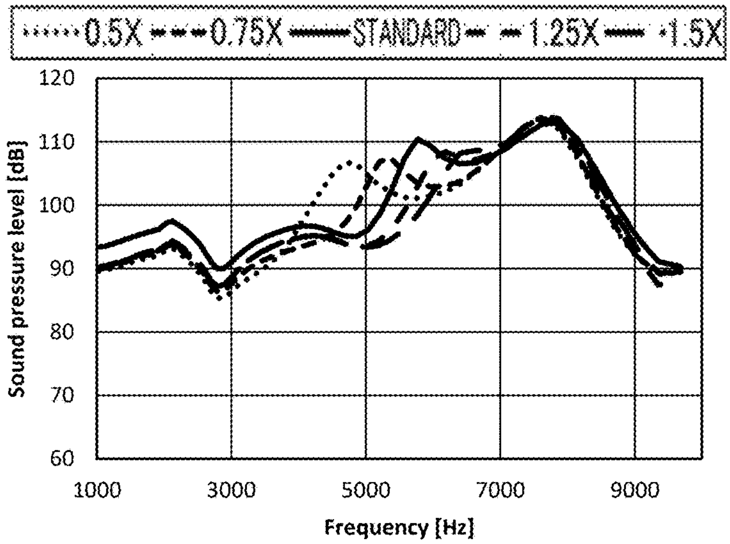
FIG. 31A is a graph comparing the frequency characteristics of the acoustic signals observed at the position P1 in FIG. 5B for acoustic signal output devices having different total opening areas of sound holes.
Figure 31B:
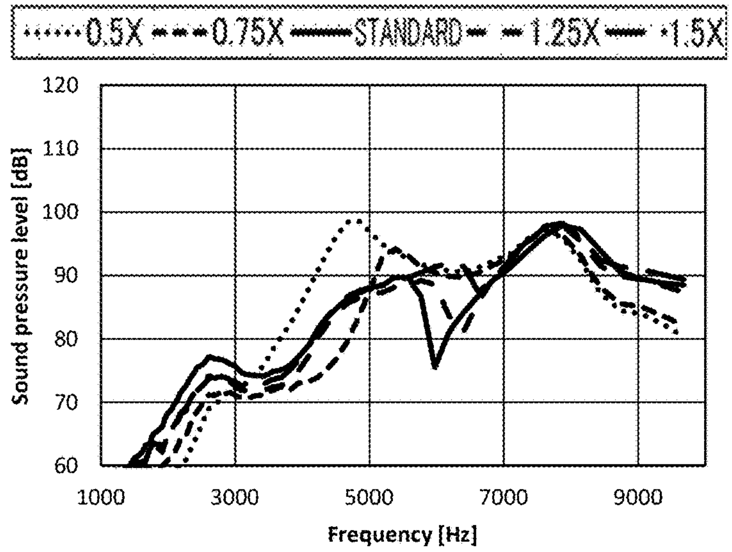
FIG. 31B is a graph illustrating the frequency characteristics of the acoustic signals observed at the position P2 in FIG. 5B for acoustic signal output devices having different total opening areas of sound holes.
Figure 31C:
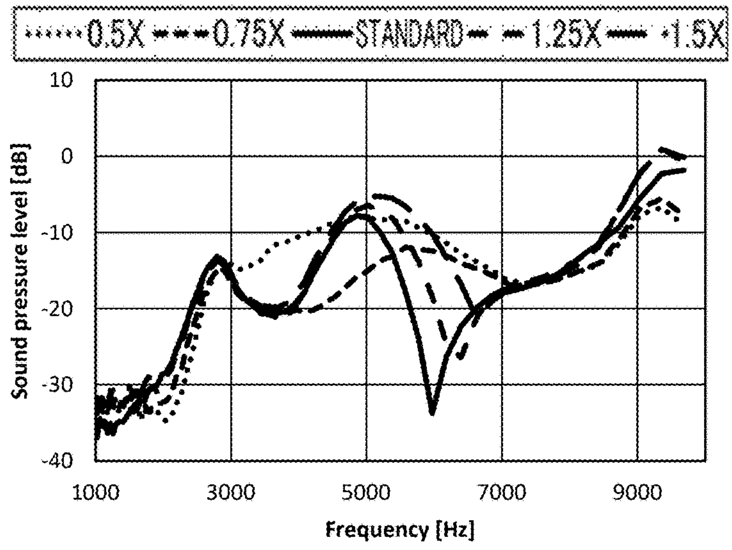
FIG. 31C is a graph illustrating the difference between the acoustic signal observed at the position P1 and the acoustic signal observed at the position P2 for acoustic signal output devices having different total opening areas of sound holes.

First, frequency characteristics due to differences in the total opening area S of the sound holes 121*a* and 123*a* will be described. FIG. 31A illustrates the frequency characteristics of the acoustic signal observed at the position P1 in FIG. 5B, FIG. 31B illustrates the frequency characteristics of the acoustic signal observed at the position P2 in FIG. 5B, and FIG. 31C illustrates the difference (difference in sound pressure level of each frequency) between the frequency characteristics of the acoustic signal observed at the position P1 and the frequency characteristics of the acoustic signal observed at the position P2. The horizontal axis represents the frequency ([Hz]), and the vertical axis represents the sound pressure level (SPL) ([dB]). Here, the opening area of the sound hole 121*a* was fixed, and the acoustic signal output device 10 with five different opening areas of the sound holes 123*a* was evaluated. Each of the acoustic signal output devices 10 includes one sound hole 121*a* and four sound holes 123*a*. Note that "standard" refers to the acoustic signal output device 10 in which the total opening area of the four sound holes 123*a* is 56 $mm^2$, and "0.5×", "0.75×", "1.25×", and "1.5×" refer to the acoustic signal output devices 10 in which the total opening areas of the four sound holes 123*a* are 0.5×, 0.75×, 1.25×, and 1.5× of 56 $mm^2$, respectively. The resonance frequencies $f_H$ [Hz] of the housings 12 of the acoustic signal output devices 10 of "0.5×", "0.75×", "standard", "1.25×", and "1.5×" calculated according to Equation (1) with $F(S)=S_{1/2}$ are as follows.

TABLE 1

| Conditions | Resonance frequency $f_H$ [Hz] |
|---|---|
| 0.5x | 4260 |
| 0.75x | 4829 |
| Standard | 5266 |
| 1.25x | 5626 |
| 1.5x | 5934 |

As illustrated in FIGS. 31A and 31B, the frequency characteristics of the acoustic signal observed at the position P1 and the acoustic signal observed at the position P2 differ depending on the difference in the total opening area S. As a result, as illustrated in FIG. 31C, depending on the difference in the total opening area S, the frequency characteristics of the difference between the sound pressure levels of the acoustic signal observed at the position P1 and the acoustic signal observed at the position P2 also differ, and the sound leakage suppression performance at the position P2 also differs. For example, in the "standard", "1.25×", and "1.5×" acoustic signal output devices 10, the sound leakage is minimal at frequencies slightly higher than the respective resonance frequencies $f_H$, which is consistent with the relationship illustrated in FIG. 22C.

Figure 32A:
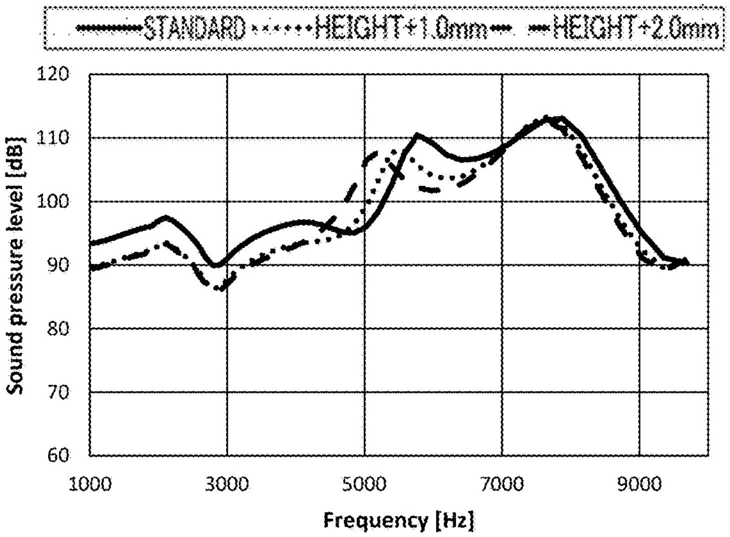
FIG. 32A is a graph comparing the frequency characteristics of the acoustic signals observed at the position P1 in FIG. 5B for acoustic signal output devices with different internal space volumes of the housings.
Figure 32B:
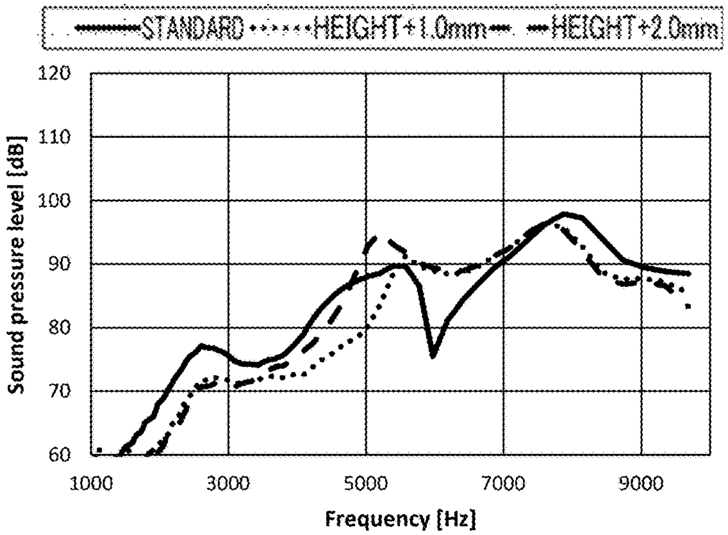
FIG. 32B is a graph illustrating the frequency characteristics of the acoustic signals observed at the position P2 in FIG. 5B for acoustic signal output devices with different internal space volumes of the housings.
Figure 32C:
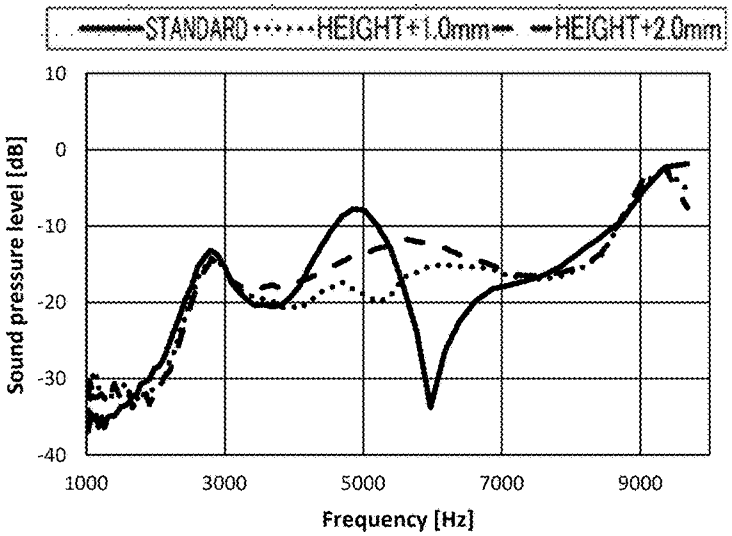
FIG. 32C is a graph illustrating the difference between the acoustic signal observed at the position P1 and the acoustic signal observed at the position P2 for acoustic signal output devices with different internal space volumes of the housings.

Next, frequency characteristics due to differences in the volume V of the region AR (internal space) of the housing 12 will be described. FIG. 32A illustrates the frequency characteristics of the acoustic signal observed at the position P1 in FIG. 5B, FIG. 32B illustrates the frequency characteristics of the acoustic signal observed at the position P2 in FIG. 5B, and FIG. 32C illustrates the difference (difference in sound pressure level of each frequency) between the frequency characteristics of the acoustic signal observed at the position P1 and the frequency characteristics of the acoustic signal observed at the position P2. The horizontal axis represents the frequency ([Hz]), and the vertical axis represents the sound pressure level (SPL) ([dB]). Here, three types of acoustic signal output devices 10 having different volumes V due to different heights of the additional members 124 illustrated in FIG. 25C were evaluated. Note that "standard" refers to the acoustic signal output device 10 in which the height of the additional member 124 is the standard value, and "height+1.0 mm" and "height+2.0 mm"

respectively refer to the acoustic signal output devices 10 in which the heights of the additional members 124 are 1.0 mm and 2.0 mm higher than the "standard". The resonance frequencies $f_H$ [Hz] of the housings 12 of the acoustic signal output devices 10 of "standard", "height+1.0 mm", and "height+2.0 mm" calculated according to Equation (1) with $F(S)=S_{1/2}$ are as follows.

TABLE 2

| Conditions | Resonance frequency $f_H$ [Hz] |
|---|---|
| Standard | 5266 |
| Height + 1.0 mm | 4563 |
| Height + 2.0 mm | 4083 |

As illustrated in FIGS. 32A and 32B, the frequency characteristics of the acoustic signal observed at the position P1 and the acoustic signal observed at the position P2 differ depending on the difference in the volume V of the internal space of the housing 12. As a result, as illustrated in FIG. 32C, depending on the difference in the volume V of the internal space of the housing 12, the frequency characteristics of the difference between the sound pressure levels of the acoustic signal observed at the position P1 and the acoustic signal observed at the position P2 also differ, and the sound leakage suppression performance at the position P2 also differs. For example, in the "standard" and "height+1.0 mm" acoustic signal output devices 10, the sound leakage is minimal at frequencies slightly higher than the respective resonance frequencies $f_H$, which is consistent with the relationship illustrated in FIG. 22C.

Figure 33A:
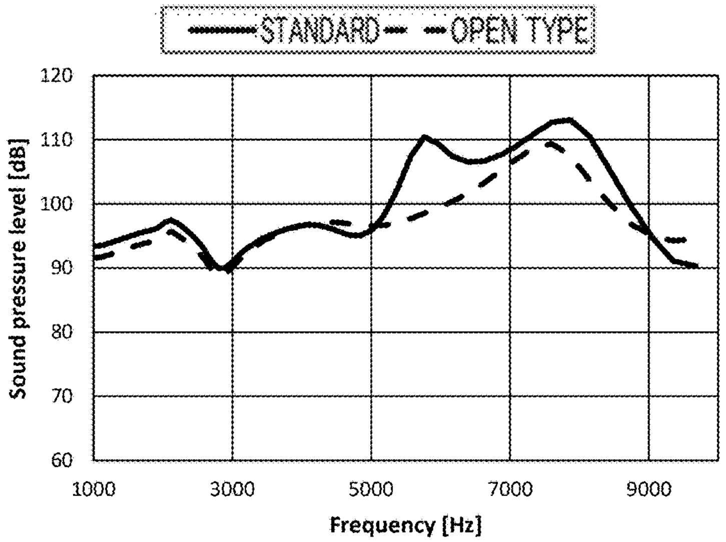
FIG. 33A is a graph comparing the frequency characteristics of the acoustic signals observed at the position P1 in FIG. 5B for the acoustic signal output device of the embodiment (reference: with enclosure) and the open-type (no enclosure) acoustic signal output device.
Figure 33B:
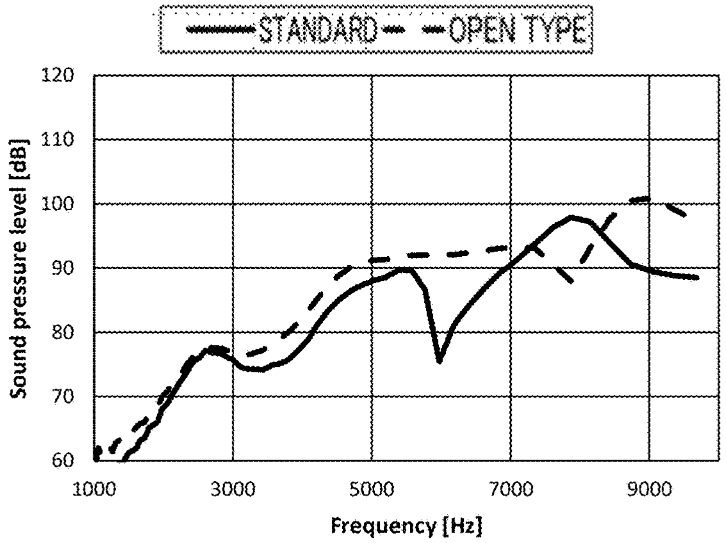
FIG. 33B is a graph illustrating the frequency characteristics of the acoustic signals observed at the position P2 in FIG. 5B for the acoustic signal output device of the embodiment and the open-type acoustic signal output device.
Figure 33C:
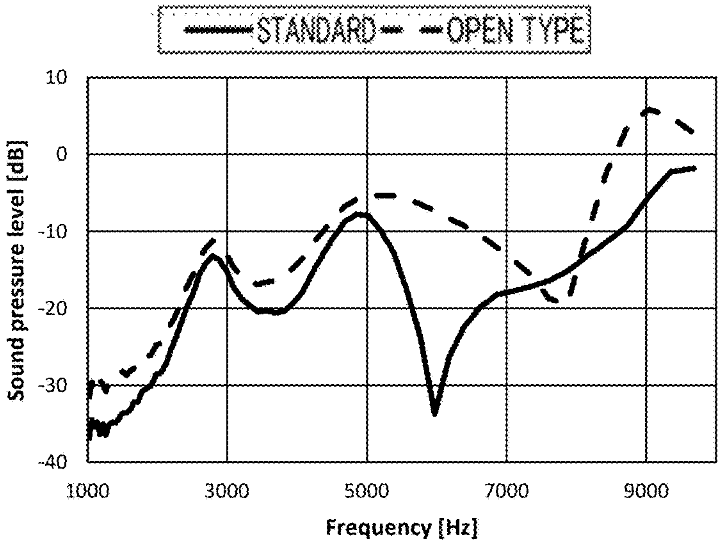
FIG. 33C is a graph illustrating the difference between the acoustic signal observed at the position P1 and the acoustic signal observed at the position P2 for the acoustic signal output device of the embodiment and the open-type acoustic signal output device.

Next, the frequency characteristics of the acoustic signal output device 10 of the embodiment (reference: with enclosure, which is the region AR surrounded by the walls 122 and 123) and the open-type (without enclosure) acoustic signal output device will be described. Note that in the open-type acoustic signal output device, the wall 122 on the D1-direction side of the driver unit 11 of the acoustic signal output device 10 is not present, and the region AR is open to the D2-direction side. FIG. 33A illustrates the frequency characteristics of the acoustic signal observed at the position P1 in FIG. 5B, FIG. 33B illustrates the frequency characteristics of the acoustic signal observed at the position P2 in FIG. 5B, and FIG. 33C illustrates the difference (difference in sound pressure level of each frequency) between the frequency characteristics of the acoustic signal observed at the position P1 and the frequency characteristics of the acoustic signal observed at the position P2. The horizontal axis represents the frequency ([Hz]), and the vertical axis represents the sound pressure level (SPL) ([dB]). As illustrated in FIGS. 33A and 33B, the frequency characteristics of the acoustic signal observed at the position P1 and the acoustic signal observed at the position P2 differ depending on the presence of an enclosure. As a result, as illustrated in FIG. 33C, it can be seen that the acoustic signal output device 10 of the embodiment having an enclosure can suppress sound leakage at the position P2 over a wide frequency band compared to the acoustic signal output device without an enclosure.

As described above, it can be seen that, by appropriately adjusting the resonance frequency $f_H$ based on the Helmholtz resonance of the housing 12, the phase of the acoustic signal AC2 emitted from the driver unit 11 to the internal space of the housing 12 can be adjusted, and as a result, sound leakage in a desired frequency band can be sufficiently suppressed.

Modification 6 of First Embodiment

In Modification 5 of the first embodiment, the phase relationship between the acoustic signal AC1 emitted from the sound hole 121*a* and the acoustic signal AC2 emitted from the sound hole 123*a* was adjusted by controlling the resonance frequency based on the Helmholtz resonance. However, a waveguide (a waveguide path of acoustic signals) for adjusting at least one of a path length from the position of the driver unit 11 to the emission position of the acoustic signal AC1 (first acoustic signal) to the outside of the acoustic signal output device 11, and/or a path length from the position of the driver unit 11 to the emission position of the acoustic signal AC2 (second acoustic signal) to the outside of the acoustic signal output device 10 may be provided to adjust the phase relationship.

For example, the waveguide described above may be designed to satisfy any of Condition Examples 1 to 6 described above. Furthermore, when adjusting the phase relationship between the acoustic signal AC1 emitted from the sound hole 121*a* and the acoustic signal AC2 emitted from the sound hole 123*a* by the waveguide, the length L in the depth direction of the sound holes 121*a* and 123*a*, the total opening area S of the sound holes 121*a* and 123*a*, and the volume V of the internal space of the housing 12 may be designed so that the influence of the resonance frequency based on the Helmholtz resonance of the housing 12 is small. That is, when adjusting the phase relationship using a waveguide, it may be difficult to adjust the phase in the frequency band in which sound leakage is to be suppressed due to the influence of the resonance frequency based on the Helmholtz resonance of the housing 12. In such a case, the length L in the depth direction of the sound holes 121*a* and 123*a*, the total opening area S of the sound holes 121*a* and 123*a*, and the volume V of the internal space of the housing 12 may be designed so that the resonance frequency based on the Helmholtz resonance of the housing 12 belongs to a frequency band (for example, other than the band from 3000 Hz to 8000 Hz; for example, a frequency band higher than 8000 Hz) other than a predetermined frequency band within the audible frequency band. Alternatively, the phase relationship between the acoustic signal AC1 emitted from the sound hole 121*a* and the acoustic signal AC2 emitted from the sound hole 123*a* may be adjusted by both the waveguide and the resonance frequency based on the Helmholtz resonance of the housing 12. In this case, the length L in the depth direction of the sound holes 121*a* and 123*a*, the total opening area S of the sound holes 121*a* and 123*a*, and the volume V of the internal space of the housing 12 may be designed so that the resonance frequency based on the Helmholtz resonance of the housing 12 belongs to a predetermined frequency band (for example, a band from 3000 Hz to 8000 Hz) within the audible frequency band.

The configuration of the acoustic signal output device 10 provided with the above-mentioned waveguide will be described below. However, these are examples and the present invention is not limited thereto.

Design Example 21

Figure 34A:
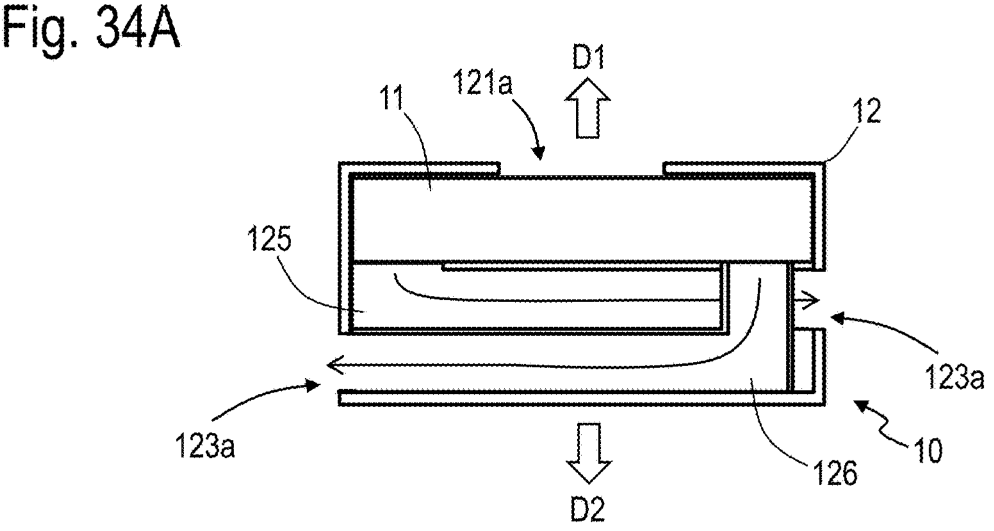
FIGS. 34A to 34C are modifications of the cross-sectional view taken along the line 2A-2A in FIG. 2A for explaining modifications of the acoustic signal output device.

FIG. 34A illustrates a design example in which waveguides 125 and 126 for adjusting the path length from the position of the driver unit 11 to the emission position of the acoustic signal AC2 (second acoustic signal) to the outside of the acoustic signal output device 10 are provided on the D2-direction side of the driver unit 11 in the housing 12 of the acoustic signal output device 10. The waveguides 125 and 126 are hollow paths (for example, acoustic tubes), and one of them is disposed on the D2-direction side of the driver unit 11, and the other is disposed on the opening side of the sound hole 123*a*. The acoustic signal AC2 emitted to the D2-direction side of the driver unit 11 is emitted to the outside from the sound hole 123*a* through the waveguides 125 and 126. By adjusting the lengths of the waveguides 125 and 126, it is possible to adjust the phase difference at the position P2 between the acoustic signal AC1 (first acoustic signal) emitted from the D1-direction side of the driver unit 11 and emitted to the outside from the sound hole 121*a* and the acoustic signal AC2 (second acoustic signal) emitted from the sound hole 123*a* to the outside through the waveguides 125 and 126. As a result, sound leakage at a desired frequency can be sufficiently suppressed at the position P2.

Design Example 22

Figure 34B:
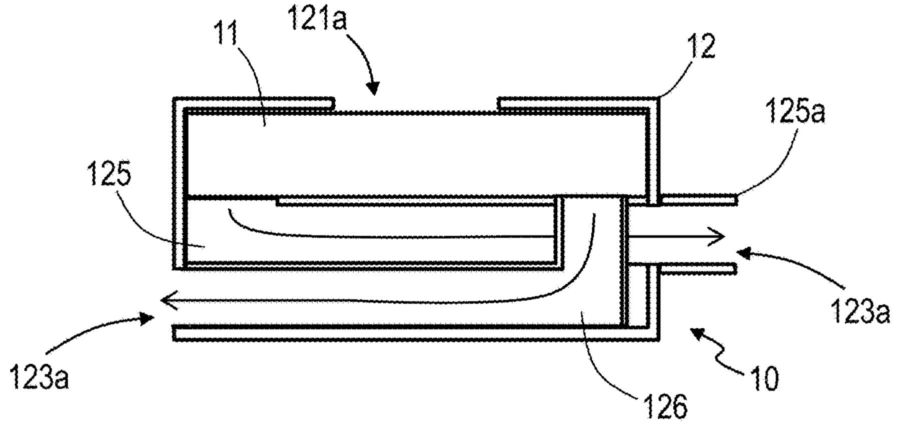
Figure 34C:
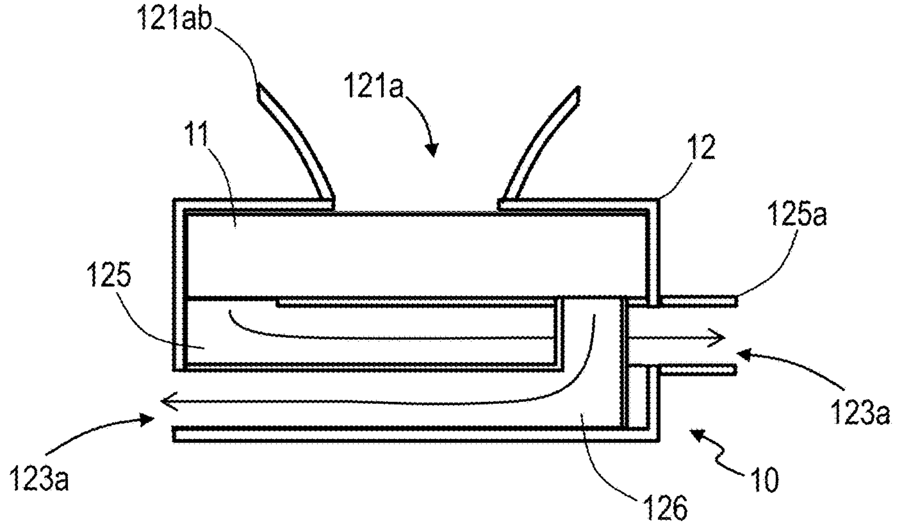

As illustrated in FIG. 34B, a portion of the waveguide may be disposed outside the housing 12. In the example of FIG. 34B, a tip portion 125*a* of the waveguide 125 is disposed outside the housing 12.

Design Example 23

FIG. 34A illustrates a design example in which a horn 121*ab* functioning as a waveguide is provided on the D1-direction side of the driver unit 11 of the acoustic signal output device 10, and the waveguides 125 and 126 for adjusting the path length from the position of the driver unit 11 to the emission position of the acoustic signal AC2 (second acoustic signal) to the outside of the acoustic signal output device 10 are provided on the D2-direction side of the driver unit 11 in the housing 12 of the acoustic signal output device 10. In this way, it is possible to adjust both the path length from the position of the driver unit 11 to the emission position of the acoustic signal AC1 (first acoustic signal) to the outside of the acoustic signal output device 10, and the path length from the position of the driver unit 11 to the emission position of the acoustic signal AC2 (second acoustic signal) to the outside of the acoustic signal output device 10.

Note that the waveguide is not limited to an acoustic tube or a horn, and the waveguide may be any mechanical configuration for adjusting at least one of the path length from the position of the driver unit 11 to the emission position of the acoustic signal AC1 to the outside of the acoustic signal output device 11, and/or the path length from the position of the driver unit 11 to the emission position of the acoustic signal AC2 to the outside of the acoustic signal output device 10.

Second Embodiment

Next, a second embodiment of the present invention will be described. The second embodiment is a modification of the first embodiment. In the following, the differences from the matters described so far are mainly described, and the same reference numbers will be used for the matters already described to simplify the explanation.

In order to improve the sound quality of the acoustic signal output device 10 of the first embodiment or its modification, the size of the driver unit 11 may need to be increased. However, in the first embodiment or its modification, when the size of the driver unit 11 increases, the size and weight of the acoustic signal output device 10 itself also increases. However, wearing the acoustic signal output device 10, which is large in size and weight, near the ear canal increases the burden on the ears and the sensation of a foreign body. Therefore, the housing provided with the sound holes and the driver unit 11 may be configured as separate bodies, and they may be connected by a waveguide. In this way, it is possible to increase the size of the driver unit 11 without increasing the size or weight of the housing that is worn near the ear canal. This will be described in detail below.

Figure 35:
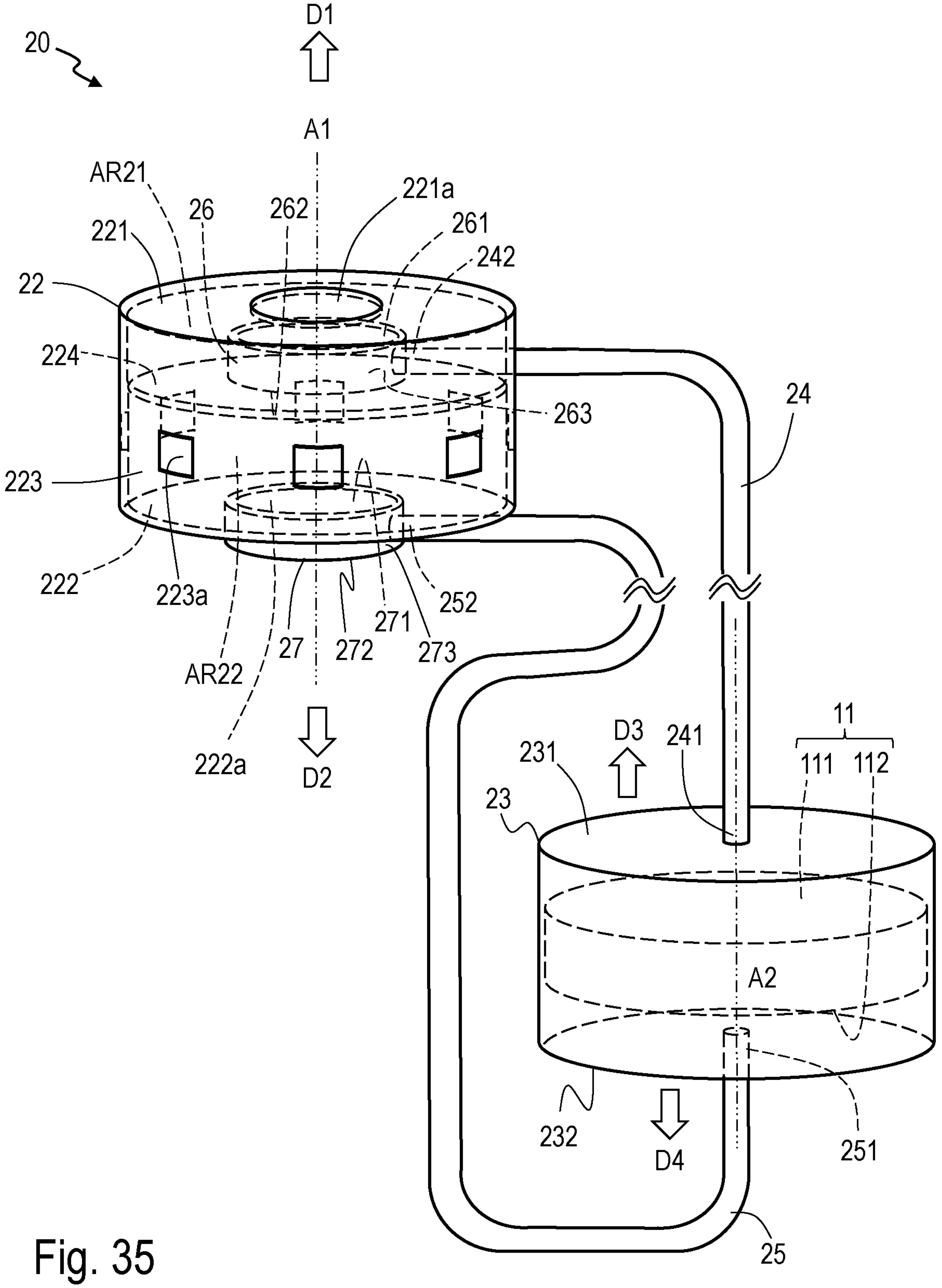
FIG. 35 is a transparent perspective view illustrating the configuration of an acoustic signal output device of a second embodiment.

An acoustic signal output device 20 of the present embodiment is also an acoustic listening device that is worn without sealing the user's ear canal. As illustrated in FIG. 35, the acoustic signal output device 20 of the present embodiment includes a driver unit 11, a housing 22 having hollow portions AR21 and AR22 (first and second hollow portions), a housing 23 that houses the driver unit 11 therein, hollow waveguides 24 and 25 (first and second waveguides) connecting the housings 22 and 23, and hollow joining members 26 and 27 connecting the waveguides 24 and 25 to the housing 22.

<Driver Unit 11>

As illustrated in FIG. 35, the driver unit 11 is a device that emits an acoustic signal AC1 (first acoustic signal) based on the input output signal to one side (D3-direction side), and emits an acoustic signal AC2 (second acoustic signal) which is a negative phase signal of the acoustic signal AC1 or an approximate signal of the negative phase signal to the other side (D4-direction side). The configuration of the driver unit 11 is the same as that of the first embodiment except that the D1 direction is replaced with the D3 direction and the D2 direction is replaced with the D4 direction.

<Housing 23>

As illustrated in FIG. 35, the housing 23 is a hollow member having a wall on the outside, and houses the driver unit 11 therein. Although there is no limitation on the shape of the housing 23, for example, it is preferable that the shape of the housing 23 be rotationally symmetric (bilaterally symmetric) or substantially rotationally symmetric about the axis A2 extending along the D3 direction. In the present embodiment, to simplify the explanation, an example is shown in which the housing 23 has a substantially cylindrical shape with both end surfaces. However, this is only an example and the present invention is not limited thereto. For example, the housing 23 may have a substantially dome shape with a wall at the end, a hollow substantially cubic shape, or any other three-dimensional shape. One end 241 of the waveguide 24 is attached to a wall 231 of the housing 23 disposed on the surface 111 side on one side (the D3-direction side) of the driver unit 11. In this way, the waveguide 24 (first waveguide) whose one end 241 is connected to one side (D3-direction side) of the driver unit 11 guides the acoustic signal AC1 emitted from the surface 111 of the driver unit 11 to one side (D3-direction side) to the outside of the housing 23. One end 251 of the waveguide 25 is attached to the wall 232 of the housing 23, which is disposed on the surface 112 side on the other side (the D4-direction side) of the driver unit 11. In this way, the waveguide 25 (second waveguide) whose one end 251 is connected to the other side (D4-direction side) of the driver unit 11 guides the acoustic signal AC2 emitted from the surface 112 of the driver unit 11 to the other side (D4-direction side) to the outside of the housing 23. Note that there is no limitation on the material that constitutes the housing 23. The housing 23 may be made of a rigid body such as synthetic resin or metal, or may be made of an elastic body such as rubber.

<Waveguides 24 and 25>

As illustrated in FIG. 35, the waveguides 24 and 25 are, for example, hollow members configured in a tube shape, and transmit the acoustic signals AC1 and AC2 input from one set of ends 241 and 251 to the other set of ends 242 and 252, respectively, and emit the acoustic signals from the other set of ends 242 and 252. However, the waveguides 24 and 25 are not limited to tube-shaped ones, but the waveguides may be any structure that guides the acoustic signals collected at one set of ends 241 and 251 (first position) to the other set of ends 242 and 252 (second position) different from the one set of ends 241 and 251 (first position). There is no limitation on the length of the waveguides 24 and 25, but the length of the sound path of the waveguide 24 and the length of the sound path of the waveguide 25 are preferably equal, or the difference between the length of the sound path of the waveguide 24 and the length of the sound path of the waveguide 25 is an integral multiple of the wavelength of the acoustic signals AC1 and AC2. That is, it is preferable that $L_1=L_2+n\lambda$ when $L_1$ is the length of the sound path of the waveguide 24 (first waveguide), $L_2$ is the length of the sound path of the waveguide 25 (second waveguide), n is an integer, and the acoustic signal AC1 (first acoustic signal) and the acoustic signal AC2 (second acoustic signal) include an acoustic signal of the wavelength λ. Note that a sound path is a path of sound, and in the case of the waveguides 24 and 25 having the same inner diameter, a specific example of the length of the sound path of the waveguides 24 and 25 is the length of the waveguides 24 and 25. Note that there is no limitation on the material that constitutes the waveguides 24 and 25. The waveguides 24 and 25 may be made of a rigid body such as synthetic resin or metal, or may be made of an elastic body such as rubber.

<Joining Member 26>

The joining member 26 is a hollow member having an open end 261 located on one side, a wall 262 which is a bottom surface located on the other side of the open end 261, and a wall 262 which is a side surface surrounding a space between the open end 261 and the wall 262 about the axis A1. The axis A1 of the present embodiment passes through the open end 261 and the wall 263. Preferably, the axis A1 is perpendicular or substantially perpendicular to the wall 262. Also preferably, the joining member 26 is rotationally symmetrical with respect to the axis A1. In the present embodiment, to simplify the explanation, an example is shown in which the wall 263 has a cylindrical shape, but the wall 263 may have other shapes such as a prismatic shape. The other end 242 of the waveguide 24 is attached to the wall 263, and the acoustic signal AC1 emitted from the other end 242 of the waveguide 24 is introduced to the inside (the space between the open end 261 and the wall 262) of the joining member 26. The acoustic signal AC1 introduced into the inside of the joining member 26 is emitted from the open end 261. Note that there is no limitation on the material that constitutes the joining member 26. The joining member 26 may be made of a rigid body such as synthetic resin or metal, or may be made of an elastic body such as rubber.

<Joining Member 27>

Similarly, the joining member 27 is a hollow member having an open end 271 located on one side, a wall 272 which is a bottom surface located on the other side of the open end 271, and a wall 272 which is a side surface surrounding the space between the open end 271 and the wall 272 about the axis A1. The axis A1 of the present embodiment passes through the open end 271 and the wall 273. Preferably, the axis A1 is perpendicular or substantially perpendicular to the wall 272. Also preferably, the joining member 27 is rotationally symmetrical with respect to the axis A1. In the present embodiment, to simplify the explanation, an example is shown in which the wall 273 has a cylindrical shape, but the wall 273 may have other shapes such as a prismatic shape. The other end 252 of the waveguide 25 is attached to the wall 273, and the acoustic signal AC2 emitted from the other end 252 of the waveguide 25 is introduced to the inside (the space between the open end 271 and the wall 272) of the joining member 27. The acoustic signal AC2 introduced into the inside of the joining member 27 is emitted from the open end 271. There is no limitation on the material that constitutes the joining member 27. The joining member 27 may be made of a rigid body such as synthetic resin or metal, or may be made of an elastic body such as rubber.

<Housing 22>

As illustrated in FIG. 35, FIG. 36A to 36C, FIGS. 37A and 37B, the housing 22 of the present embodiment includes a wall 221 located on one side (D1-direction side), a wall 222 located on the other side (D2-direction side), a wall 223 surrounding the space between the walls 221 and 222, and a wall 224 that separates the space surrounded by the walls 221, 222, and 223 into a hollow portion AR21 (first hollow portion) and a hollow portion AR22 (second hollow portion). In the present embodiment, the hollow portions AR21 and AR22 are arranged on the axis A1 extending in the same D1 direction. For example, the central region of the hollow portion AR21 and the central region of the hollow portion AR22 are arranged on the same axis A1. It is preferable that the internal space of the hollow portion AR21 be separated from the internal space of the hollow portion AR22 by the wall 224.

The joining member 26 to which the other end 242 of the waveguide 24 is attached is fixed to or integrated with the inner wall of the hollow portion AR21, and the open end 261 side of the joining member 26 is directed toward the wall 221 side. For example, the wall 262 side of the joining member 26 is fixed to or integrated with the wall 224 inside the hollow portion AR21, and the open end 261 side is directed toward the wall 221 side. In the example of the present embodiment, the centers of the wall 262 and the open end 261 of the joining member 26 are arranged on the axis A1. As a result, the other end 242 of the waveguide 24 is connected to the hollow portion AR21 through the joining member 26, and the acoustic signal AC1 sent to the joining member 26 is emitted from the open end 261 toward the wall 221 side (D1-direction side). That is, for example, the joining member 26 is disposed on the axis A1, the open end 261 of the joining member 26 is open in the direction D1 (first direction) along the axis A1, and the acoustic signal AC1 introduced from the other end 242 of the waveguide 24 is emitted in the direction D1 inside the hollow portion AR21.

A through-hole 222*a* is provided in the wall 222 of the hollow portion AR22. The through-hole 222*a* is preferably disposed on the axis A1, and more preferably, the center of the through-hole 222*a* is disposed on the axis A1. Further, although there is no limitation on the shape of the through-hole 222*a*, it is preferable that the open portion of the through-hole 222*a* be rotationally symmetrical with respect to the axis A1, and more preferably, the edge of the open portion of the through-hole 222*a* is circular. The joining member 27 to which the other end 252 of the waveguide 25 is attached is fixed to or integrated with the outside of the wall 222 of the housing 22, and the open end 271 side of the joining member 27 is directed toward the through-hole 222*a*. In the example of the present embodiment, the centers of the wall 272, the open end 271, and the through-hole 222*a* of the joining member 27 are arranged on the axis A1. As a result, the other end 252 of the waveguide 25 is connected to the hollow portion AR22 through the joining member 27, and the acoustic signal AC2 sent to the joining member 27 is emitted from the open end 271 toward the internal space of the hollow portion AR22. For example, the acoustic signal AC2 is emitted from the open end 271 toward the wall 224 side (D1-direction side). That is, for example, the joining member 27 is disposed on the axis A1, the open end 271 of the joining member 27 is open in the direction D1 (first direction) along the axis A1, and the acoustic signal AC2 introduced from the other end 252 of the waveguide 25 is emitted in the direction D1 inside the hollow portion AR22.

Although there is no limitation on the shape of the housing 22, for example, it is preferable that the shape of the housing 22 be rotationally symmetrical or approximately rotationally symmetrical with respect to the axis A1. In the present embodiment, to simplify the explanation, an example will be shown in which the external shape of the housing 22 is a substantially cylindrical shape having walls 221 and 222 as both end surfaces and a wall 223 as a side surface. Further, in the present embodiment, an example is shown in which the walls 221, 222, and 224 are perpendicular or substantially perpendicular to the axis A1, and the wall 223 is parallel or substantially parallel to the axis A1. However, these are examples and the present invention is not limited thereto. For example, the external shape of the housing 22 may be a substantially dome shape with a wall at the end, a hollow substantially cubic shape, or any other three-dimensional shape. Furthermore, there is no limitation on the material that constitutes the housing 22. The housing 22 may be made of a rigid body such as synthetic resin or metal, or may be made of an elastic body such as rubber.

<Sound Holes 221*a* and 223*a*>

The wall 221 of the hollow portion AR21 (first hollow portion) is provided with a sound hole 221*a* (first sound hole) from which the acoustic signal AC1 (first acoustic signal) introduced into the inside of the hollow portion AR21 by the waveguide 24 (first waveguide) is guided to the outside. In addition, the wall 223 of the hollow portion AR22 (second hollow portion) is provided with a sound hole 223*a* (second sound hole) from which the acoustic signal AC2 (second acoustic signal) introduced into the inside of the hollow portion AR22 by the waveguide 25 (second waveguide) is guided to the outside. Similarly to the sound holes 121*a* and 123*a* of the first embodiment, the sound holes 221*a* and 223*a* are, for example, through-holes penetrating the wall of the housing 12, but the present invention is not limited thereto. The sound holes 221*a* and 223*a* may not be through-holes as long as the acoustic signals AC1 and AC2 can be respectively guided to the outside.

The acoustic signal AC1 emitted from the sound hole 221*a* reaches the user's ear canal and is heard by the user. On the other hand, the acoustic signal AC2, which is a negative phase signal of the acoustic signal AC1 or an approximate signal of the negative phase signal, is emitted from the sound hole 223*a*. A portion of this acoustic signal AC2 cancels out a portion (sound leakage component) of the acoustic signal AC1 emitted from the sound hole 221*a*. In this way, the sound leakage can be suppressed.

The arrangement of the sound holes 221*a* and 223*a* will be described.

The sound hole 221*a* (first sound hole) of the present embodiment is provided in the wall 221 of the hollow portion AR21 arranged on one side (the D1-direction side which is the emission side of the acoustic signal AC1) of the joining member 26 (FIG. 35, FIG. 36A, FIG. 36B, FIG. 37A). Further, the sound hole 223*a* (second sound hole) of the present embodiment is provided in the wall 223 in contact with the hollow portion AR22. That is, if the center of the hollow portion AR22 is used as a reference and the direction between the D1 direction (first direction) and the direction opposite to the D1 direction is the D12 direction (second direction) (FIG. 37A), the sound hole 221*a* (first sound hole) is provided on the D1-direction side (first direction side) of the housing 22, and the sound hole 223*a* (second sound hole) is provided on the D12-direction side (second direction side) of the housing 22. That is, the sound hole 221*a* is open in the D1 direction (first direction) along the axis A1, and the sound hole 223*a* is open in the D12 direction (second direction). For example, when the outer shape of the housing 22 has a first end surface which is the wall 221 disposed on one side (D1-direction side) of the joining member 26, a second end surface, which is the wall 222 disposed on the other side (D2-direction side) of the joining member 26, and a side surface which is the wall 223 surrounding the space sandwiched between the first end surface and the second end surface about the axis A1 along the emission direction (D1 direction) of the acoustic signal AC1 passing through the first end surface and the second end surface (FIGS. 36B and 37A), the sound hole 221*a* (first sound hole) is provided on the first end surface, and the sound hole 223*a* (second sound hole) is provided on the side surface. Further, in the present embodiment, no sound hole is provided on the wall 222 side of the housing 22. This is because, if a sound hole is provided on the wall 222 side of the housing 22, the sound pressure level of the acoustic signal AC2 emitted from the housing 22 will exceed the level required to cancel out the sound leakage component of the acoustic signal AC1, and the excess amount is perceived as sound leakage.

Figure 36A:
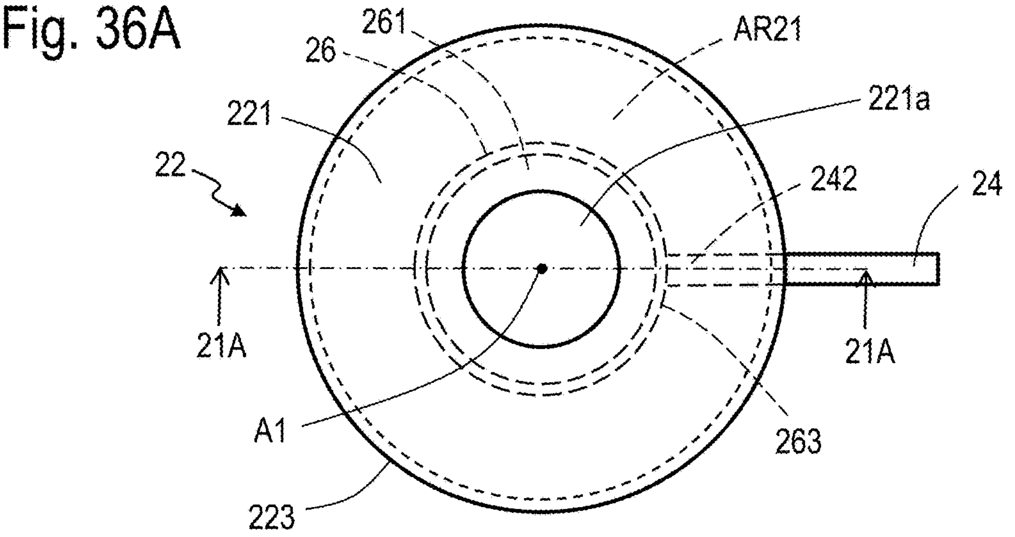
FIG. 36A is a transparent plan view illustrating the configuration of the acoustic signal output device of the second embodiment.

As illustrated in FIG. 36A and the like, the sound hole 221*a* of the present embodiment is disposed on or near the axis A1 along the emission direction (D1 direction) of the acoustic signal AC1. The axis A1 of the present embodiment passes through the center of the region of the wall 221 disposed on one side (D1-direction side) of the joining member 26 or near the center. For example, the axis A1 is an axis that passes through the central region of the housing 22 and extends in the D1 direction. That is, the sound hole 221*a* of the present embodiment is provided at the center position of the region of the wall 221 of the housing 22. In the present embodiment, to simplify the explanation, an example is shown in which the edge of the open end of the sound hole 221*a* has a circular shape (the open end is circular). However, the present invention is not limited thereto. For example, the shape of the edge of the open end of the sound hole 221*a* may be any other shape such as an ellipse, a quadrangle, or a triangle. Further, the open end of the sound hole 221*a* may have a mesh shape. In other words, the open end of the sound hole 221*a* may be composed of a plurality of holes. Further, in the present embodiment, to simplify the explanation, an example will be shown in which one sound hole 221*a* is provided in the wall 221 of the housing 22. However, the present invention is not limited thereto. For example, two or more sound holes 221*a* may be provided in the wall 221 of the housing 22.

Figure 36B:
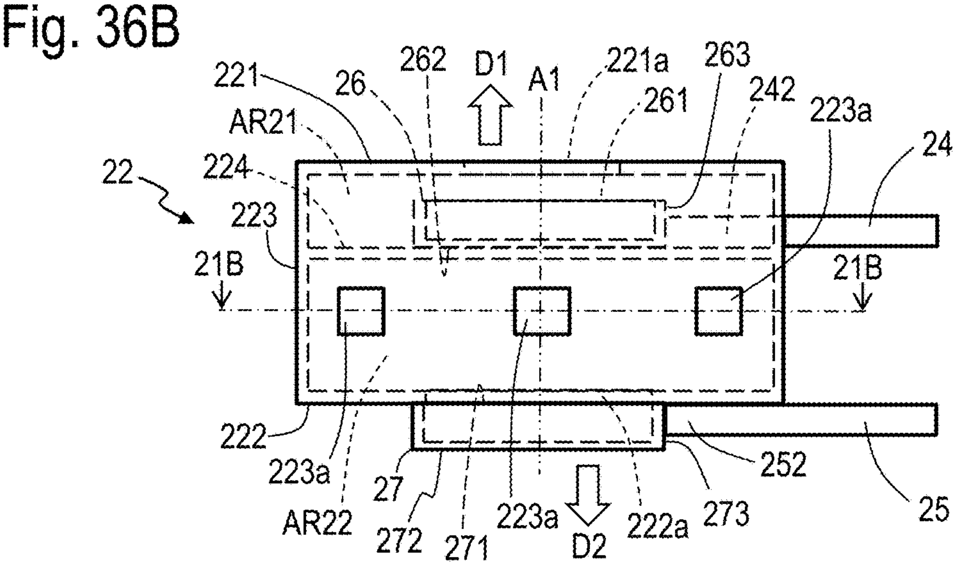
FIG. 36B is a transparent front view illustrating the configuration of the acoustic signal output device of the second embodiment.
Figure 36C:
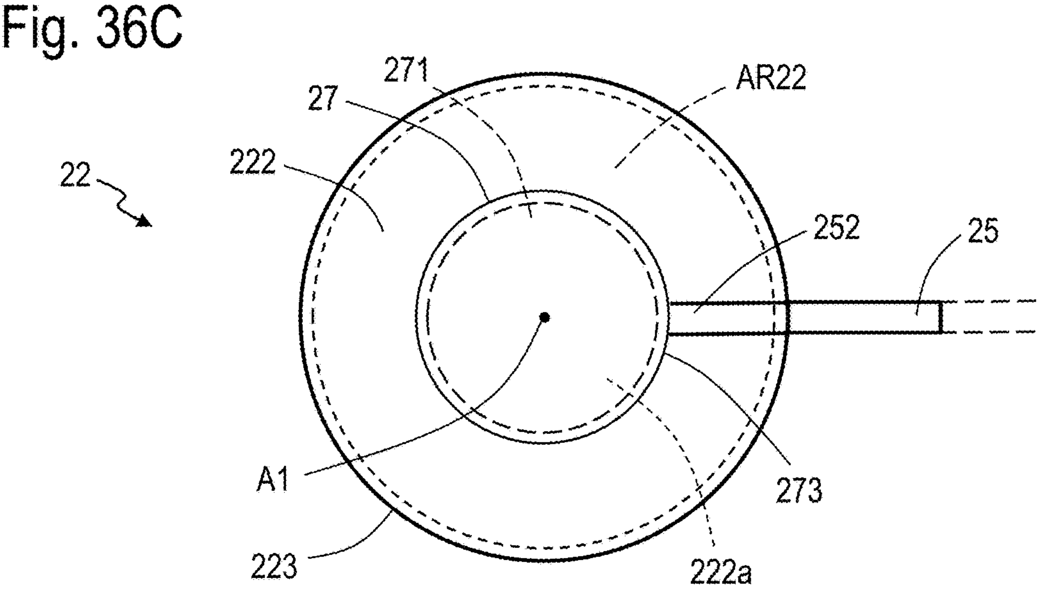
FIG. 36C is a bottom view illustrating the configuration of the acoustic signal output device of the second embodiment.
Figure 37A:
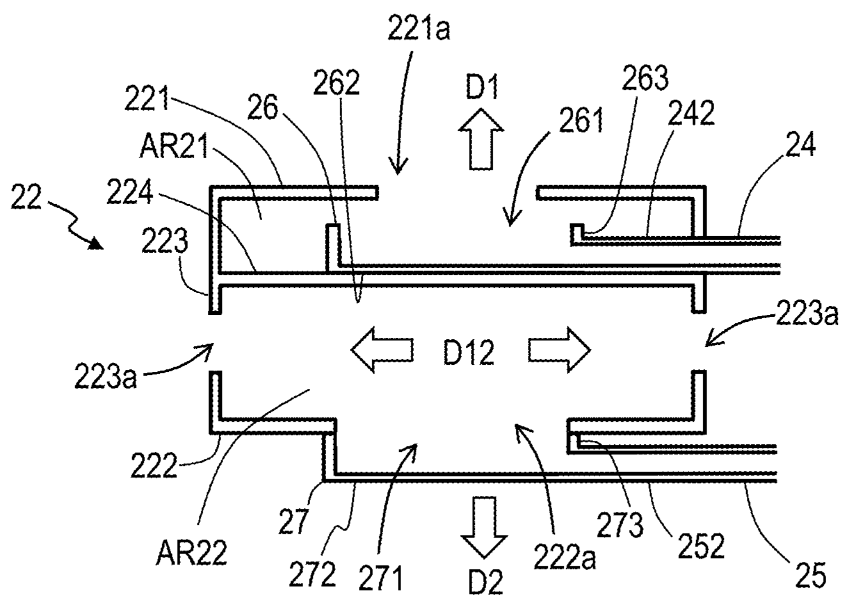
FIG. 37A is a cross-sectional view taken along the line 21A-21A in FIG. 36A.
Figure 37B:
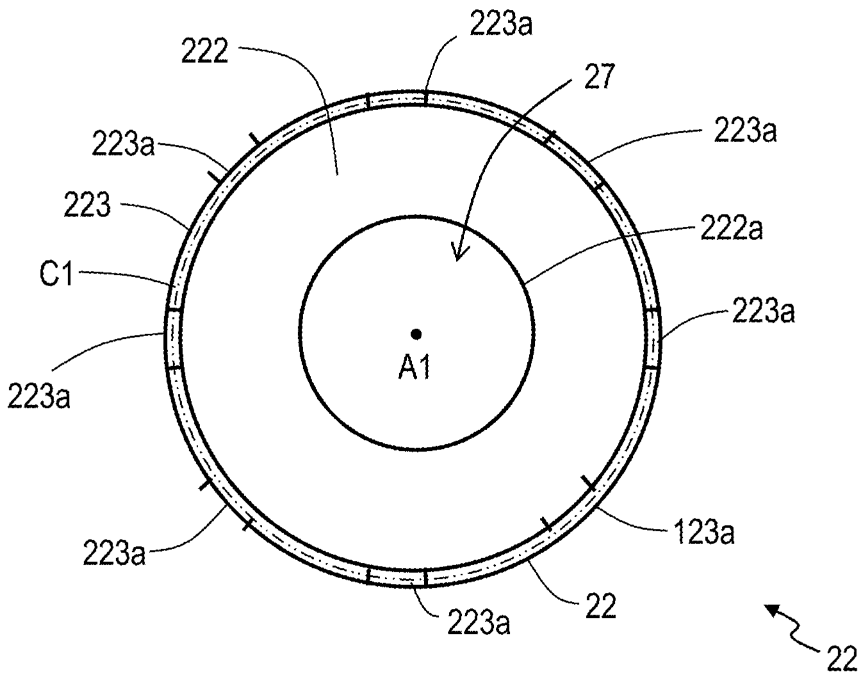
FIG. 37B is a cross-sectional view taken along the line 21B-21B in FIG. 36B.

Similarly to the first embodiment, as illustrated in FIGS. 36B and 37B, a plurality of sound holes 223*a* (second sound holes) of the present embodiment are provided along the circumference C1 around the axis A1 along the emission direction of the acoustic signal AC1 (first acoustic signal). In the present embodiment, to simplify the explanation, an example is shown in which a plurality of sound holes 223*a* are provided on the circumference C1. However, it is sufficient that the plurality of sound holes 223*a* are provided along the circumference C1, and it is not necessary that all the sound holes 223*a* are arranged strictly on the circumference C1.

Further, as in the first embodiment, preferably, when the circumference C1 is equally divided into a plurality of unit arc regions, a total opening area of the sound holes 223*a* (second sound holes) provided along a first arc region, which is any of the unit arc regions is the same as or approximately the same as a total opening area of the sound holes 223*a* (second sound holes) provided along a second arc region, which is any of the unit arc regions excluding the first arc region (FIG. 37B).

As in the first embodiment, more preferably, the plurality of sound holes 223*a* are provided along the circumference C1 with the same shape, the same size, and the same interval. However, the present invention is not limited thereto.

In the present embodiment, to simplify the explanation, a case is illustrated in which the shape of the edge of the open end of the sound hole 223*a* is a quadrangle, but the present invention is not limited thereto. For example, the shape of the edge of the open end of the sound hole 223*a* may be a circle, an ellipse, a triangle, or other shapes. Further, the open end of the sound hole 223*a* may have a mesh shape. In other words, the open end of the sound hole 223*a* may be composed of a plurality of holes. Furthermore, there is no limitation on the number of sound holes 223*a*, and a single sound hole 223*a* may be provided in the wall 223 of the housing 22, or a plurality of sound holes 223*a* may be provided.

Similarly to the first embodiment, the ratio $S_2/S_1$ of the total opening area $S_2$ of the sound holes 223*a* (second sound holes) to the total opening area $S_1$ of the sound holes 221*a* (first sound holes) preferably satisfies $2/3 \leq S_2/S_1 \leq 4$. Furthermore, when the outer shape of the housing 22 has a first end surface which is the wall 221 disposed on one side (D1-direction side) of the joining member 26, a second end surface, which is the wall 222 disposed on the other side (D2-direction side) of the joining member 26, and a side surface which is the wall 223 surrounding the space sandwiched between the first end surface and the second end surface about the axis A1 along the emission direction (D1 direction) of the acoustic signal AC1 passing through the first end surface and the second end surface (FIGS. 36B and 37A), the ratio $S_2/S_3$ of the total opening area $S_2$ of the sound holes 223*a* to the total area $S_3$ of the side surface is preferably $1/20 < S_2/S_3 \leq 1/5$.

<Usage State>

Figure 38A:
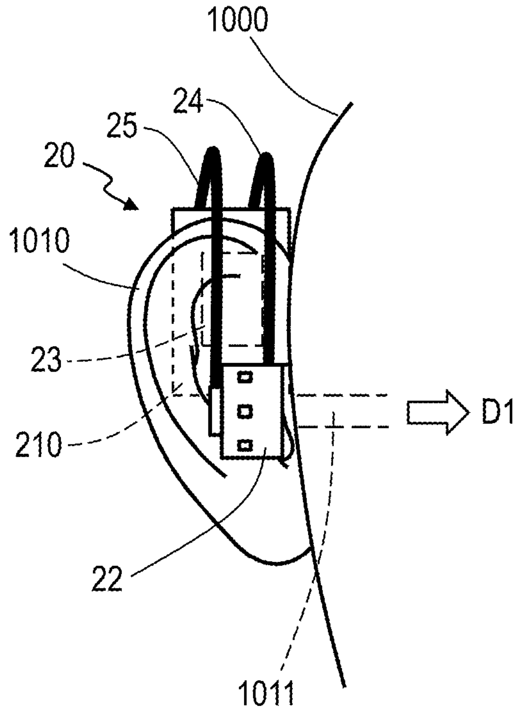
FIGS. 38A and 38B are diagrams illustrating the usage state of the acoustic signal output device of the second embodiment.

Using FIGS. 38A and 38B, the usage state of the acoustic signal output device 20 will be described. In the example of FIG. 38A, one acoustic signal output device 20 is worn on the right ear 1010 and the left ear (not shown) of the user 1000. An arbitrary wearing mechanism is used to wear the acoustic signal output device 20 on the ear. The housing 22 of the acoustic signal output device 20 is disposed on the ear canal 1011 side of each of the right ear 1010 and the left ear, and the D1-direction side is directed to the ear canal 1011 side of the user 1000. Furthermore, the playback device 210 including the housing 23 is disposed on the back side of the auricle of each of the right ear 1010 and the left ear, and the housing 23 and the housing 22 are connected by the waveguides 24 and 25 as described above. The acoustic signal AC1 introduced from the driver unit 11 in the housing 23 into the hollow portion AR21 of the housing 22 is emitted from the sound hole 221*a*, and the emitted acoustic signal AC1 is heard by the user 1000. On the other hand, the acoustic signal AC2 introduced from the driver unit 11 in the housing 23 into the hollow portion AR22 of the housing 22 is emitted from the sound hole 223*a*. A portion of the acoustic signal AC2 is a negative phase signal of the acoustic signal AC1 or an approximate signal of the negative phase signal, and cancels out a portion (sound leakage component) of the acoustic signal AC1 emitted from the sound hole 221*a*.

Figure 38B:
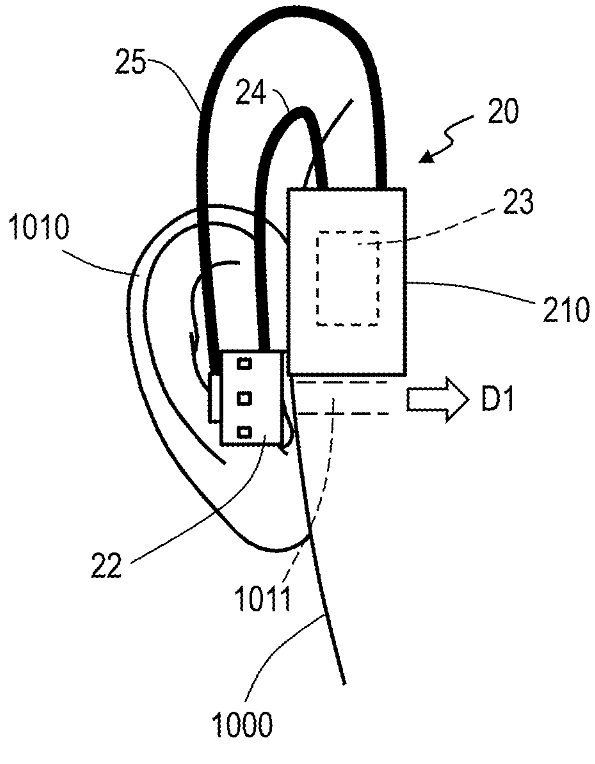
Figure 39:
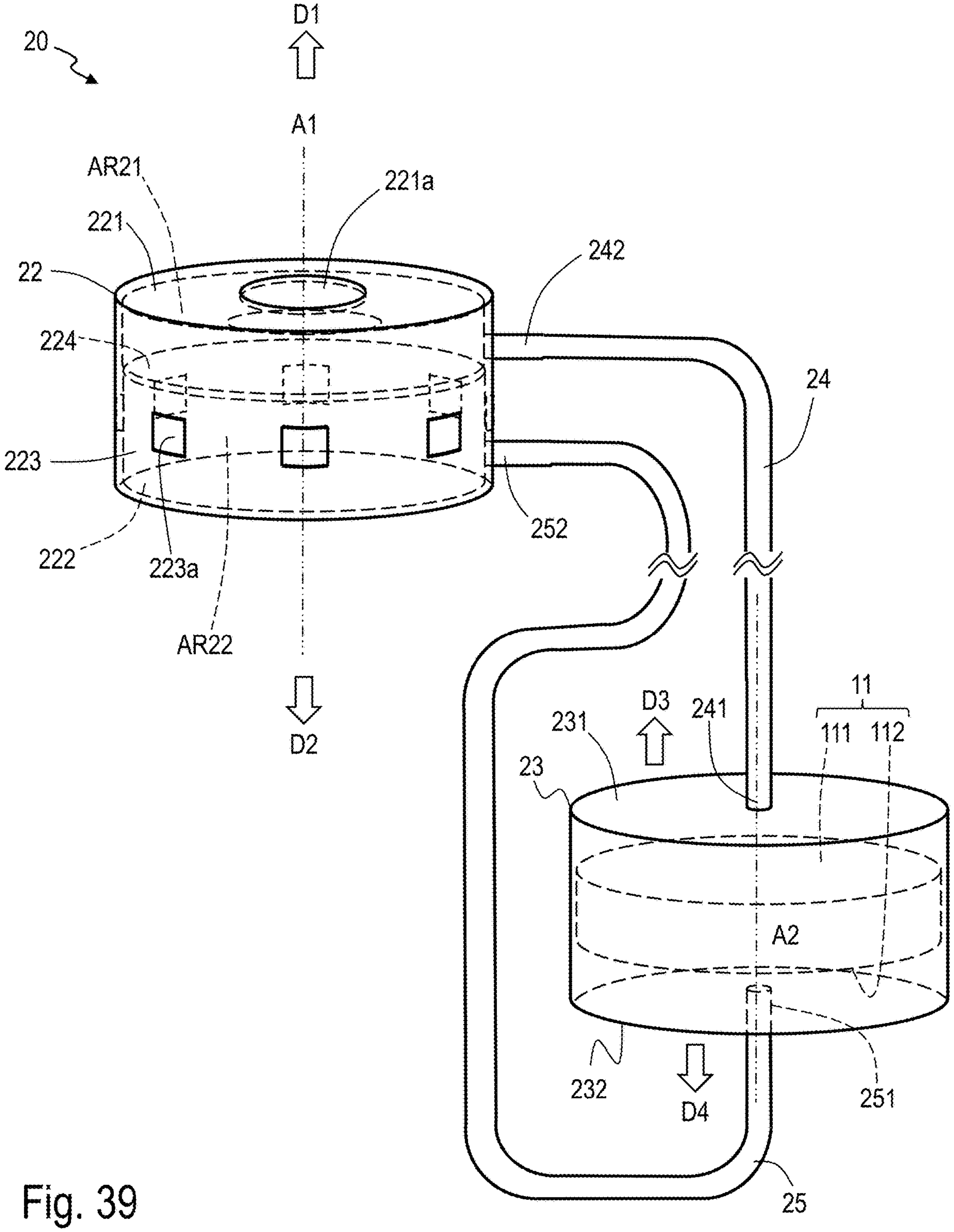
FIG. 39 is a transparent perspective view illustrating a modification of the acoustic signal output device of the second embodiment.
Figure 40A:
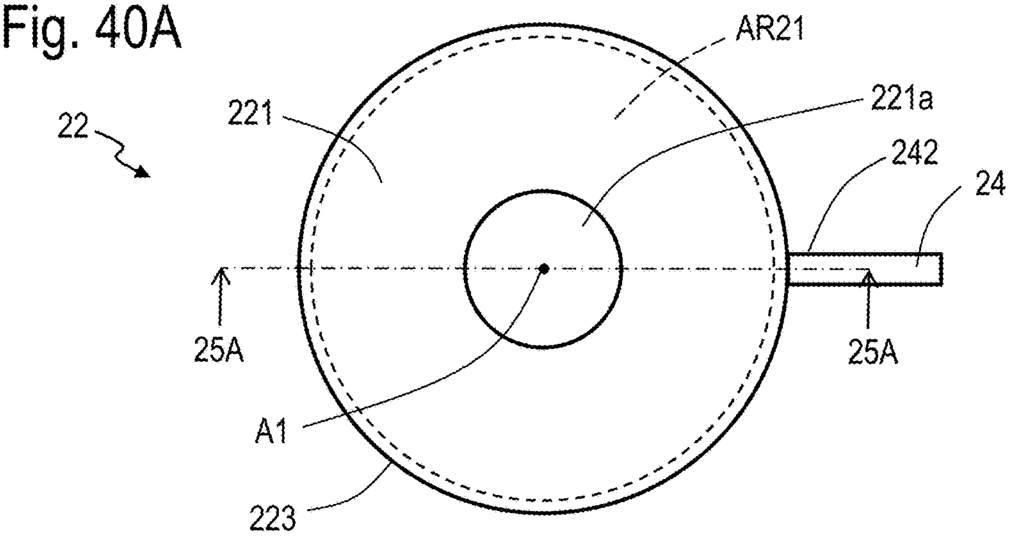
FIG. 40A is a transparent plan view illustrating a modification of the acoustic signal output device of the second embodiment.
Figure 40B:
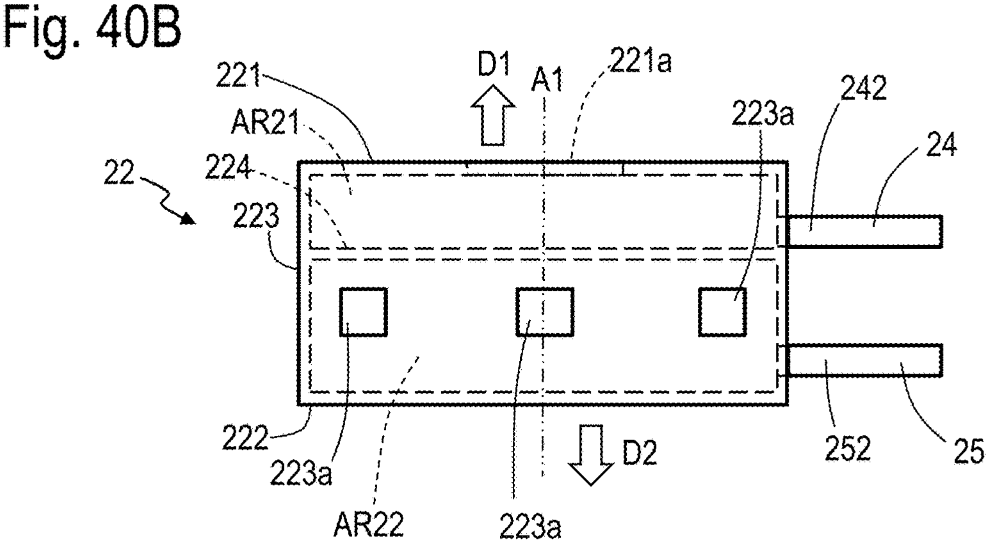
FIG. 40B is a transparent front view illustrating a modification of the acoustic signal output device of the second embodiment.
Figure 40C:
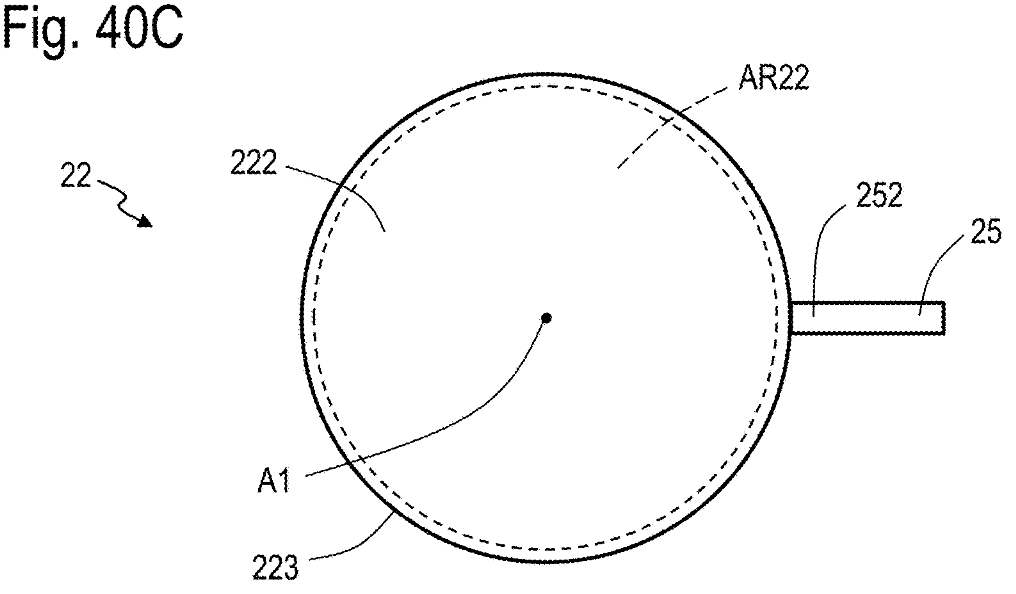
FIG. 40C is a bottom view illustrating a modification of the acoustic signal output device of the second embodiment.
Figure 41:
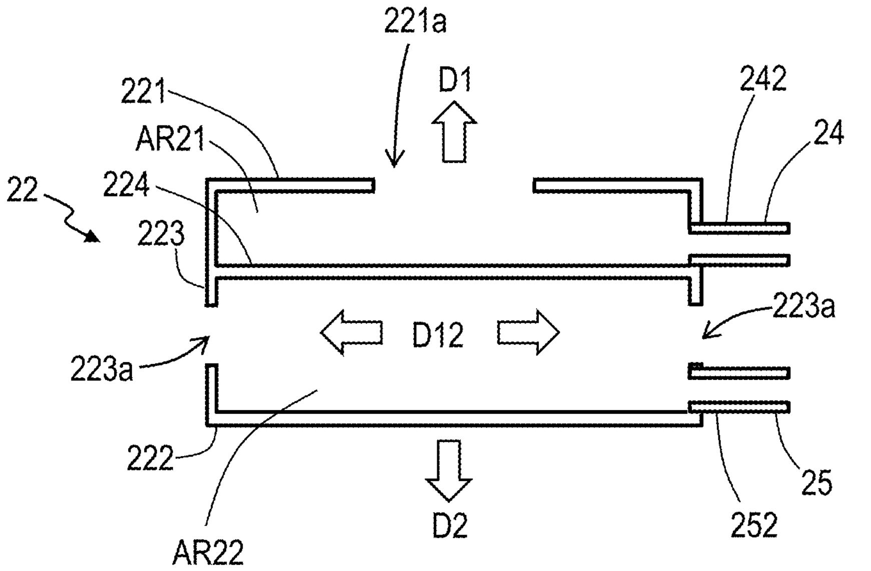
FIG. 41 is a cross-sectional view taken along the line 25A-25A in FIG. 40A.

As in the example of FIG. 38B, the playback device 210 including the housing 23 may be disposed on the head on the front side of the auricle of each of the right ear 1010 and the left ear, and the housing 23 and the housing 22 may be connected by the waveguides 24 and 25 as described above. The rest is the same as the example in FIG. 38A.

Modification 1 of Second Embodiment

In the second embodiment, an example has been shown in which a plurality of sound holes 223*a* (second sound holes) having the same shape, the same size, and the same interval are provided along the circumference C1. However, the present invention is not limited thereto. For example, the housing 22 may be provided with the sound holes 223*a* having the same arrangement as that of the sound holes 123*a* in Modification 1 of the first embodiment (FIGS. 10A to 12C).

Modification 2 of Second Embodiment

In the second embodiment, a configuration in which one sound hole 221*a* is disposed at the center position of the wall 221 of the housing 22 has been described. However, similarly to Modification 2 of the first embodiment, a plurality of sound holes 221*a* may be provided in the region of the wall 221 of the housing 22, and the sound holes 221*a* may be biased toward an eccentric position from the center of the region of the wall 221 of the housing 22. For example, the housing 22 may be provided with the sound holes 221*a* having the same arrangement as that of the sound holes 121*a* in Modification 2 of the first embodiment (FIGS. 13A and 13B).

Further, as in Modification 2 of the first embodiment, when the position of one or more sound holes 221*a* is biased toward an eccentric position, the distribution and the opening area of the sound holes 223*a* may be biased accordingly. In other words, when the circumference C1 is equally divided into a plurality of unit arc regions, the total opening area of the sound holes 223*a* (second sound holes) provided along the first arc region which is any of the unit arc regions may be smaller than the total opening area of the sound holes 223*a* provided along the second arc region which is any of the unit arc regions closer to the eccentric position than the first arc region. For example, the housing 22 may be provided with the sound holes 223*a* having the same arrangement as that of the sound holes 123*a* in Modification 2 of the first embodiment (FIGS. 14A and 14B). In addition, the resonance frequency of the housing 22 may be controlled by controlling at least some of the size of the openings of the sound holes 221*a* and 223*a*, the thickness of the wall of the housing 22, and the internal volume of the housing 22.

Modification 3 of Second Embodiment

The acoustic signal output device 20 may be provided with an acoustic absorbent in which the sound absorption coefficient for the acoustic signal of the frequency $f_1$, which was described in Modification 4 of the first embodiment, is higher than the sound absorption coefficient for the acoustic signal of the frequency $f_2$ ($f_1>f_2$). The acoustic absorbent may be provided on the other side 112 (D4-direction side) of the driver unit 11 inside the housing 23, or may be provided inside the waveguide 25 (second waveguide). The acoustic absorbent may be provided at the end (open end portion) of the waveguide 25, or may be provided in at least one of the sound holes 223*a* (second sound holes), or may be provided inside the hollow portion AR22 (the second hollow portion). For example, in Examples 4-1 to 4-3 of Modification 4 of the first embodiment, the housing 12 may be replaced with the hollow portion AR22, the sound hole 123*a* may be replaced with the sound hole 223*a*, the region on the other side 112 of the driver unit 11 may be replaced with the internal region of the hollow portion AR22, and the region AR2 of the wall 122 may be replaced with the region of the wall 222.

Modification 4 of Second Embodiment

By providing the joining members 26 and 27 as in the second embodiment, the emission direction of the acoustic signals AC1 and AC2 within the hollow portions AR21 and AR22 can be controlled. For example, the acoustic signal AC1 introduced from the other end 242 of the waveguide 24 can be emitted in the direction D1 along the axis A1 inside the hollow portion AR21, and the acoustic signal AC2 introduced from the other end 252 of the waveguide 25 can be emitted in the direction D1 inside the hollow portion AR22. In this case, the sound pressure distributions of the acoustic signal AC1 emitted from the sound hole 221*a* and the acoustic signal AC2 emitted from the sound hole 223*a* can be made rotationally symmetrical or approximately rotationally symmetrical with respect to the axis A1. In this way, it is possible to appropriately suppress sound leakage. However, the present invention is not limited thereto. For example, as illustrated in FIG. 39, FIG. 40A, FIG. 40B, FIG. 40C, and FIG. 41, the acoustic signal output device 20 may not have the joining member 26, and the other end 242 side of the waveguide 24 may be directly connected to the wall 223 of the hollow portion AR21, and the acoustic signal AC1 sent to the other end 242 of the waveguide 24 may be emitted toward the inside of the hollow portion AR21. Similarly, the acoustic signal output device 20 may not have the joining member 27, the other end 252 side of the waveguide 25 may be directly connected to the wall 223 of the hollow portion AR22, and the acoustic signal AC2 sent to the other end 252 of the waveguide 25 may be emitted toward the inside of the hollow portion AR22.

Furthermore, in the second embodiment, an example has been shown in which the internal space of the hollow portion AR21 of the housing 22 is separated from the internal space of the hollow portion AR22 by the wall 224 (FIG. 35, FIG. 36B, FIG. 37A). However, the internal space of the hollow portion AR21 of the housing 22 may not be separated from the internal space of the hollow portion AR22. In such a case, it is preferable that the open end 261 of the joining member 26 be directed toward the wall 221 side (D1-direction side) (for example, the sound hole 221*a* side) of the housing 22, and the open end 271 of the joining member 27 is directed toward the wall 222 side (D2-direction side) of the housing 22. Even with such a configuration, the acoustic signal AC1 is emitted from the sound hole 221*a*, and the acoustic signal AC2 is emitted from the sound hole 223*a*.

Third Embodiment

A plurality of acoustic signal output devices 10 described in the first embodiment or its modification may be provided and controlled independently. In this way, the sound pressure level of the acoustic signal AC1 emitted from a certain acoustic signal output device 10 and the sound pressure level of the acoustic signal AC2 emitted from another acoustic signal output device 10 can be independently controlled. For example, it is also possible to drive one acoustic signal output device 10 and another acoustic signal output device 10 in opposite phases or substantially opposite phases, and control the level (power) at each frequency independently. As a result, as illustrated in the first embodiment, the sound leakage components of the acoustic signals AC1 of each acoustic signal output device 10 are canceled out by a portion of the acoustic signal AC2, and a portion of the acoustic signal AC1 and a portion of the acoustic signal AC2 output from different acoustic signal output devices 10 can be canceled out. As a result, it becomes possible to more appropriately cancel out sound leakage components. In the present embodiment, to simplify the explanation, an example will be shown in which two acoustic signal output devices 10 are provided for one ear and they are independently controlled. However, the present invention is not limit thereto, and three or more acoustic signal output devices 10 may be provided for one ear, and they may be independently controlled. Note that the same reference numbers will be used for the matters that have already been described, and the description will be omitted, but branch numbers will be used to distinguish between multiple members with the same configuration. For example, two acoustic signal output devices 10 are referred to as an acoustic signal output device 10-1 and an acoustic signal output device 10-2, but the configurations of the acoustic signal output devices 10-1 and 10-2 are the same as the acoustic signal output device 10.

Figure 42:
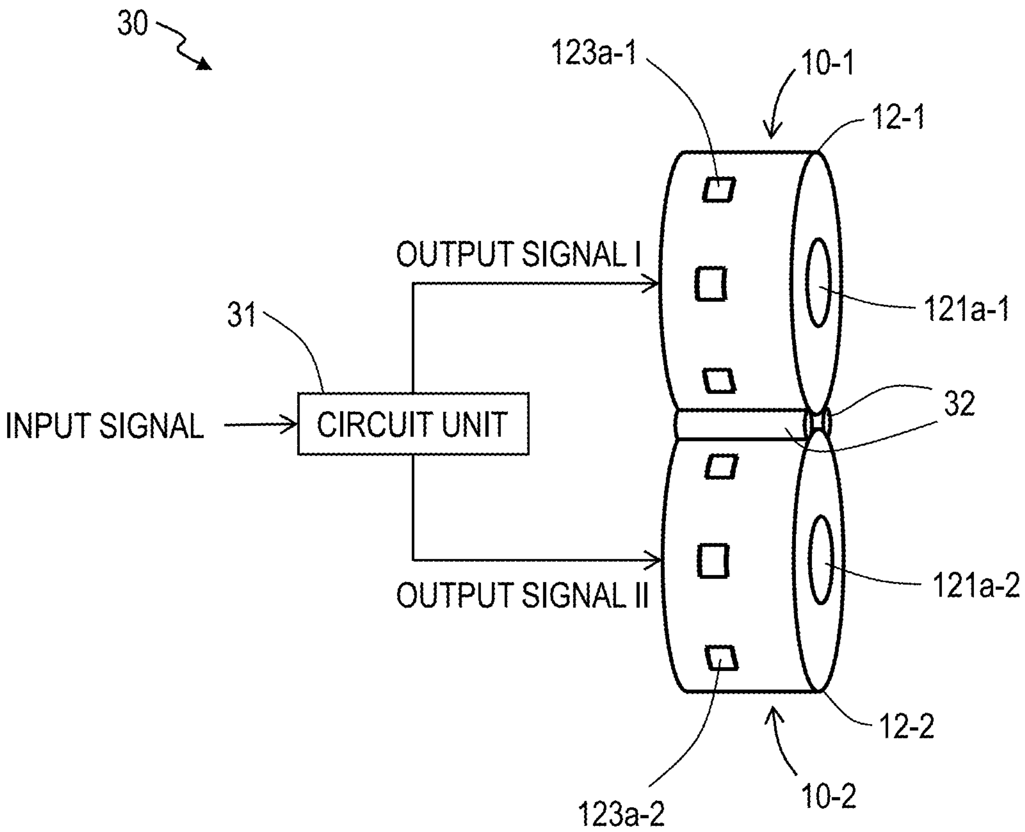
FIG. 42 is a perspective view illustrating the configuration of an acoustic signal output device of a third embodiment.
Figure 43:
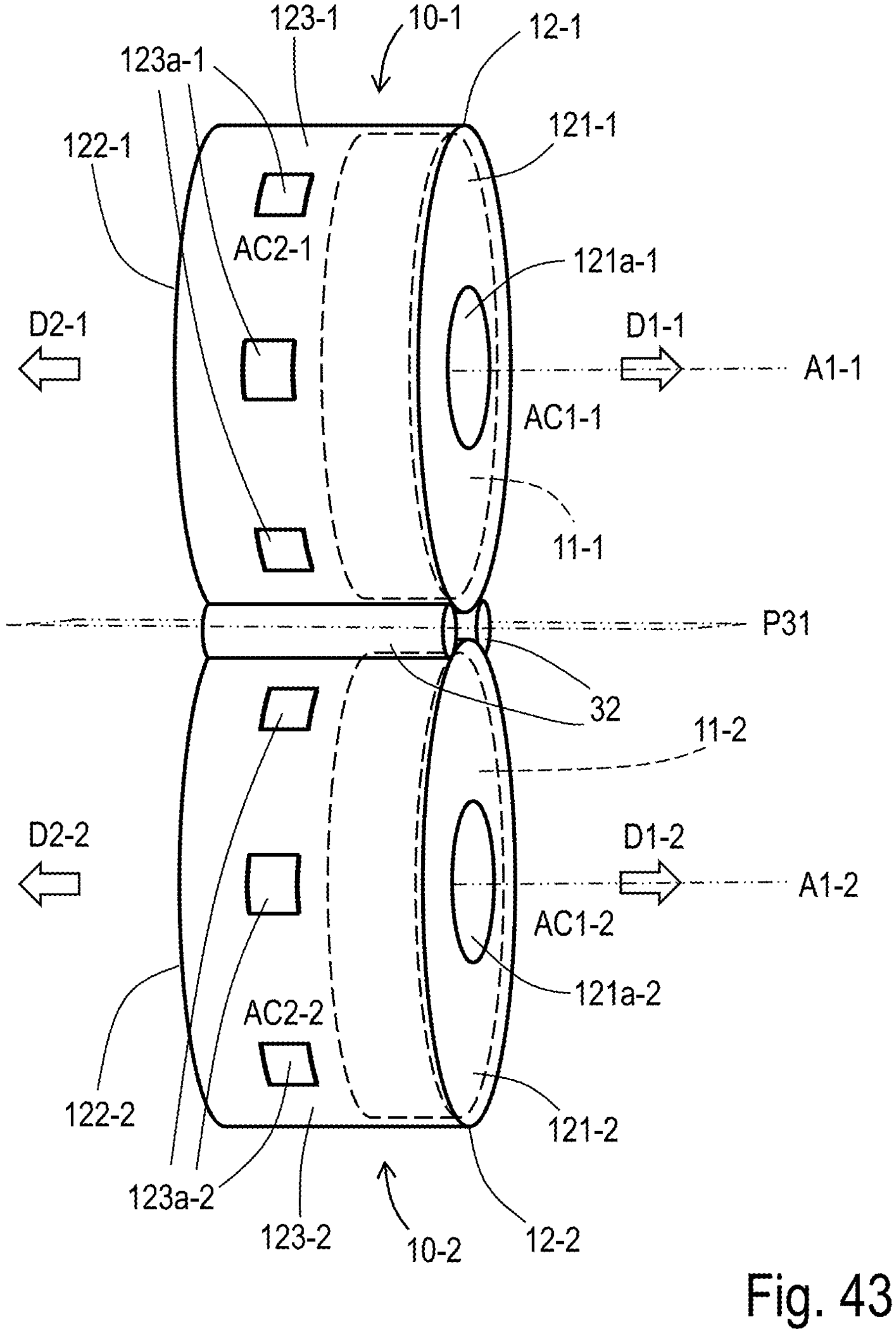
FIG. 43 is a transparent perspective view illustrating the configuration of the acoustic signal output device of the third embodiment.

An acoustic signal output device 30 of the present embodiment is an acoustic listening device that is worn without sealing the user's ear canal. As illustrated in FIGS. 42 and 43, the acoustic signal output device 30 of the present embodiment includes the acoustic signal output devices 10-1 and 10-2, a circuit unit 31, and a connecting portion 32.

<Acoustic Signal Output Device 10-1>

Figure 44:
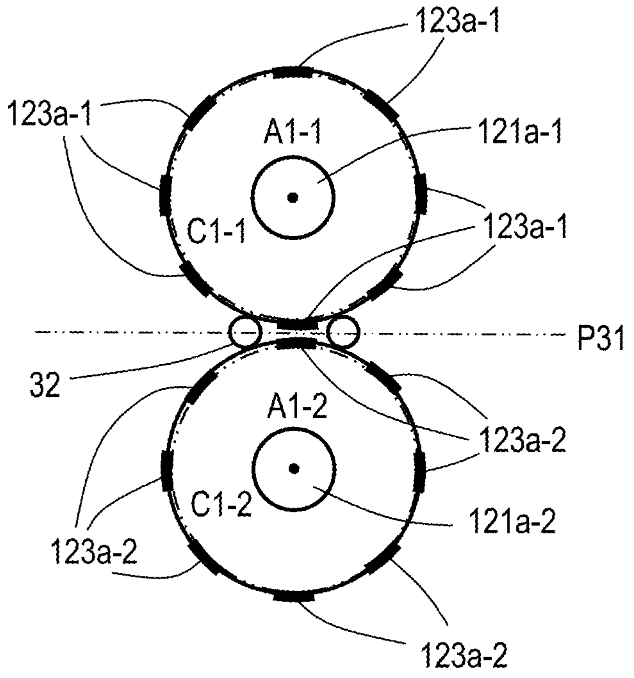
FIG. 44 is a conceptual diagram illustrating the arrangement of sound holes.

The configuration of the acoustic signal output device 10-1 is the same as the acoustic signal output device 10 illustrated in the first embodiment and its modification. That is, the acoustic signal output device 10-1 includes a driver unit 11-1 (first driver unit) and a housing 12-1 (first housing portion) that houses the driver unit 11-1 therein. The driver unit 11-1 emits an acoustic signal AC1-1 (first acoustic signal) to the D1-1-direction side (one side) based on the input output signal I (an electrical signal representing an acoustic signal), and emits an acoustic signal AC2-1 (second acoustic signal), which is a negative phase signal of the acoustic signal AC1-1 (first acoustic signal) or an approximate signal of the negative phase signal, to the D2-1-direction side (the other side). The wall 121-1 of the housing 12-1 is provided with one or more sound holes 121*a*-1 (first sound holes) for guiding the acoustic signal AC1-1 (first acoustic signal) emitted from the driver unit 11-1 to the outside. The wall 123-1 of the housing 12-1 is provided with one or more sound holes 123*a*-1 (second sound holes) for guiding the acoustic signal AC2-1 (second acoustic signal) emitted from the driver unit 11-1 to the outside. The details of the configuration of the acoustic signal output device 10-1 are the same as the acoustic signal output device 10 described in the first embodiment. For example, a plurality of sound holes 123*a*-1 (second sound holes) are provided along the circumference C1-1 (first circumference) around the axis A1-1 (first axis) parallel or substantially parallel to a straight line extending in the direction D1-1 (first direction) (FIG. 44). For example, when the circumference C1-1 (first acoustic signal) is equally divided into a plurality of first unit arc regions, a total opening area of the sound holes 123*a*-1 (second sound holes) provided along a first arc region, which is any of the first unit arc regions is the same as or approximately the same as a total opening area of the sound holes 123*a*-1 (second sound holes) provided along a second arc region, which is any of the first unit arc regions excluding the first arc region.

<Acoustic Signal Output Device 10-2>

The configuration of the acoustic signal output device 10-2 is also the same as the acoustic signal output device 10 illustrated in the first embodiment and its modification. That is, the acoustic signal output device 10-2 includes a driver unit 11-2 (second driver unit) and a housing 12-2 (second housing portion) that houses the driver unit 11-2 therein. The driver unit 11-2 emits an acoustic signal AC1-2 (fourth acoustic signal) in the D1-2 direction side (one side) based on the input output signal II (an electrical signal representing an acoustic signal), and emits an acoustic signal AC2-2 (third acoustic signal), which is a negative phase signal of the acoustic signal AC1-2 or an approximate signal of the negative phase signal, to the D2-2 direction side (the other side). The phase of the acoustic signal AC1-2 (fourth acoustic signal) is the same as or similar to the phase of the acoustic signal AC2-1 (second acoustic signal). The phase of the acoustic signal AC2-2 (third acoustic signal) is the same as or similar to the phase of the acoustic signal AC1-1 (first acoustic signal). Note that driver unit 11-2 may have the same design as the driver unit 11-1, or may have a different design from the driver unit 11-1. For example, the driver unit 11-2 may be smaller than the driver unit 11-1, or the performance of the driver unit 11-2 may be inferior to the driver unit 11-1. The wall 123-2 of the housing 12-2 is provided with one or more sound holes 123*a*-2 (third sound holes) for guiding the acoustic signal AC2-2 (third acoustic signal) emitted from the driver unit 11-2 to the outside. The wall 121-2 of the housing 12-2 is provided with one or more sound holes 121*a*-2 (fourth acoustic signal) for guiding the acoustic signal AC1-2 (fourth acoustic signal) emitted from the driver unit 11-2 to the outside. The details of the configuration of the acoustic signal output device 10-2 are the same as the acoustic signal output device 10 described in the first embodiment. For example, a plurality of sound holes 123*a*-2 (third sound holes) are provided along the circumference C1-2 (fourth circumference) around the axis A1-2 (fourth axis) parallel or substantially parallel to a straight line extending in the direction D1-2 (fourth direction) (FIG. 44). For example, when the circumference C1-2 (fourth circumference) is equally divided into a plurality of fourth unit arc regions, a total opening area of the sound holes 123*a*-2 (third sound holes) provided along a third arc region, which is any of the fourth unit arc regions is the same as or approximately the same as a total opening area of the sound holes 123*a*-2 (third sound holes) provided along a fourth arc region, which is any of the fourth unit arc regions excluding the third arc region.

<Connecting Portion 32>

As illustrated in FIG. 42, FIG. 43, and FIG. 44, the connecting portion 32 fixes the housing 12-1 of the acoustic signal output device 10-1 and the housing 12-2 of the acoustic signal output device 10-2 to each other. In the example of FIG. 43, the outside of the wall 123-1 of the housing 12-1 of the acoustic signal output device 10-1 and the outside of the wall 123-2 of the housing 12-2 of the acoustic signal output device 10-2 are joined. The sound hole 121*a*-1 (first sound hole) is open in the direction D1-1 (first direction) along the axis A1-1. Note that the direction D1-1 is a direction along the axis A1-1. The sound hole 123*a*-1 (second sound hole) is open in the direction D12-1 (second direction) between the direction D1-1 (first direction) and the opposite direction of the direction D1-1 (first direction). The sound hole 121*a*-2 (fourth sound hole) is open in the direction D1-2 (fourth direction) that is the same as or similar to the direction D1-1 (first direction). Note that the direction D1-2 is a direction along the axis A1-2. The sound hole 123*a*-2 (third sound hole) is open in the direction D12-2 (third direction) between the direction D1-2 (fourth direction) and the opposite direction of the direction D1-2 (fourth direction). However, this arrangement is just an example and the present invention is not limited thereto.

As illustrated in FIGS. 42, 43, and 44, it is preferable that the sound hole 121*a*-1 (first sound hole) and the sound hole 121*a*-2 (fourth sound hole) be plane-symmetrical or substantially plane-symmetrical with respect to a reference plane P31 that includes a straight line parallel or substantially parallel to the straight line (axis A1-1) extending in the direction D1-1 (first direction). Similarly, it is preferable that the sound hole 123*a*-1 (second sound hole) and the sound hole 123*a*-2 (third sound hole) be plane-symmetrical or substantially plane-symmetrical with respect to the reference plane P31. More preferably, the housing 12-1 (first housing portion) and the housing 12-2 (second housing portion) are plane-symmetrical or substantially plane-symmetrical with respect to the reference plane P31.

<Circuit Unit 31>

The circuit unit 31 is a circuit that uses an input signal, which is an electrical signal representing an acoustic signal, as an input, and outputs an output signal I which is an electrical signal for driving the driver unit 11-1 and an output signal II which is an electrical signal for driving the driver unit 11-2. The output signal I and the output signal II are electrical signals representing acoustic signals, and the output signal II is a negative phase signal of the output signal I or an approximate signal of the negative phase signal. The configuration of the circuit unit 31 will be described below.

Configuration Example 1 of Circuit Portion 31

Figure 45A:
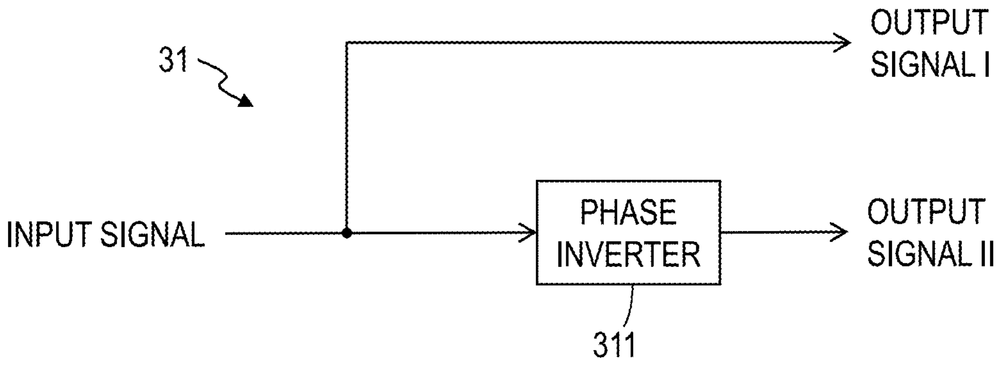
FIGS. 45A to 45C are block diagrams illustrating the configuration of a circuit unit.

The circuit unit 31 illustrated in FIG. 45A includes a phase inverter 311 that is a phase inversion circuit. The input signal input to the circuit unit 31 is output as it is as an output signal I, and is supplied to the driver unit 11-1. Furthermore, the input signal input to the circuit unit 31 is also input to the phase inverter 311. The phase inverter 311 outputs a negative phase signal of the input signal or an approximate signal of the negative phase signal as an output signal II. The output signal II is supplied to the driver unit 11-2.

Configuration Example 2 of Circuit Portion 31

Figure 45B:
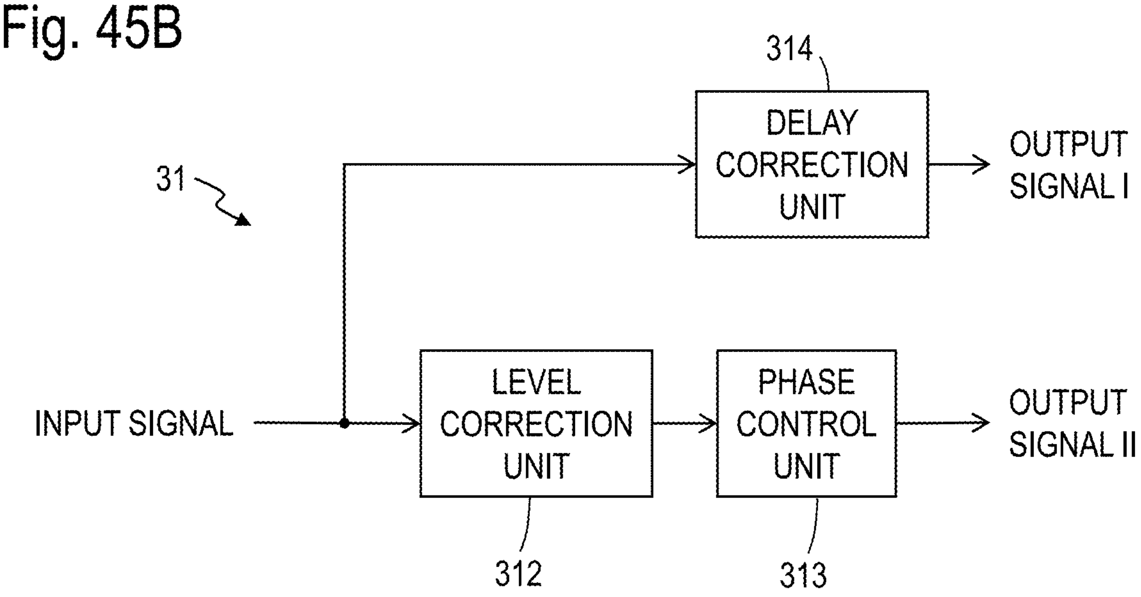

The circuit unit 31 illustrated in FIG. 45B includes a level correction unit 312, a phase control unit 313, and a delay correction unit 314. The input signal input to the circuit unit 31 is input to the level correction unit 312 and the delay correction unit 314. The level correction unit 312 adjusts the level of each frequency band of the input signal, and outputs a band-level-adjusted signal obtained thereby. That is, if the designs (caliber, structure, and the like) of the driver units 11-1 and 11-2 differ from each other, the frequency characteristics of the acoustic signals output from the driver units 11-1 and 11-2 also differ. The difference in frequency characteristics of the acoustic signals output from the driver units 11-1 and 11-2 is related to the sound leakage cancellation effect. For example, if the housings 12-1 and 12-2 are plane-symmetrical with respect to the reference plane P31, it is preferable that the frequency characteristics of the acoustic signals output from the driver units 11-1 and 11-2 be the same so that the sound leakage cancellation effect is enhanced. Therefore, it is preferable to adjust the output signals so that the frequency characteristics of the acoustic signals output from the driver units 11-1 and 11-2 are the same. On the other hand, if the housings 12-1 and 12-2 are not plane-symmetrical with respect to the reference plane P31, it is preferable to adjust the balance of the frequency characteristics of the acoustic signals output from the driver units 11-1 and 11-2 so that the sound leakage cancellation effect is enhanced according to the asymmetry. The level correction unit 312 achieves this by adjusting the level of each band of the input signal. The band-level-adjusted signal output from the level correction unit 312 is input to the phase control unit 313. The phase control unit 313 generates a negative phase signal of the band-level-adjusted signal or an approximate signal of the negative phase signal, and outputs this as an output signal II. The phase control unit 313 is, for example, a phase inversion circuit or an all-pass filter. When the phase control unit 313 is an all-pass filter, it is possible to generate a negative phase signal of the band-level-adjusted signal or an approximate signal of the negative phase signal by taking the phase characteristics of the level correction unit 312 into consideration. The output signal II is supplied to the driver unit 11-2. Furthermore, the delay correction unit 314 outputs an output signal I obtained by adjusting the amount of delay of the input signal. That is, when a delay occurs in the processing (filter processing) of the level correction unit 312 and the phase control unit 313, the delay correction unit 314 adjusts the amount of delay. In this way, the phase of the acoustic signals output from the driver units 11-1 and 11-2 can be adjusted, and the sound leakage suppression effect can be improved. The output signal I is supplied to the driver unit 11-1. As described above, in Configuration Example 2 of the circuit unit 31, the output signal I and the output signal II based on the input signal can be independently controlled.

Configuration Example 3 of Circuit Portion 31

As described above, the higher the frequencies of the acoustic signals AC1 and AC2, the shorter the wavelength thereof, making it difficult to cancel out the sound leakage component of the acoustic signal AC1 with the acoustic signal AC2. For example, this cancellation becomes difficult in a frequency range exceeding 6000 Hz. Therefore, in such a high frequency band, there is a possibility that the acoustic signal AC2 for suppressing the sound leakage component may actually accelerate sound leakage. On the other hand, with earphones and the like, the level of low frequency sounds is weak, so the influence of sound leakage is small. For example, the influence of sound leakage is small in the frequency range below 2000 Hz. Therefore, in such a low frequency band, the importance of the acoustic signal AC2 for suppressing sound leakage components is low. Furthermore, human auditory sensitivity to acoustic signals with frequencies between 2000 Hz and 6000 Hz is relatively large. In other words, the importance of the acoustic signal AC2 for suppressing the sound leakage component of the acoustic signal AC1 in such a frequency band is high.

From the above-described viewpoint, when the user listens to the acoustic signal AC1 emitted from the sound hole 121*a*-1 of the acoustic signal output device 10-1, the frequency band of the acoustic signal emitted from the acoustic signal output device 10-2 may be limited more than the frequency band of the acoustic signal emitted from the acoustic signal output device 10-1. That is, the frequency bandwidth BW-2 of the acoustic signals AC2-2 and AC1-2 (the third and fourth acoustic signals) emitted from the driver unit 11-2 (second driver unit) may be narrower than the frequency bandwidth BW-1 of the acoustic signals AC1-1 and AC2-1 (first and second acoustic signals) emitted from the driver unit 11-1 (first driver unit).

Example 31-1

For example, the magnitude (level) on the high-frequency side of the acoustic signals AC2-2 and AC1-2 may be suppressed more than the magnitude on the high-frequency side of the acoustic signals AC1-1 and AC2-1. In other words, the magnitude of the components of frequency $f_{31}$ (first frequency) or higher of the acoustic signals AC2-2 and AC1-2 (third and fourth acoustic signals) emitted from the driver unit 11-2 (second driver unit) may be smaller than the magnitude of the components of frequency $f_{31}$ or higher of the acoustic signals AC1-1 and AC2-1 (first and second acoustic signals) emitted from the driver unit 11-1 (first driver unit). For example, the driver unit 11-2 may output the acoustic signals AC2-2 and AC1-2 in which the frequency band above the frequency $f_{31}$ is suppressed. Note that specific examples of the frequency $f_{31}$ are 3000 Hz, 4000 Hz, 5000 Hz, 6000 Hz, and the like.

Example 31-2

For example, the magnitude on the low-frequency side of the acoustic signals AC2-2 and AC1-2 may be suppressed more than the magnitude on the low-frequency side of the acoustic signals AC1-1 and AC2-1. In other words, the magnitude of the components of frequency $f_{32}$ (second frequency) or lower of the acoustic signals AC2-2 and AC1-2 (third and fourth acoustic signals) emitted from the driver unit 11-2 (second driver unit) may be smaller than the magnitude of the components of frequency $f_{32}$ or lower of the acoustic signals AC1-1 and AC2-1 (first and second acoustic signals) emitted from the driver unit 11-1 (first driver unit). For example, the driver unit 11-2 may output the acoustic signals AC2-2 and AC1-2 in which the frequency band below the frequency $f_{32}$ is suppressed. Note that specific examples of the frequency $f_{32}$ are 1000 Hz, 2000 Hz, 3000 Hz, and the like.

Example 31-3

For example, the magnitude on the high-frequency side of the acoustic signals AC2-2 and AC1-2 may be suppressed more than the magnitude on the high-frequency side of the acoustic signals AC2-1 and AC1-1, and the magnitude on the low-frequency side of the acoustic signals AC2-2 and AC1-2 may be suppressed more than the magnitude on the low-frequency side of the acoustic signals AC2-1 and AC1-1. For example, the driver unit 11-2 may output the acoustic signals AC2-2 and AC1-2 in which a frequency band below frequency $f_{32}$ and a frequency band above frequency $f_{31}$ are suppressed (for example, the acoustic signals AC2-2 and AC1-2 containing only signals in a frequency band between frequency $f_{32}$ and frequency $f_{31}$).

Configuration Example 3 of the circuit unit 31 that realizes these will be described below.

Figure 45C:
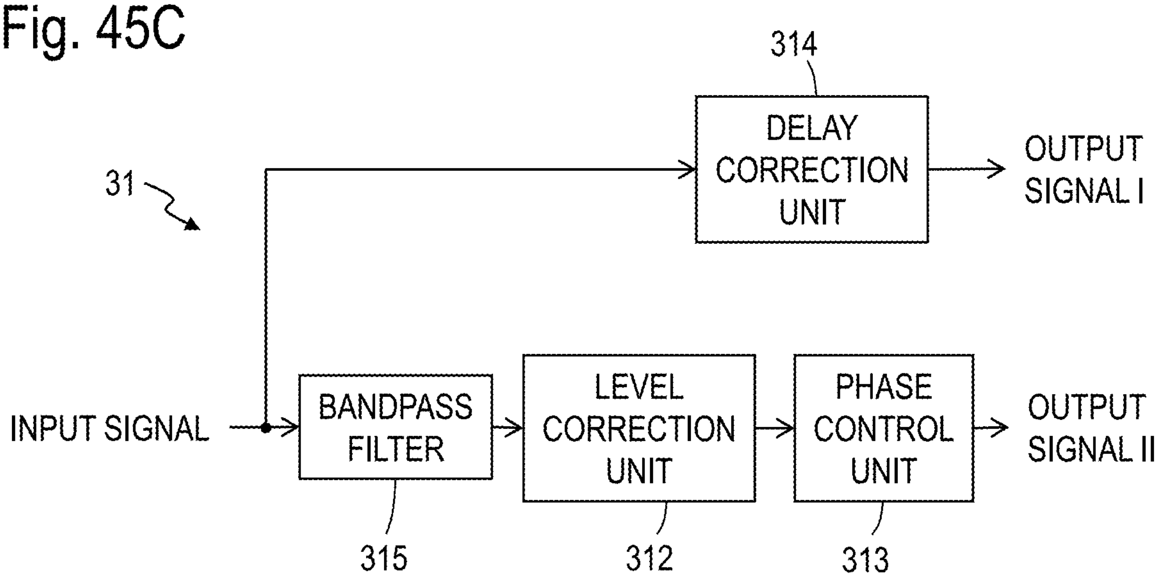

As illustrated in FIG. 45C, the circuit unit 31 in this example includes a level correction unit 312, a phase control unit 313, a delay correction unit 314, and a bandpass filter 315. The input signal input to the circuit unit 31 is input to the bandpass filter 315 and the delay correction unit 314. The bandpass filter 315 obtains and outputs a band-limited signal in which the band of the input signal is limited (narrowed). In the case of Example 31-1 described above, a signal in which the high-frequency side of the input signal (for example, a frequency band above frequency $f_{31}$) is suppressed is output as a band-limited signal. In the case of Example 31-2 above, a signal in which the low-frequency side (for example, a frequency band below frequency $f_{32}$) of the input signal is suppressed is output as a band-limited signal. In the case of Example 31-3 above, a signal in which the high-frequency side (for example, the frequency band above frequency $f_{31}$) and the low-frequency side (for example, the frequency band below frequency $f_{32}$) of the input signal is suppressed is output as a band-limited signal.

The band-limited signal is input to the level correction unit 312. The level correction unit 312 adjusts the level of each band of the band-limited signal, and outputs a band-level-adjusted signal obtained thereby. The band-level-adjusted signal output from the level correction unit 312 is input to the phase control unit 313. The phase control unit 313 generates a negative phase signal of the band-level-adjusted signal or an approximate signal of the negative phase signal, and outputs this as an output signal II. The output signal II is supplied to the driver unit 11-2. Furthermore, the delay correction unit 314 outputs an output signal I obtained by adjusting the amount of delay of the input signal.

<Usage State>

Figure 46:
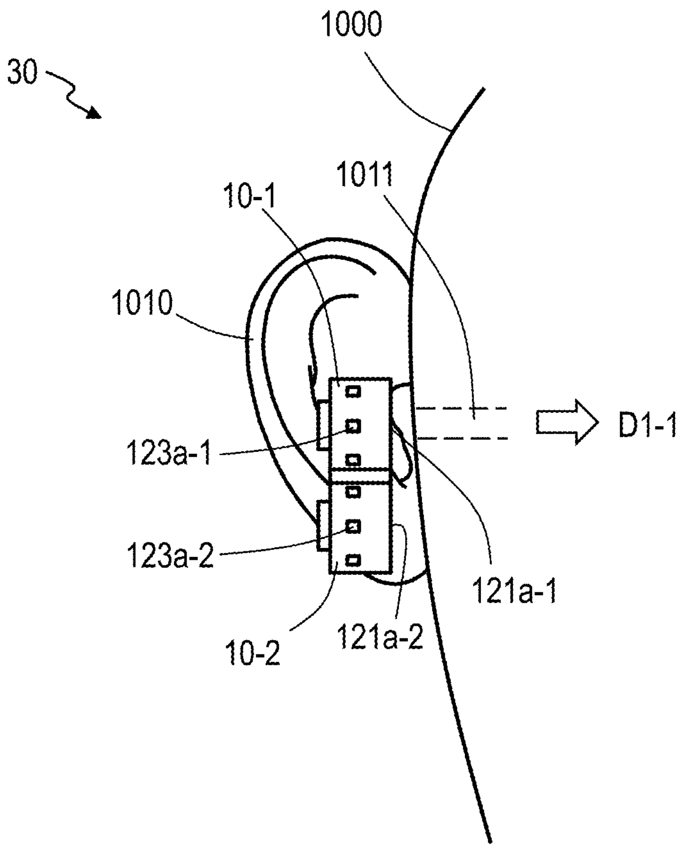
FIG. 46 is a diagram illustrating the usage state of the acoustic signal output device of the third embodiment.

Using FIG. 46, the usage state of the acoustic signal output device 30 will be described. One acoustic signal output device 30 is worn on each of the right ear 1010 and the left ear (not shown) of the user 1000 in FIG. 46. The D1-direction side of each acoustic signal output device 10-1 of the acoustic signal output device 30 is directed toward the ear canal 1011 side of the user 1000. Furthermore, the acoustic signal output device 10-2 is disposed at a position offset from the ear canal 1011. For example, when the acoustic signal output device 30 is worn on the ear, the sound hole 121*a*-1 (first sound hole) is disposed toward the ear canal 1011, the sound hole 123*a*-1 (second sound hole), the sound hole 123*a*-2 (third sound hole) and the sound hole 121*a*-2 (fourth sound hole) are arranged toward a direction other than the ear canal 1011. An arbitrary wearing mechanism is used to wear the acoustic signal output device 30 on the ear. The user 1000 hears the acoustic signal AC1-1 (first acoustic signal) emitted from the sound hole 121*a*-1 (first sound hole) of the acoustic signal output device 10-1. On the other hand, a portion of the acoustic signal AC2-1 (second acoustic signal) emitted from the sound hole 123*a*-1 (second sound hole) cancels out a portion of the acoustic signal AC1-1 (first acoustic signal) emitted from the sound hole 121*a*-1 (first sound hole). Also, a portion of the acoustic signal AC2-2 (third acoustic signal) emitted from the sound hole 123*a*-2 (third sound hole) cancels out a portion of the acoustic signal AC1-2 (fourth acoustic signal) emitted from the sound hole 121*a*-2 (fourth sound hole). Also, a portion of the acoustic signal AC2-2 (third acoustic signal) emitted from the sound hole 123*a*-2 (third sound hole) cancels out a portion of the acoustic signal AC2-1 (second acoustic signal) emitted from the sound hole 123*a*-1 (second sound hole). Also, a portion of the acoustic signal AC1-2 (fourth acoustic signal) emitted from the sound hole 121*a*-2 (fourth sound hole) cancels out a portion of the acoustic signal AC1-1 (first acoustic signal) emitted from the sound hole 121*a*-1 (first sound hole). That is, in the present embodiment, the acoustic signal AC1-1 (first acoustic signal) is emitted from the sound hole 121*a*-1 (first sound hole), the acoustic signal AC2-1 (second acoustic signal) is emitted from the sound hole 123*a*-1 (second sound hole), the acoustic signal AC2-2 (third acoustic signal) is emitted from the sound hole 123*a*-2 (third sound hole), and the acoustic signal AC1-2 (fourth acoustic signal) is emitted from the sound hole 121*a*-2 (fourth sound hole). In this case, an attenuation rate $\eta_{11}$ of the acoustic signal AC1-1 (first acoustic signal) at the position P2 (second point) with respect to the position P1 (first point) is equal to or smaller than a predetermined value th, which is smaller than an attenuation rate $\eta_{21}$ of the acoustic signal due to air propagation at the position P2 (second point) with respect to the position P1 (first point). Alternatively, in this case, an attenuation amount $\eta_{12}$ of the acoustic signal AC1-1 (first acoustic signal) at the position P2 (second point) with respect to the position P1 (first point) is equal to or larger than a predetermined value $\omega_{th}$, which is larger than an attenuation amount $\eta_{22}$ of the acoustic signal due to air propagation at the position P2 (second point) with respect to the position P1 (first point). Note that the position P1 (first point) in the present embodiment is a predetermined point where the acoustic signal AC1-1 (first acoustic signal) emitted from the sound hole 121*a*-1 (first sound hole) reaches.

On the other hand, position P2 (second point) in the present embodiment is a predetermined point that is farther from the acoustic signal output device 30 than the position P1 (first point). With the above, the sound leakage component from the acoustic signal output device 30 is canceled out. In particular, in the present embodiment, the relative level of the driver unit 11-2 to the driver unit 11-1 can be controlled, the sound leakage can be further reduced compared to the case where one driver unit 11 is used as in the first embodiment.

Further, as described in Configuration Example 3 of the circuit unit 31, when the user listens to the acoustic signal AC1 emitted from the sound hole 121*a*-1 of the acoustic signal output device 10-1, a sufficient sound leakage suppression effect can be expected by limiting the frequency band of the acoustic signal emitted from the acoustic signal output device 10-2 more than the frequency band of the acoustic signal emitted from the acoustic signal output device 10-1. For example, as in Example 31-1, when the magnitude on the high-frequency side of the acoustic signals AC2-2 and AC1-2 (for example, the high-frequency side where it is difficult to suppress sound leakage through cancellation) is further suppressed than the magnitude on the high-frequency side of the acoustic signals AC2-1 and AC1-1, it is possible to suppress sound leakage from being accelerated on the high-frequency side. For example, as in Example 31-2, even when the magnitude on the low-frequency side of the acoustic signals AC2-2 and AC1-2 is further suppressed than the magnitude on the low-frequency side of the acoustic signals AC2-1 and AC1-1, the influence of sound leakage is small in applications where the level of low frequency sound is weak, such as in earphones. Further, even if the driver unit 11-2 is smaller or has lower performance than the driver unit 11-1, a sufficient sound leakage suppression effect can be expected.

Modification 1 of Third Embodiment

Figure 47A:
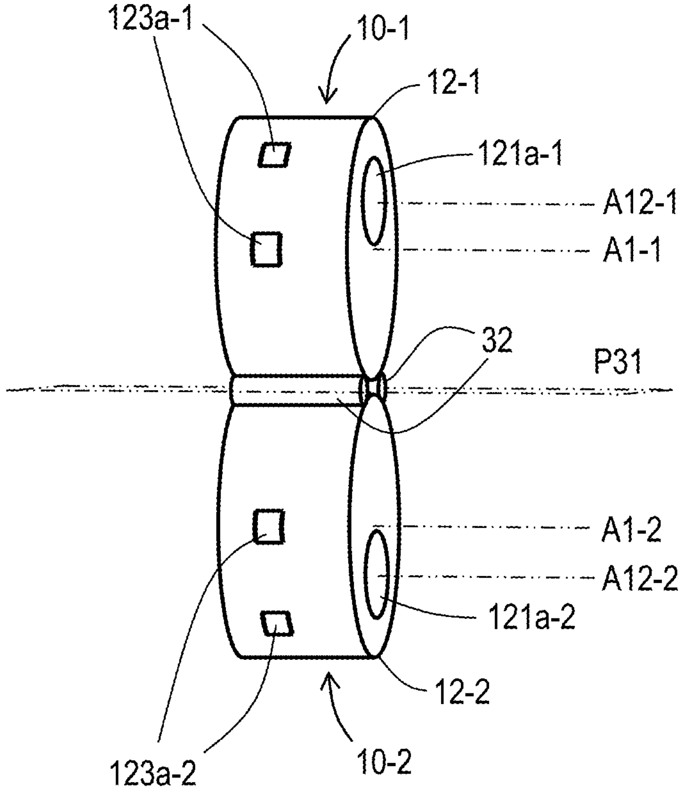
FIG. 47A is a perspective view illustrating a modification of the acoustic signal output device of the third embodiment.
Figure 47B:
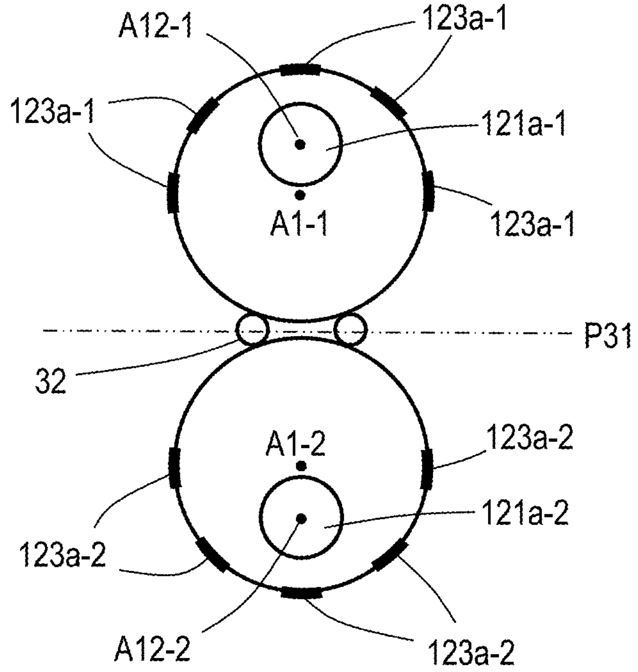
FIG. 47B is a conceptual diagram illustrating a modification of the arrangement of sound holes.

The acoustic signal output devices 10-1 and 10-2 may be the acoustic signal output device 10 described in the modification of the first embodiment. For example, as illustrated in FIG. 47A, the position of the sound hole 121a-1 (first sound hole) may be biased toward a first eccentric position (a position on the axis A12-1 parallel to the axis A1-1 offset from the axis A1-1) offset from the axis A1-1 (first central axis) passing through the central region of the housing 12-1 (first housing portion) and extending in the direction D1-1 (the first direction). Further, as illustrated in FIG. 47B, when the circumference C1-1 (first circumference) is equally divided into a plurality of first unit arc regions, a total opening area of the sound holes 123a-1 (second sound holes) provided along a first arc region which is any of first unit arc regions may be smaller than a total opening area of the sound holes 123a-1 (second sound holes) provided along a second arc region which is any of the first unit arc regions closer to the first eccentric position than the first arc region. Similarly, for example, the position of the sound hole 121a-2 (fourth sound hole) may be biased toward a fourth eccentric position (a position on the axis A12-2 parallel to the axis A1-2 offset from the axis A1-2) offset from the axis A1-2 (second central axis) passing through the central region of the housing 12-2 (second housing portion) and extending in the direction D1-2 (fourth direction). Furthermore, as illustrated in FIG. 47B, when the circumference C1-2 (fourth circumference) is equally divided into a plurality of second unit arc regions, a total opening area of the sound holes 121a-2 (fourth sound holes) provided along a third arc region which is any of the second unit arc regions may be smaller than a total opening area of the fourth sound holes provided along the fourth arc region which is any of the second unit arc regions closer to the fourth eccentric position than the third arc region. Even in such a case, preferably, the sound hole 121a-1 (first sound hole) and the sound hole 121a-2 (fourth sound hole) are plane-symmetrical or substantially plane-symmetrical with respect to a reference plane P31 including a straight line parallel or substantially parallel to a straight line (axis A1-1) extending in the direction D1-1 (first direction). Similarly, it is preferable that the sound hole 123a-1 (second sound hole) and the sound hole 123a-2 (third sound hole) be plane-symmetrical or substantially plane-symmetrical with respect to the reference plane P31. More preferably, the housing 12-1 (first housing portion) and the housing 12-2 (second housing portion) are plane-symmetrical or substantially plane-symmetrical with respect to the reference plane P31. Furthermore, the acoustic absorbent described in the modification of the first embodiment may be provided on at least one of the acoustic signal output devices 10-1 and 10-2.

Modification 2 of Third Embodiment

Figure 48A:
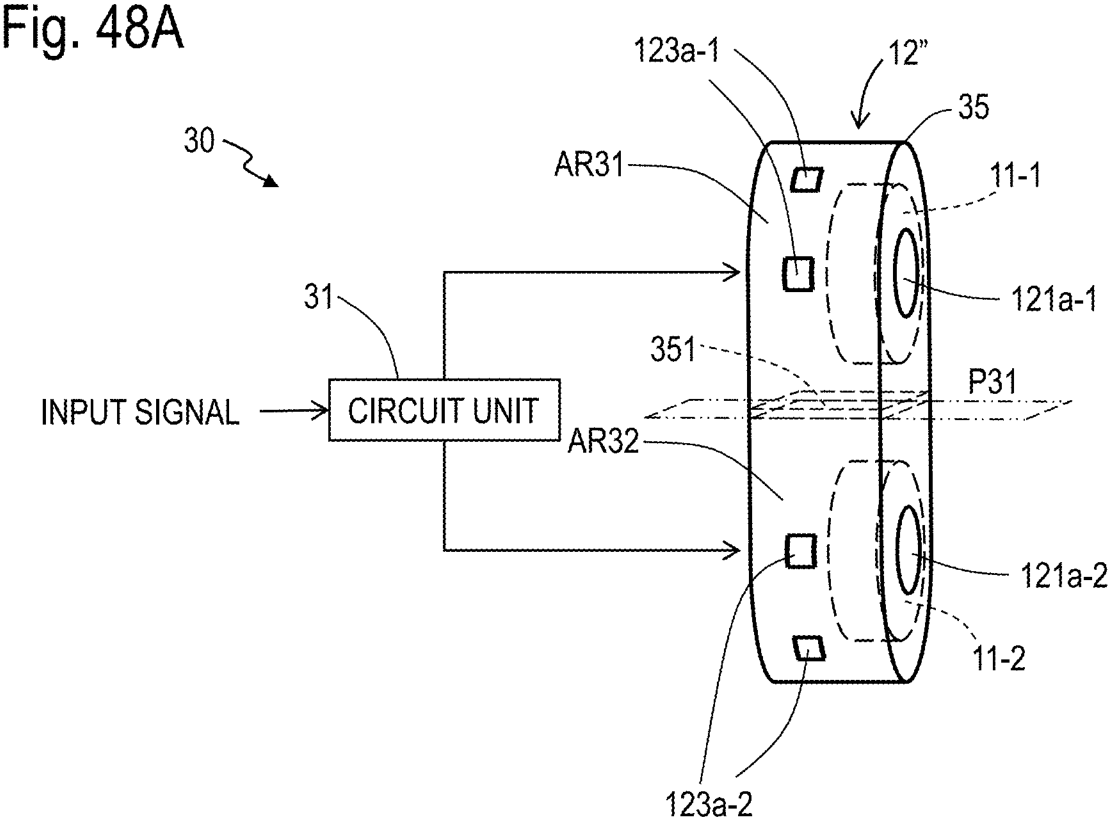
FIG. 48A is a transparent perspective view illustrating a modification of the acoustic signal output device of the third embodiment.

In the third embodiment, the housing 12-1 (first housing portion) of the acoustic signal output device 10-1 and the housing 12-2 (second housing portion) of the acoustic signal output device 10-2 may be integrated. For example, as illustrated in FIG. 48A, the housing 12-1 of the acoustic signal output device 10-1 and the housing 12-2 of the acoustic signal output device 10-2 may be replaced with an integrated housing 12", a region AR31 where the driver unit 11-1 is housed and a region AR32 where the driver unit 11-2 is housed may be partitioned by a wall 351 provided inside the housing 12", and the region AR31 may be separated from the region AR32. Note that when the region AR31 and the region AR32 are partitioned by the wall 351, it is possible to prevent a portion of the acoustic signal AC1-1 and a portion of the acoustic signal AC1-2 from canceling out each other inside the housing 12", and prevent a portion of the acoustic signal AC2-1 and a portion of the acoustic signal AC2-2 from canceling out each other out. Therefore, it is preferable that the region AR31 and the region AR32 be partitioned by the wall 351. However, the region AR31 and the region AR32 may not be partitioned by the wall 351. In other words, some of the acoustic signals AC1-1 and AC2-1 emitted from the driver unit 11-1 may not be emitted from any of the sound holes 121a-1, 123a-1, 121a-2, and 123a-2, but may be canceled out by some of the acoustic signals AC1-2 and AC2-2 emitted from the driver unit 11-2 inside the housing 12". Even in this case, the components of the acoustic signals AC1-1, AC2-1, AC1-2, and AC2-2 that are not canceled out inside the housing 12" are emitted to the outside from any of the sound holes 121a-1, 123a-1, 121a-2, and 123a-2. For example, among the acoustic signals AC1-1 and AC2-1 emitted from the driver unit 11-1, the components that are not canceled out inside the housing 12" are emitted to the outside from any of the sound holes 121a-1, 123a-1, 121a-2, and 123a-2. Naturally, the components are canceled out by some of the components of other acoustic signals emitted from either of the driver units 11-1 and 11-2 and emitted to the outside from any of the sound holes 121a-1, 123a-1, 121a-2, 123a-2. Therefore, even in such a case, the effect of suppressing sound leakage can be obtained. Furthermore, even if the housing 12-1 and the housing 12-2 are integrated as the housing 12", it is preferable that the sound hole 121a-1 (first sound hole) and the sound hole 121a-2 (fourth sound hole) be plane-symmetrical or substantially plane-symmetrical with respect to the reference plane P31. Similarly, it is preferable that the sound hole 123a-1 (second sound hole) and the sound hole 123a-2 (third sound hole) be plane-symmetrical or substantially plane-symmetrical with respect to the reference plane P31. More preferably, it is preferable that the housing 12-1 (first housing portion) and the housing 12-2 (second housing portion) be plane-symmetrical or substantially plane-symmetrical with respect to the reference plane P31. Furthermore, the acoustic absorbent described in the modification of the first embodiment may be provided inside the housing 12" or in any of the sound holes 121a-1, 121a-2, 123a-1, and 123a-2. The rest is the same as the third embodiment or its modification 1.

Modification 3 of Third Embodiment

Figure 48B:
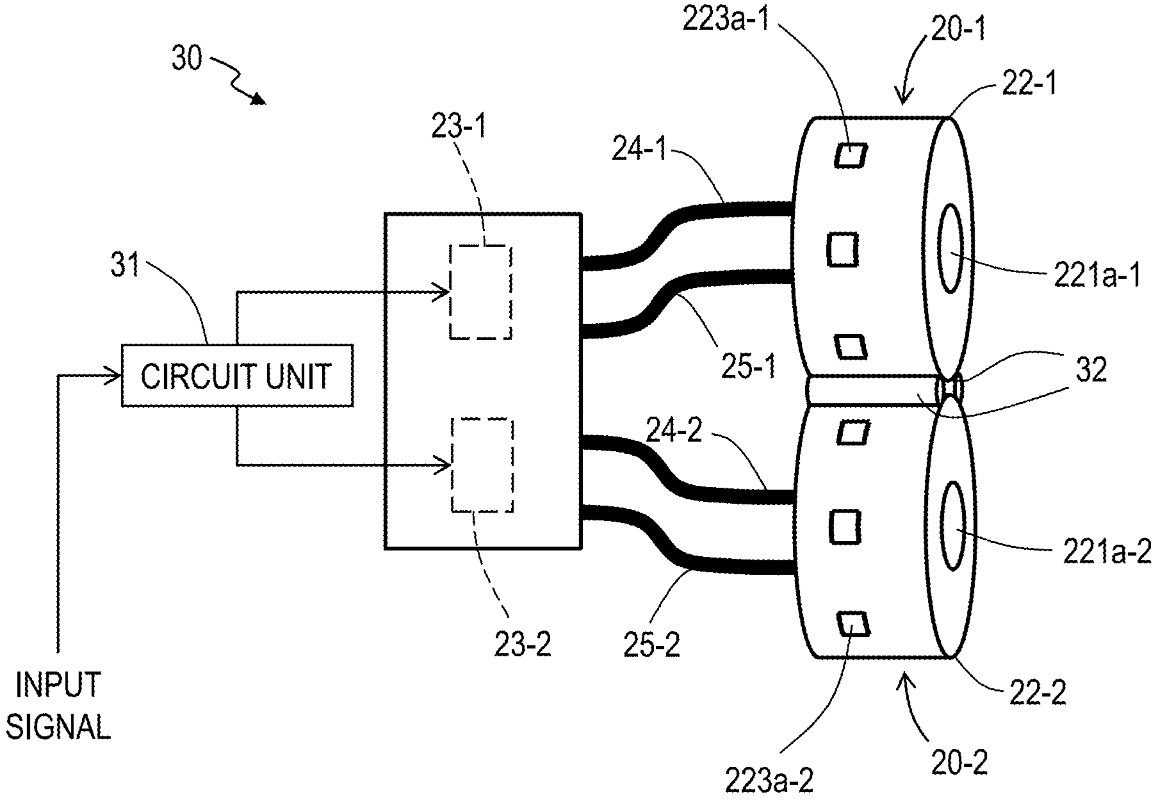
FIG. 48B is a diagram illustrating a modification of the acoustic signal output device of the third embodiment.

Instead of the acoustic signal output devices 10-1 and 10-2 of the third embodiment, acoustic signal output devices 20-1 and 20-2 having the same configuration as the acoustic signal output device 20 of the second embodiment may be used. For example, as illustrated in FIG. 48B, the housings 22-1 and 22-2 of the acoustic signal output devices 20-1 and 20-2 may be joined by the connecting portion 32, and as described in the second embodiment, the housings 22-1 and 23-1 may be connected by waveguides 24-1 and 25-1, and the housings 22-2 and 23-2 may be connected by waveguides 24-2 and 25-2. The circuit unit 31 supplies an output signal I to the driver unit 11-1 housed in the housing 23-1, and supplies an output signal II to the driver unit 11-2 housed in the housing 23-2. As described in the second embodiment, the acoustic signal AC1-1 sent from the housing 23-1 to the housing 22-1 through the waveguides 24-1 and 25-1 is emitted from the sound hole 221a-1, the acoustic signal AC2-1 is emitted from the sound hole 223a-1. Similarly, the acoustic signal AC1-2 sent from the housing 23-2 to the housing 22-2 through the waveguides 24-2 and 25-2 is emitted from the sound hole 221a-2, and the acoustic signal AC2-2 is emitted from the sound hole 223a-2. Other matters are the same as the third embodiment or its modifications 1 and 2 except that the housings 12-1 and 12-2, the sound holes 121$a$-1, 121$a$-2, 123$a$-1, and 123$a$-2, the walls 121-1, 121-2, 122-1, 122-2, 123-1, and 123-2 are replaced with the housings 22-1 and 22-2, the sound hole 221$a$-1, 221$a$-2, 223$a$-1, and 223$a$-2, and the walls 221-1, 221-2, 222-1, 222-2, 223-1, and 223-2. In addition, the housing 23-1 may be connected to the housing 22-1 by the waveguides 24-1 and 25-1, and connected to the housing 23-1 by the waveguides 24-2 and 25-2. In this case, the circuit unit 31 supplies the output signal I to the driver unit 11-1 housed in the housing 23-1. The acoustic signal AC1-1 sent from the housing 23-1 to the housing 22-1 through the waveguides 24-1 and 25-1 is emitted from the sound hole 221$a$-1, and the acoustic signal AC2-1 is emitted from the sound hole 223$a$-1. Similarly, the acoustic signal AC1-2 sent from the housing 23-1 to the housing 22-2 through the waveguides 24-2 and 25-2 is emitted from the sound hole 221$a$-2, and the acoustic signal AC2-2 is emitted from the sound hole 223$a$-2. Furthermore, the housing 23-1 may be connected to k housings 22-κ by waveguides 24-κ and 25-κ. Here, $\kappa=1, \ldots, \kappa_{max}$, and $\kappa_{max}$ is an integer of 2 or more. In this case, the circuit unit 31 supplies the output signal I to the driver unit 11-1 housed in the housing 23-1. The acoustic signal AC1-κ sent from the housing 23-1 to the housing 22-κ through the waveguides 24-κ and 25-κ is emitted from the sound hole 221$a$-κ, and the acoustic signal AC2-κ is emitted from the sound hole 223$a$-κ. In such a case, the housing 23-2 and the driver unit 11-2 may be omitted, and the circuit unit 31 may not output the output signal II. Alternatively, the housing 23-2 and the driver unit 11-2 may not be omitted, and the housing 23-2 may be further connected to another housing 22-γ by waveguides 24-γ and 25-γ. Here, $\gamma=\kappa_{max}+1, \ldots, \gamma_{max}$, and $\gamma_{max}$ is an integer larger than $\kappa_{max}$. In this case, the output signal II output from the circuit unit 31 is further supplied to the driver unit 11-2 housed in the housing 22-2, the acoustic signal AC1-γ sent from the housing 23-2 to the housing 22-γ through the waveguides 24-γ and 25-γ is emitted from the sound hole 221$a$-$y$, and the acoustic signal AC2-γ is emitted from the sound hole 223$a$-$y$. That is, it is only sufficient that the acoustic signal AC1-1 (first acoustic signal) emitted from any one of a single or multiple driver units is emitted to the outside from the sound hole 221$a$-1 (first sound hole). Further, it is only sufficient that the acoustic signal AC2-1 (second acoustic signal) emitted from any one of the single or multiple driver units is emitted to the outside from the sound hole 123$a$-1 (second sound hole). Further, it is only sufficient that the acoustic signal AC2-2 (third acoustic signal) emitted from any one of the single or multiple driver units is emitted from the sound hole 123$a$-2 (third sound hole). Further, it is only sufficient that the acoustic signal AC1-2 (fourth acoustic signal) emitted from any one of the single or multiple driver units is emitted to the outside from the sound hole 221$a$-2 (fourth sound hole). In other words, the acoustic signal AC1-1 (first acoustic signal) and the acoustic signal AC2-2 (third acoustic signal) may be the same signal emitted from the same driver unit, or they may be different signals emitted from different driver units. Similarly, the acoustic signal AC2-1 (second acoustic signal) and the acoustic signal AC1-2 (fourth acoustic signal) may be the same signal emitted from the same driver unit, or they may be different signals emitted from different driver units.

Fourth Embodiment

The fourth embodiment illustrates an example in which an acoustic signal output device that is worn on both ears without sealing the user's ear canal emits monaural acoustic signals whose phases are inverted to each other toward the left and right ears. Such an acoustic signal output device emits a portion of the monaural acoustic signal not only toward the user's ear canal but also toward the outside of the user. However, since monaural acoustic signals whose phases are inverted to each other are emitted, the monaural acoustic signals propagating outward from the user cancel each other out, reducing sound leakage.

Figure 49A:
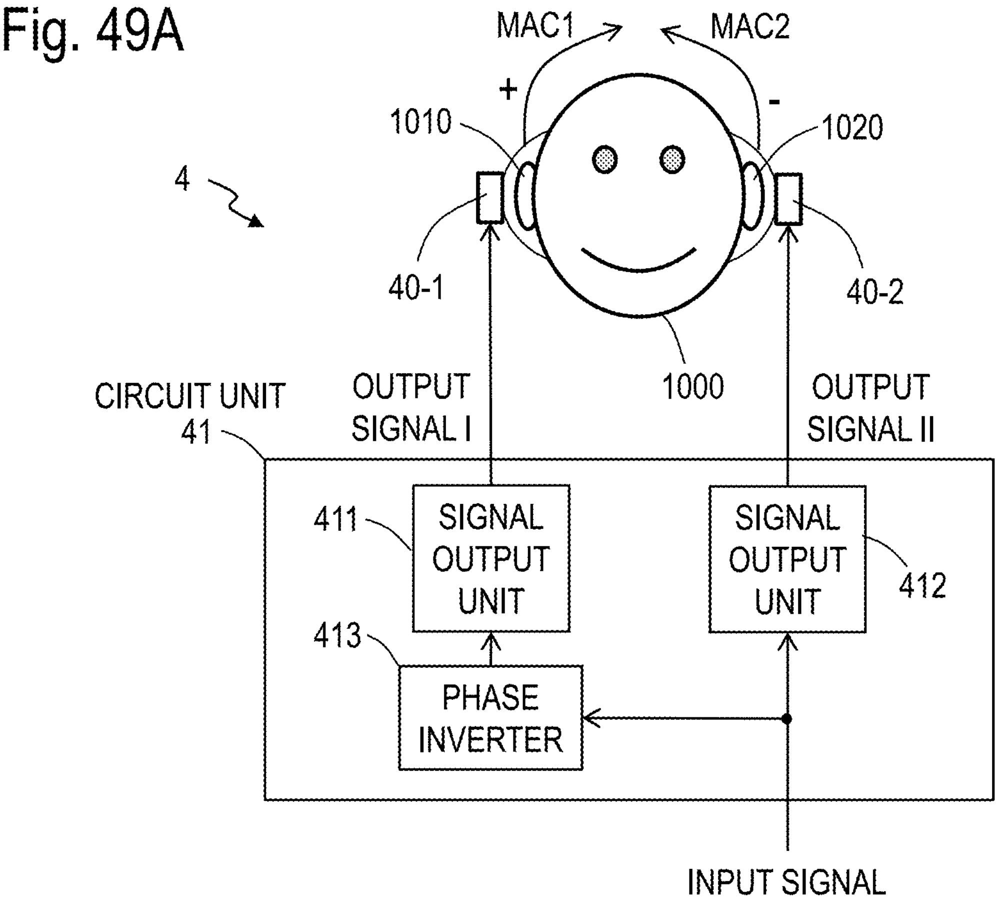
FIG. 49A is a diagram illustrating the configuration of an acoustic signal output device of a fourth embodiment.

As illustrated in FIG. 49A, the acoustic signal output device 4 of the present embodiment includes an acoustic signal output unit 40-1 (first acoustic signal output unit) that is worn on the right ear (one ear) 1010 of the user 1000, an acoustic signal output unit 40-2 (second acoustic signal output unit) that is worn on the left ear (the other ear) 1020, and a circuit unit 41.

<Circuit Portion 41>

The circuit unit 41 is a circuit that uses an input signal that is an electrical signal representing a monaural acoustic signal as an input, and generates and outputs an output signal I to be supplied to the acoustic signal output unit 40-1 and an output signal II to be supplied to the acoustic signal output unit 40-2. The circuit unit 41 of the present embodiment includes signal output units 411 and 412 and a phase inverter 413. The input signal is input to the phase inverter 413 and the signal output unit 412. The phase inverter 413 outputs an output signal I (first output signal) that is a negative phase signal of the input signal or an approximate signal of the negative phase signal. The signal output unit 411 (first signal output unit) outputs the output signal I (first output signal) to the acoustic signal output unit 40-1 (first acoustic signal output unit). That is, the signal output unit 411 (first signal output unit) outputs the output signal I (first output signal) for outputting a monaural acoustic signal MAC1 (first monaural acoustic signal) from the acoustic signal output unit 40-1 (first acoustic signal output unit) worn on the right ear (one ear) 1010. Further, the signal output unit 412 outputs the input signal as it is to the acoustic signal output unit 40-2 (second acoustic signal output unit) as an output signal II (second output signal). That is, the signal output unit 412 outputs an output signal II (second output signal) for outputting a monaural acoustic signal MAC2 (second monaural acoustic signal) from the acoustic signal output unit 40-2 (second acoustic signal output unit) worn on the left ear (the other ear) 1020.

<Acoustic Signal Output Portion 40-1 and 40-2>

The acoustic signal output units 40-1 and 40-2 are audio listening devices that are worn on both ears of the user without sealing the ear canal. The output signal I is input to the acoustic signal output unit 40-1, and the acoustic signal output unit 40-1 converts the output signal I into a monaural acoustic signal MAC1 (a phase that is the same or approximately the same as the phase of the monaural acoustic signal MAC1 is represented as "+") and emits it toward the ear canal of the right ear 1010. The output signal II is input to the acoustic signal output unit 40-2, and the acoustic signal output unit 40-2 converts the output signal II into a monaural acoustic signal MAC2 (a phase that is the same or approximately the same as the phase of the monaural acoustic signal MAC2 is represented as "−") and emits it toward the ear canal of the left ear 1020. Here, the monaural acoustic signal MAC2 is a negative phase signal of the monaural acoustic signal MAC1 or an approximate signal of the negative phase signal of the monaural acoustic signal MAC1. However, even if the phases of the acoustic signals perceived by the left and right ears are inverted, almost no problems arise in terms of listening. In addition, portions of the emitted monaural acoustic signals MAC1 and MAC2 are also emitted to the outside of both ears, but since the monaural acoustic signals MAC1 and MAC2 are in opposite phase or approximately in opposite phase to each other, they cancel each other. That is, a portion of the emitted monaural acoustic signal MAC1 (first monaural acoustic signal) and the emitted monaural acoustic signal MAC2 (a portion of the second monaural acoustic signal) are canceled by interfering with each other on the outer side of the acoustic signal output unit 40-1 (first acoustic signal output unit) (the outer side of the user 1000, that is, the side opposite to the right ear 1010 side) worn on the right ear 1010 (one ear), and/or on the outer side of the acoustic signal output unit 40-2 (second acoustic signal output unit) (the outer side of the user 1000, that is, the side opposite to the left ear 1020) worn on the left ear 1020 (the other ear). In other words, as described above, the monaural acoustic signal MAC1 (first monaural acoustic signal) is output from the acoustic signal output unit 40-1 (first acoustic signal output unit), and the monaural acoustic signal MAC2 (second monaural acoustic signal) is output from the acoustic signal output unit 40-2 (second acoustic signal output unit). In this case, the attenuation rate $\eta_{11}$ of the monaural acoustic signal MAC1 (first monaural acoustic signal) at the position P2 (second point) with respect to the position P1 (first point) is equal to or smaller than a predetermined value $\eta_{th}$ which is smaller than the attenuation rate $\eta_{21}$ of the acoustic signal due to air propagation at the position P2 (second point) with respect to the position P1 (first point). Alternatively, in this case, the attenuation amount $\eta_{12}$ of the first monaural acoustic signal at the position P2 (second point) with respect to the position P1 (first point) is equal to or larger than a predetermined value $\omega_{th}$ which is larger than the attenuation amount $\eta_{22}$ of the acoustic signal due to air propagation at the position P2 (second point) with respect to the position P1 (first point). However, the position P1 (first point) in the present embodiment is a predetermined position where the monaural acoustic signal MAC1 (first monaural acoustic signal) reaches. Furthermore, the position P2 (second point) in the present embodiment is farther from the acoustic signal output unit 40-1 (first acoustic signal output unit) than the position P1 (first point). As a result, sound leakage is suppressed.

Modification 1 of Fourth Embodiment

Instead of the acoustic signal output units 40-1 and 40-2, the acoustic signal output device 10 of the first embodiment or a modification thereof may be used, or the acoustic signal output device 20 of the second embodiment or a modification thereof may be used.

Figure 49B:
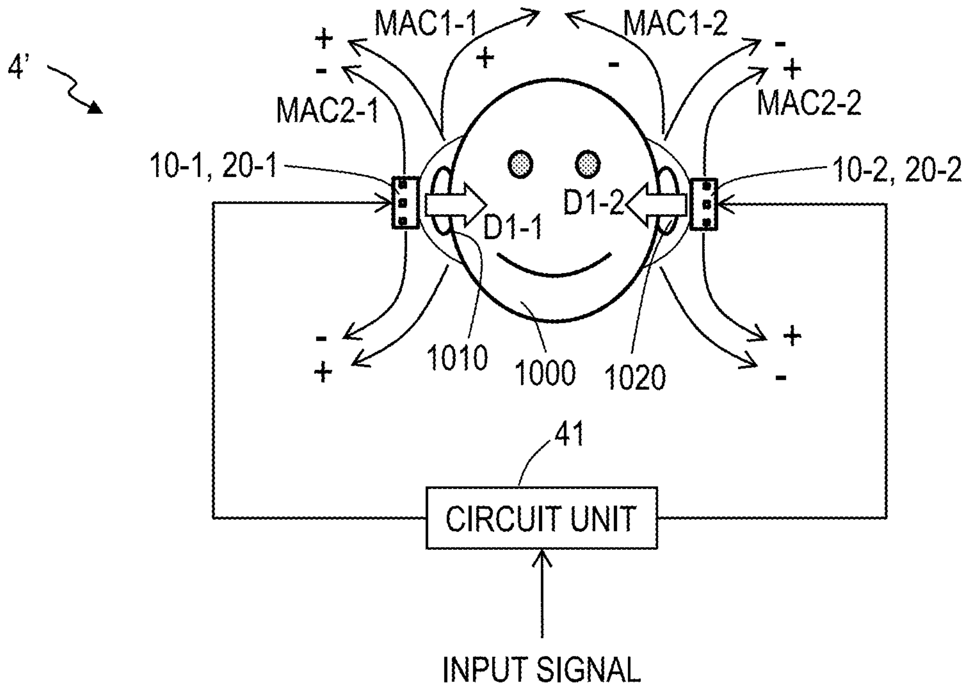
FIG. 49B is a diagram illustrating a modification of the acoustic signal output device of the fourth embodiment.

As illustrated in FIG. 49B, an acoustic signal output device 4' of this modification includes an acoustic signal output device 10-1 (first acoustic signal output unit) worn on the right ear (one ear) 1010 of the user 1000, an acoustic signal output device 10-2 (second acoustic signal output unit) worn on the left ear (the other ear) 1020, and a circuit unit 41. Alternatively, the acoustic signal output device 4' includes an acoustic signal output device 20-1 (first acoustic signal output unit) worn on the right ear (one ear) 1010 of the user 1000, an acoustic signal output device 20-2 (second acoustic signal output unit) worn on the left ear (the other ear) 1020, and a circuit unit 41.

The acoustic signal output device 10-1 or 20-1 (first acoustic signal output unit) includes a housing 12-1 or 22-1 (first housing) having a wall provided with a driver unit 11-1 (first driver unit) for emitting a monaural acoustic signal MAC1-1 (first acoustic signal or first monaural acoustic signal) in the D1-1 direction (one side) and emitting a monaural acoustic signal MAC2-1 (second acoustic signal) which is a negative phase signal of the monaural acoustic signal MAC1-1 or an approximate signal of the negative phase signal of the monaural acoustic signal MAC1-1 to the other side of the D1-1 direction, one or more sound holes 121*a*-1 or 221*a*-1 (first sound holes) for guiding the monaural acoustic signal MAC1-1 (first acoustic signal) emitted from the driver unit 11-1 to the outside, and one or more sound holes 123*a*-1 or 223*a*-1 (second sound holes) for guiding the monaural acoustic signal MAC2-1 (second acoustic signal) emitted from the driver unit 11-1 to the outside.

The acoustic signal output device 10-2 or 20-2 (second acoustic signal output unit) includes a housing 12-2 or 22-2 (second housing) having a wall provided with a driver unit 11-2 (second driver unit) for emitting a monaural acoustic signal MAC1-2 (fourth acoustic signal or second monaural acoustic signal) which is the same as or similar to the monaural acoustic signal MAC2-1 (second acoustic signal) in the D1-2 direction (one side) and emitting a monaural acoustic signal MAC2-2 (third acoustic signal) which is the same as or similar to the monaural acoustic signal MAC1-1 (first acoustic signal) to the other side of the D1-2 direction, one or more sound holes 123*a*-2 or 223*a*-2 (third sound holes) for guiding the monaural acoustic signal MAC2-2 (third acoustic signal) emitted from the driver unit 11-2 to the outside, and one or more sound holes 121*a*-2 or 221*a*-2 (fourth sound holes) for guiding the monaural acoustic signal MAC1-2 (fourth acoustic signal) emitted from the driver unit 11-2 to the outside.

In this modification, the acoustic signal AC1-1 (first acoustic signal) is the monaural acoustic signal MAC1-1 (first monaural acoustic signal), the acoustic signal AC2-1 is the monaural acoustic signal MAC2-1, the acoustic signal AC1-2 (fourth acoustic signal) is the monaural acoustic signal MAC1-2 (second monaural acoustic signal), and the acoustic signal AC2-2 is the monaural acoustic signal MAC2-2. The other detailed configuration of the acoustic signal output devices 10-1 and 10-2 is the same as that of the acoustic signal output device 10 of the first embodiment or its modification. Further, the detailed configuration of the acoustic signal output devices 20-1 and 20-2 is the same as that of the acoustic signal output device 20 of the second embodiment or a modification thereof.

When the acoustic signal output device 4' is worn on both ears, the sound hole 121*a*-1 or 221*a*-1 of the acoustic signal output device 10-1 or 20-1 is directed toward the right ear 1010 (that is, in the D1-1 direction is directed toward the right ear 1010), and the sound hole 121*a*-2 or 221*a*-2 of the acoustic signal output device 10-2 or 20-2 is directed toward the left ear 1020 (that is, the D1-2 direction is directed toward the left ear 1020).

A monaural acoustic signal MAC1-1 (first monaural acoustic signal) is emitted from the sound hole 121*a*-1 or 221*a*-1 of the acoustic signal output device 10-1 or 20-1 (first acoustic signal output unit) to the ear canal of the right ear 1010. The monaural acoustic signal MAC1-2 (second monaural acoustic signal) is emitted toward the ear canal of the left ear 1020 from the sound hole 121*a*-2 or 221*a*-2 of the acoustic signal output device 10-2 or 20-2 (second acoustic signal output unit). Here, the monaural acoustic signal MAC1-2 is a negative phase signal of the monaural acoustic signal MAC1-1 or an approximate signal of the negative phase signal of the monaural acoustic signal MAC1-1. However, even if the phases of the acoustic signals perceived by the left and right ears are inverted, almost no problems arise in terms of listening. In addition, portions of the emitted monaural acoustic signals MAC1-1 and MAC1-2 are also emitted to the outside of both ears, but since the monaural acoustic signals MAC1-1 and MAC1-2 are in opposite phase or approximately in opposite phase to each other, they cancel each other. That is, a portion of the emitted monaural acoustic signal MAC1-1 (first monaural acoustic signal) and the emitted monaural acoustic signal MAC1-2 (a portion of the second monaural acoustic signal) are canceled by interfering with each other on the outer side of the acoustic signal output device 10-1 or 20-1 (first acoustic signal output unit) (the outer side of the user 1000, that is, the side opposite to the right ear 1010 side) worn on the right ear 1010 (one ear), and/or on the outer side of the acoustic signal output device 10-2 or 20-2 (second acoustic signal output unit) (the outer side of the user 1000, that is, the side opposite to the left ear 1020) worn on the left ear 1020 (the other ear). Furthermore, the monaural acoustic signal MAC2-1 is emitted from the sound hole 123*a*-1 or 223*a*-1 of the acoustic signal output device 10-1 or 20-1 (first acoustic signal output unit). A portion of the emitted monaural acoustic signal MAC2-1 cancels a portion of the monaural acoustic signal MAC1-1 emitted from the sound hole 121*a*-1 or 221*a*-1. Furthermore, the monaural acoustic signal MAC2-2 is emitted from the sound hole 123*a*-2 or 223*a*-2 of the acoustic signal output device 10-2 or 20-2 (second acoustic signal output unit). A portion of the emitted monaural acoustic signal MAC2-2 cancels out a portion of the monaural acoustic signal MAC1-2 emitted from the sound hole 121*a*-2 or 221*a*-2. As a result, sound leakage is suppressed.

Modification 2 of Fourth Embodiment

The output signal I and the output signal II in the fourth embodiment or Modification 1 of the fourth embodiment may be reversed. That is, the input signal input to the circuit unit 41 may be input to the phase inverter 413 and the signal output unit 412, the phase inverter 413 may output an output signal II (second output signal) which is a negative phase signal of the input signal or an approximate signal of the negative phase signal to the acoustic signal output unit 40-2 (second acoustic signal output unit), and the signal output unit 412 may output the input signal to the acoustic signal output unit 40-1 (first acoustic signal output unit) as it is as an output signal I (first output signal).

Fifth Embodiment

In the fifth embodiment, a mounting method of an ear-mounted acoustic signal output device will be described. As mentioned above, conventional mounting methods may cause problems such as placing a heavy burden on the ears and making it difficult to wear the device stably. In the present embodiment, a new mounting method for an acoustic signal output device for solving such a problem will be described.

<Mounting Method 1>

Figure 50A:
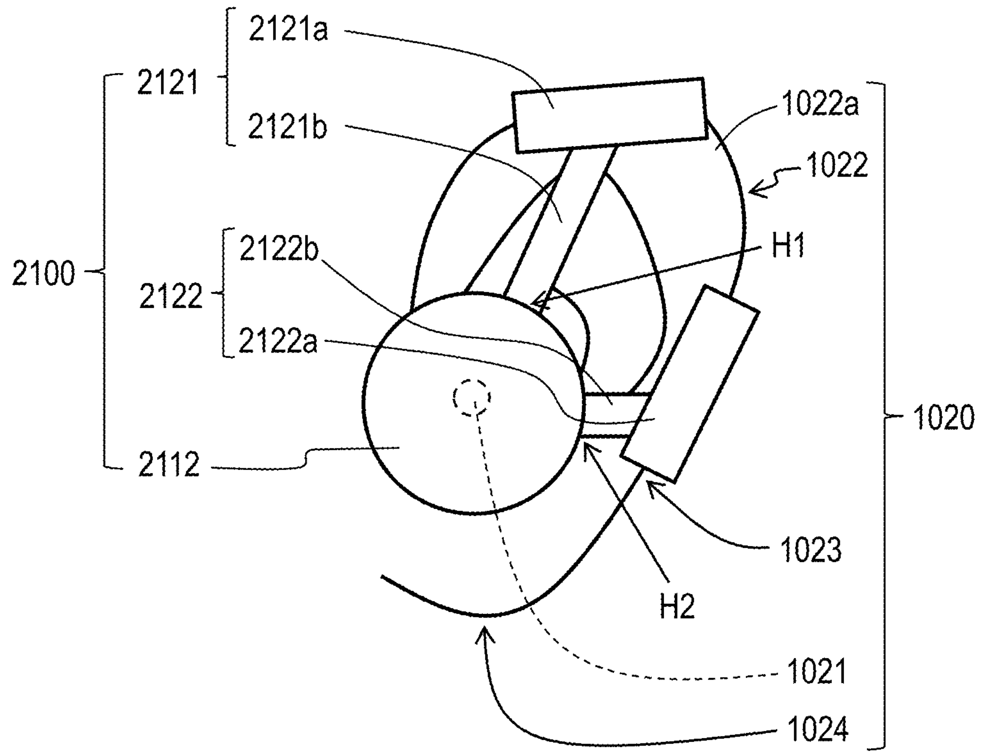
FIG. 50A is a transparent front view illustrating the configuration of an acoustic signal output device of a fifth embodiment.
Figure 50B:
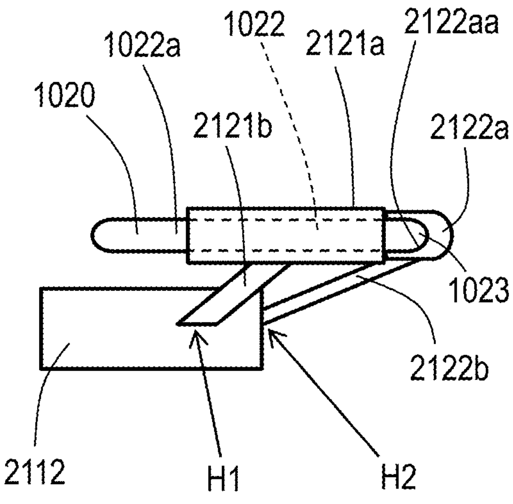
FIG. 50B is a transparent plan view illustrating the configuration of the acoustic signal output device of the fifth embodiment.
Figure 50C:
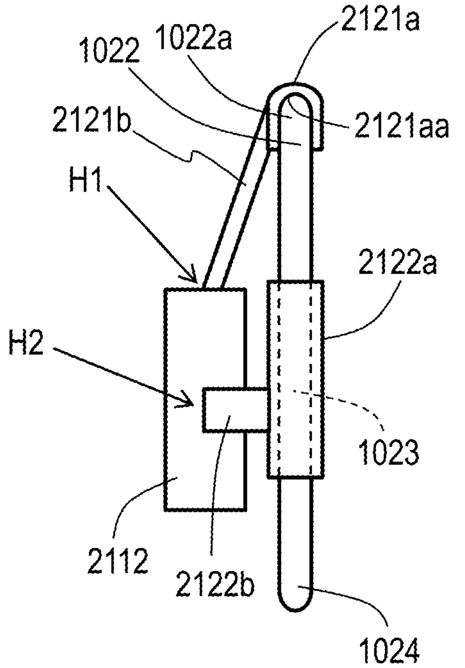
FIG. 50C is a transparent right side view illustrating the configuration of the acoustic signal output device of the fifth embodiment.
Figure 51A:
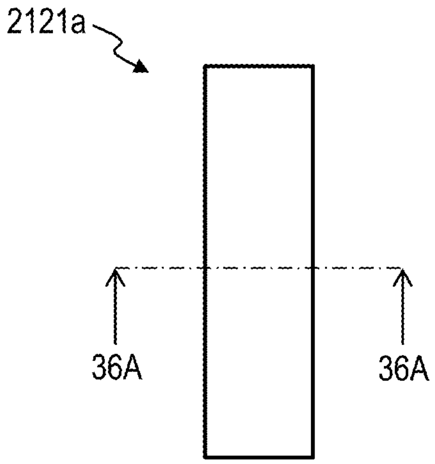
FIG. 51A is a plan view illustrating the fixing portion of the fifth embodiment.
Figure 51B:
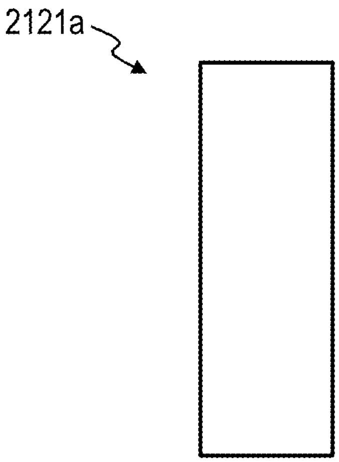
FIG. 51B is a right side view illustrating a fixing portion of the fifth embodiment.
Figure 51C:
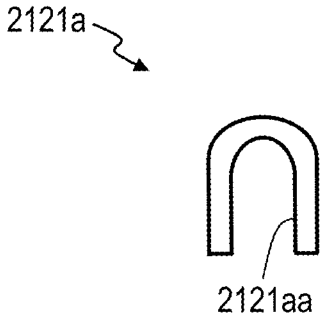
FIG. 51C is a front view illustrating the fixing portion of the fifth embodiment.
Figure 51D:
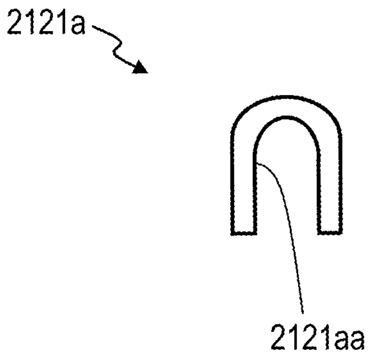
FIG. 51D is a cross-sectional view taken along the line 36A-36A in FIG. 51A.

Mounting method 1 will be described using FIGS. 50A to 51D. As illustrated in FIGS. 50A to 50C, an acoustic signal output device 2100 of mounting method 1 includes a housing 2112 that emits an acoustic signal, a mounting portion 2121 (first mounting portion) that holds the housing 2112 and is configured to be mounted on an upper portion 1022 (first auricle portion) of the auricle 1020 which is a portion of the auricle 1020, and a mounting portion 2122 (second mounting portion) that holds the housing 2112 and is configured to be mounted on an intermediate portion 1023 (second auricle portion) which is a portion of an auricle 1020 different from the upper portion 1022 (first auricle portion) of the auricle 1020. Note that the intermediate portion 1023 is an intermediate portion between the upper portion 1022 (ear ring side) and a lower portion 1024 (earlobe side) of the auricle 1020. Further, in the present embodiment, an example is shown in which the auricle 1020 is a human auricle, but the auricle 1020 may be an auricle of an animal other than a human (such as a chimpanzee).

The housing 2112 in this example may be any of the housings 12, 12", and 22 illustrated in the first to fourth embodiments and their modifications, or may be the housing such as a conventional earphone of an acoustic signal output device that emits an acoustic signal. When the acoustic signal output device 2100 is worn, the housing 2112 is disposed so that the sound hole 2112*a* is directed toward the ear canal 1021 and the ear canal 1021 is not blocked.

The mounting portion 2121 (first mounting portion) in this example includes a fixing portion 2121*a* (first fixing portion) that grips the ear ring 1022*a* (end) of the upper portion 1022 (first auricle portion) of the auricle 1020, and a supporting portion 2121*b* that fixes the fixing portion 2121*a* (first fixing portion) to the housing 2112. One end of the supporting portion 2121*b* holds a specific region of the outer wall of the fixing portion 2121*a*, and the other end of the supporting portion 2121*b* holds a specific region H1 (first holding region) of the outer wall of the housing 2112. One end of the supporting portion 2121*b* may be fixed to a specific region of the wall of the fixing portion 2121*a*, or may be integrated with the wall of the fixing portion 2121*a* in the specific region. Similarly, the other end of the supporting portion 2121*b* may be fixed to the specific region H1 of the outer wall of the housing 2112, or may be integrated with the outer wall of the housing 2112 in the specific region H1. In this way, the supporting portion 2121*b* holds the housing 2112 from the outer side (first outer side) of the specific region H1 of the wall of the housing 2112. In this example, when the fixing portion 2121*a* is mounted on the ear ring 1022*a*, the outer side (first outer side) of the region H1 becomes the upper portion 1022 side of the auricle 1020. Here, the fixing portion 2121*a* (first fixing portion) is configured to grip the ear ring 1022*a* of the upper portion 1022 (first auricle portion) of the auricle 1020 from above the auricle 1020. Furthermore, the housing 2112 is configured to be suspended by the mounting portion 2121 (first mounting portion) that includes the fixing portion 2121*a* (first fixing portion) that grips the ear ring 1022*a*. That is, the fixing portion 2121*a* grips the ear ring 1022*a* from above the auricle 1020, and the housing 2112 is suspended by the other end of the supporting portion 2121*b*, which holds the fixing portion 2121*a* at one end. The reaction force against the weight of the housing 2112 suspended in this manner is supported by the inner wall surface of the fixing portion 2121*a*. For example, this reaction force is supported by the inner wall surface of the fixing portion 2121*a*, which is disposed perpendicularly or substantially perpendicularly to the direction of the reaction force. In such a configuration, the weight of the housing 2112 can be supported even if the gripping force of the fixing portion 2121*a* is small. The smaller the gripping force of the fixing portion 2121*a* is, the less the burden on the auricle 1020 is, so the burden on the ear can be reduced. Note that the fixing portion 2121*a* may have any specific shape. An example of the fixing portion 2121*a* is a member that has a C-shaped or U-shaped hollow cross-sectional shape and is configured to grip the ear ring 1022*a* in a state where the ear ring 1022*a* is in contact with the inner wall surface **2121*aa* (for example, FIGS. 51A to 51D). For example, the fixing portion 2121*a*** may have an ear cuff shape.

The mounting portion 2122 (second mounting portion) in this example includes a fixing portion **2122*a* (second fixing portion) that grips the end of the intermediate portion 1023 (second auricle portion) of the auricle 1020, and a supporting portion 2122*b* that fixes the fixing portion 2122*a* (second fixing portion) to the housing 2112. One end of the supporting portion 2122*b* holds a specific region of the outer wall of the fixing portion 2122*a*, and the other end of the supporting portion 2122*b* holds a specific region H2 (second holding region) of the outer wall of the housing 2112. The region H2 is different from the region H1** described above.

One end of the supporting portion **2122*b* may be fixed to a specific region of the wall of the fixing portion 2122*a*, or may be integrated with the wall of the fixing portion 2122*a* in the specific region. Similarly, the other end of the supporting portion 2122*b* may be fixed to the specific region H2 of the outer wall of the housing 2112, or may be integrated with the outer wall of the housing 2112 in the specific region H2. In this way, the supporting portion 2122*b* holds the housing 2112 from the outer side (the second outer side different from the first outer side) of the specific region H2 of the wall of the housing 2112. In this example, when the fixing portion 2122*a* is mounted on the end of the intermediate portion 1023 of the auricle 1020, the outer side (second outer side) of the region H2 becomes the intermediate portion 1023 side of the auricle 1020. In this way, the housing 2112 is held on the upper portion 1022 of the auricle 1020 from the outer side (first outer side) of the region H1 by the mounting portion 2121 (first mounting portion) as described above, and is further held on the intermediate portion 1023 of the auricle 1020 from the outer side of the region H2 (the second outer side different from the first outer side) by the mounting portion 2122 (second mounting portion). In this way, the position of the housing 2112 mounted on the auricle 1020 is stabilized. Furthermore, since the housing 2112 is held at different portions of the auricle 1020 (the upper portion 1022 and the intermediate portion 1023) by the mounting portion 2121 (first mounting portion) and the mounting portion 2122 (second mounting portion), the burden on the auricle 1020 due to wearing can be distributed. Furthermore, the housing 2112 is mounted on the auricle 1020 by the mounting portions 2121 and 2122 that grip the ends of the auricle 1020. Such mounting portions 2121 and 2122 do not interfere with the temples of glasses or the strings of a mask that are hooked on the back side of the auricle 1020. Note that the fixing portion 2122*a* may have any specific shape. An example of the fixing portion 2122*a* is a member having a C-shaped or U-shaped hollow cross-sectional shape and configured to grip the intermediate portion 1023 of the auricle 1020 with the ear ring 1022*a* in contact with the inner wall surface 2122*aa*. For example, the fixing portion 2122*a*** may have an ear cuff shape.

There is also no limitation on the material that constitutes the mounting portions 2121 and 2122. The mounting portions 2121 and 2122 may be made of a rigid body such as synthetic resin or metal, or may be made of an elastic body such as rubber.

<Mounting Method 2>

Figure 52A:
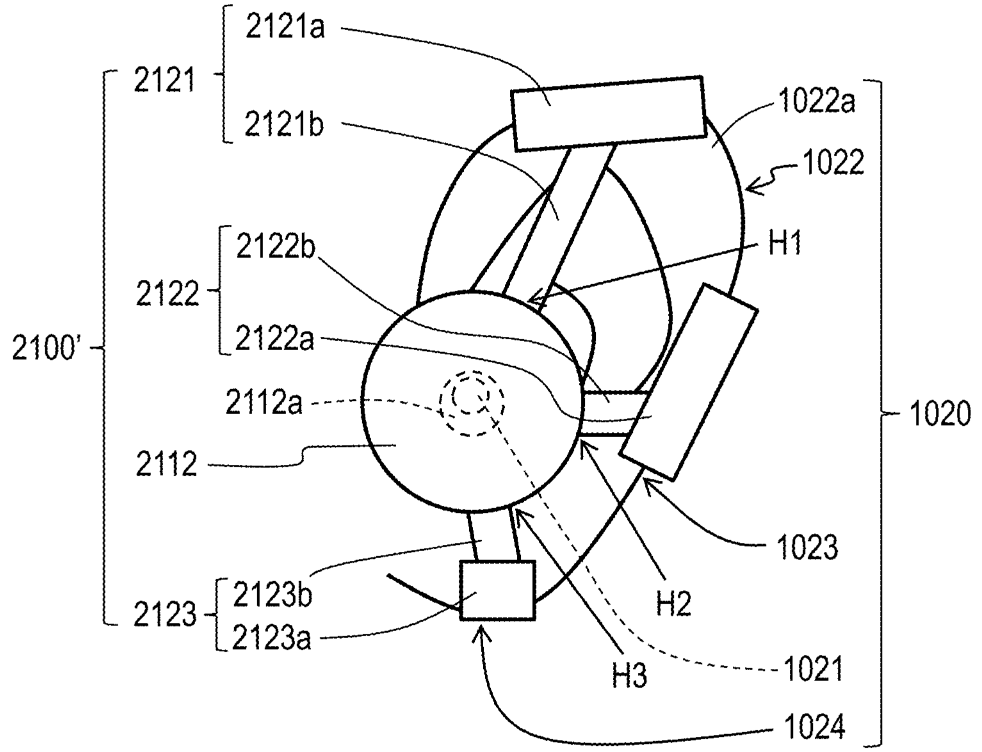
FIG. 52A is a transparent front view illustrating a modification of the acoustic signal output device of the fifth embodiment.
Figure 52B:
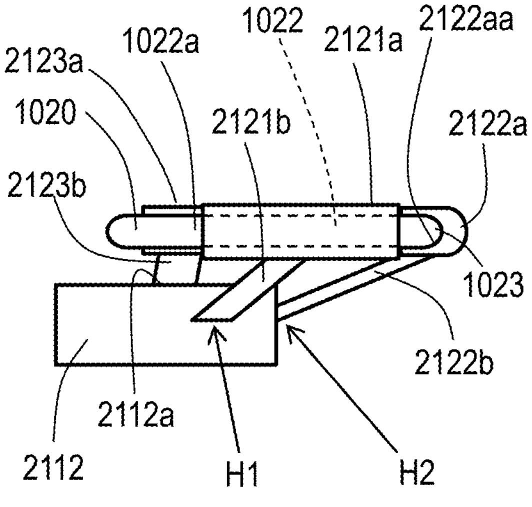
FIG. 52B is a transparent plan view illustrating a modification of the acoustic signal output device of the fifth embodiment.
Figure 52C:
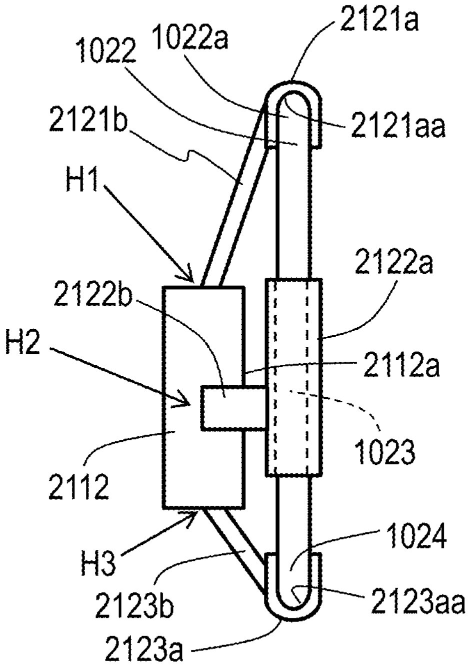
FIG. 52C is a transparent right side view illustrating a modification of the acoustic signal output device of the fifth embodiment.

Mounting method 2 will be described using FIGS. 52A to 52C. As illustrated in FIGS. 52A to 52C, an acoustic signal output device 2100' of mounting method 2 further includes, compared to the acoustic signal output device 2100 of mounting method 1, a mounting portion 2123 (second mounting portion) configured to be mounted on a lower portion 1024 (second auricle portion) which is a portion of the auricle 1020, which is different from the upper portion 1022 (first auricle portion) and the intermediate portion 1023 (second auricle portion) of the auricle 1020.

The mounting portion 2123 (second mounting portion) in this example includes a fixing portion **2123*a* (second fixing portion) that grips the end of the lower portion 1024 (second auricle portion) of the auricle 1020, and a supporting portion 2123*b* that fixes the fixing portion 2123*a* (second fixing portion) to the housing 2112. One end of the supporting portion 2123*b* holds a specific region of the outer wall of the fixing portion 2123*a*, and the other end of the supporting portion 2123*b* holds a specific region H3 (second holding region) of the outer wall of the housing 2112. The region H3 is different from the region H1 and the region H2 described above. One end of the supporting portion 2123*b* may be fixed to a specific region of the wall of the fixing portion 2123*a*, or may be integrated with the wall of the fixing portion 2123*a* in the specific region. Similarly, the other end of the supporting portion 2123*b* may be fixed to the specific region H3 of the outer wall of the housing 2112, or may be integrated with the outer wall of the housing 2112 in the specific region H3. In this way, the supporting portion 2123*b* holds the housing 2112 from the outer side (the second outer side different from the first outer side) of the specific region H3 of the wall of the housing 2112. In this example, when the fixing portion 2123*a* is mounted on the end of the lower portion 1024 of the auricle 1020, the outer side (second outer side) of the region H3 becomes the lower portion 1024 side of the auricle 1020. In this way, the housing 2112 is further held on the lower portion 1024 of the auricle 1020 from the outer side of the region H3 (the second outer side different from the first outer side) by the mounting portion 2123 (second mounting portion). In this way, the position of the housing 2112 mounted on the auricle 1020 is further stabilized. In addition, since the housing 2112 is held at different portions of the auricle 1020 (the upper portion 1022, the intermediate portion 1023, and the lower portion 1024) by the mounting portion 2121 (first mounting portion), the mounting portion 2122 (second mounting portion), and the mounting portion 2123 (second mounting portion), the burden on the auricle 1020 due to wearing can be distributed. Furthermore, the housing 2112 is mounted on the auricle 1020 by the mounting portions 2121, 2122, and 2123 that grip the end of the auricle 1020. Such mounting portions 2121, 2122, and 2123 do not interfere with the temples of glasses or the strings of a mask that are hooked on the back side of the auricle 1020. Note that the fixing portion 2123*a* may have any specific shape. An example of the fixing portion 2123*a* is a member having a C-shaped or U-shaped hollow cross-sectional shape, and configured to grip the lower portion 1024 of the auricle 1020 with the ear ring 1022*a* in contact with the inner wall surface 2123*aa*. For example, the fixing portion 2123*a* may have an ear cuff shape. There is also no limitation on the material that constitutes the mounting portion 2123**.

<Mounting Method 3>

The mounting portion 2122 of the acoustic signal output device 2100' of mounting method 2 may be omitted.

<Mounting Method 4

Figure 53:
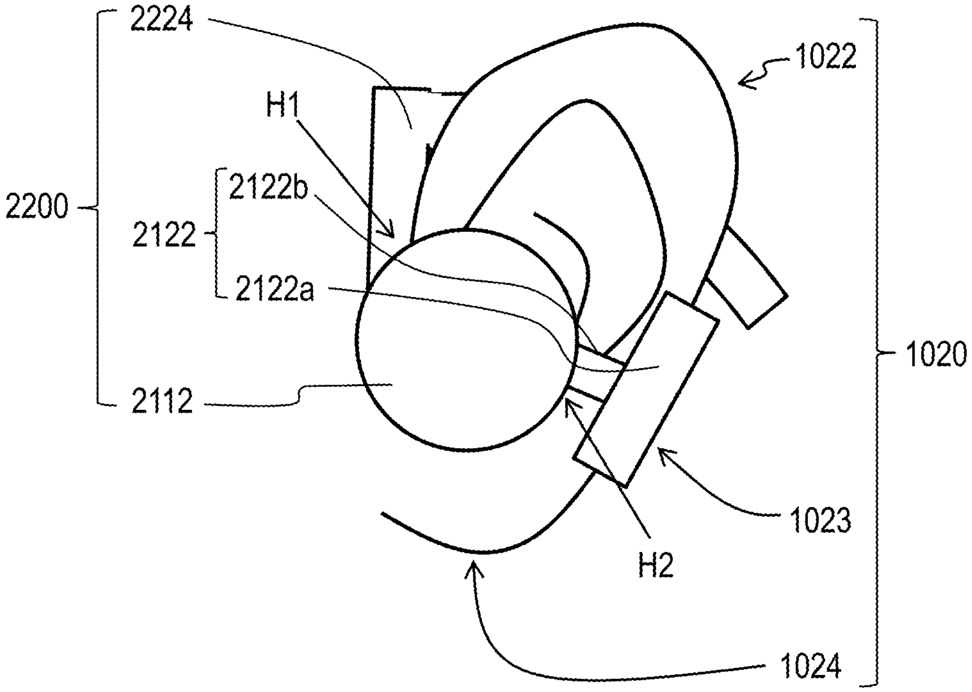
FIG. 53 is a front view illustrating a modification of the acoustic signal output device of the fifth embodiment.

Similarly to the acoustic signal output device 2200 illustrated in FIG. 53, the mounting portion 2121 of the acoustic signal output device 2100 of mounting method 1 may be replaced with the mounting portion 2224 of a type (glass temple type) that is hooked on the back side of the upper portion 1022 of the auricle 1020. The mounting portion 2224 is a rod-shaped member. One end of the mounting portion 2224 is bent so as to be hooked on the back side of the upper portion 1022 of the auricle 1020, and the other end holds a specific region H1 (first holding region) of the outer wall of the housing 2112. The other end of the mounting portion 2224 may be fixed to a specific region H1 of the outer wall of the housing 2112, or may be integrated with the outer wall of the housing 2112 in the specific region H1. Similarly, the mounting portion 2121 of the acoustic signal output device 2100' of mounting methods 2 and 3 may be replaced with the mounting portion 2224 of a type that is hooked on the back side of the upper portion 1022 of the auricle 1020. Note that there is no limitation on the material that constitutes the mounting portion 2224.

<Mounting Method 5>

Figure 54A:
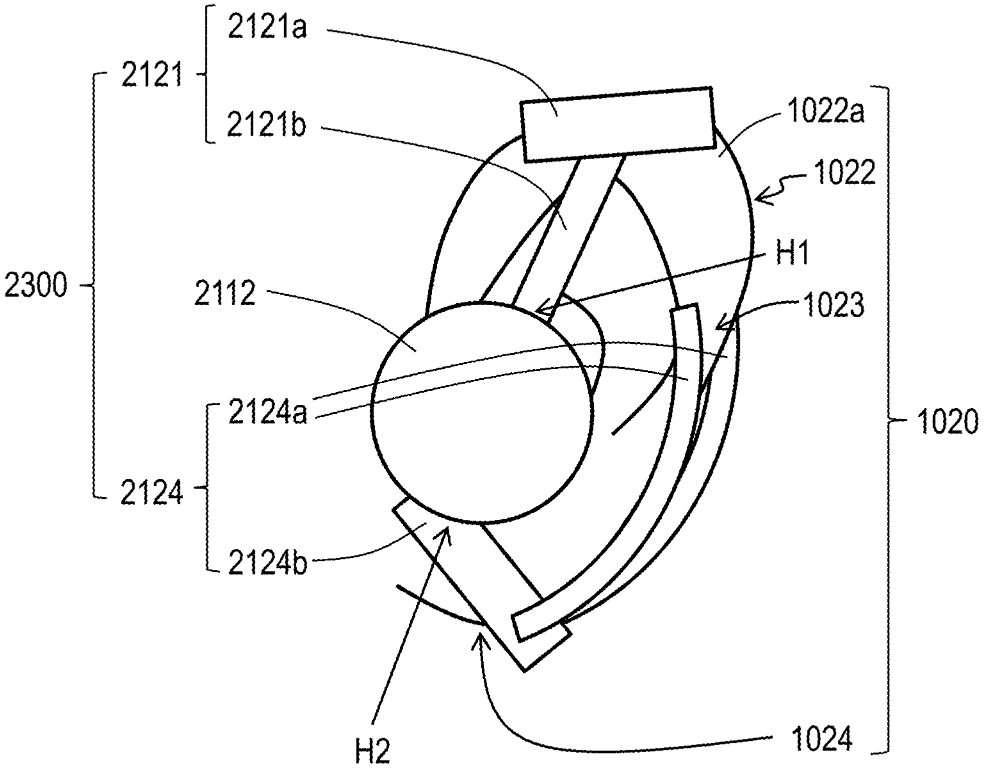

As in the acoustic signal output device 2300 illustrated in FIG. 54A, the mounting portion 2122 of the acoustic signal output device 2100 of mounting method 1 may be replaced with a mounting portion 2124 (second mounting portion) that sandwiches the end of the intermediate portion 1023 (second auricle portion) of the auricle 1020. The mounting portion 2124 (second mounting portion) includes a fixing portion 2124*a* (second fixing portion) that sandwiches the end of the intermediate portion 1023 (second auricle portion) of the auricle 1020, and a supporting portion 2124*b* that fixes the fixing portion 2124*a* (second fixing portion) to the housing 2112. One end of the supporting portion 2124*b* holds the end of the fixing portion 2124*a*, and the other end of the supporting portion 2124*b* holds a specific region H2 (second holding region) of the outer wall of the housing 2112. One end of the supporting portion 2124*b* may be fixed to the end of the fixing portion 2124*a*, or may be integrated with the end of the fixing portion 2124*a*. Similarly, the other end of the supporting portion 2124*b* may be fixed to a specific region H2 of the outer wall of the housing 2112, or may be integrated with the outer wall of the housing 2112 in the specific region H2. In this way, the supporting portion 2124*b* holds the housing 2112 from the outer side (the second outer side different from the first outer side) of the specific region H2 of the wall of the housing 2112. In this way, the housing 2112 is held on the upper portion 1022 of the auricle 1020 from the outer side (first outer side) of the region H1 by the mounting portion 2121 (first mounting portion) as described above, and is further held on the intermediate portion 1023 of the auricle 1020 from the outer side of the region H2 (the second outer side different from the first outer side) by the mounting portion 2124 (second mounting portion). In this way, the position of the housing 2112 mounted on the auricle 1020 is stabilized. In this case as well, since the housing 2112 is held at different portions of the auricle 1020 (the upper portion 1022 and the intermediate portion 1023) by the mounting portion 2121 (first mounting portion) and the mounting portion 2124 (second mounting portion), the burden on the auricle 1020 due to wearing can be distributed. Furthermore, the mounting portions 2121 and 2124 do not interfere with the temples of glasses or the strings of a mask that are hooked on the back side of the auricle 1020. In addition, the sandwiching fixing portion 2124*a* (second fixing portion) may be configured to sandwich the lower portion 1024 of the auricle 1020 instead of the intermediate portion 1023 of the auricle 1020. Note that the fixing portion 2124*a* may have any specific shape. For example, the fixing portion 2124*a* may be a clip-like pinching mechanism or may be an integrated leaf spring. Furthermore, there is no limitation on the material that constitutes the mounting portion 2124.

<Mounting Method 6>

Figure 54B:
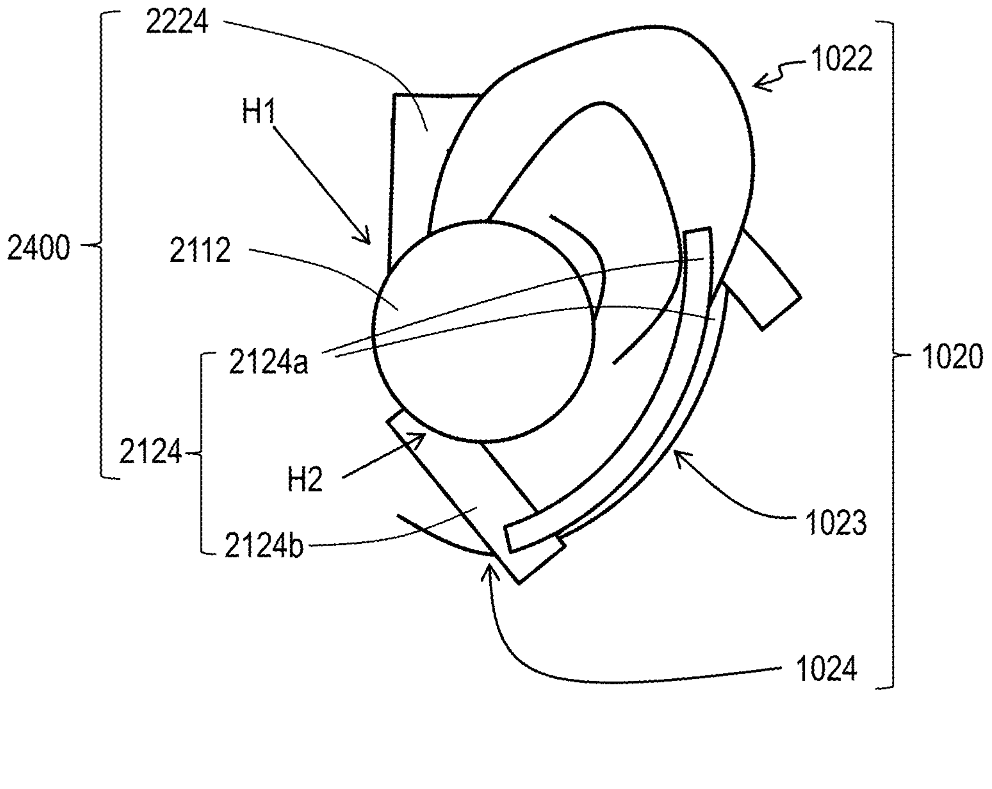

As in the acoustic signal output device 2400 illustrated in FIG. 54B, the mounting portion 2121 of the acoustic signal output device 2300 of mounting method 5 may be replaced with a mounting portion 2224 of a type that is hooked on the back side of the upper portion 1022 of the auricle 1020. The configuration of the mounting portion 2224 is the same as mounting method 4.

<Mounting Method 7

When the housing 2112 is the housings 12, 12", and 22 illustrated in the first to fourth embodiments and their modifications, an opening area of the sound holes 123*a* and 223*a* (second sound holes) provided in or near a region (shielded region) where the acoustic signal AC1 (first acoustic signal) emitted from the sound holes 121*a* and 221*a* (first sound holes) of the housing 12, 12", or 22 is blocked by the mounting portions 2121, 2122, 2123, 2124, and 2224 may be smaller than an opening area of the sound holes 123*a* and 223*a* (second sound holes) provided at positions away from the shielded region. As mentioned above, a portion of the acoustic signal AC1 (first acoustic signal) emitted from the sound holes 121*a* and 221*a* (first sound holes) of the housings 12, 12", and 22 is canceled by the acoustic signal AC2 (second acoustic signal) emitted from the sound holes 123*a* and 223*a* (second sound holes), whereby the sound leakage is suppressed. Here, in the shielded region, the sound pressure of the acoustic signal AC1 (first acoustic signal) leaking to the outside is small as compared to the other regions. Accordingly, by reducing the opening area of the sound holes 123*a* and 223*a* (second sound holes) provided in or near the shielded region, it is possible to achieve a balance between the sound pressure distribution of the acoustic signal AC1 (first acoustic signal) leaking to the outside and the sound pressure distribution of the acoustic signal AC2 (second acoustic signal) emitted from the sound holes 123*a* and 223*a* (second sound holes). That is, the acoustic signal AC1 (first acoustic signal) is emitted from the sound holes 121*a* and 221*a* (first sound holes), and the acoustic signal AC2 (second acoustic signal) is emitted from the sound holes 123*a* and 223*a* (second sound holes). In this case, it is possible to achieve a balance of the sound pressure distribution so that the attenuation rate $\eta_{11}$ of the acoustic signal AC1 (first acoustic signal) at the position P2 (second point) with respect to the position P1 (first point) is equal to or smaller than a predetermined value $\eta_{th}$ which is smaller than the attenuation rate $\eta_{21}$ of the acoustic signal due to air propagation at the position P2 (second point) with respect to the position P1 (first point). Alternatively, in this case, it is possible to achieve a balance of the sound pressure distribution so that the attenuation amount $\eta_{12}$ of the acoustic signal AC1 (first acoustic signal) at the position P2 (second point) with respect to the position P1 (first point) is equal to or larger than a predetermined value $\omega_{th}$, which is larger than the attenuation amount $\eta_{22}$ of the acoustic signal due to air propagation at the position P2 (second point) with respect to the position P1 (first point). The position P1 (first point) is a predetermined point where the acoustic signal AC1 (first acoustic signal) emitted from the sound hole 221*a* (first sound hole) reaches. The position P2 (second point) is a predetermined point that is farther from the acoustic signal output device than the position P1 (first point). As a result, the sound leakage can be effectively suppressed.

Hereinafter, an example will be described in which the housing 2112 is the housing 12 of the first embodiment or a modification thereof, and this housing 12 (housing 2112) is held by the mounting portions 2121 and 2122 of mounting method 1. However, the present invention is not limited thereto. The housing 2112 may be the housing 12, 12", and 22 illustrated in the second to fourth embodiments and their modifications, and the housings 12, 12", and 22 may be held by the mounting portions 2121, 2122, 2123, 2124, and 2224 of any of mounting methods 2 to 6. In this case as well, the following configuration can be applied.

As illustrated in FIG. 55A, the acoustic signal output device 2100 in this case includes the driver unit 11 that emits the acoustic signal AC1 (first acoustic signal) to one side (D1-direction side) and emits the acoustic signal AC2 (second acoustic signal) which is a negative phase signal of the acoustic signal AC1 (first acoustic signal) or an approximate signal of the negative phase signal to the other side (D2-direction side). As described above, the walls 121 and 123 of the housing 12 are provided with one or more sound holes 121*a* (first sound holes) for guiding the acoustic signal AC1 (first acoustic signal) emitted from the driver unit 11 to the outside, and one or more sound holes 123*a* (second sound holes) for guiding the acoustic signal AC2 (second acoustic signal) emitted from the driver unit 11 to the outside. As mentioned above, a portion of the acoustic signal AC2 (second acoustic signal) emitted from the sound hole 123*a* (second sound hole) cancels a portion of the acoustic signal AC1 (first acoustic signal) emitted from the sound hole 121*a* (first sound hole), whereby sound leakage is suppressed. As described above, the supporting portion 2121*b* of the mounting portion 2121 (first mounting portion) holds the region H1 (first holding region) of the wall 123 of the housing 12 (housing 2112), and the supporting portion 2122*b* of the mounting portion 2122 (second mounting portion) holds the region H2 (second holding region) of the wall 123 of the housing 12 (housing 2112). Here, the sound hole 121*a* (first sound hole) is arranged on one side (D1-direction side) of a space partitioned by a virtual plane P51 passing through the region H1 (first holding region) and the mounting portion 2122 (second mounting portion). On the other hand, the sound hole 123*a* (second sound hole) is arranged on the other side (D2-direction side) of the space partitioned by the virtual plane P51. Here, the opening area of the sound holes 123*a* (second sound holes) provided in or near the shielded region AR51 where the acoustic signal AC1 (first acoustic signal) is blocked by the supporting portion 2121*b* of the mounting portion 2121 (first mounting portion) or the supporting portion 2122*b* of the mounting portion 2122 (second mounting portion) is reduced. That is, as illustrated in FIG. 55B, it is assumed that the sound holes 123*a* (second sound holes) are provided along the above-mentioned circumference C1. In addition, a case will be considered in which the surface of the wall 123 of the housing 12 is equally divided into a plurality of unit area regions (in this example, unit area regions C5-1, C5-2, C5-3, and C5-4) along the circumference C1. In this example, the number of sound holes 123*a* (second sound holes) provided in a first unit area region (in this example, unit area regions C5-2 and C5-3) which is any of the unit area regions including the shielded region AR51 is smaller than the number of sound holes 123*a* (second sound holes) provided in a second unit area region (in this example, unit area regions C5-1 and C5-4) which is any of the unit area regions that do not include the shielded region AR51. In this case, the total opening area of the sound holes 123*a* (second sound holes) provided in the first unit area region (in this example, unit area regions C5-2 and C5-3) which is any of the unit area regions including the shielded region AR51 is smaller than the total opening area of the sound holes 123*a* (second sound holes) provided in the second unit area region (in this example, unit area regions C5-1 and C5-4) which is any of the unit area regions that do not include the shielded region AR51. In this way, the sound leakage can be effectively suppressed.

As illustrated in FIGS. 56A and 56B, the number of sound holes 123*a* (second sound holes) provided in the first unit area region (in this example, unit area regions C5-2 and C5-3) including the shielded region AR51 may be smaller than the number of sound holes 123*a* (second sound holes) provided in the second unit area region (in this example, unit area regions C5-1 and C5-4) that does not include the shielded region AR51, and the sound hole 123*a* having a larger opening area than the first unit area region may be provided in the second unit area region. In addition, the number of sound holes 123*a* may be the same in the first unit area region and the second unit area region, and the opening area of the sound holes 123*a* provided in the first unit area region may be smaller than the opening area of the sound holes 123*a* provided in the second unit area region. In such a case as well, the total opening area of the sound holes 123*a* (second sound holes) provided in the first unit area region (in this example, unit area regions C5-2 and C5-3) is smaller than the total opening area of the sound holes 123*a* (second sound holes) provided in the second unit area region (in this example, unit area regions C5-1 and C5-4). Even in this case, the sound leakage can be effectively suppressed.

<Mounting Method 8>

Mounting method 8 will be described using FIG. 57, FIG. 58A, and FIG. 58B. As illustrated in FIGS. 57 and 58A, an acoustic signal output device 2500 of mounting method 8 includes a housing 2112 that emits an acoustic signal and a mounting portion 2221 that holds the housing 2112 and is configured to be mounted on the auricle 1020.

The mounting portion 2221 includes a fixing portion 2221*a* having a concave inner wall surface 2221*aa* configured to be fitted into the upper portion 1022 of the auricle 1020, and a shielding wall 2221*b* configured to cover only a portion of the auricle 1020 when the inner wall surface 2221*aa* side of the fixing portion 2221*a* is fitted into the upper portion 1022 of the auricle 1020. The fixing portion 2221*a* in this example has a hollow structure that accommodates at least a portion (for example, the ear ring 1022*a*) of the upper portion 1022 of the auricle 1020. Considering the burden on the auricle 1020, it is preferable that the inner wall surface 2221*aa* of the fixing portion 2221*a* be a curved surface. However, the present invention is not limited thereto. The shielding wall 2221*b* is a plate having a flat or curved wall surface. The shielding wall 2221*b* in this example is configured in a shape that, when the inner wall surface 2221*aa* side of the fixing portion 2221*a* is fitted into the upper portion 1022 of the auricle 1020, the lower portion 1024 of the auricle 1020 is open to the outside while covering the upper portion 1022 of the auricle 1020. That is, the end 2221*c* (the end opposite to the fixing portion 2221*a*) of the shielding wall 2221*b* is an open portion O51. The open portion O51 is provided at a position where the lower portion 1024 of the auricle 1020 is open to the outside when the upper portion 1022 of the auricle 1020 is fitted into the inner wall surface 2221*aa* side of the fixing portion 2221*a*. There is also no limitation on the material that constitutes the mounting portion 2221.

The housing 2112 in this example may be any of the housings 12, 12", and 22 illustrated in the first to fourth embodiments and their modifications, or may be the housing such as a conventional earphone of an acoustic signal output device that emits an acoustic signal. The housing 2112 is held on the inner wall surface 2221*bb* side of the shielding wall 2221*b*, and the sound hole 2112*a* that emits the acoustic signal is open in the opposite direction from the inner wall surface 2221*bb*. When the acoustic signal output device 2500 is mounted on the auricle 1020, the outer wall surface 2221*ba* side of the shielding wall 2221*b* is directed outward, the inner wall surface 2221*bb* side of the shielding wall 2221*b* is directed toward the inner side (auricle 1020 side), the sound hole 2112*a* of the housing 2112 held on the inner wall surface 2221*bb* is directed toward the ear canal 1021, and the housing 2112 is disposed so as not to block the ear canal 1021. At this time, since the sound hole 2112*a* is disposed on the inner side of the shielding wall 2221*b*, it is possible to suppress the influence of external noise and to suppress the sound leakage of the acoustic signal emitted from the sound hole 2112*a*. Since the shielding wall 2221*b* covers only a portion of the auricle 1020 (the lower portion 1024 side of the auricle 1020 is not blocked), external sounds are not completely blocked, and the user can still hear external sounds.

<Mounting Method 9>

As illustrated in FIG. 59, an acoustic signal output device 2500' of mounting method 9 is a modification of the acoustic signal output device 2500 of mounting method 8, and the mounting portion 2221 of the acoustic signal output device 2500 is replaced with a mounting portion 2221'. The mounting portion 2221' is obtained by replacing the shielding wall 2221*b* of the mounting portion 2221 with a shielding wall 2221*b*'. The shielding wall 2221*b*' is configured in such a shape that, when the inner wall surface 2221*aa* side of the fixing portion 2221*a* is fitted into the upper portion 1022 of the auricle 1020, a portion of the upper portion 1022 of the auricle 1020 is further open to the outside. That is, the end 2221*c* (the end opposite to the fixing portion 2221*a*) side of the shielding wall 2221*b*' is an open portion O51, and a portion of the shielding wall 2221*b*' on the fixing portion 2221*a* side is also an open portion O52 (through-hole). The open portion O52 is provided at a position that opens a portion of the upper portion 1022 of the auricle 1020 to the outside. The rest is the same as mounting method 8. Since the shielding wall 2221*b*' covers only a portion of the auricle 1020 (the lower portion 1024 side and the upper portion 1022 side of the auricle 1020 are not blocked), external sounds are not completely blocked and users can still hear external sounds.

<Mounting Method 10>

As illustrated in FIGS. 60, 61A, 61B, and 61C, when the housing 2112 is the housings 12, 12", and 22 illustrated in the first to fourth embodiments and their modifications, it is preferable that the sound holes 121*a* and 221*a* (first sound holes) of the housings 12, 12", and 22 be arranged on the inside side of the shielding wall 2221*b*, and the sound holes 123*a* and 223*a* (second sound holes) are arranged on the outer side of the shielding wall 2221*b*. In this way, it is possible to suppress the acoustic signal AC1 from being canceled out by the acoustic signal AC2 inside the shielding wall 2221*b* and cancel out a portion of the acoustic signal AC1 (first acoustic signal) leaking to the outside of the shielding wall 2221*b* with a portion of the acoustic signal AC2 emitted from the sound holes 123*a* and 223*a* (second sound holes). As a result, the sound leakage of the acoustic signal AC1 to the outside can be effectively suppressed without significantly reducing the listening efficiency of the acoustic signal AC1 by the user.

In this case, the sound pressure of the acoustic signal AC1 leaking to the outside from the open portions O51 and O52 of the shielding walls 2221*b* and 2221*b*' is larger than the sound pressure of the acoustic signal AC1 leaking to the outside from the shielding walls 2221*b* and 2221*b*' other than the open portions O51 and O52. Therefore, it is preferable that the opening area per unit area of the sound holes 123*a* and 223*a* (second sound holes) arranged on the side where the open portions O51 and O52 are provided is larger than the opening area per unit area of the sound holes 123*a* and 223*a* (second sound holes) arranged on the side where the open portions O51 and O52 are not provided. As a result, the sound pressure distribution of the acoustic signal AC2 (second acoustic signal) emitted from the sound holes 123*a* and 223*a* (second sound holes) can be brought closer to the sound pressure distribution of the acoustic signal AC1 leaking to the outside of the shielding wall 2221*b*, and the acoustic signal AC1 can be appropriately canceled by the acoustic signal AC2. That is, the acoustic signal AC1 (first acoustic signal) is emitted from the sound holes 121*a* and 221*a* (first sound holes), and the acoustic signal AC2 (second acoustic signal) is emitted from the sound holes 123*a* and 223*a* (second sound holes). In this case, it is possible to achieve a balance of the sound pressure distribution so that the attenuation rate $\eta_{11}$ of the acoustic signal AC1 (first acoustic signal) at the position P2 (second point) with respect to the position P1 (first point) is equal to or smaller than a predetermined value $\eta_{th}$ which is smaller than the attenuation rate $\eta_{21}$ of the acoustic signal due to air propagation at the position P2 (second point) with respect to the position P1 (first point). Alternatively, in this case, it is possible to achieve a balance of the sound pressure distribution so that the attenuation amount $\eta_{12}$ of the acoustic signal AC1 (first acoustic signal) at the position P2 (second point) with respect to the position P1 (first point) is equal to or larger than a predetermined value $\omega_{th}$, which is larger than the attenuation amount $\eta_{22}$ of the acoustic signal due to air propagation at the position P2 (second point) with respect to the position P1 (first point). The position P1 (first point) is a predetermined point where the acoustic signal AC1 (first acoustic signal) emitted from the sound hole 221*a* (first sound hole) reaches. The position P2 (second point) is a predetermined point that is farther from the acoustic signal output device than the position P1 (first point). In this way, the sound leakage can be effectively suppressed.

Hereinafter, an example will be described in which the housing 2112 is the housing 12 of the first embodiment or a modification thereof, and this housing 12 (the housing 2112) is held by the mounting portion 2221 of mounting method 8. However, the present invention is not limited thereto. The housing 2112 may be the housings 12, 12", and 22 illustrated in the second to fourth embodiments and their modifications, and the housings 12, 12", and 22 may be held by the mounting portion 2221' of mounting method 9. In this case as well, the following configuration can be applied.

As illustrated in FIG. 61B, the acoustic signal output device 2600 in this case includes the driver unit 11 that emits the acoustic signal AC1 (first acoustic signal) to one side (D1-direction side) and emits the acoustic signal AC2 (second acoustic signal) which is a negative phase signal of the acoustic signal AC1 (first acoustic signal) or an approximate signal of the negative phase signal to the other side (D2-direction side). As described above, the walls 121 and 123 of the housing 12 are provided with one or more sound holes 121*a* (first sound holes) for guiding the acoustic signal AC1 (first acoustic signal) emitted from the driver unit 11 to the outside, and one or more sound holes 123*a* (second sound holes) for guiding the acoustic signal AC2 (second acoustic signal) emitted from the driver unit 11 to the outside (FIGS. 61B and 61C). As mentioned above, a portion of the acoustic signal AC2 (second acoustic signal) emitted from the sound hole 123*a* (second sound hole) cancels out a portion of the acoustic signal AC1 (first acoustic signal) emitted from the sound hole 121*a* (first sound hole), whereby sound leakage is suppressed. As illustrated in FIG. 61B, the sound hole 121*a* (first sound hole) of the housing 12 is disposed on the inner side (D1-direction side) of the shielding wall 2221*b*, and the sound hole 123*a* (second sound hole) is disposed on the outer side (D2-direction side) of the shielding wall 2221*b*. In this way, it is possible to suppress the acoustic signal AC1 from being canceled out by the acoustic signal AC2 inside the shielding wall 2221*b* and cancel out a portion of the acoustic signal AC1 (first acoustic signal) leaking to the outside of the shielding wall 2221*b* with a portion of the acoustic signal AC2 emitted from the sound holes 123*a* (second sound holes). As a result, the sound leakage of the acoustic signal AC1 to the outside can be effectively suppressed without significantly reducing the listening efficiency of the acoustic signal AC1 by the user.

As described above, a portion (the end 2221*c* side) of the shielding wall 2221*b* is provided in the open portion O51 that partially opens the portion (the lower portion 1024) of the auricle 1020 to the outside when the upper portion 1022 of the auricle 1020 is fitted into the inner wall surface 2221*aa* side of the fixing portion 2221*a* (FIGS. 61A and 61B). That is, the open portion O51 in this example is provided at a position that opens the lower portion 1024 of the auricle 1020 to the outside when the upper portion 1022 of the auricle 1020 is fitted into the inner wall surface 2221*aa* side of the fixing portion 2221*a*. Here, the opening area per unit area (FIG. 61B) of the sound holes 123*a* (second sound holes) arranged on the side where the open portion O51 is provided is larger than the opening area (FIG. 61C) per unit area of the sound holes 123*a* (second sound holes) arranged on the side where the open portion is not provided. That is, as illustrated in FIGS. 61B, 61C, and 62A, the sound holes 123*a* (second sound holes) are provided along the above-mentioned circumference C1. Here, a case will be considered in which the surface of the wall 123 of the housing 12 is equally divided into unit area regions (in this example, unit area regions C5-1 and C5-2) along the circumference C1. In this example, the number of sound holes 123*a* (second sound holes) arranged on the side (unit area region C5-1) where the open portion O51 is provided is larger than the number of sound holes 123*a* (second sound holes) arranged on the side (unit area region C5-2) where the open portion is not provided. Therefore, the opening area per unit area of the sound holes 123*a* (second sound holes) arranged on the side (unit area region C5-1) where the open portion O51 is provided is larger than the opening area per unit area of the sound holes 123*a* (second sound holes) arranged on the side (unit area region C5-2) where the open portion is not provided. As a result, the sound pressure distribution of the acoustic signal AC2 (second acoustic signal) emitted from the sound holes 123*a* and 223*a* (second sound holes) can be brought closer to the sound pressure distribution of the acoustic signal AC1 leaking to the outside of the shielding wall 2221*b*, and the acoustic signal AC1 can be appropriately canceled out by the acoustic signal AC2, the sound leakage can be effectively suppressed.

In addition, as illustrated in FIG. 62B, the average opening area of the sound holes 123*a* (second sound holes) arranged on the side (unit area region C5-1) where the open portion O51 is provided may be larger than the average opening area of the sound holes 123*a* (second sound holes) arranged on the side (unit area region C5-2) where the open portion is not provided. Alternatively, as illustrated in FIG. 63A, sound holes 123*a* (second sound holes) arranged in pairs in a direction perpendicular to the circumference C1 may be arranged at equal intervals in the direction of the circumference C1 on the side (unit area region C5-1) where the open portion O51 is provided, whereas one set of sound holes 123*a* (second sound holes) may be arranged at equal intervals in the direction of the circumference C1 on the side (unit area region C5-2) where the open portion is not provided. Alternatively, as illustrated in FIG. 63B, the sound holes 123*a* (second sound holes) may be arranged on the side (unit area region C5-1) where the open portion O51 is provided, but the sound holes 123*a* (second sound holes) may not be arranged on the side (the unit area region C5-2) where the open portion is not provided. Even in this case, the sound leakage can be effectively suppressed.

Sixth Embodiment

In the sixth embodiment, another mounting method for an ear-mounted acoustic signal output device will be described.

<Mounting Method 11

As in the acoustic signal output device 3100 illustrated in FIG. 64A, the mounting portion 2121 of the acoustic signal output device 2100 of mounting method 1 may be omitted.

<Mounting Method 12>

As in the acoustic signal output device 3200 illustrated in FIG. 64B, the mounting portion 2123 of the acoustic signal output device 2100 of mounting method 1 may be omitted, and the housing 2112 may be any of the housings 12, 12", and 22 described above. However, in this example, when the acoustic signal output device 3200 is mounted on the auricle 1020, the opening direction (D1) of the sound holes 121*a* and 221*a* of the housings 12, 12", and 22 is configured to be substantially perpendicular to the direction of the ear canal 1021.

<Mounting Method 13>

As in the acoustic signal output device 3300 illustrated in FIG. 65A, the mounting portion 2121 of the acoustic signal output device 2300 of mounting method 5 may be omitted, and the housing 2112 may be any of the above-mentioned housings 12, 12", and 22. In this example, when the acoustic signal output device 3300 is mounted on the auricle 1020, the sound holes 121*a* and 221*a* of the housings 12, 12", and 22 are configured to face the ear canal 1021 side.

<Mounting Method 14>

As in the acoustic signal output device 3600 illustrated in FIG. 65B, the mounting portion 2221 of the acoustic signal output device 2500 of mounting method 8 may be replaced with a mounting portion 2221'. The mounting portion 2221' includes a shielding wall 2221*b* configured to cover only the upper portion 1022 of the auricle 1020 when the inner wall surface side of the fixing portion 2221*a* is fitted into the upper portion 1022 of the auricle 1020. Furthermore, the end 2221*c'* of the shielding wall 2221*b* is configured in a curved shape, and the region covered by the shielding wall 2221*b* on the ear ring 1022*a* side of the auricle 1020 is smaller than the region covered by the shielding wall 2221*b* on the base side of the auricle 1020.

<Mounting Method 15>

As in the acoustic signal output device 4100 illustrated in FIG. 66A, the mounting portion 2122 of the acoustic signal output device 2200 of mounting method 4 may be omitted.

<Mounting Method 16>

Figure 66B:
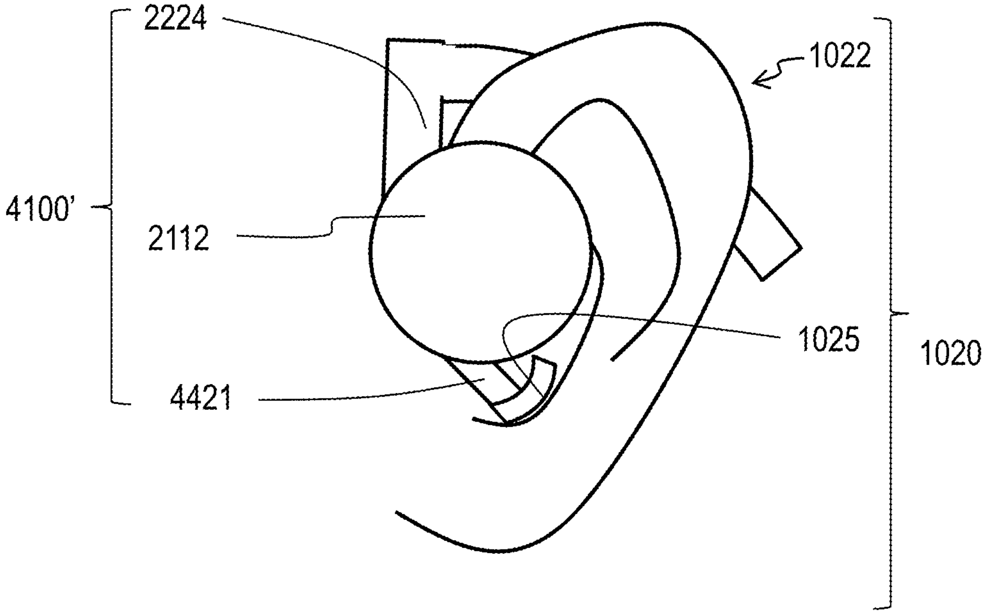

As in the acoustic signal output device 4100' illustrated in FIG. 66B, the mounting portion 2122 of the acoustic signal output device 2200 of mounting method 4 may be omitted, and a mounting portion 4421 configured to contact the concha cavity 1025 of the auricle 1020 during mounting may be further provided. One end of the mounting portion 4421 holds the housing 2112, and the other end of the mounting portion 4421 is configured in a shape capable of supporting the concha cavity 1025 so as not to block the ear canal. As a result, more stable mounting is possible.

<Mounting Method 17>

The acoustic signal output device 4200 illustrated in FIG. 67A includes a housing 2112, a columnar mounting portion 4210 that holds the housing 2112 and is configured to be disposed at the base side of the auricle 1020 during mounting, and an arc-shaped mounting portion 4220 that is held at both ends of the mounting portion 4210 and is mounted on the region from the back side of the upper portion 1022 to the lower portion 1024 of the auricle 1020.

<Mounting Method 18

As in the acoustic signal output device 4300 illustrated in FIG. 67B, the mounting portion 2122 of the acoustic signal output device 2200 of mounting method 4 may be omitted, and the housing 2112 may be any of the above-mentioned housings 12, 12", and 22. However, in this example, when the acoustic signal output device 4300 is mounted on the auricle 1020, the opening direction (D1) of the sound holes 121*a* and 221*a* of the housings 12, 12", and 22 is configured to be substantially perpendicular to the direction of the ear canal 1021.

<Mounting Method 19>

The acoustic signal output device 5110 of mounting method 19 illustrated in FIGS. 68A to 68E includes a housing 5111 that emits an acoustic signal, and a mounting portion 5112 of a type that holds the housing 5111 and is hooked on the back side of the upper portion 1022 of the auricle 1020 during mounting. The mounting portion 5112 is a bent rod-shaped member, and the housing 5111 is attached to one end of the mounting portion 5112 so as to be rotatable in the R5 direction. As illustrated in FIG. 68E, the housing 5111 is mounted in a state where the sound holes through which acoustic signals are emitted are directed toward the ear canal without blocking the ear canal. At this time, the auricle 1020 is sandwiched between the housing 5111 and the mounting portion 5112, whereby the acoustic signal output device 5110 is fixed to the auricle 1020. Furthermore, since the housing 5111 is rotatable in the R5 direction in relation to one end of the mounting portion 5112, the mounting position and the sound hole position can be adjusted according to the size and shape of an individual auricle 1020.

<Mounting Method 20>

The acoustic signal output device 5120 of mounting method 20 illustrated in FIGS. 69A to 69C includes a housing 5121 that emits an acoustic signal, and a mounting portion 5122 of a type that holds the housing 5121 and is hooked on the back side of the upper portion 1022 of the auricle 1020 during mounting. Unlike mounting method 19, the housing 5121 is not rotatable in relation to the mounting portion 5122. As illustrated in FIG. 69C, the housing 5121 is mounted in a state where the sound holes through which acoustic signals are emitted are directed toward the ear canal without blocking the ear canal. At this time, the auricle 1020 is sandwiched between the housing 5121 and the mounting portion 5122, whereby the acoustic signal output device 5120 is fixed to the auricle 1020.

<Mounting Method 21>

The acoustic signal output devices 5130 and 5140 of mounting method 21 illustrated in FIGS. 70A and 70B include housings 5131 and 5141 that emit acoustic signals and mounting portions 5132 and 5142 of a type that hold the housings 5131 and 5141, respectively, and are hooked on the back side of the upper portion 1022 of the auricle 1020 during mounting.

Furthermore, the acoustic signal output device 5140 illustrated in FIG. 70B is provided with a mounting portion 5143 configured to contact the concha cavity 1025 of the auricle 1020 during mounting. As a result, more stable mounting is possible.

<Mounting Method 22>

The acoustic signal output device 5150 illustrated in FIGS. 71A, 71B, and 71C includes a housing 5151 that emits an acoustic signal, a rod-shaped mounting portion 5152 of a type that holds the housing 5151 and is hooked on the back side of the upper portion 1022 of the auricle 1020 during mounting, a columnar supporting portion 5154 that holds the housing 5151 at one end and holds the mounting portion 5152 at the other end, a rod-shaped mounting portion 5153 of a type that is hooked on the back side of the intermediate portion 1023 and the upper portion 1022 of the auricle 1020 from the intermediate portion 1023 side during mounting, and a columnar supporting portion 5155 that holds the housing 5151 at one end and holds the mounting portion 5153 at the other end. As illustrated in FIG. 71C, the housing 5151 is mounted in a state where the sound holes through which acoustic signals are emitted are directed toward the ear canal without blocking the ear canal. At this time, the auricle 1020 is sandwiched between the housing 5151 and the mounting portions 5152 and 5153, whereby the acoustic signal output device 5150 is fixed to the auricle 1020.

<Mounting Method 23>

The acoustic signal output device 5160 illustrated in FIGS. 72A to 72E includes a housing 5161 that emits an acoustic signal a column-shaped mounting portion 5164 that holds the housing 5161, and is configured to be disposed at the base side of the auricle 1020 during mounting, a rod-shaped mounting portion 5162 of a type that is held at one end of the mounting portion 5164 and is hooked on the back side of the upper portion 1022 of the auricle 1020 during mounting, and a rod-shaped mounting portion 5163 of a type that is held at the other end of the mounting portion 5164 and is hooked on the back side of the lower portion 1024 of the auricle 1020 during mounting. As illustrated in FIG. 72E, the housing 5161 is mounted in a state where the sound holes through which acoustic signals are emitted are directed toward the ear canal without blocking the ear canal. At this time, the auricle 1020 is sandwiched between the housing 5161, the mounting portion 5164, and the mounting portions 5162, 5163, whereby the acoustic signal output device 5160 is fixed to the auricle 1020.

<Mounting Method 24>

The acoustic signal output devices 5170 and 5180 illustrated in FIGS. 73A to 73D and 74A to 74D include housings 5171 and 5181 that emit acoustic signals, respectively, and column-shaped mounting portions 5172 and 5182 configured to be disposed on the back side of the intermediate portion 1023 of the auricle 1020 during mounting, and curved strip-shaped supporting portions 5173 and 5183 that hold the housings 5171 and 5181 at one end and hold the mounting portions 5172 and 5182 at the other end. As illustrated in FIGS. 73D and 74D, the housings 5171 and 5181 are mounted in a state where the sound holes through which acoustic signals are emitted are directed toward the ear canal without blocking the ear canal. At this time, the auricle 1020 is sandwiched between the housings 5171 and 5181 and the mounting portions 5172 and 5182, whereby the acoustic signal output devices 5170 and 5180 are fixed to the auricle 1020.

<Mounting Method 25>

The acoustic signal output device 5190 illustrated in FIGS. 75A to 75C includes a housing 5191 that emits an acoustic signal and a rod-shaped mounting portion 5192 that holds the housing 5191 and is configured to be disposed on the back side of the auricle 1020 during mounting. The mounting portion 5192 holds the housing 5191 at one end on the side where the mounting portion is disposed on the lower portion 1024 side of the auricle 1020 during mounting. As illustrated in FIG. 75C, the housing 5191 is mounted in a state where the sound holes through which acoustic signals are emitted are directed toward the ear canal without blocking the ear canal. At this time, the auricle 1020 is sandwiched between the housing 5191 and the mounting portion 5192, whereby the acoustic signal output device 5190 is fixed to the auricle 1020.

<Mounting Method 26>

The acoustic signal output device 5200 illustrated in FIGS. 76A to 76E includes a housing 5201 that emits an acoustic signal, and an annular mounting portion 5202 that holds the housing 5021. As illustrated in FIG. 76E, the housing 5201 is mounted in a state where the sound holes through which acoustic signals are emitted are directed toward the ear canal without blocking the ear canal. During mounting, the auricle 1020 is inserted into the annular mounting portion 5202, and the mounting portion 5202 is disposed on the back side of the upper portion 1022, the intermediate portion 1023, and the lower portion 1024 of the auricle 1020. At this time, the auricle 1020 is sandwiched between the housing 5201 and the mounting portion 5202, whereby the acoustic signal output device 5200 is fixed to the auricle 1020.

<Mounting Method 27>

As illustrated in FIGS. 77A and 79B, the acoustic signal output device may be configured such that one of the housings 12, 12", and 22 illustrated in the first to fourth embodiments and their modifications is fixed to the temples of glasses.

In the acoustic signal output devices 5310 and 5320 illustrated in FIGS. 77A and 77B, one end of the supporting portion 5312 is held in the middle portion of the temples 5311 of the glasses, and the other end of the supporting portion 5312 holds the housing 12. In both acoustic signal output devices 5310 and 5320, the temples 5311 of the glasses are disposed on the back side of the upper portion 1022 of the auricle 1020 during mounting. However, in the acoustic signal output device 5310 illustrated in FIG. 77A, the opening direction of the sound hole 121*a* of the housing 12 is inclined with respect to the ear canal 1021 during mounting. On the other hand, in the example of the acoustic signal output device 5320 illustrated in FIG. 77B, the sound hole 121*a* of the housing 12 is disposed to be directed toward the ear canal 1021 side during mounting.

In the acoustic signal output devices 5340 and 5350 illustrated in FIGS. 78A and 78B, the housing 12 is directly held at the middle portion of the temples 5311 of the glasses. In both acoustic signal output devices 5340 and 5350, the temples 5311 of the glasses are disposed on the back side of the upper portion 1022 of the auricle 1020 during mounting. However, in the acoustic signal output device 5340 illustrated in FIG. 78A, the housing 12 is held by the temples 5311 so that the opening direction of the sound hole 121*a* of the housing 12 is approximately perpendicular to the temples 5311, and the opening direction of the sound hole 121*a* of the housing 12 is substantially perpendicular to the ear canal 1021 during mounting. On the other hand, in the acoustic signal output device 5350 illustrated in FIG. 78B, the housing 12 is held by the temples 5311 so that the opening direction of the sound hole 121*a* of the housing 12 is approximately parallel to the temples 5311, and the opening direction of the sound hole 121*a* of the housing 12 is directed toward the upper portion 1022 of the auricle 1020 during mounting.

In the acoustic signal output devices 5360 and 5370 illustrated in FIGS. 79A and 79B, the housing 12 is directly held at the tip portions of the temples 5361 and 5371 of the glasses. In both acoustic signal output devices 5360 and 5370, during mounting, the temples 5361 of the glasses are disposed on the back side of the upper portion 1022 of the auricle 1020. However, the acoustic signal output device 5360 illustrated in FIG. 79A is disposed such that the opening direction of the sound hole 121*a* of the housing 12 is directed from the base side of the lower portion 1024 of the auricle 1020 toward the ear canal 1021 side during mounting. The acoustic signal output device 5370 illustrated in FIG. 79B is disposed such that the opening direction of the sound hole 121*a* of the housing 12 is directed from the outer side of the lower portion 1024 of the auricle 1020 toward the ear canal 1021 side during mounting.

<Mounting Method 28>

In addition, as in the acoustic signal output device 5380 illustrated in FIG. 80A, any of the housings 12, 12", and 22 illustrated in the first to fourth embodiments and their modifications may be fixed to a rod-shaped mounting portion 5381 that is curved in a shape to be mounted on the neck or shoulder of the user 1000. Further, as in the acoustic signal output device 5390 illustrated in FIG. 80B, any of the housings 12, 12", and 22 may be fixed to a rod-shaped mounting portion 5391 that is curved in a shape that is mounted on the top of the head of the user 1000. Further, as in the acoustic signal output device 5400 illustrated in FIG. 80C, any of the housings 12, 12", and 22 may be fixed to a rod-shaped mounting portion 5401 that is curved in a shape that is mounted on the back of the head of the user 1000 and the auricle 1020.

<Other Mounting Methods>

In addition, the mounting methods of existing open-ear earphones may be applied to the acoustic signal output devices 4, 4', 10, 20, and 30 illustrated in the first to fourth embodiments and their modifications. For example, as illustrated in Reference 1 (https://www.sony.jp/headphone/products/STH40D/feature_1.html), a ring body serving as a stopper may be added to the D1-direction side of the housings 12, 12", and 22 or the acoustic signal output units 40-1 and 40-2, and a U-shaped mounting portion may be added to the side opposite to the D1-direction side of the housings 12, 12", and 22 or the acoustic signal output units 40-1 and 40-2. In this case, the ring body is placed around the peripheral portion (for example, the concha) of the external ear canal, and the lower portion of the auricle is sandwiched by the U-shaped mounting portion, whereby the housings 12, 12", and 22 or the acoustic signal output units 40-1 and 40-2 are mounted on the auricle. In particular, when the mounting method of Reference 1 is applied to the acoustic signal output device 20 of the second embodiment, a ring body serving as a stopper may be added to the D1-direction side of the housing 22, and a U-shaped mounting portion added to the D2-direction side of the housing 22 serves as the waveguides 24 and 25 and the housing 23 (FIG. 35).

For example, as illustrated in Reference 2 (https://www.bose.com/en_us/products/headphones/earbuds/sport-open-earbuds.html#v=sport_open_earbuds_black), the housings 12, 12", and 22 or the acoustic signal output units 40-1 and 40-2 may be formed into a substantially elliptical cylinder shape, and a J-shaped mounting portion may be provided on the housings 12, 12", and 22 or the acoustic signal output units 40-1 and 40-2. In this case, the D1-direction side of the housings 12, 12", and 22 or the acoustic signal output units 40-1 and 40-2 is placed on the front side (external ear canal side) of the upper portion of the auricle, and the J-shaped mounting portion is hooked on the back side of the upper portion of the auricle, whereby the housings 12, 12", and 22 or the acoustic signal output units 40-1 and 40-2 are mounted on the auricle.

For example, as illustrated in Reference 3 (https://ambie.co.jp/soundearcuffs/tws/), the housings 12, 12", and 22 or the acoustic signal output units 40-1 and 40-2 may be configured in a substantially spherical shape, and the side opposite to the D1-direction side of the housings 12, 12", and 22 or the acoustic signal output units 40-1 and 40-2 may be held at one end side of a C-shaped mounting portion. The other end of this C-shaped mounting portion may also be configured in a substantially spherical shape. In this case, the D1-direction side of the housings 12, 12", and 22 or the acoustic signal output units 40-1 and 40-2 are placed around the peripheral portion (for example, the concha) of the external ear canal, and the intermediate portion of the auricle is gripped (sandwiched) by the C-shaped mounting portion, whereby the housings 12, 12", and 22 or the acoustic signal output units 40-1 and 40-2 are mounted on the auricle.

For example, as illustrated in Reference 4 (https://www.jabra.jp/bluetooth-headsets/jabra-elite-active-45e##100-99040000-40), the sound holes 121*a* and 221*a* of the housings 12, 12", and 22 or the acoustic signal output units 40-1 and 40-2 may be provided with a sound pipe for directing the acoustic signals emitted from the sound holes 121*a* and 221*a* toward the external ear canal.

For example, as illustrated in Reference 5 (https://www.audio-technica.co.jp/product/ATH-EW9), the housings 12, 12", and 22 or the acoustic signal output units 40-1 and 40-2 may be provided with a semicircular mounting portion (ear hanger) having an adjustment mechanism (slide fit mechanism) for adjusting the position of the mounted housing or acoustic signal output unit relative to the auricle. In this case, the D1-direction side of the housings 12, 12", and 22 or the acoustic signal output units 40-1 and 40-2 is disposed on the front side of the upper portion of the auricle, and the semicircular mounting portion is hooked on the back side of the upper portion of the auricle, whereby the housings 12, 12", and 22 or the acoustic signal output units 40-1 and 40-2 are mounted on the auricle. By operating the adjustment mechanism in this state, the positions of the mounted housings 12, 12", and 22 or the acoustic signal output units 40-1 and 40-2 relative to the auricle can be adjusted.

For example, as illustrated in Reference 6 (https://www.mu6.live/), a headband-type mounting portion may be provided in the housings 12, 12", and 22 or the acoustic signal output units 40-1 and 40-2. For example, both ends of the headband-type mounting portion may hold the housings 12, 12", and 22 or the acoustic signal output units 40-1 and 40-2. At this time, the housings 12, 12", and 22 or the acoustic signal output units 40-1 and 40-2 may be rotatable relative to both ends of the headband-type mounting portion, respectively. In this case, the D1-direction side of the housings 12, 12", and 22 or the acoustic signal output units 40-1 and 40-2 is placed on or near the auricle, and the headband-type mounting portion is mounted on the head. At this time, by rotating the housings 12, 12", and 22 or the acoustic signal output units 40-1 and 40-2 relative to the headband-type mounting portion, the mounting position of the headband-type mounting portion and the positions of the housings 12, 12", and 22 or the acoustic signal output units 40-1 and 40-2 relative to the auricle can be adjusted.

Other Modifications

Note that the present invention is not limited to the above-described embodiments. For example, in each of the above-described embodiments and their modifications, examples have been described in which the present invention is applied to an acoustic listening device (for example, open-ear earphones, headphones, and the like) that is worn on the user's ear without sealing the ear canal. However, the present invention is not limit thereto, and the present invention is applicable to acoustic listening devices such as bone conduction earphones and neck speaker earphones that are worn on body parts other than the ear without sealing the user's ear canal.

In addition, for example, the present invention may also be used as an acoustic signal output device capable of controlling the attenuation rate of the acoustic signal emitted to the outside without providing an acoustic absorbent in the sound hole through which the acoustic signal emitted from the driver unit passes. Further, for example, the present invention may also be used as an acoustic signal output device capable of attenuating acoustic signals emitted from a driver unit so that they cannot be heard at a predetermined position without performing directional control based on physical shape or signal processing. Furthermore, for example, the present invention may be used as an acoustic signal output device capable of attenuating an acoustic signal at a point where the acoustic signal is to be attenuated, without placing a speaker at that point. For example, the present invention may be used as an acoustic signal output device capable of locally reproducing an acoustic signal in a specific local region without covering the periphery of the specific local region with an acoustic absorbent.

REFERENCE SIGNS LIST

4, 4', 10, 20, 30, 2100 to 2600, 3100 to 3300, 3600, 4100 to 4300, 5110 to 5200, 5310 to 5400 Acoustic signal output device
11 Driver unit
113 Diaphragm
12, 12", 22, 23, 2112, 5021, 5111, 5121, 5131, 5151, 5161, 5171, 5191, 5201 Housing
121*a*, 123*a*, 221*a*, 223*a* Sound hole
13 Acoustic absorbent
24, 25 Waveguide
31, 41 Circuit portion
40-1, 40-2 Acoustic signal output unit
AC1, AC2 Acoustic signal
AR21, AR22 Hollow portion
C1 Circumference
C1-1, C1-2, C1-3, C1-4 Unit arc region
MAC1, MAC2 Monaural acoustic signal
2121, 2122, 2123, 2124, 2221, 2224, 4210, 4220, 4421, 5112, 5122, 5132, 5152, 5153, 5162, 5163, 5164, 5172, 5192, 5202, 5381, 5391, 5401 Mounting portion
2121*a*, 2122*a*, 2123*a*, 2124*a*, 2221*a* Fixing portion
2221*b* Shielding wall

The invention claimed is:

1. An acoustic signal output device comprising:
a driver unit;
a housing that houses the driver unit therein;

an acoustic signal emitted from the driver unit to one side being defined as a first acoustic signal, and an acoustic signal emitted from the driver unit to the other side being defined as a second acoustic signal; and a wall of the housing being provided with one or more first sound holes for guiding the first acoustic signal to the outside, and one or more second sound holes for guiding the second acoustic signal to the outside, wherein a direction between a first direction and a direction opposite to the first direction is a second direction, the one or more first sound holes are provided on the first direction side of the housing, the one or more second sound holes are provided on the second direction side of the housing, and no sound hole is provided on a side of the housing opposite to the first direction.

2. The acoustic signal output device according to claim 1, further comprising a waveguide for adjusting a path length from a position of the driver unit to an emission position of the first acoustic signal to the outside of the acoustic signal output device, wherein the waveguide is designed so that a first sound pressure level at a point when the first acoustic signal is emitted from a first sound hole of the one or more first sound holes and the second acoustic signal is emitted from a second sound hole of the one or more second sound holes is smaller than a second sound pressure level at the point when the first acoustic signal is emitted from the first sound hole but the second acoustic signal is not emitted from the second sound hole.

3. The acoustic signal output device according to claim 1, wherein lengths in a depth direction of a first sound hole of the one or more first sound holes and a second sound hole of the one or more second sound holes, a total opening area of the one or more first sound holes and the one or more second sound holes, and a volume of an internal space of the housing are designed so that a resonance frequency based on the Helmholtz resonance of the housing belongs to a frequency band other than a predetermined frequency band within an audible frequency band.

4. The acoustic signal output device according to claim 3, wherein the predetermined frequency band is a band of 3000 Hz or higher and 8000 Hz or lower.

5. The acoustic signal output device according to claim 1, further comprising a waveguide for adjusting a path length from a position of the driver unit to an emission position of the first acoustic signal to the outside of the acoustic signal output device, wherein the waveguide is designed so that a first sound pressure level at a point when the first acoustic signal is emitted from a first sound hole of the one or more first sound holes and a second acoustic signal of the one or more second sound holes is emitted from the second sound hole is smaller than a second sound pressure level at the point when the first acoustic signal is not emitted from the first sound hole and the second acoustic signal is emitted from the second sound hole.

6. The acoustic signal output device according to claim 1, further comprising a waveguide for adjusting a path length from a position of the driver unit to an emission position of the second acoustic signal to the outside of the acoustic signal output device, wherein the waveguide is designed so that a first sound pressure level at a point when the first acoustic signal is emitted from a first sound hole of the one or more first sound holes and the second acoustic signal is emitted from a second sound hole of the one or more second sound holes is smaller than a second sound pressure level at the point when the first acoustic signal is emitted from the first sound hole but the second acoustic signal is not emitted from the second sound hole.

7. The acoustic signal output device according to claim 1, further comprising a waveguide for adjusting a path length from a position of the driver unit to an emission position of the second acoustic signal to the outside of the acoustic signal output device, wherein the waveguide is designed so that a first sound pressure level at a point when the first acoustic signal is emitted from a first sound hole of the one or more first sound holes and a second acoustic signal of the one or more second sound holes is emitted from the second sound hole is smaller than a second sound pressure level at the point when the first acoustic signal is not emitted from the first sound hole and the second acoustic signal is emitted from the second sound hole.

8. An acoustic signal output device comprising:

a driver unit;

a housing that houses the driver unit therein;

an acoustic signal emitted from the driver unit to one side being defined as a first acoustic signal, and an acoustic signal emitted from the driver unit to the other side being defined as a second acoustic signal; and a wall of the housing being provided with one or more first sound holes for guiding the first acoustic signal to the outside, and one or more second sound holes for guiding the second acoustic signal to the outside, wherein the acoustic signal output device further comprises:

a waveguide for adjusting at least one of a path length from a position of the driver unit to an emission position of the first acoustic signal to the outside of the acoustic signal output device, and/or a path length from the position of the driver unit to an emission position of the second acoustic signal to the outside of the acoustic signal output device, wherein $\omega$ is a frequency, $H_{ncg,in}(\omega)$ is a transfer function from the other side of the driver unit in an internal space of the housing to the emission position of the second acoustic signal to the outside of the acoustic signal output device, $H_{pos,out}(\omega)$ is a transfer function from the emission position of the first acoustic signal to the outside of the acoustic signal output device to a point, and $H_{neg,\ out}(\omega)$ is a transfer function from the emission position of the second acoustic signal to the outside of the acoustic signal output device to the point, the waveguide is designed so that $H_{neg,in}(\omega)$ matches or approximates $H_{pos,out}(\omega)/H_{neg,out}(\omega)$ for the frequency $\omega$ in the frequency band.

9. An acoustic signal output device comprising:

a driver unit, a housing that houses the driver unit therein, an acoustic signal emitted from the driver unit to one side being defined as a first acoustic signal, and an acoustic signal emitted from the driver unit to the other side being defined as a second acoustic signal, and a wall of the housing being provided with one or more first sound holes for guiding the first acoustic signal to the outside, and one or more second sound holes for guiding the second acoustic signal to the outside, wherein a ratio $S_2/S_1$ of a total opening area $S_2$ of the one or more second sound holes to a total opening area $S_1$ of the one or more first sound holes satisfies $2/3 \leq S_2/S_1 \leq 4$.

* * * * *